US012387036B1

(12) United States Patent
Elsen et al.

(10) Patent No.: US 12,387,036 B1
(45) Date of Patent: Aug. 12, 2025

(54) MULTIMODAL AGENT FOR EFFICIENT IMAGE-TEXT INTERFACE AUTOMATION

(71) Applicant: Anthropic, PBC, San Francisco, CA (US)

(72) Inventors: Erich Elsen, San Francisco, CA (US); Curtis Hawthorne, San Francisco, CA (US); Augustus Odena, San Francisco, CA (US); Maxwell Nye, San Francisco, CA (US); Arushi Somani, San Francisco, CA (US); Kyle Vigen, San Francisco, CA (US); Rohan Bavishi, San Francisco, CA (US); Sagnak Tasirlar, San Francisco, CA (US); Warut Vijitbenjaronk, San Francisco, CA (US); Ulas Kirazci, San Francisco, CA (US); Joe Gershenson, San Francisco, CA (US); Shaya Zarkesh, San Francisco, CA (US)

(73) Assignee: Anthropic, PBC, San Francisco, CA (US)

( * ) Notice: Subject to any disclaimer, the term of this patent is extended or adjusted under 35 U.S.C. 154(b) by 0 days.

(21) Appl. No.: 18/909,588

(22) Filed: Oct. 8, 2024

Related U.S. Application Data

(60) Provisional application No. 63/638,613, filed on Apr. 25, 2024, provisional application No. 63/638,644, (Continued)

(51) Int. Cl.
*G06F 40/166* (2020.01)
*G06F 3/0481* (2022.01)
(Continued)

(52) U.S. Cl.
CPC .......... *G06F 40/166* (2020.01); *G06F 3/0481* (2013.01); *G06F 40/284* (2020.01); (Continued)

(58) Field of Classification Search
None
See application file for complete search history.

(56) References Cited

U.S. PATENT DOCUMENTS

| | | | |
|---|---|---|---|
| 6,226,785 | B1 | 5/2001 | Peterson et al. |
| 8,185,544 | B2 | 5/2012 | Oztekin et al. |

(Continued)

FOREIGN PATENT DOCUMENTS

WO WO-2024146961 A1 * 7/2024 ............ G06N 3/006

OTHER PUBLICATIONS

Li, Bo, Peiyuan Zhang, Jingkang Yang, Yuanhan Zhang, Fanyi Pu, and Ziwei Liu. "Otterhd: A high-resolution multi-modality model." arXiv preprint arXiv:2311.04219 (2023). (Year: 2023).*

(Continued)

*Primary Examiner* — Frank D Mills
(74) *Attorney, Agent, or Firm* — Haynes and Boone LLP

(57) ABSTRACT

A system for image-text agentic interface automation is disclosed. A multimodal agent is configured to process arbitrary-length text sequences and arbitrary-resolution images. A newline insertion logic is configured to interleave a newline character between successive lines of image patches in a plurality of lines of image patches, wherein the newline character specifies an end of a line in an input image. A tokenization logic is configured to translate the input text sequence into a sequence of input text tokens, and to translate the successive lines of image patches interleaved with the newline character into a sequence of input image tokens. A linear projection logic is configured to linearly project a single token stream of the sequence of input text tokens and the sequence of input image tokens into a decoder-only Transformer logic, wherein the linear projection of the single token stream bypasses any embedding lookup.

18 Claims, 180 Drawing Sheets
(121 of 180 Drawing Sheet(s) Filed in Color)

Related U.S. Application Data filed on Apr. 25, 2024, provisional application No. 63/638,631, filed on Apr. 25, 2024, provisional application No. 63/567,667, filed on Mar. 20, 2024, provisional application No. 63/567,681, filed on Mar. 20, 2024, provisional application No. 63/567,698, filed on Mar. 20, 2024, provisional application No. 63/567,721, filed on Mar. 20, 2024, provisional application No. 63/567,714, filed on Mar. 20, 2024.

(51) Int. Cl.

| | |
|---|---|
| *G06F 40/284* | (2020.01) |
| *G06V 10/77* | (2022.01) |
| *G06V 10/80* | (2022.01) |
| *G06V 10/82* | (2022.01) |

(52) U.S. Cl.

CPC ........ *G06V 10/7715* (2022.01); *G06V 10/803* (2022.01); *G06V 10/82* (2022.01)

(56) References Cited

U.S. PATENT DOCUMENTS

| | | | | |
|---|---|---|---|---|
| 8,855,684 | B2 | 10/2014 | Bellver et al. | |
| 9,218,128 | B1 | 12/2015 | Yuschik et al. | |
| 10,257,225 | B1 | 4/2019 | Sites | |
| 10,587,708 | B2 | 3/2020 | Laird-McConnell et al. | |
| 11,645,564 | B2 | 5/2023 | Wu et al. | |
| 11,809,887 | B2 | 11/2023 | Hinton et al. | |
| 11,907,864 | B2 | 2/2024 | Wu et al. | |
| 2002/0062475 | A1 | 5/2002 | Iborra et al. | |
| 2003/0217054 | A1 | 11/2003 | Bachman et al. | |
| 2004/0054690 | A1 | 3/2004 | Hillerbrand et al. | |
| 2004/0078787 | A1 | 4/2004 | Borek et al. | |
| 2004/0215665 | A1 | 10/2004 | Edgar et al. | |
| 2006/0155954 | A1 | 7/2006 | Haynes et al. | |
| 2006/0161878 | A1 | 7/2006 | Koh et al. | |
| 2008/0118051 | A1 | 5/2008 | Odinak et al. | |
| 2011/0041140 | A1 | 2/2011 | Harm et al. | |
| 2013/0226892 | A1 | 8/2013 | Ehsani et al. | |
| 2014/0157288 | A1 | 6/2014 | Wong | |
| 2014/0214404 | A1 | 7/2014 | Kalia et al. | |
| 2015/0339712 | A1 | 11/2015 | Koutrika et al. | |
| 2016/0162172 | A1 | 6/2016 | Rathod | |
| 2016/0335331 | A1 | 11/2016 | Schnase et al. | |
| 2017/0091178 | A1 | 3/2017 | Barbosa et al. | |
| 2017/0289305 | A1 | 10/2017 | Liensberger et al. | |
| 2018/0012141 | A1 | 1/2018 | Chehreghani et al. | |
| 2018/0060744 | A1 | 3/2018 | Achin et al. | |
| 2019/0171984 | A1 | 6/2019 | Irimie et al. | |
| 2019/0187987 | A1 | 6/2019 | Fauchère et al. | |
| 2019/0332686 | A1 | 10/2019 | Lee | |
| 2020/0342316 | A1* | 10/2020 | Shazeer | G06N 3/08 |
| 2023/0106716 | A1* | 4/2023 | Xiong | G06V 10/811 704/9 |
| 2023/0222623 | A1* | 7/2023 | Ke | G06N 3/0455 382/155 |
| 2023/0281400 | A1* | 9/2023 | Wang | G06F 40/284 704/2 |
| 2023/0306205 | A1 | 9/2023 | Maeder et al. | |
| 2023/0325693 | A1 | 10/2023 | Wu et al. | |
| 2023/0342167 | A1 | 10/2023 | Radkoff et al. | |
| 2023/0351149 | A1* | 11/2023 | Yu | G06N 3/045 |
| 2023/0386025 | A1 | 11/2023 | Loddenkemper et al. | |
| 2023/0419652 | A1* | 12/2023 | Tiong | G06V 10/82 |
| 2024/0119257 | A1* | 4/2024 | Guo | G06F 16/583 |
| 2024/0256835 | A1* | 8/2024 | Dehghani | G06N 3/088 |
| 2024/0282084 | A1* | 8/2024 | Serra | G06V 10/774 |
| 2024/0282094 | A1* | 8/2024 | Tsimpoukelli | G06V 10/80 |
| 2024/0290065 | A1* | 8/2024 | Park | G06V 10/44 |
| 2024/0303443 | A1 | 9/2024 | Cheng et al. | |
| 2024/0362272 | A1 | 10/2024 | Lee et al. | |
| 2024/0370765 | A1 | 11/2024 | Pierucci et al. | |
| 2024/0412720 | A1 | 12/2024 | Vasylyev | |

OTHER PUBLICATIONS

F. Shi, R. Gao, W. Huang and L. Wang, "Dynamic MDETR: A Dynamic Multimodal Transformer Decoder for Visual Grounding," in IEEE Transactions on Pattern Analysis and Machine Intelligence, vol. 46, No. 2, pp. 1181-1198, Feb. 2024 (Year: 2024).*

J. Wu, W. Gan, Z. Chen, S. Wan and P. S. Yu, "Multimodal Large Language Models: A Survey," 2023 IEEE International Conference on Big Data (BigData), Sorrento, Italy, 2023, pp. 2247-2256 (Year: 2023).*

Chen, Delong, Samuel Cahyawijaya, Jianfeng Liu, Baoyuan Wang, and Pascale Fung. "Subobject-level Image Tokenization." arXiv preprint arXiv:2402.14327 (2024). (Year: 2024).*

Adept Product Team, 'Building Powerful Agents with Adept', Aug. 23, 2024, 12 pages.

Adept Team, "Adept Fuyu-Heavy: A new multimodal model", Jan. 24, 2024, 11 pages.

Erich Elsen, Augustus Odena, Maxwell Nye, Sanak Tarlar, Tri Dao, Curtis Hawthorne, Deepak Moparthi, Arushi Somani, "Releasing Persimmon-8B", Sep. 7, 2023, 7 pages.

Erich Elsen, Curtis Hawthorne, Arushi Somani, "The Adventure of the Errant Hardware", Sep. 19, 2023, 14 pages.

Rohan Bavishi, Erich Elsen, Curtis Hawthorne, Maxwell Nye, Augustus Odena, Arushi Somani, Sanak Tarlar, "Fuyu-8B: A Multimodal Architecture for AI Agents", Oct. 17, 2023, 22 pages.

Tri Dao, "FlashAttention: Fast Transformer training with long sequences", Jan. 17, 2023, 9 pages.

Li et al, Demonstration+ Natural Language: Multi modal Interfaces for GUI-Based Interactive Task Learning Agents (Year: 2021) 43 pages.

Sethi, Pooja, et al. "Autonlu: Detecting, root-causing, and fixing nlu model errors." arXiv preprint arXiv:2110.06384 (2021). (Year:2021) 10 pages.

Takebayashi et al., Multi modal Interface Agent for Enhancing Knowledge Sharing (Year: 1997) 4 pages.

U.S. Appl. No. 18/908,447 Non Final Office Action dated Dec. 13, 2024, 27 pages.

U.S. Appl. No. 18/909,068 Non-final Office Action dated Dec. 19, 2024, 34 pages.

U.S. Appl. No. 18/909,186 Non-final Rejection dated Dec. 9, 2024, 27 pages.

U.S. Appl. No. 18/909,455 Non-final Office Action dated Dec. 19, 2024, 30 pages.

U.S. Appl. No. 18/909,531 Non-final Rejection dated Jan. 3, 2025, 110 pages.

Walker et al. "Neural semantic parsing with anonymization for command understanding in general-purpose service robots." Robot World Cup. Cham: Springer International Publishing, 2019. 337-350. (Year: 2019) 14 pages.

Xie et al., OpenAgents: An Open Platform for Language Agents in the Wild, (Year: 2023) 34 pages.

Yin, Pengcheng. Learning Structured Neural Semantic Parsers. Diss. Carnegie Mellon University, 2021. (Year: 2021) 189 pages.

Zhou, Shuyan, et al. "Webarena: A realistic web environment for building autonomous agents." arXiv preprint arXiv:2307.13854 (2023). (Year: 2023) 22 pages.

* cited by examiner $$Z = softmax\left(\frac{QK^T}{\sqrt{d_k}}\right)V$$

```
batch_size = tf.shape(x)[0]
x = self.rescale(x)
patches = self.extract_patches(x)
x = self.patch_proj(patches)

class_emb = tf.broadcast_to(
    self.class_emb, [batch_size, 1, self.d_model]
)
x = tf.concat([class_emb, x], axis=1)
x = x + self.pos_emb for layer in self.enc_layers:
    x = layer(x, training)

return self.mlp_head(x[:, 0])
```

Figure 10

AI agents translate user intent into actions. This is immensely valuable, but not yet solved in the industry:

Existing approaches fall short on multiple axes, due to:

- Inability to interact with or understand UIs visually
- Over reliance on API coverage and text generation
- Hallucinations and low reliability

59%

GPT-4 agent score on enterprise task benchmark

Our 3-pronged approach is more robust, reliable, and future-proof:

- Our model sees pixels *natively* and is SOTA at VQA: it can understand software UI, and know how to proceed
- Our model is SOTA at localization and knows exactly *where to click*
- We've built a custom actuation layer that translates model instructions into real web events

88%

Adept agent score on same benchmark

Figure 11

Figure 17
Heading OCR
Question: Tell me the heading text of this screenshot of webpage.
Answer: Discover, Appreciate, & Understand the Animal World!
Captioning
Question: What is the meta description of this website?
Answer: The world's largest & most trusted collection of animal facts, pictures and more!
WebQA
Question: What additional platform is mentioned for following the website's content?
Answer: YouTube Channel
Website-wise Task
Element-wise Task
Action-wise Task
Element OCR
Question: Tell me the text content in the red bounding box
Answer: We believe that if people know about the world's creatures they will better care for them. That's why we add new animals for you to discover ...
Element Grounding
Question: I have labeled bright IDs for some HTML elements in this website screenshot. Tell me which one is the element corresponding to the description: button with text "See All Animals A-Z!"
Answer: D
Action Grounding
Question: I have labeled bright IDs for some HTML elements in this website screenshot. Tell me which one I should click to complete the instruction: learn about the animal of the day
Answer: C
Action Prediction
Question: After clicking the element in the bounding box, which one is the best description of the new webpage?
(A) Animal news, facts, ...
(B) All animals A-Z List
(C) The 7 best pet ...
(D) Search any animals!
Answer: C
Discover, Appreciate, & Understand the Animal World!
Discover Your Favorite Animal Today!

VisualWebBench is a multimodal benchmark designed to assess the understanding and grounding capabilities of MLLMs in web scenarios.
7 different tasks across 139 websites

Our models outperform larger frontier models on public web understanding benchmarks due to a focus on these skills from the pre-training stage

*Visual Web Bench assesses MLLMs on human-curated web tasks.*

| | Overall Average | Action Prediction | Element Ground | Element OCR | Action Ground | Web Caption | Web QA | Heading OCR |
|---|---|---|---|---|---|---|---|---|
| Adept-110B | 71.5 | 75.09 | 95.16 | 89.75 | 71.84 | 24 | 78.83 | 66.11 |
| GPT-4V | 64.6 | 67.6 | 67.5 | 62.8 | 75.7 | 34.5 | 75 | 68.8 |
| Claude Sonnet | 65.8 | 63.4 | 68.8 | 89.2 | 58.3 | 28.9 | 81.8 | 70.3 |
| Gemini Pro | 48 | 26.7 | 44.3 | 65.4 | 43.7 | 25 | 55.5 | 75.1 |

Leading to production-grade models fine-tuned to be SOTA for agentic skills:

| Models | Adept-8B | Adept-110B | Adept-180B |
|---|---|---|---|
| Optimized for | Inference speed and web element location | Reasoning and planning capabilities | Complex reasoning |
| Eval Performance (%) | | | |
| Web Locates | 86.7 | 90.1 | 92.9 |
| Web VQA | 75.1 | 88.6 | 88.2* |
| E2E Agent Evals | 78.8 | 92.1 | 87.1* |
| MMLU | 48.6 | 69.7 | 80.3 |
| MMMU | 36.4 | 41.9 | 50.9 |

*The 180B model was fine-tuned on less agentic data than the 110B model

Figure 19

To power this agent, we've focused on two core capabilities in our Unified Adept model: locate and VQA. What does this mean?
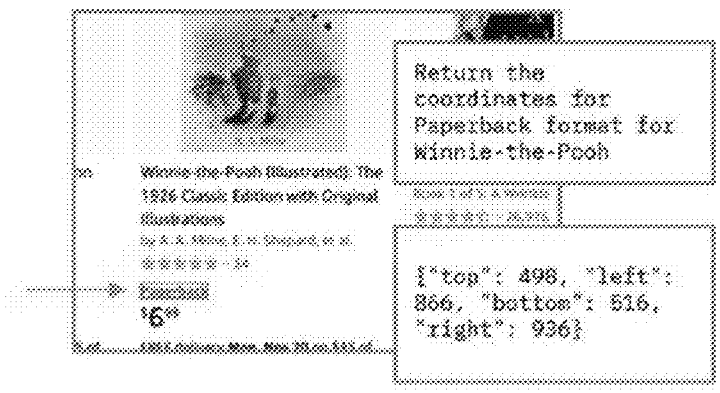
Our model can Locate elements on the screen given a screenshot and text description
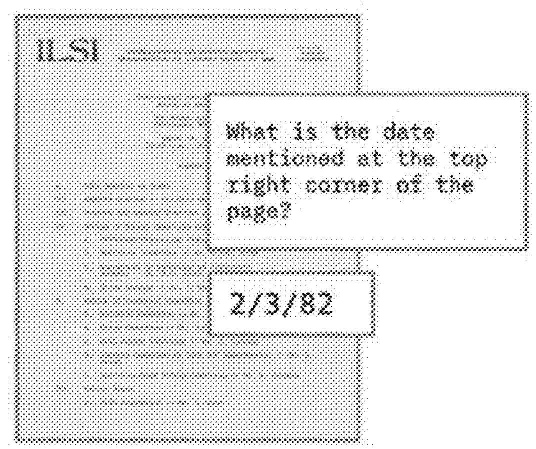
Our model can Answer questions about screenshots of websites and documents
Figure 20

Figure 27
ORGANIC
EXHIBITION OPENING
MAY 11th 5 PM - 9 PM
MAY 11 JUNE 11
MENUS

Figure 28
Home
Reservations
Events
Menu
Gallery
About
Events
Your Contact Information
First Name *
Last Name *
Email Address *
Phone Number *
Ext.
Category *

Figure 29
Your Event Details
events@adept.ai
888-888-8888
Adept
Adept Happy Hour
Select an option

Figure 30
Your Event Details
event@adept.ai
Adept
Adept Happy Hour
5:00 PM
6:30 PM
Hello!
My name is Rick, and I am reaching out on behalf of Adept. We are planning a Team Happy Hour and
Select an option

Specialized Data

Human Collected: 14K Hours of Paired Video and Text of Software Tool-Use

Overview 14K hours of footage of usage of business tools including Zendesk, Salesforce, Gmail paired with text descriptions of the task being performed.

The actions were performed by a team of human annotators using a special recorder that captures metadata on actions like clicking, scrolling, and typing.

Post-processing and data format

The videos and recorder events are processed into trajectories where a text description of the task and human actions are interleaved with corresponding screenshots

Raw Data Example

```
INDEX 1 out of 5 TEXT: Book a 60-minute job
fair interview for potential candidates to
discuss career opportunities within our
organization.
========================================
INDEX 2 out of 5 IMAGE:
```

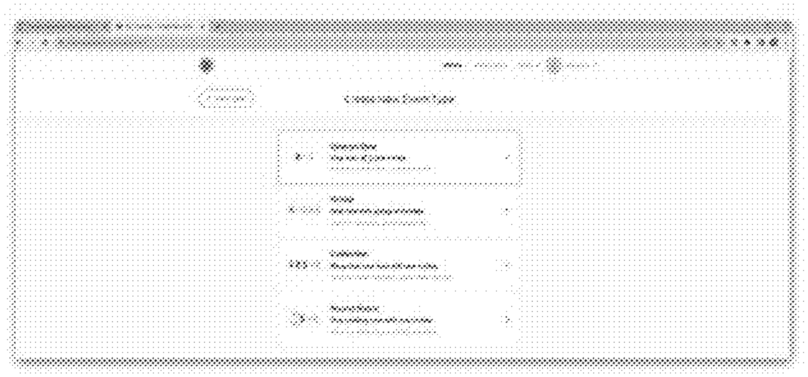

```
INDEX 3 out of 5 TEXT: click(870,326)
.
.
```

Figure 36

Specialized Data

Human Collected: Specific-Domain Multimodal Webcrawl (~1M observations)

Overview

Human annotators collected web observations on non-public, web pages spanning both consumer and business tools (Gmail, Doordash, Salesforce, Zendesk, etc.)

The annotators were instructed to reach complex states within these tools that would not be captured through a regular crawler (e.g., through filling out form fields).

This dataset contains ~1M observations with many MM's of tasks created from these observations.

Post-processing and data format

We built a proprietary pipeline that cleans the DOM captured in these observations and creates synthetic tasks for localizing elements on the page, confirming whether specific text is on the page, or identifying key:value pairs

Raw Data Example

```
URL: https://bob-
builder.atlassian.net/wiki/spaces/~71202009222
b849eea4cf7834ba397e7e51176/page
==========================================================
TASK TYPE: VISUAL QUESTION ANSWER
VQA DESCRIPTION: {'answer': ['Add tips in a
colored panel'], 'key': 'Success panel',
'sample_key': 'Error panel', 'sample_values':
['Call out errors in a colored panel']}
```

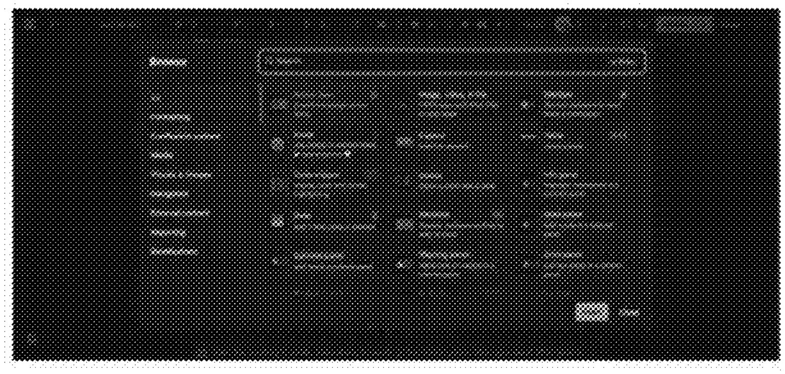

Figure 37

Specialized Data

Human-collected: Agent action trajectories

Overview

A team of humans instructed the Adept agent to perform specific tasks, and trajectories of agent rollout were collected. These were done on a targeted list of domains that are representative of both enterprise and consumer UIs.

Humans then gave feedback on these trajectories and positive examples were retained for training (~100K data points).

Post-processing and data format

The trajectories are processed into individual data points. Each datapoint is a step in the trajectory which contains the agent instructions, agent action, agent thought, screenshot and DOM.

Raw Data Example

> Image Observations (before/current)

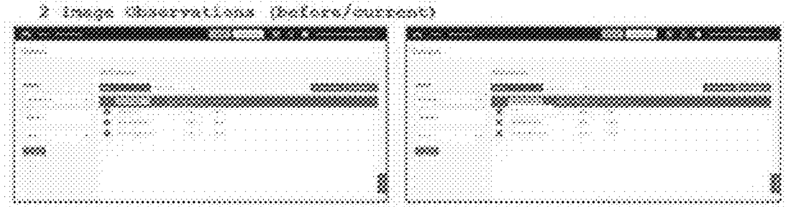

[illegible]

Figure 38

Specialized Data

Open-domain Multimodal Webcrawl

Overview

Since the human-collected webcrawl data was very impactful for improving model performance, we built an automated crawler to scale this dataset.

The open-domain webcrawl spans 200 million observations and MM's of tasks created based on these sites.

Post-processing and data format

We built a proprietary pipeline that cleans the DOM captured in these observations and creates synthetic tasks for localizing elements on the page, confirming whether specific text is on the page, or identifying key:value pairs (same processing as the human collected webcrawl data)

Raw Data Example

```
URL: https://www.asolo.com/en/mountain-trekking/1200-corax-gv.html
TASK TYPE: LOCALIZATION
ELEMENT DESCRIPTION: {'input_type': 'Search'}
```

Figure 39

Data Tooling

Labeler

The labeler is used by our human annotation team to label elements on the page with the text in the element, semantic ways to describe the element, and other information that can help the model understand things like relative relationships to other elements

Figure 40

Specialized Data > Our Models > Agent Loop > Agents > Data Tools

We've built custom tools for data collection, management, and and model performance feedback.

Recorder

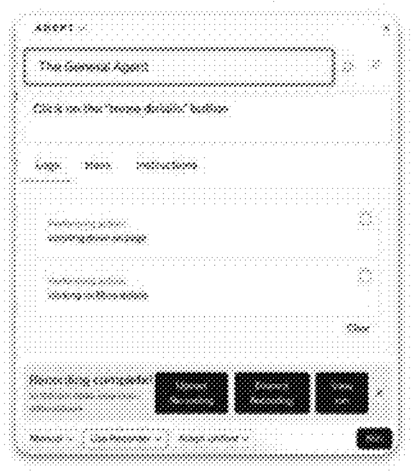

Our Recorder tool allows us to capture agent trajectories and human-provided step-wise feedback in a training-ready formats.

Labeler

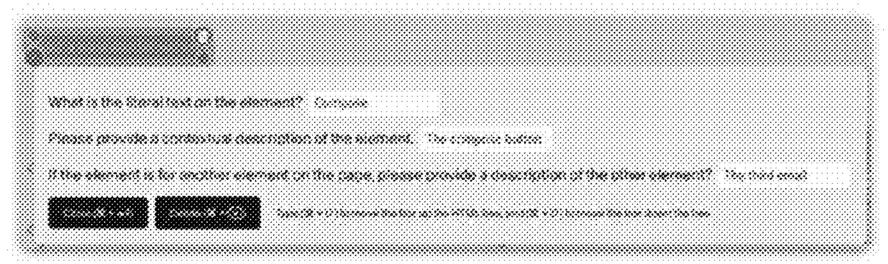

Our Labeler tool allows human annotators to easily add context to web UI for higher-fidelity training tasks (VQA, OCR, etc.)

Figure 41

Specialized Data > Our Models > Agent Loop > Agents > Data Tools

Our tooling enables data flywheels: the ability for you to rapidly collect effective, on-policy feedback for ongoing fine-tuning.

Recorder

The Recorder tool allows our human annotators to create tasks — "find pizza spots with over 4.6 stars" — and demonstrate to the agent (1) exactly where to click and (2) what that UI represents, via a label.

Stepwise Feedback w/ Recorder

Human annotators can also use the Recorder tool to instruct the agent, oversee its thinking process step-by-step, and intervene and provide feedback when the agent judges incorrectly. By giving *feedback* to the model, and ultimately allowing the agent to rethink its steps for itself, we maintain the structure of our agent traces for training. The feedback mechanism also allows us to effectively create good/bad pairs of agent traces, helpful for DPO.

In this video, you'll see a workflow for ordering Souvla salads on Doordash. For each step of the process, the agent first shows the human its proposed step -- a think trace and an action (a place to click, or a scroll, for example). The human either approves the step by hitting enter, or provides a hint to the agent to do something differently (you'll see the user provide a hint for how to find "greek style" in the salad modification modal.)

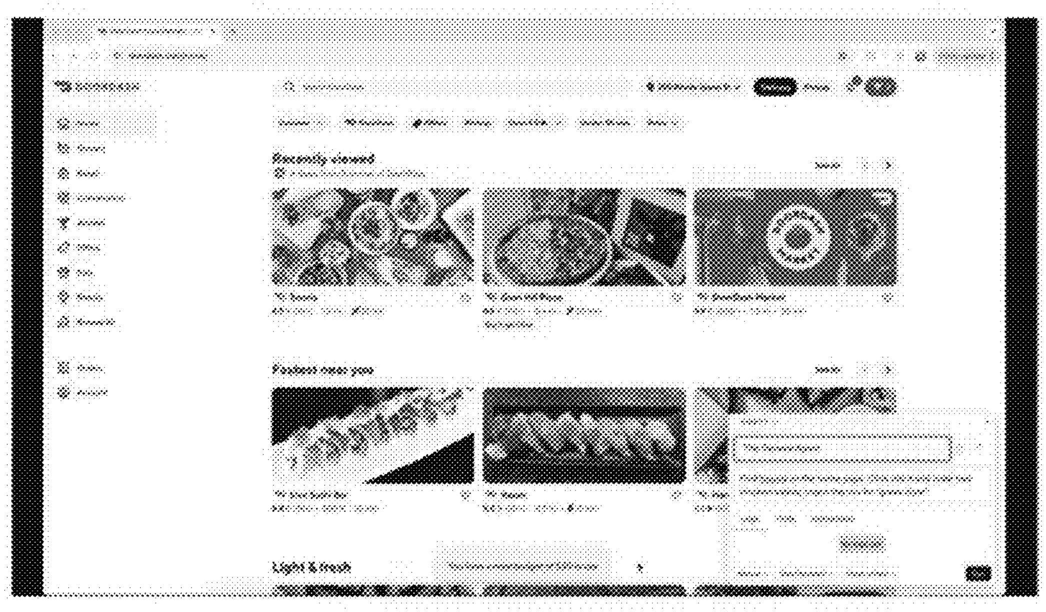

Figure 45

We built a lightweight interpreter in Typescript that is bundled with the client

| **Example AWL function** | **Model behavior** |
|---|---|
| act(prompt: string) | Agent observation, plan, act loop |
| isVisible(element: string): boolean | Model VQA |
| click(element: string, scrollContainer?: string) | Model locates element, issuing coordinates |
| answerQuestionAboutScreen(prompt: string, choices?: string[]): string | Model VQA |

Figure 49

Adept Agent: an AWL demo

AWL and our act() function make it easy to create long-horizon workflows:

Adept's Agent

While other functions are direct model calls, we also have a special act( ) function that invokes this agent loop. This loop *runs at inference time*, and happens for each step of the workflow until it determines that the workflow is finished.

Adept's Agent

In the agent loop, our 110B Unified Adept Model is used to reason about a plan like a human would: it sees the screen and makes a plan (VQA), *produces* the clicks necessary (locate), and assesses how to proceed (VQA).

Agent plans + Actuation:

```
think("The last action was to fill out the 'To' field with the address 'New York, NY'. The current screenshot shows
the 'To' field filled with 'New York, NY' and the dropdown menu with address suggestions is visible. This suggests
that the text input was successful. The next step is to select the correct address from the dropdown menu PROCEED");
think("The last action was to fill out the 'To' field with the address 'New York, NY'. Now, I need to select the
correct address from the dropdown menu.");
clickById("address suggestion", "3256");
```

Figure 53

Specialized Data > Our Models > Agent Loop > Agents > Data Tools

Our agent can successfully complete end-to-end complex enterprise workflows.

93.3%

*Completion score on our internal E2E agent eval*

Example click-level task for compliance training on Workday:

1. Click on the training assignment link
2. Select compliance training
3. Set the duration dropdown to Months
4. Set duration to 6 months
5. Click the checkbox for all employees
6. Click OK

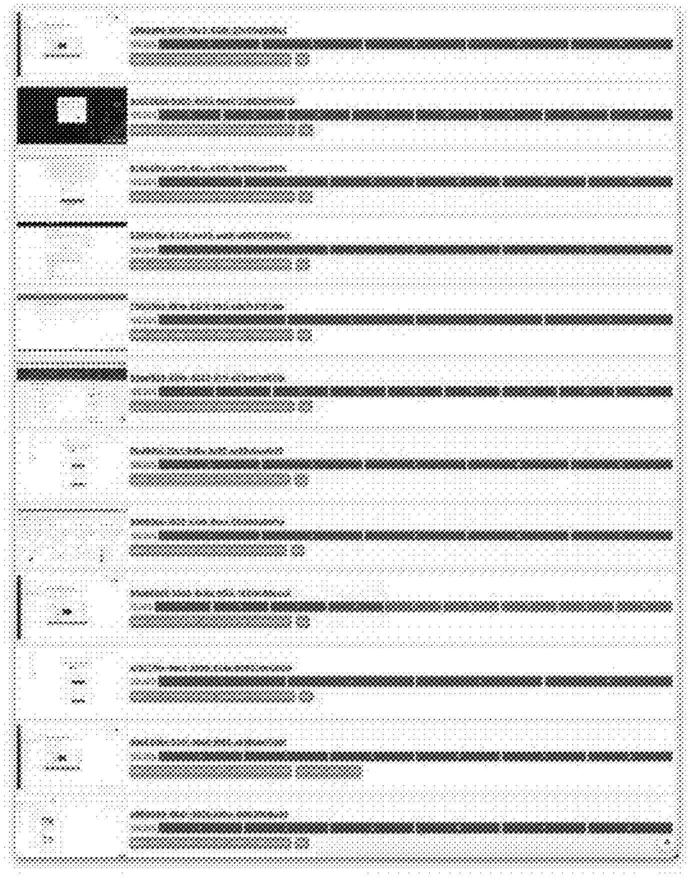

Figure 54

Specialized Data > Our Models > Agent Loop > Agents > Data Tools

We've successfully deployed our agents in production with 95%+ reliability across thousands of runs.

*Specialized Data > Our Models > Agent Loop >* *Agents >* *Data Tools*

Instructing an agent: Explicit instructions (Click Level) are extremely reliable – more abstract instructions (Step and Task Level) can be achieved with prompting or fine-tuning.

Task Level

1. Return the container availability for containers at portal.fenixmarineservices.com
2. Use my login info from 1Password, and this documentation: [link]

Step Level

1. Go to portal.fenixmarineservices.com/
2. Login with the credentials: username: asherb, password: Flexport257p
3. Add containers to the watchlist
4. Search for containers
5. Parse the containers into an array
6. Return container availability for those containers based on the business rules in the attached doc Click Level 1. Go to the URL portal.fenixmarineservices.com/
2. Click on the login button
3. Type asherb as the username
4. Type Flexport257 as the password
5. Click the sign in button
6. Click Add Containers to watchlist
7. Enter the containers: containers
8. Click add to watchlist
9. Close any popup if you need to by clicking OK
10. Click on the search bar and search for the containers: containers
11. Parse the containers: containers with the parseIntoArray() function
12. Return availability for the containers: containers using the getContainerAvailability() function

Figure 56

✕ Input: "Login to this website with Lina and secret_pass"
Output: `click("log in field"), type("lina"), click('password field'), type('secret_pass'), click('Sign in button')`

✓ Input: `(function=Login, parameters={username: 'lina', password: 'secret_pass'}, details="This function logs in to the user account given their username and password")` + screenshot
Output: `click("log in field"), type(username)` + more actions

Figure 57

The execution loop

Example:

1. The Function Planner (FP) receives

`(function=Login, parameters={username: 'lina', password: 'secret_pass'}, details="This function logs in to the user account given their username and password")` + the current screenshot + actions already taken 2. FP outputs `click("login field")`
3. Action model (which can be a separate small model which reliably executes atomic actions — locates and VQA) executes the click and sends the next screenshot to the FP.
4. FP outputs `type(username)` – username is replaced at runtime before actuation
5. repeat until at some point FP outputs EOS token.

Figure 58

- Function-like prompt + training data with parameters
  - At training time:

Prompt:

> function=ContainerAvailability, parameters={containers: 'CMAU3803762, CAIU7411659'}, details='This function navigates to a page showing if given containers are available to be picked up')

Actions: `Click("container numbers field")`; `Type(containers)`

- Note that the output of the model does not contain the container numbers in this case.
  - At inference time:

Prompt:

> function=ContainerAvailability, parameters={containers: 'CMAU3803762, CAIU7411658'}, details='This function navigates to a page showing if given containers are available to be picked up')

Actions: `Click("container numbers field")`; `Type(containers)`

Figure 59

Client

The internal tools extension or product client both implement a workflow runtime, which serves as an interpreter for AWL code. The workflow runtime runs a program, such as:

```
function workflow(){
  click("log in");
  act("Add something to cart");
}
```

Figure 68

The workflow runtime has builtin functions (like click, or type) and planner functions (like act). "Running the act agent" simply instantiates the following workflow and runs it:

```
function workflow(task){
  act(task);
}
```

The workflow runtime has an interpreter (a thing that takes in a piece of AdeptDSL code and runs it). The interpreter also takes in a list of external functions provided to it, so whenever the code hits one of these builtin functions, it kicks out to the external function. There are three types of external functions: *builtin* functions [like click and type], *planner* functions [like act], and *workflow* functions [these enable workflows to call other workflows]. The builtin functions use the *actuation sdk* to actually emit javascript events into the browser and perform actions.

When the workflow runtime hits a planner function, it makes a call to executePlan (see "const plannerFunctions" in buildExternalFunctions `applications/internal-tools/internal-tools-extension/src/lib/playback/workflowRuntime.ts` ). If you look at the `executePlan` function, it basically just calls `executePlanStep` in a loop.

`executePlanStep` does one step of the observation-AWL loop: it calls getObservation, and then calls the plan endpoint (see `const modelResponse = await this.services.modelService.plan` ). This endpoint returns a snippet of AWL to run, and the runtime creates a "nested" interpreter, and calls `nestedInterpreter.runAdeptWorkflowAbstractSyntaxTreeAsFunction` to run the nested program.

Figure 69

Backend

The relevant starting point for the plan endpoint is `plan(` in `applications/product-server/product-server-backend/src/model/model.service.ts` . It does the following:

1) Pull the relevant workflow event history.

2) Pull the relevant `Agent` class from the passed in agent config name. You can see an example of an Agent class at `applications/product-server/product-server-backend/src/model/lib/selectIdAgent.ts`

3) Calls `Agent` .getNextAction(). Technically each agent can do whatever it wants here, but in general, agents:

a) Provide a template, which is the system prompt with hooks to inject the dynamic pieces.

b) Call the `renderPrompt` function in `agentPromptRendering.ts` . This takes in a bundle of information and puts together a series of `ModelMessages.` Really it's just the prompt, plus an image or two c) Send the `ModelMessages` to the target model by calling `makeRawCompletionRequestWithMessages`

Figure 70

Workflow code:

```
print(answerQuestionAboutScreen("What is the latest market cap?"
click("The topmost 10-Q");
```

Adept output:

Adept says "$3.754 billion" and clicks the link shown below

Figure 71

Figure 72
BamSEC
Lyft Inc
20 Lyft Inc Expert Interviews, now on BamSEC Powered by Tegus
Financials
News
Prospectuses and Registrations
Proxies
Search in Documents
Key Exhibits

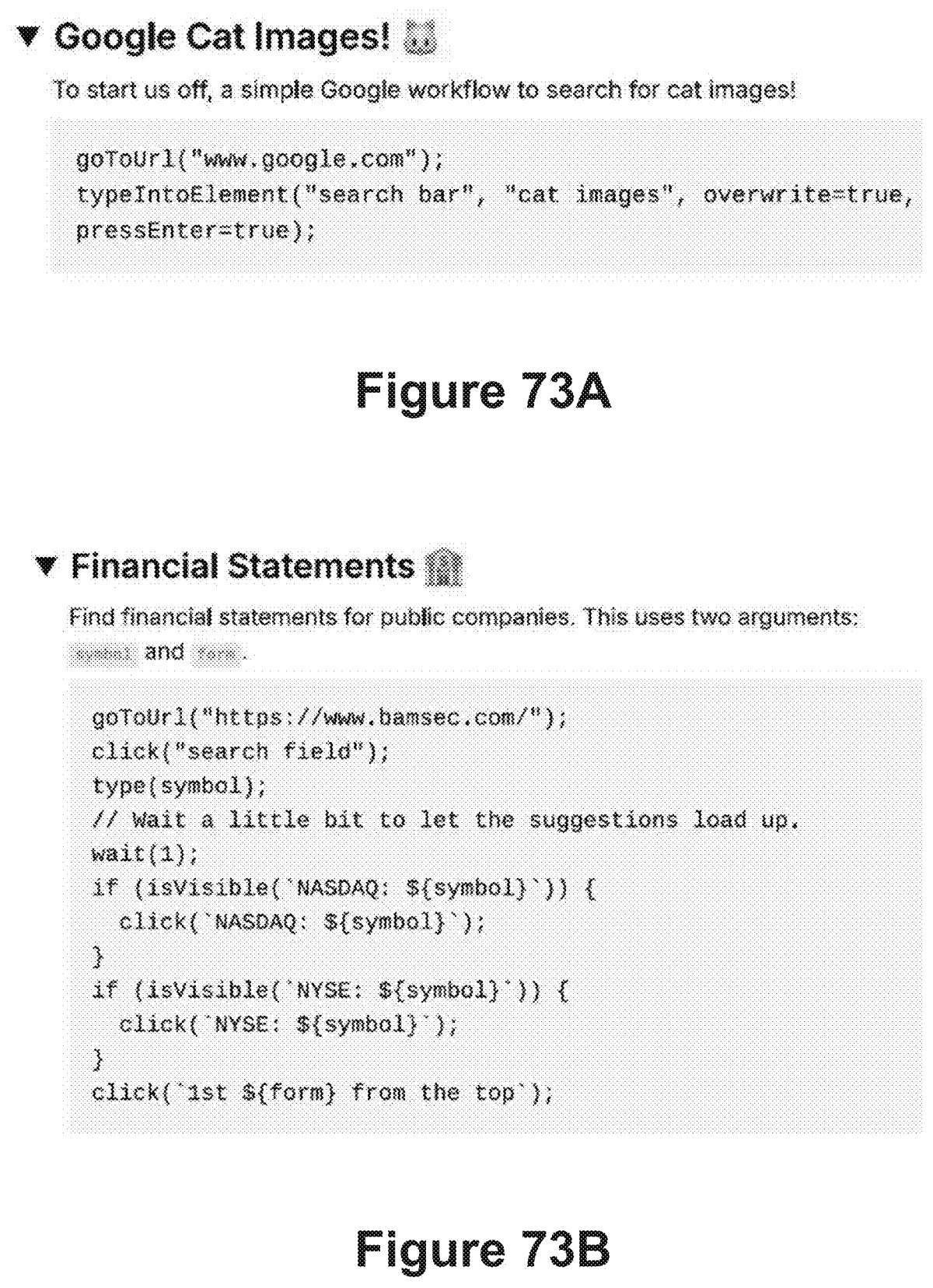

▼ Google Cat Images!

To start us off, a simple Google workflow to search for cat images!

```
goToUrl("www.google.com");
typeIntoElement("search bar", "cat images", overwrite=true,
pressEnter=true);
```

Figure 73A

▼ Financial Statements

Find financial statements for public companies. This uses two arguments: [illegible] and [illegible].

```
goToUrl("https://www.bamsec.com/");
click("search field");
type(symbol);
// Wait a little bit to let the suggestions load up.
wait(1);
if (isVisible(`NASDAQ: ${symbol}`)) {
  click(`NASDAQ: ${symbol}`);
}
if (isVisible(`NYSE: ${symbol}`)) {
  click(`NYSE: ${symbol}`);
}
click(`1st ${form} from the top`);
```

Figure 73B

▼ Spotify 🎼

Here's a workflow for Spotify's webplayer. It takes `artist_name` as an argument and adds 3 songs from that artist to the current queue.

```
function goToSong(song_name) {
  click("Search");
  type(song_name);
  wait(0.5);
  click("Song for " + song_name);
  wait(0.5);
  click(". . .");
  click("Add to queue");
}

artist_songs = compose(`Name 3 songs from ${artist_name}. R
eturn the results as an array. Be concise.`);
parsed_songs = parseIntoArray(artist_songs);

for (song of parsed_songs) {
  goToSong(song);
}
```

Figure 74

Built-in Functions

AWL provides a number of built-in functions that allow you to interact with a webpage at a much higher level of abstraction thanks to Adept's in-house models. These functions are akin to built-in functions, and can be treated as regular JS functions. We detail each of these functions below along with precise documentation and examples.

▼ `answerQuestionAboutScreen(prompt: string, choices?: string[]): string`

Asks a question (as given in `prompt`) about the screen and returns the model's text response. If a list `choices` is provided, chooses an answer from one of the choices; otherwise, responds in freeform.

See this snippet from the "Check Yosemite camping availability" example:

```
Workflow code:

availability = answerQuestionAboutScreen("Is Bridalveil Creek
print("Bridalveil Creek Campground is: " + availability + "."

Adept output:
```

```
"Bridalveil Creek Campground is: Unavailable"
```

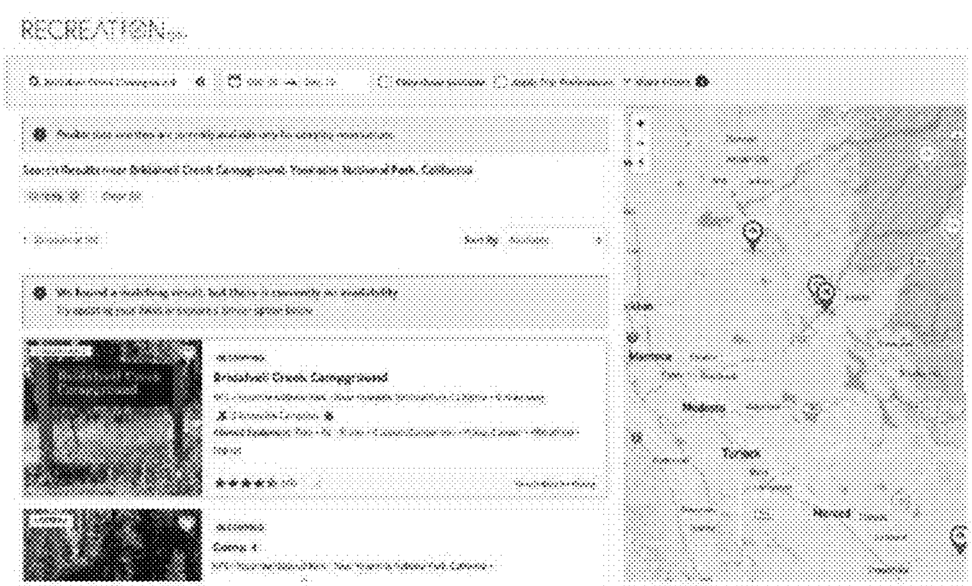

Figure 75

▼ `answerTrueFalseQuestionAboutScreen(prompt: string): boolean`

Asks the model a question (as given in `prompt`) about the screen and returns a boolean (true or false) based on the model's text response.

▼ `click(element: string, scrollContainer?: string)`

Clicks the element matching the given natural language description `element`. If the natural language container description `scrollContainer` is provided, it scrolls down the container until it finds the element.

▼ `compose(prompt: string, multiple?: boolean): string | string[]`

Calls a text model to compose some content per the given `prompt` and return it. If `multiple` is `true` then it formats the response as an array of strings. This can be useful for, say, looping over the results and applying an operation.

Examples:

`compose("A haiku about cats.")` returns `"Playful kittens pounce, whiskers twitch in moonlit night. Graceful feline dance."`

`compose("What are the first three planets of the solar system?", true)` returns `["Mercury", "Venus", "Earth"]`.

▼ `composeAndType(prompt: string, overwrite?: boolean = true, pressEnter?: boolean)`

Queries a text model using `prompt` and types out the resulting text stream as it comes in. If `overwrite` is true (defaults to `true`), it clears the contents of the input before typing. If `pressEnter` is true (defaults to `false`), it presses the Enter key after typing. Equivalent to `type(compose(prompt), overwrite, pressEnter)`.

Figure 76

▼ `getCurrentDate(format?: "full" | "date-only" | "time-only" = "full"): string`

Returns a formatted date. Valid options for `format` are: `"full"`, `"date-only"`, `"time-only"` (defaults to `"full"`)

Examples:

`getCurrentDate("full")` returns `Friday, November 3, 2023 at 4:45:56 PM PDT`

`getCurrentDate("date-only")` returns `11/3/2023`

`getCurrentDate("time-only")` returns `4:46:04 PM`

▼ `goToUrl(url: string)`

Goes to the given `url`.

▼ `isVisible(element: string): boolean`

Returns true if the natural language `element` is visible on the screen, and false otherwise.

▼ `keydown(keys: Key[])`

Performs a keydown event. A `key` is an object with the following properties:

```
type Key = {
  altKey?: boolean;
  ctrlKey?: boolean;
  key: string;
  metaKey?: boolean;
  shiftKey?: boolean;
}
```

Examples:

`keydown([{key: "Enter"}])` (Enter key)

`keydown([{key: "Enter", metaKey: true}])` (Cmd+Enter (Mac) / Ctrl+Enter (Windows))

`keydown([{key: "p", altKey: true}])` (Alt+P)

Figure 77

▼ `print(text: any)`

Prints any value provided as a string. Equivalent to `console.log` in regular TS/JS.

▼ `scroll(element: string, direction?: "up" | "down" | "left" | "right" = "down")`

Scrolls the element with the natural language description `element` in `direction` (one of: `"up"`, `"down"`, `"left"`, `"right"`, `"down"` by default). Scrolls by 75% of the element's height or width.

▼ `spotlight(elementToHighlight: string)`

Applies a visual highlight to the given element description on the screen. Mostly used for testing the model's capabilities and for debugging. Hit Esc to clear.

▼ `type(value: string, overwrite?: boolean = true, pressEnter?: boolean)`

Types out the exact string content of `value` into the currently focused element.
If
`overwrite` is `true` (defaults to `true`), it clears the contents of the input before typing.
If
`pressEnter` is `true` (defaults to `false`), it presses the Enter key after typing.

▼ `typeIntoElement(element: string, value: string)`

Types the exact `value` into the natural language element `element`. Equivalent to `click(element)` followed by `type(value)`.

▼ `wait(seconds: number)`

Waits for the given number of `seconds`. Can be an integer or float (e.g. 0.5 or 4).

Figure 78

Full Language Specification

Here's the Abstract Syntax Tree (AST) of the language as an EBNF grammar that precisely captures the constructs available in the Adept's workflow language:

```
Prog ::= Stmt* script

Stmt ::= ExprStmt(Expr expr)
       | Assign(Expr tgt, Expr val)
       | FunctionDef(Ref name, Param* params)
       | Return(Expr? expr)
       | If(Expr cond, Stmt* then, Stmt*? else)
       | While(Expr cond, Stmt* body)
       | ForOf(StoreExpr tgt, Expr iter, Stmt* body)
       | ForIn(StoreExpr tgt, Expr iter, Stmt* body)
       | For(Expr? initializer, Expr? cond, Expr? update, Stmt
* body)
       | Break
       | Continue
       | TryStatement(Stmt* body, CatchClause clause, Stmt*? f
inalizer)
       | CatchClause(Ref name, Stmt* body)
       | ThrowStatement(Expr expr)

Expr ::= str | int | bool | null | undefined | Ref
       | ParenthesizedExpr(Expr expr)
       | AssignExpr(Expr tgt, Expr val)
       | SubscriptAccess(Expr expr, Expr index)
       | PropertyAccess(Expr expr, str prop)
       | ArrayExpression(Expr* elements)
       | ObjectExpression(PropertyAssignment* props)
       | NewExpr(Expr func, Expr* args)
       | InterpolatedStr(Expr* parts)
       | Call(Expr func, Expr* args, Keyword* kwargs)
       | BinOp(Expr left, BOp op, Expr right)
       | PrefixUnOp(PrefixUOp op, Expr expr)
```

Figure 79

```
          | PostfixUnOp(Expr tgt, PostfixUOp op)
          | ConditionalExpression(Expr cond, Expr then, Expr els
e)

Ref ::= Reference(str varName)

PropertyAssignment ::= Prop((str | int) prop, Expr value)

BOp ::= && | `||` | & | `|` | ^ (xor) | >> | << | >>>
         | > | >= | < | <=
         | == | != | === (strict eq) | !== (strict ineq) |
         | + | - | / | * | % | ** (exponentiation)
         | ?? (nullish coalescing) | in | , (comma operator)
PrefixUOp ::= ! (not) | ++ | --
PostfixUOp ::= ++ | --

Param ::= Parameter(Ref name, (str | int | bool) kind)
Keyword ::= Keyword(Ref name, Expr value)
```

Figure 80

```
1. CLICK on the search bar
2. TYPE 'label:important newer_than:3d is:unread'
3. CLICK on the search icon
```

Figure 81A

```
1. CLICK to start a new email
2. TYPE 'max@adept.ai' into the recipient field
3. TYPE 'Inquiry Regarding Model Improvements' into the subject
```

```
4. TYPE 'Dear Max,\n\nI hope this message finds you well. Would
5. CLICK to send the email
```

Figure 81B

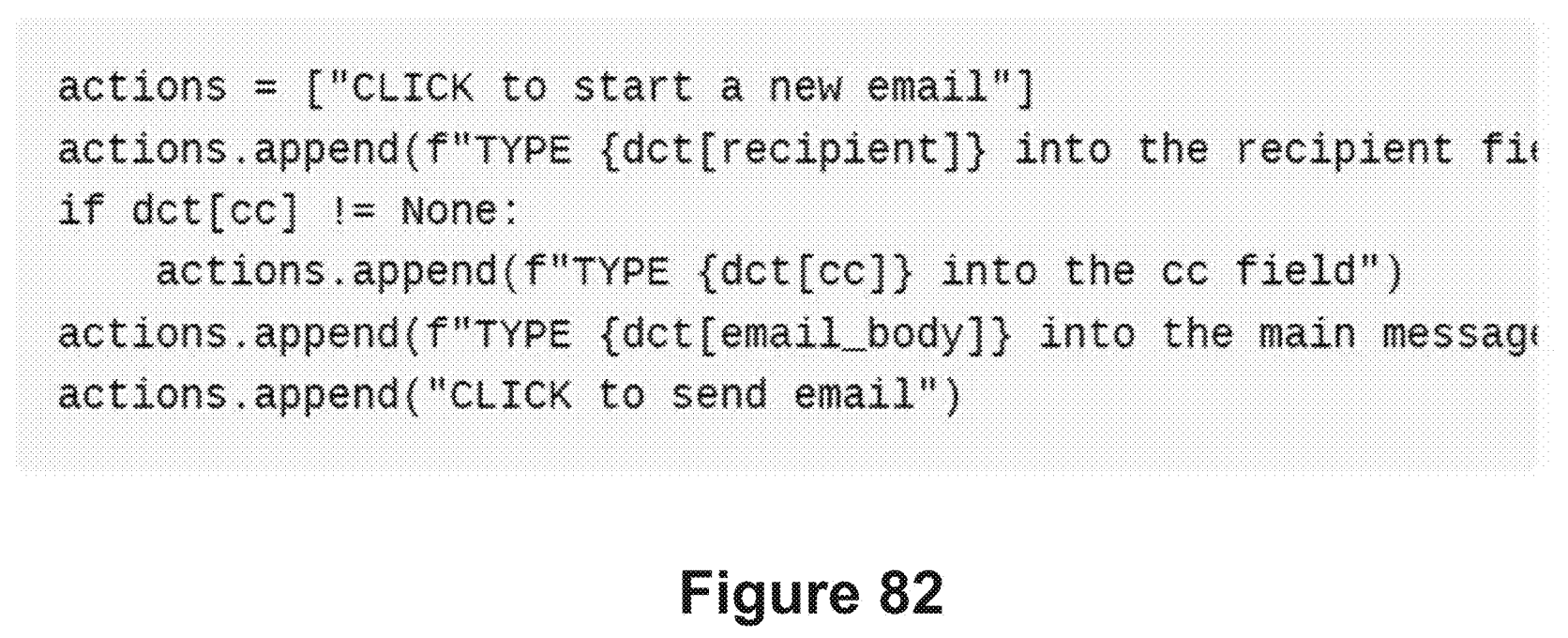

```
actions = ["CLICK to start a new email"]
actions.append(f"TYPE {dct[recipient]} into the recipient fi
if dct[cc] != None:
    actions.append(f"TYPE {dct[cc]} into the cc field")
actions.append(f"TYPE {dct[email_body]} into the main messag
actions.append("CLICK to send email")
```

Figure 82

```
goToUrl(
  "https://drive.google.com/file/d/1jOL06PfsbAN2sLrTI9H3V0ZKUpugjXJA/view",
);

contactJSON = act(
  "Extract the first row of this contact table in a JSON with the following fields per row: first_name,
last_name, position, email",
);

goToUrl("https://app.hubspot.com/contacts/47075812/objects/0-1/views/all/list");

click("Create contact");

act(
  `Fill out the fields for E-mail, First Name, Last Name, Job Title. Email - ${contactJSON.email}, First name -
${contactJSON.first_name}, Last name - ${contactJSON.last_name}, Job Title - ${contactJSON.position}. Then
click create.`,
);
```

Figure 83

"Streams"

One way Adept was planning to expose the agent to enterprises was via a dashboard product. In this view, a user could breakdown a long-horizon workstream and turn each of its steps — finding container availability, scheduling appointments, then updating dashboards, and generating invoices — into a column that could be assigned to an agent.

Workflows in columns could be configured to run only when a human had reviewed the previous step, and users would be able to see the contents of each agent's thought and action traces in the right hand viewer, if they wanted to zoom in.

Each column represented a step of a workflow that could be handled by a different configuration of our agents

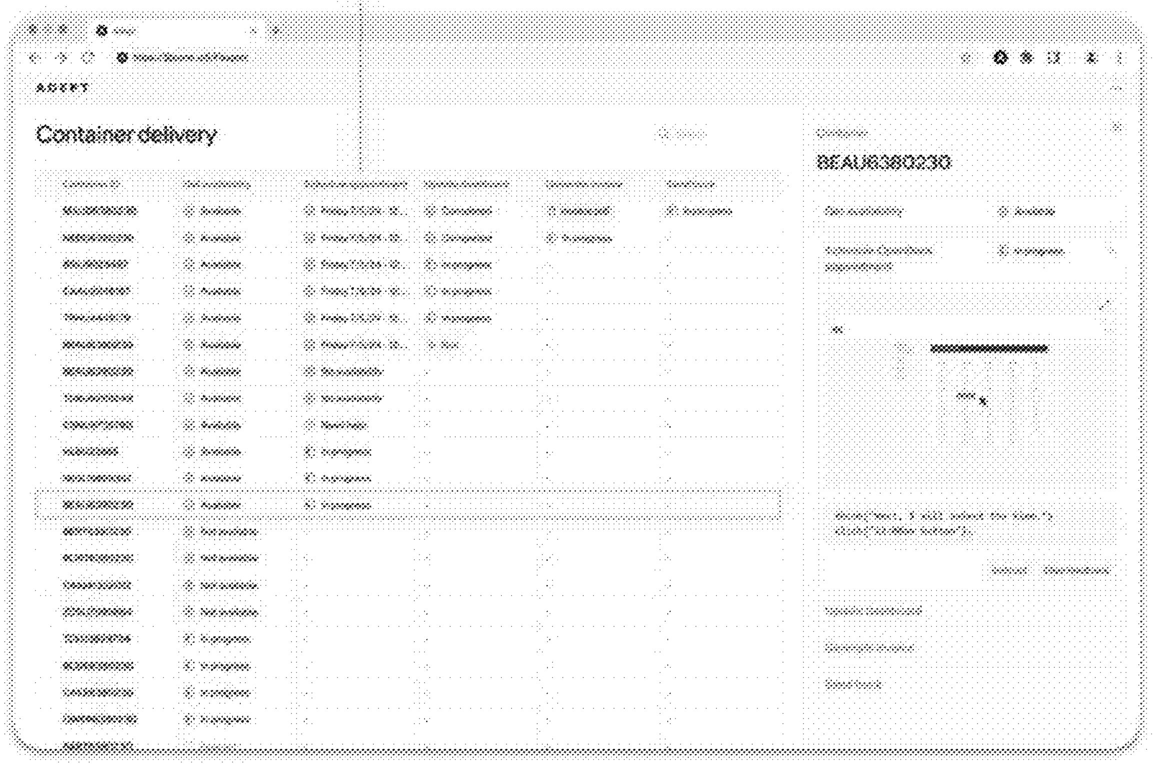

Figure 89

We trained our model on myriad UI understanding tasks, introduced from pre-training:
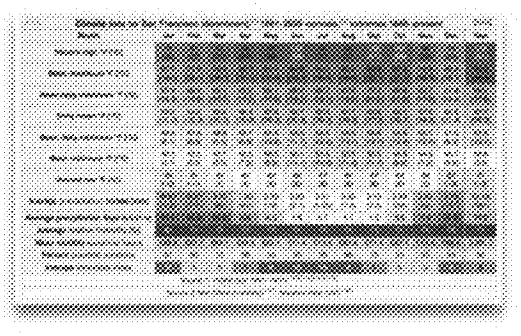
OCR
Key / Value Pair Extraction VQA
Existence VQA
Traditional VQA
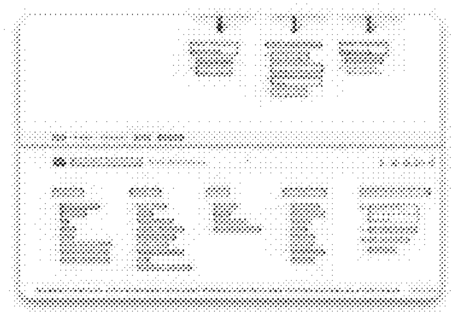
Absolute element positioning
Relative element positioning
Counting
Anchored localization
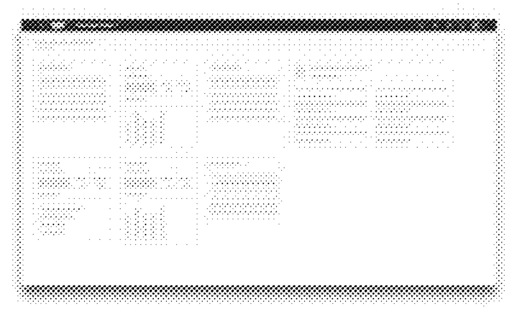
Page State Understanding
Element description
Figure 90

“Locate” tasks assess the model’s ability to find elements on the screen based on a text description and the screenshot
Prompt: “collapse the customer icon”
Adept-8B: {"top": 120, "left": 1344, "bottom": 140, "right": 1364}
Prompt: “checkbox near virtual visit”
Adept-8B: {"top": 204, "left": 1296, "bottom": 224, "right": 1312}
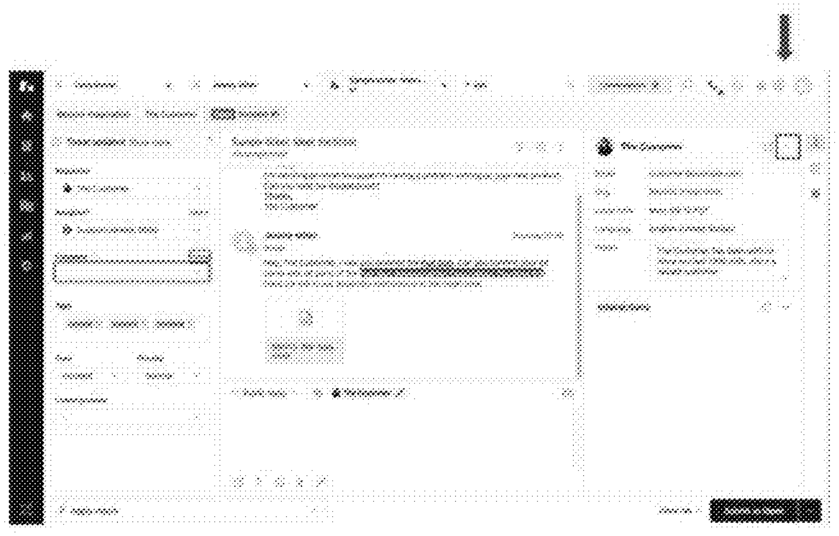
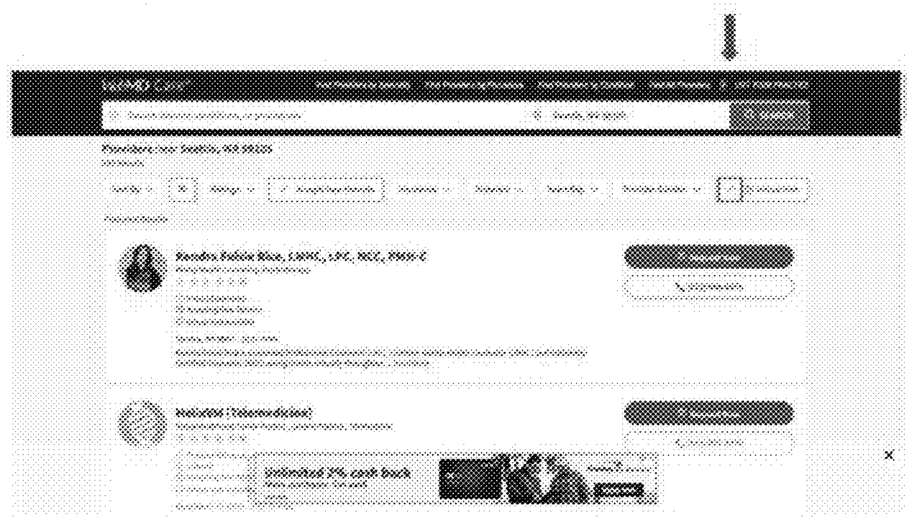
Figure 91

"Web VQA" tasks assess the model's ability to answer questions about the screen
Prompt: "What is the second ticket in the in progress category?"
Adept-110B: Can't log in to SAP
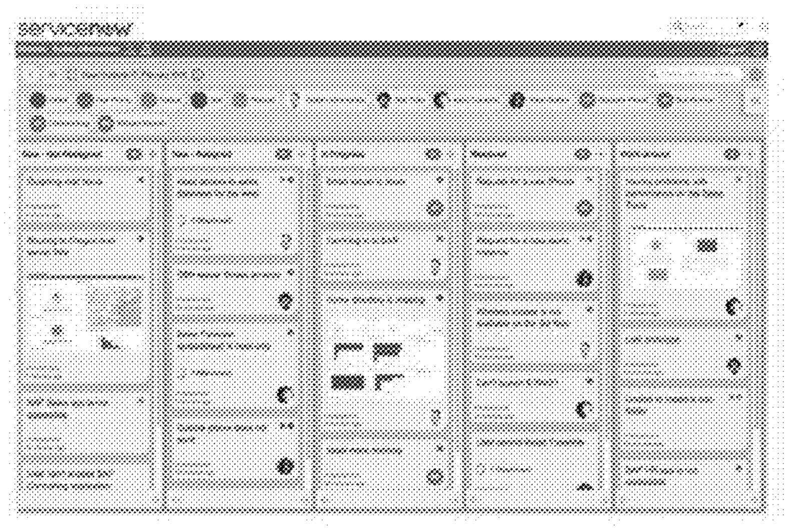
Prompt: "What is the resistance index for guar gum"
Adept-110B: 0.9658
Figure 92

Our model sees pixels natively and is SOTA at Web VQA: it can understand software UI, and know how to proceed "What time will Moo's Craft Barbecue be open?"

Adept: ☑ "Noon tomorrow"

Gemini: ✗ "11:00 AM to 9:00 PM"

Figure 94
United States · CA · San Francisco Co. · Mission District
Feedback

Our approach makes us SOTA at UI understanding:

"is La Taqueria north of the 24th St Mission Bart station?"

Adept: ✅ "No"

GPT-4V: ❌ "Yes"

Our model is SOTA at localization and knows exactly where to click

"Locate the notification icon"

Adept: ✓ {"top": 16, "left": 1864, "bottom": 56, "right": 1902}

GPT-4V: ✗ {"top": 50, "left": 1840, "bottom": 100, "right": 1880}

Adept's models are competitive on public multimodal benchmarks

| | Adept -110B | GPT4-V ( >10x larger) | Gemini 1.5 Pro | Claude 3 Opus |
|---|---|---|---|---|
| DocVQA | 91.6 | 88.4 | 86.5 | 89.3 |
| ChartQA | 87.9 | 78.5 | 81.3 | 80.8 |
| AI2D | 89.1 | 78.2 | 80.3 | 88.1 |
| VQAv2 | 79.9 | 77.2 | 73.2 | n/a |
| OKVQA | 68.7 | n/a | n/a | n/a |
| MMMU* | 51.4 | 56.8 | 58.5 | 59.4 |

Figure 96

Our agents can handle unexpected situations like pop-ups.

ADEPT

Why AWL?

- Client-side execution vastly simplifies infrastructure
  - No need to manage runtimes server-side
  - Simpler client-server communication model
- A custom interpreter allows finer-grained control and customization vs. embedded-DSL
  - AWL can execute in the same runtime as the client and share context
    - Much easier interface with actuation layer
    - Easier to build dev-tooling specific to AWL authoring
  - Superior control over the security surface area The HackerOne pentest team particularly calls out the extremely well-designed and implemented custom workflow language (Adept Workflow Language aka AWL) interpreter, which is primarily implemented in the browser extension. This pentest team has had many examples in prior security work where poorly implemented workflow languages expose users and systems to very significant security vulnerabilities. The AWL interpreter has been very carefully and deliberately built to avoid many common pitfalls with custom domain-specific languages. After significant analysis of the code, the pentest team were able to find no significant flaws in the implementation that could be exploited.

Figure 100

AWL allows us to invoke multimodal models with the expressivity of a full-fledged programming language

AWL is a syntactic subset of JS 6:

- Conditionals, for/while loops
- Try-catch error handling
- Higher-order functions (map, forEach etc.), function closures
- Async parallelism exposed through dedicated primitives
- Extendable library of functions for actuation/multimodal interaction (click, askQuestionAboutScreen, etc.)

These functions are multimodal *model calls*

- act(prompt: string)
- answerQuestionAboutScreen(prompt: string, choices?: string[]): string
- answerTrueFalseQuestionAboutScreen(prompt: string): boolean
- click(element: string, scrollContainer?: string)
- compose(prompt: string, multiple?: boolean): string | string[]
- composeAndType(prompt: string, overwrite?: boolean = true, pressEnter?: boolean)
- getCurrentDate(format?: "full" | "date-only" | "time-only" = "full"): string
- goToUrl(url: string)
- isVisible(element: string): boolean
- keydown(keys: Key[])
- print(text: any)
- scroll(element: string, direction?: "up" | "down" | "left" | "right" = "down")
- spotlight(elementToHighlight: string)

Figure 101

**With AWL, we can easily create workflows with our functions *and* design our agent behavior (predictable ‹ › more open-ended).**
The spectrum of AWL expression allows us to capture the nature of complex workflows in a few lines of code.

| | | |
|---|---|---|
| AWL natural language *act ()* | function spotify_workflow() {<br>act("go to open.spotify.com, click on Today's Top Hits, return all the songs in the playlist as your output Then navigate to gmail.com")<br>} | function spotify_workflow() {<br>act("Gather all the songs on Today's top hits from Spotify. Then go to Gmail.com and prepare a draft email containing the list.")<br>} |
| AWL function s | function spotify_workflow() {<br>goToUrl("https://open.spotify.com/?");<br>click("Today's Top Hits");<br>songs = answerQuestion("What are all the songs in this playlist? Return a list as output");<br>goToUrl("https://mail.google.com");<br>} | N/A |
| | Click-level instruction | Step-level instruction |

Figure 103

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5KZ7Y");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAO
YER/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

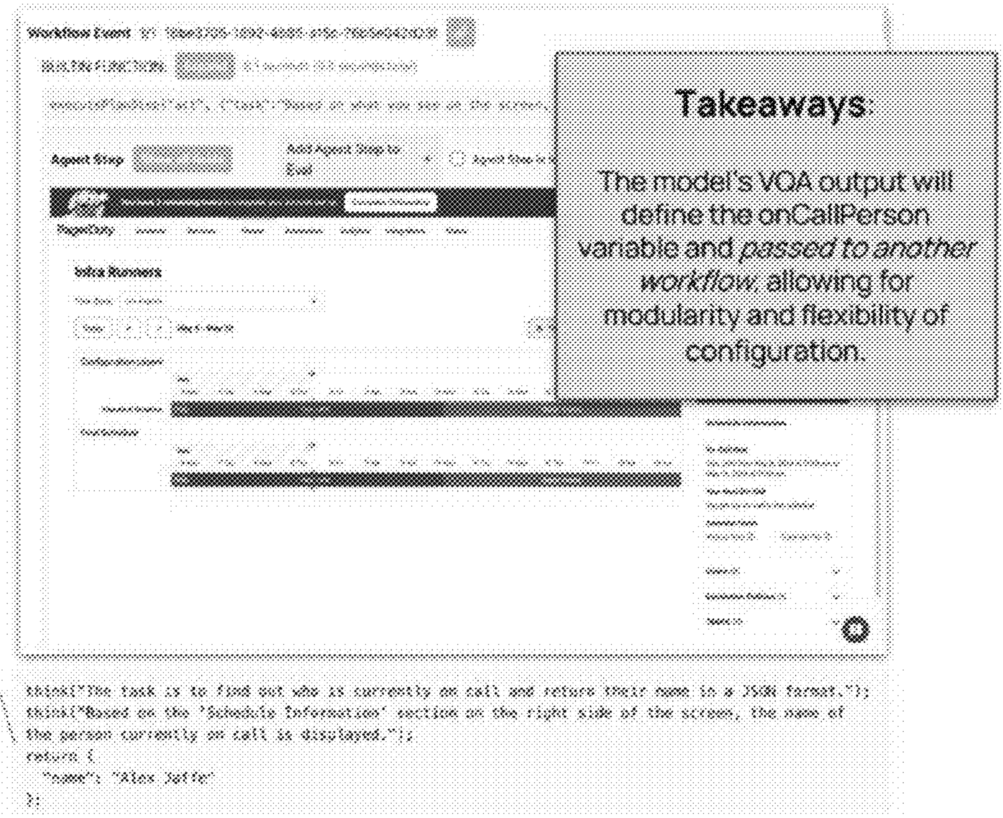

Figure 105

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5X27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAQ
XER/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

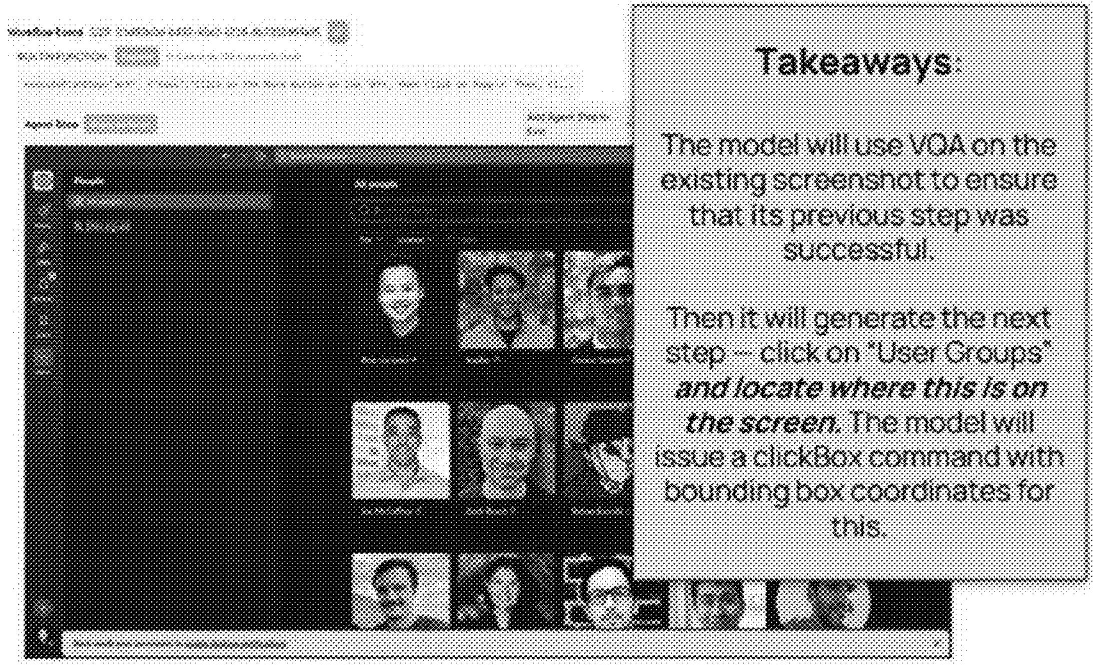

Takeaways:

The model will use VQA on the existing screenshot to ensure that its previous step was successful.

Then it will generate the next step – click on "User Groups" *and locate where this is on the screen.* The model will issue a clickBox command with bounding box coordinates for this.

```
think("Assessing the last action, which was to click on 'People' under the 'More' menu.");
think("The current screenshot shows the 'People' page, indicating the last action was successful.");
think("The next step is to click on 'User groups'.");
clickBox("User groups", [140, 116, 158, 196]);
```

Figure 106

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5K27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAQ
YER/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

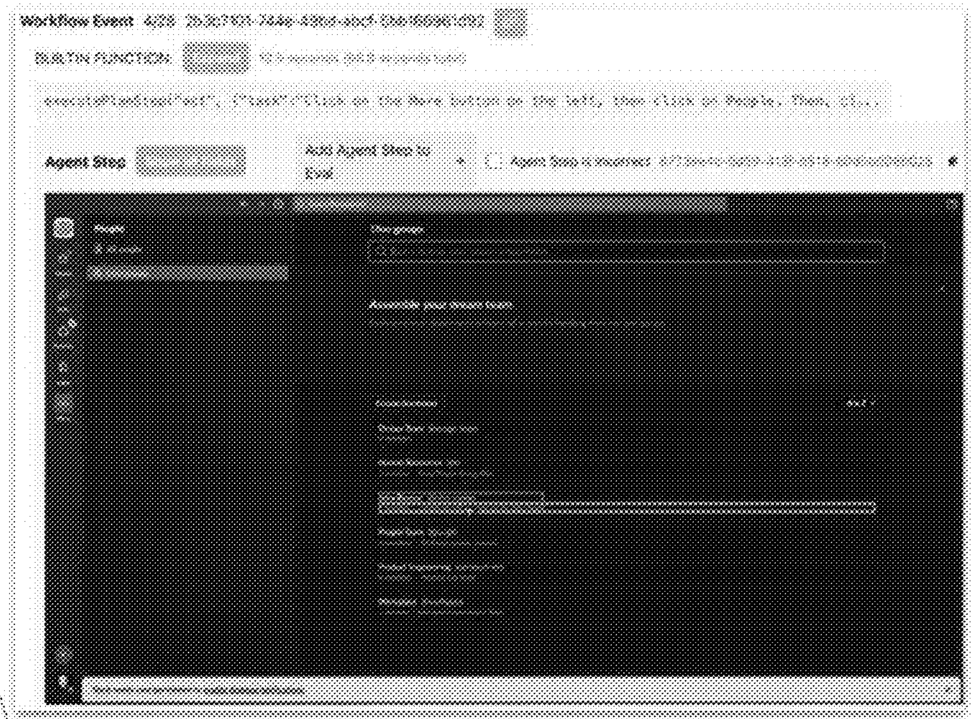

```
think("Assessing the last action, which was to click on 'User groups'.");
think("The current screenshot shows the 'User groups' page, indicating the last action was
successful.");
think("The next step is to click into the 'Infra Runner' user group.");
clickBox("Infra Runner user group", [560, 628, 608, 938]);
```

Figure 107

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5R27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAQ
XE8/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

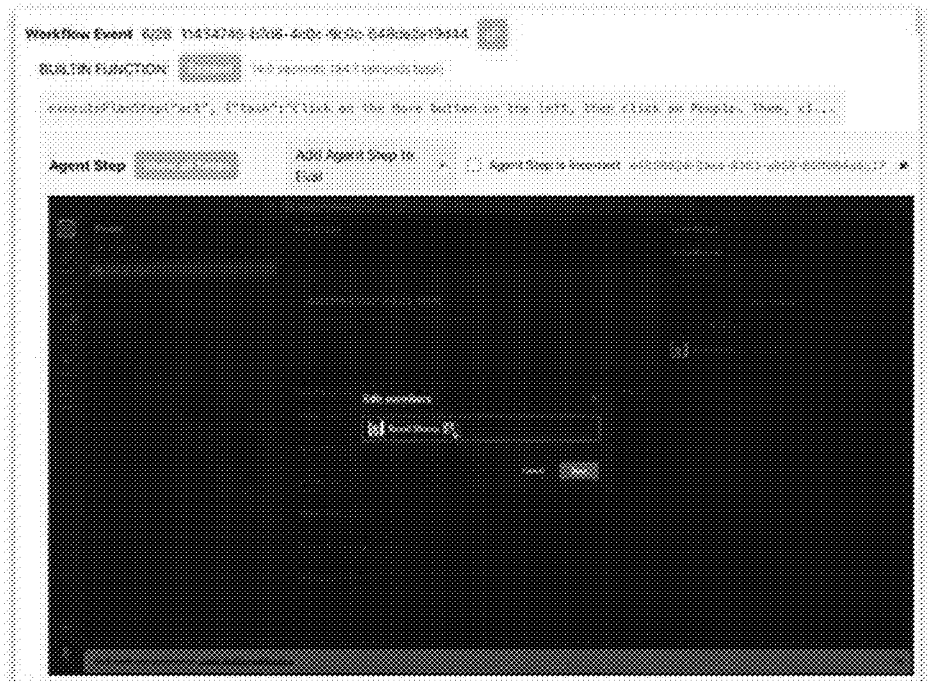

```
think("Assessing the last action, which was to click 'Edit Members' within the 'Infra Runner' user
group.");
think("The current screenshot shows the 'Edit members' dialog with the current member's name
highlighted, indicating the last action was successful.");
think("The next step is to remove the current member by clicking on the 'X' next to the current
member's name.");
clickBox("X next to current member's name in Edit members for Infra Runner", (452, 782), 478,
806));
```

Figure 108

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5K27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAQ
YEE/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

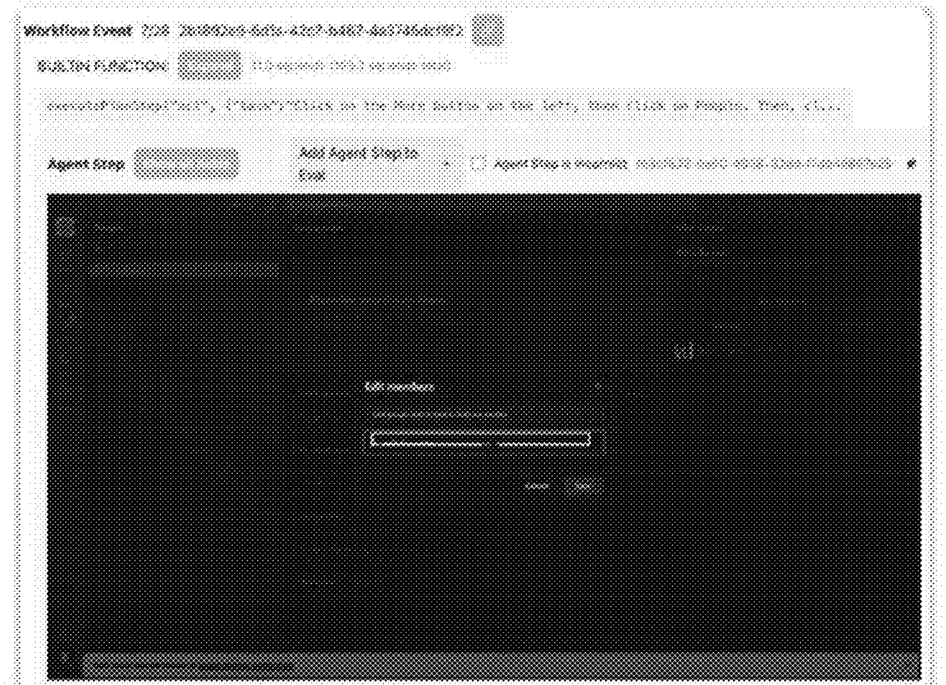

```
think("Assessing the last action, which was to click on the 'X' next to the current member's name in the 'Edit members' dialog for the Infra Runner user group.");
think("The current screenshot shows the 'Edit members' dialog with a message stating 'User groups need to have at least one member', indicating the last action was successful and the member was removed.");
think("The next step is to type 'Alex Jaffe' into the member search field to add a new member to the Infra Runner user group.");
type("Alex Jaffe", pressEnter=true);
```

Figure 109

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5K27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAQ
YER/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

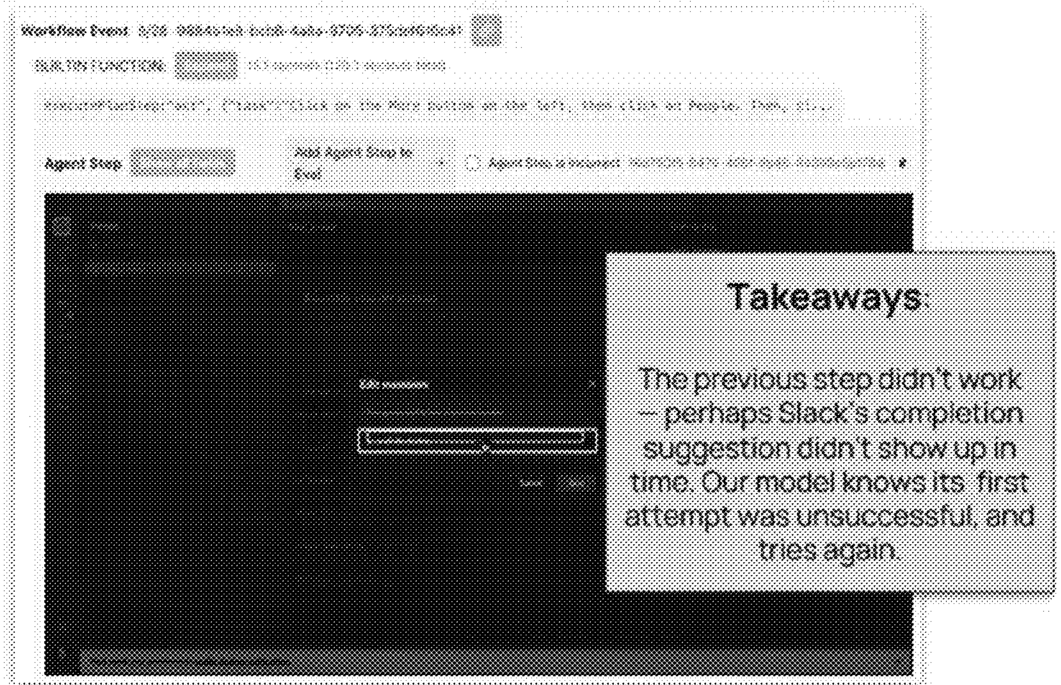

```
think("Assessing the last action, which was to type 'Alex Jaffe' into the member search field.");
think("The current screenshot does not show any change, suggesting that the action to add 'Alex
Jaffe' as a member might not have been registered properly.");
think("I will attempt to type 'Alex Jaffe' again and select the correct auto-completion to add
them as a member.");
clickBox("member search field in Edit members for Infra Runner", [468, 624, 514, 1100]);
type("Alex Jaffe");
```

Figure 110

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5R27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T0ZT6AAQ
YER/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

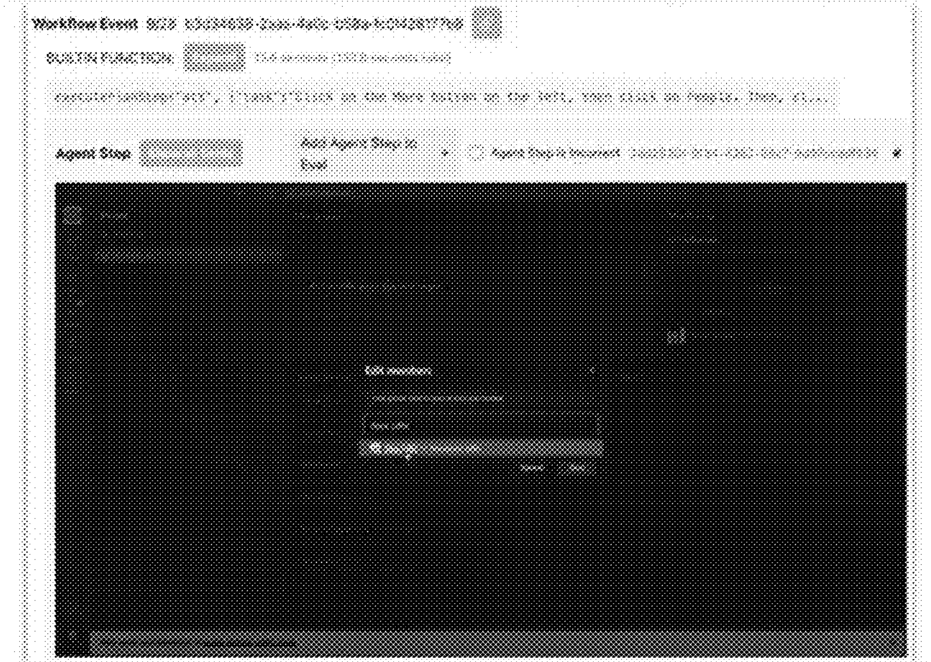

```
think("Assessing the last action, which was to type 'Alex Jaffe' into the member search field and
select the correct auto-completion.");
think("The current screenshot shows 'Alex Jaffe' and 'Alexander Jaffe' as options in the auto-
completion, indicating the last action was successful.");
think("The next step is to click on the correct 'Alex Jaffe' option from the auto-completion
list.");
clickBox("Alex Jaffe auto-complete option for Infra Runner member search", [528, 668, 548, 732]);
```

Figure 111

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5K27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/TS2T6AAQ
YER/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

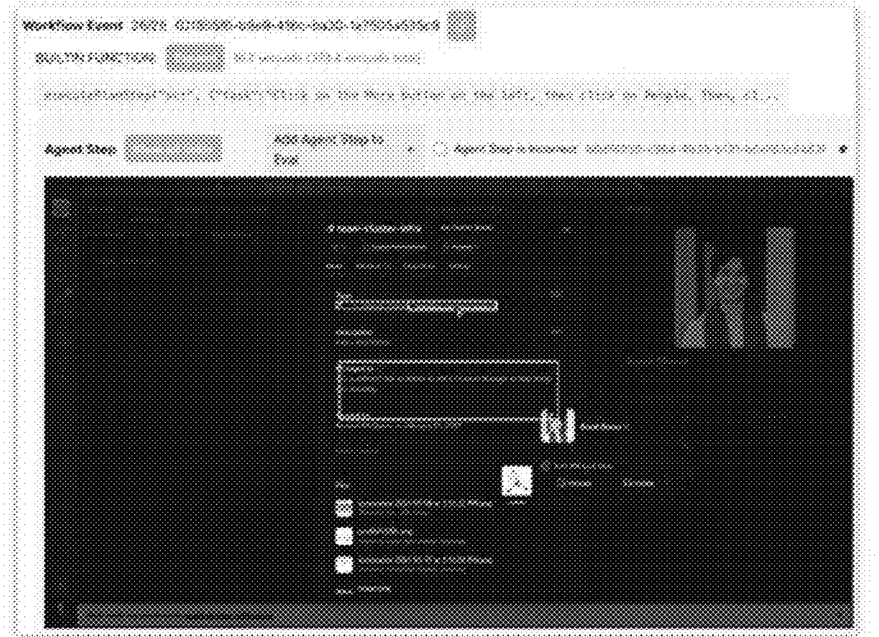

```
think("Assessing the last action, which was to click on the 'Edit topic' button for #team-cluster-
infra.");
think("The current screenshot shows the channel details with the topic field open for editing,
indicating the last action was successful.");
think("The next step is to edit the Topic to replace the current runner mentioned with 'Alex
Jaffe'.");
clickBox("Topic text field for #team-cluster-infra", [262, 776, 284, 968]);
type("Alex Jaffe | wrestling supercomputers");
think("After editing the topic, I will click 'Save' to confirm the changes.");
```

Figure 113

An example workflow: Updating the oncall engineer using PagerDuty + Slack

```
channelName = "team-cluster-infra";
aliasName = "Infra Runner";
goToUrl("https://adept-
ai.pagerduty.com/schedules/PV5K27V");
onCallPerson = act(
  `Based on what you see on the screen, who is
currently on call? Return the name of the
person in the format of {"name": <name>}`,
);
onCallPerson = onCallPerson["name"];
goToUrl("https://app.slack.com/client/T02T6AAQ
YE8/");
act(
  `Click on the More button on the left, then
click on People. Then, click on User groups.
Then, click into the ${aliasName} user group.
Then, click Edit Members, remove the current
member by clicking on the X next to the
current member, then type ${onCallPerson}.
Click on the option that shows up in the
completions, and click Save.
Then, click into the Search field at the very
top and type in #${channelName}, making sure
to press enter after you type to search. Then,
click on the Channels tab, then click on the
${channelName} option that shows up. Then,
click on the #${channelName} name at the top
of the channel page. Then, Edit the Topic to
be whatever the current topic is, but with the
current runner mentioned replaced to be
${onCallPerson}. Click save once you've made
the edit and you're done.`,
);
```

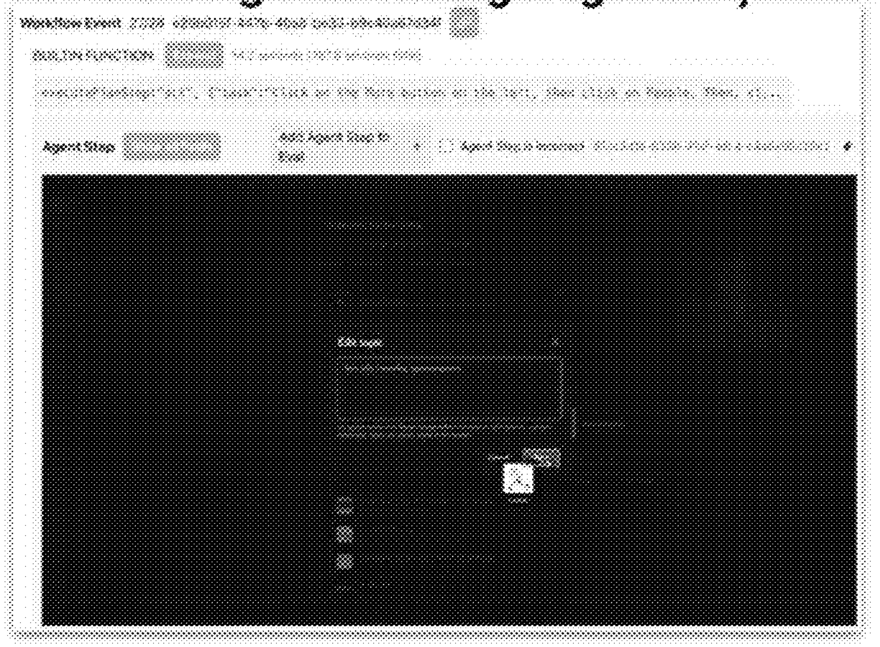

```
think("Assessing the last action, which was to click on the 'Edit topic' button for #team-cluster-
infra.");
think("The current screenshot shows the 'Edit topic' dialog with the topic field populated with
'Alex Jaffe | wrestling supercomputers', indicating the last action was successful.");
think("The next step is to save the edited topic by clicking the 'Save' button.");
clickBox("Save button for editing topic", [588, 1028, 616, 1108]);
```

Figure 114

The agent is resilient to changes on the website due to inference-time decision making for which button to click Original website: Blue button says "Search flights"

Agent thinks "I need to click on the 'Search flights' button

The agent is resilient to changes on the website due to inference-time decision making for which button to click Original website: Blue button says "Look up flights"

Agent thinks "I need to click on the 'Look up flights' button

Tools > Sample Workflows > Live Authoring

Workflow Editor

HubSpot

Tools › Sample Workflows › Live Authoring

Let's author a lead generation workflow in ~~Salesforce~~ Hubspot:

1. First, we'll do this manually to understand the click-path.
2. Next, we'll walk through our AWL and run the workflow.
3. We can also see the full workflow run via our workflow viewer.

To do this, let's try the *same code* with minor tweaks.

Figure 123

Tools › Sample Workflows › Live Authoring

Link to video

Lead generation with salesforce

Workflow code

```
goToUrl(
  "https://drive.google.com/file/d/[illegible]/view?",
);

contactJSON = act(
  "Extract the first row of this contact table in a JSON with the following fields per row: first_name, last_name, position, org",
);

goToUrl(
  "https://nosoftware-inspiration-8481.lightning.force.com/lightning/page/home",
);

click("New next to the My Leads search bar");

act(
  `Fill out the fields for Salutation, First Name, Last Name, Company, and Title. Salutation dropdown - ${contactJSON.title}, First name - ${contactJSON.first_name}, Last name - ${contactJSON.last_name}, Company - ${contactJSON.org}, Title - ${contactJSON.position}. Then click save.`,
);
```

Let's run it!

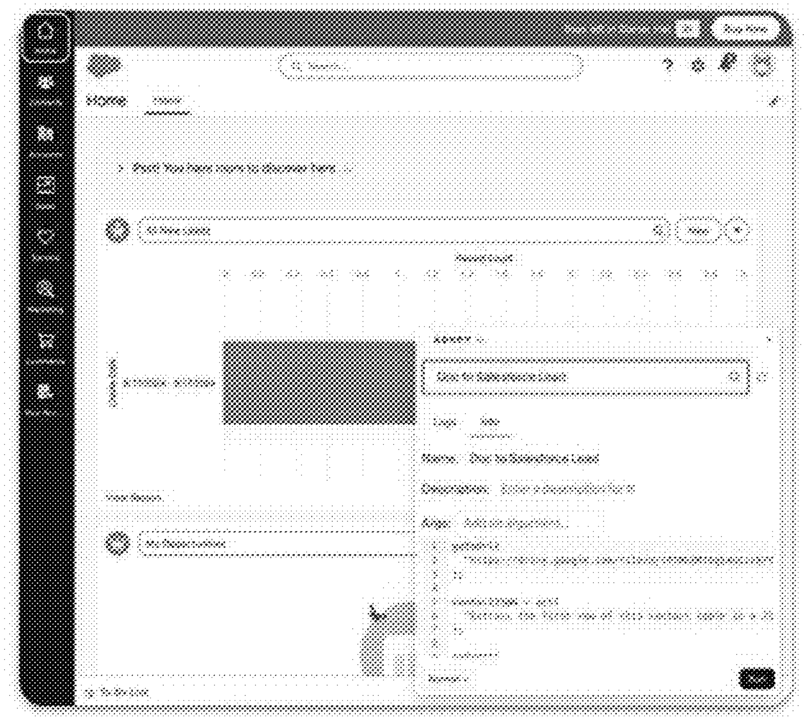

Figure 125

Tools › Sample Workflows › Live Authoring

Link to video

EHR system entry from patient appointment PDF eClinicalWorks

Workflow code

```
goToUrl("https://drive.google.com/file/d/[illegible]/view");

details = act('Return values for diagnosis and the last name for Client Name from this report as a JSON saved as the variables diagnosis and last_name');

goToUrl("https://[illegible].ecwcloud.com/mobiledoc/jsp/webemr/index.jsp#/mobiledoc/jsp/webemr/scheduling/resourceSchedule.jsp/[illegible]",);

wait(1);

click("Patient search button next to the eClinicalWorks logo and the black icon");

act(`1. Type ${details.last_name} in the primary search bar. Do not click on anything else to complete the search. Move to the next step
2. Click on the link for ${details.last_name} in the results
3. Click on Progress notes within the active window (focused) `);

click("yellow sticky note to the left of secure notes");
typeIntoElement("this is a sticky note textbox", details.diagnosis);
click("save");
```

Let's run it!

Figure 127

Tools > Sample Workflows > Live Authoring

Link to video

Revenue Recovery with stripe

Workflow code

```
act(
    `Navigate to Revenue Recovery from the Billing page, Go to ""Retries"" tab, Select ""use a custom retry policy for subscriptions"" if it is not already selected, Change ""Retry 5 days after previous attempt"" to ""Retry 3 day after previous attempt"`,
);
```

Let's run it!

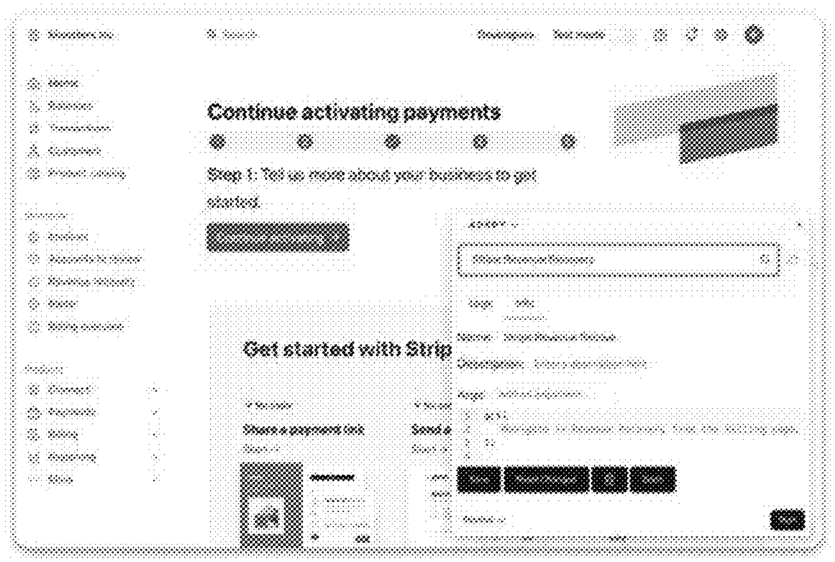

Figure 129

| Eval Task | Fuyu-8B | Fuyu-Medium | LLaVA 1.5 (13.5B) | QWEN-VL (10B) | PALI-X (55B) | PALM-e-12B | PALM-e-562B |
|---|---|---|---|---|---|---|---|
| VQAv2 | 74.2 | 77.4 | 80 | 79.5 | 86.1 | 76.2 | 80.0 |
| OKVQA | 60.6 | 63.1 | n/a | 58.6 | 66.1 | 55.5 | 66.1 |
| COCO Captions | 141 | 138 | n/a | n/a | 149 | 135 | 138 |
| AI2D | 64.5 | 73.7 | n/a | 62.3 | 81.2 | n/a | n/a |

Figure 133

OKVQA
Question: "What instrument is the toy bear playing?"
Fuyu's answer: "snare"
OKVQA Score: 0 (all reference answers are simply "drum")
VQAv2
Question: "What type of foods are in the image?"
Fuyu's answer: "fish, carrots"
VQAv2 Score: 0 (reference answers were "hot dogs", "sausages", and "healthy")
Figure 134

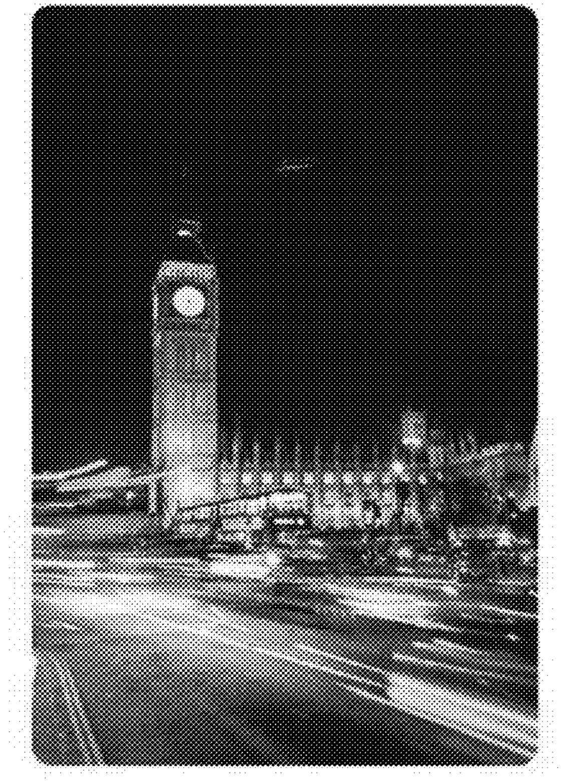

Fuyu's caption: "A nighttime view of Big Ben and the Houses of Parliament."

Reference captions: "A fast moving image of cars on a busy street with a tower clock in the background."

"Lit up night traffic is zooming by a clock tower."

"A city building is brightly lit and a lot of vehicles are driving by."

"A large clock tower and traffic moving near."

"there is a large tower with a clock on it."

0.4 (No reference caption mentions Big Ben or Parliament)

Figure 135

Question: "Aidan Gillen acted in how many series?"

Fuyu's answer: "2"

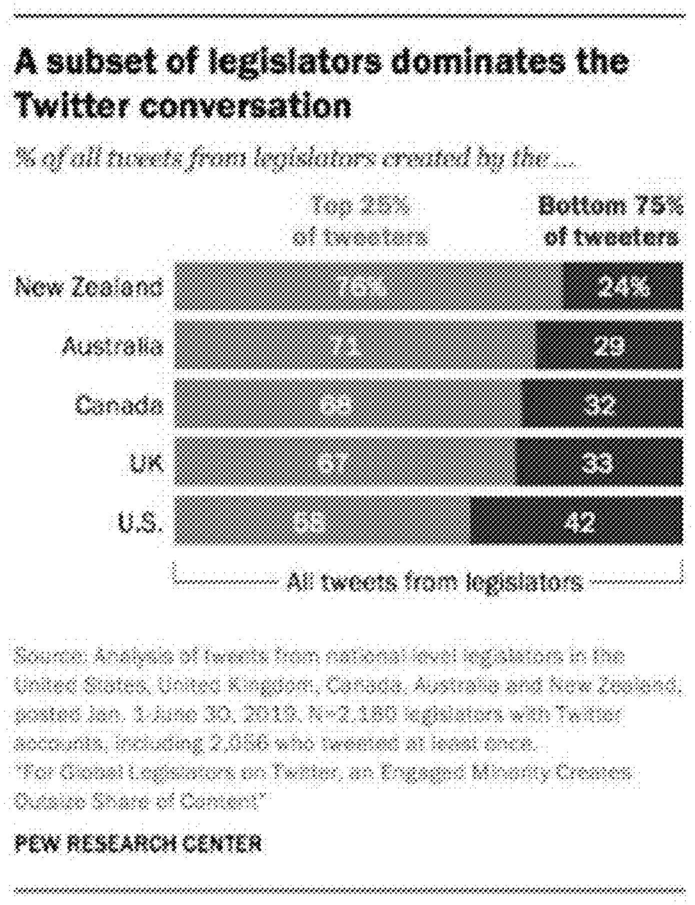
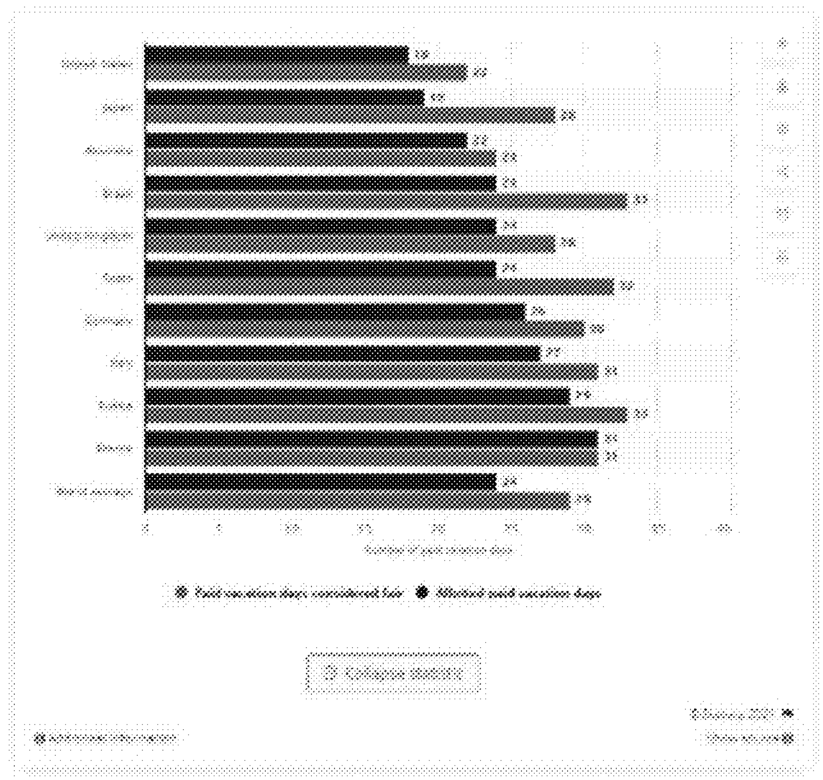
Question: "Find missing data of the sequence 24, _ ,32, 33, 42?"
Fuyu's answer: "29"
Question: "What was the fair amount of paid vacation days in the UK?"
Fuyu's answer: "28"
Figure 137

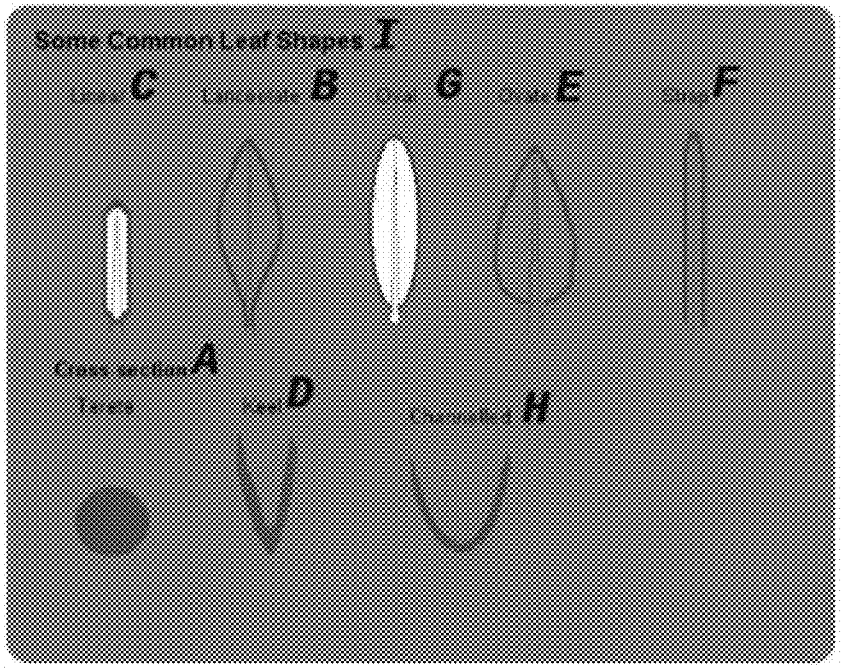
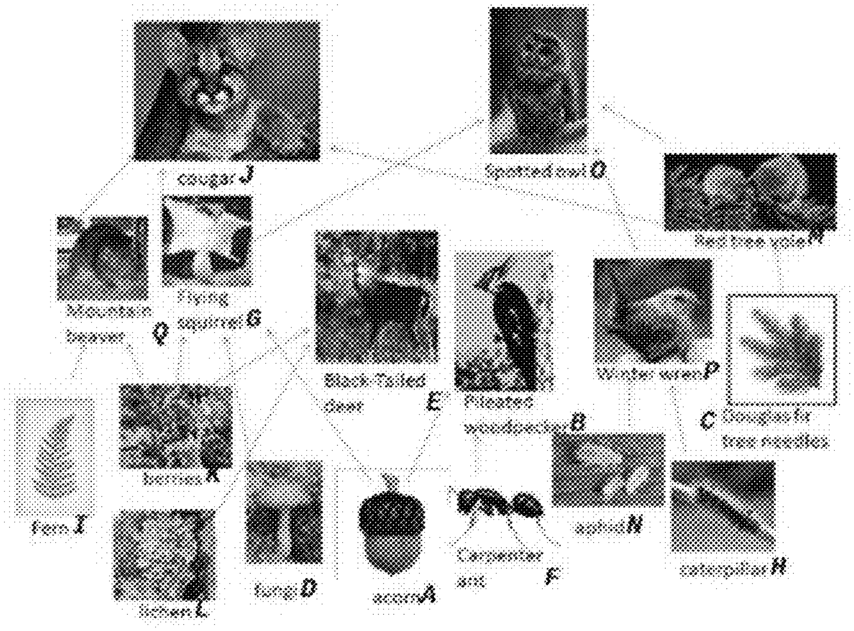
| | |
|---|---|
| Question: | "What letter does a keel-shaped cross-section look like?" |
| Fuyu's answer: | "The letter V" |
| | |
|---|---|
| Question: | "If in the food web shown in the diagram, Douglas fir tree needles are absent, which organism would starve?" |
| Fuyu's answer: | "Red tree vole" |
Figure 139

MULTIMODAL AGENT FOR EFFICIENT IMAGE-TEXT INTERFACE AUTOMATION

PRIORITY DATA

This patent application claims the benefit of and priority to the following eight U.S. Provisional Patent Applications:

- U.S. Provisional Patent Application No. 63/567,667, titled "Persimmon-8B," filed Mar. 20, 2024;
- U.S. Provisional Patent Application No. 63/567,681, titled "Adventure of the Errant Hardware," filed Mar. 20, 2024;
- U.S. Provisional Patent Application No. 63/567,698, titled "Fuyu-8B: A Multimodal Architecture for AI Agents," filed Mar. 20, 2024;
- U.S. Provisional Patent Application No. 63/567,721, titled "Adept Experiments," filed Mar. 20, 2024;
- U.S. Provisional Patent Application No. 63/567,714, titled "Adept Fuyu-Heavy: A new multimodal model," filed Mar. 20, 2024;
- U.S. Provisional Patent Application No. 63/567,714, titled "Adept Recorder," filed Apr. 25, 2024;
- U.S. Provisional Patent Application No. 63/567,714, titled "Adept Workflow Language (AWL)," filed Apr. 25, 2024; and
- U.S. Provisional Patent Application No. 63/567,714, titled "Adept Frankenmodel," filed Apr. 25, 2024.

The priority U.S. Provisional Patent Applications are incorporated herein by reference in their entirety and for all purposes as if completely and fully set forth herein.

FIELD OF THE TECHNOLOGY

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to automating artificial intelligence-based multimodal agentic workflows, specifically user interface-based multimodal agentic workflows.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep learning is a frontier for artificial intelligence, aiming to be closer to its primary goal—artificial intelligence. Deep learning has seen great success in a wide variety of applications, such as natural language processing, speech recognition, medical applications, computer vision, and intelligent transportation systems. The great success of deep learning is due to the larger models. The scale of these models has included hundreds of millions of parameters. These hundreds of millions of parameters allow the model to have more degrees of freedom enough to produce awe-inspiring description capability.

However, the large number of parameters requires a massive amount of training data with labels. Improving model performance by data annotation has two crucial challenges. On the one hand, the data growth rate is far behind the growth rate of model parameters, so data growth has primarily hindered the further development of the model. On the other hand, the emergence of new tasks has far exceeded the speed of data updates, and annotating for all samples is laborious.

To tackle this challenge, new datasets are built by generating synthetic samples, thereby speeding up model iteration and reducing the cost of data annotation. Pre-training methods and transfer learning have also been used to solve this challenge, such as Transformers, BERT, and GPT. These works have achieved incredible results.

However, the generated data is only used as base data to initialize the model. In order to obtain a high-precision usable model, it is often necessary to label and update specific data.

Integrating apriori knowledge in the learning framework is an effective means to deal with sparse data, as the learner does not need to induce the knowledge from the data itself. As special agents, humans have rich prior knowledge. If the machine can learn human wisdom and knowledge, it will help deal with sparse data.

Human-in-the-loop (HITL) addresses these issues by incorporating human knowledge into the modeling process. HITL aims to train an accurate prediction model with minimum cost by integrating human knowledge and experience. Humans can provide training data for machine learning applications and directly accomplish some tasks that are hard for computers in the pipeline with the help of machine-based approaches.

At present, there is still a high degree of coupling between deep learning tasks and data, and the performance of deep learning largely depends on the quality of the data. For a new task, if you want to obtain better performance, you need to provide a large amount of high-quality labeled data. However, the labeled data requires a large amount of labor. In addition, large-scale data annotation takes a long time, and many iterations of tasks cannot wait such a long time. Unlike weak annotate and automatic annotate, HITL-based methods emphasize finding the key samples that play a decisive factor in new sample data.

A core set is a weighted subset of a larger set. A core set guarantees that a model fitting the core set also fits the larger set. Core set construction methods perform importance sampling with respect to sensitivity score, to provide high-probability solutions for a particular problem, such as k-means and k-median clustering, naïve Bayes and nearest-neighbors, mixture models, low rank approximation, spectral approximation, Nystrom methods, and Bayesian inference.

Supervised learning usually requires a large set of labeled data to train the prediction model. As the learning algorithms become more and more complicated, the required size of training set gets larger and larger. Meanwhile, labeling data examples is rather expensive, because the annotation process is usually time-consuming and needs high expertise in some difficult tasks. It is thus a significant challenge to learn with insufficient labeled data.

Active learning is a primary approach to overcome this challenge. It iteratively selects the most useful examples from the unlabeled dataset to query their labels from the oracle. After adding the newly labeled data into the training set, the model can be updated to achieve better performance. The key task in active learning is how to accurately estimate the potential utility of an example on improving the performance, such that the model can be well trained with minimal queries.

Adept is an ML research and product lab building general intelligence by enabling people and computers to work together creatively. We believe that A1 systems should be built with users at the center—our vision is one where machines work together with people in the driver's seat: discovering new solutions, enabling more informed decisions, and giving us more time for the work we love. Machine learning has seen more progress in the last five years than in the prior 60. Since the beginning, we have wanted to build models with similar plasticity to human intelligence—models that can learn and grow in capability across a highly diverse set of tasks. For most of this time, our best results were limited to models that were engineered to excel in specific domains—they showed promising levels of capability, but were bespoke. But when my cofounders Ashish Vaswani and Niki Parmar invented the Transformer in 2017, the pace of progress towards generality dramatically changed. The Transformer was the first neural network that seemed to "just work" for every major AI use case—it was the research result that convinced me that general intelligence was possible. Transformers quickly became the fundamental architecture of giant models with highly general capabilities, giving researchers the key to unlock decades-old problems in rapid succession. The Transformer was scaled into GPT-2 and GPT-3, a language generation model that can write news articles, poetry, emails, and even answer trivia questions. Google's efforts scaling Transformer models yielded BERT, which now powers Google search. Transformers were trained that can write code. DeepMind even showed that the Transformer works for protein folding (AlphaFold) and Starcraft (AlphaStar). Transformers made general intelligence tangible for our field. These breakthroughs would not have happened without Ashish and Niki's work, and I finally had a chance to work closely with them when I joined Google to lead Google's giant model efforts. There, we trained bigger and bigger Transformers, with the dream of eventually building one general model to power all ML use cases—but there was a clear limitation: models trained on text can write great prose, but they can't take actions in the digital world. You cannot ask GPT-3 to book you a flight, cut a check to a vendor, or conduct a scientific experiment. True general intelligence requires models that can not only read and write, but act in a way that is helpful to users. That is why we are starting Adept: we are training a neural network to use every software tool and API in the world, building on the vast amount of existing capabilities that people have already created. In practice, we're building a general system that helps people get things done in front of their computer: a universal collaborator for every knowledge worker. Think of it as an overlay within your computer that works hand-in-hand with you, using the same tools that you do. We all have parts of our job that energize us more than others—with Adept, you'll be able to focus on the work you most enjoy and ask our model to take on other tasks. For example, you could ask our model to "generate our monthly compliance report" or "draw stairs between these two points in this blueprint"—all using existing software like Airtable, Photoshop, an ATS, Tableau, Twilio to get the job done together. We expect the collaborator to be a good student and highly coachable, becoming more helpful and aligned with every human interaction. This product vision excites us not only because of how immediately useful it could be to everyone who works in front of a computer, but because we believe this is actually the most practical and safest path to general intelligence. Unlike giant models that generate language or make decisions on their own, ours are much narrower in scope-we are an interface to existing software tools, making it easier to mitigate issues with bias. And critical to our company is how our product can be a vehicle to learn people's preferences and integrate human feedback every step of the way.

Adept Workflow Language (AWL) is an expressive, custom language that allows users to easily compose powerful multimodal web interactions on top of Adept's models. Here at Adept, we define AI agents as "software that can translate user intent into actions." We envision a world in which AI can assist users in everything from the handling of complex, taxing tasks to executing a high volume of rote chores—all in service of freeing up a user's time and headspace.

Building our agent requires powerful multimodal capabilities: our agent understands the screen, reasons about what is on the page, and makes plans. Our suite of multimodal models have been trained on these capabilities from the earliest training stages. To build a truly usable agent on top of this—one that you can depend on in production—requires even more carefully-designed characteristics.

At Adept, we have specifically engineered our agent to be:

Reliable: Our agent can easily be kept "on rails" to consistently execute a workflow.

Robust: Our agent is resilient to changes in its execution environment, and can successfully carry on despite these variations.

Easy to author: Our agent's instructions are quick and simple to write, and can even be a few lines of natural language.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

A system for generating training data to train agents to automate tasks otherwise done by users includes an intermediary disposed between an interface and a user. The intermediary is configured to: intercept one or more user-actuated actions directed towards the interface by the user, the user-actuated actions, if received by the interface, execute a task on the interface; preserve a state of the interface prior to the execution of the task; translate the user-actuated actions into one or more actuation commands, the actuation commands configured to trigger one or more machine-actuated actions that replicate the user-actuated actions on the interface to cause automation of the task; and generate a training dataset to train an agent to automate the task, wherein the training dataset requires the agent to process, as input, the state of the interface prior to the execution of the task, and to generate, as output, the actuation commands.

A system for interface automation includes an agent. The agent is configured to process an input that specifies an interface workflow, wherein the interface workflow is otherwise implementable by one or more user-actuated actions directed towards an interface by a user. The agent is also configured to generate an output that specifies a sequence of actuation commands, wherein the sequence of actuation commands triggers one or more machine-actuated actions that replicate the user-actuated actions on the interface and cause automation of the interface workflow.

A system for constructing prompts that cause an agent to automate multimodal interface workflows includes agent specification logic and agent calling logic. The agent specification logic is configured to construct agent specifications using prompts and agent functions, wherein the agent specifications are configured to automate a multimodal interface workflow. The agent calling logic is in communication with the agent specification logic and is configured to translate the agent specifications into agent calls that cause an agent to implement the agent functions to produce outputs that are responsive to the prompts.

A system for interface automation includes an agent. The agent is configured to process an input that specifies an interface workflow, wherein the interface workflow is otherwise implementable by one or more user-actuated actions directed towards an interface by a user. The agent is also configured to generate an output that specifies a sequence of actuation commands, wherein the sequence of actuation commands triggers one or more machine-actuated actions that replicate the user-actuated actions on the interface and cause automation of the interface workflow.

A system for constructing prompts that cause an agent to automate multimodal interface workflows includes agent specification logic and agent calling logic. The agent specification logic is configured to construct agent specifications using prompts and agent functions, wherein the agent specifications are configured to automate a multimodal interface workflow. The agent calling logic is in communication with the agent specification logic and is configured to translate the agent specifications into agent calls that cause an agent to implement the agent functions to produce outputs that are responsive to the prompts.

A system for client-side implementation of an interface automation language at runtime includes agent specification logic and runtime interpretation logic. The agent specification logic, running on client-side, is configured construct an agent specification, and to make the agent specification available for server-side translation into an intermediate representation, wherein the agent specification is configured to automate a multimodal interface workflow. The runtime interpretation logic, running on client-side, is configured to receive the intermediate representation, detect one or more agent functions in the intermediate representation, generate one or more agent calls based on the agent functions, issue the agent calls to an agent and, in response, receive at least one runtime actuation function from the agent, and translate the runtime actuation function into at least one runtime actuation command, wherein the runtime actuation command triggers at least one machine-actuated action as a runtime synthetic action that automates the multimodal interface workflow.

A system for automating software usage includes an agent configured to automate. The agent is trained on one or more training data sets. The one or more training datasets include one or more of a first training dataset including documents containing text interleaved with images, a second training dataset including text embedded in images, a third training dataset including recorded videos of software usage, a fourth training dataset including portable document format (PDF) documents, a fifth training dataset including recorded videos of software tool usage trajectories, a sixth training dataset including images of open-domain web pages, a seventh training dataset including images of specific-domain web pages, and/or an eighth training dataset including images of agentic trajectories of the agent performing interface automation task workflows.

A system for providing artificial intelligence agents that automate software usage includes training servers configured to train agents during training, production servers configured to execute the trained agents during inference, a plurality of training datasets, and data flow logic. The data flow logic is configured to, provide, during the training, the agents and the plurality of training datasets to the training servers to cause the training servers to train the agents on the plurality of training datasets and thereby produce the trained agents, configure the production servers with the trained agents for use during the inference, provide, during the inference, prompts issued by clients to the production servers to cause the production servers to translate the prompts into agent calls to the trained agents that in turn cause the trained agents to generate outputs that are responsive to the prompts, and make the outputs available to the clients.

A system for image-text agentic interface automation is disclosed. A multimodal agent is configured to process arbitrary-length text sequences and arbitrary-resolution images. A newline insertion logic is configured to interleave a newline character between successive lines of image patches in a plurality of lines of image patches, wherein the newline character specifies an end of a line in an input image. A tokenization logic is configured to translate the input text sequence into a sequence of input text tokens, and to translate the successive lines of image patches interleaved with the newline character into a sequence of input image tokens. A linear projection logic is configured to linearly project a single token stream of the sequence of input text tokens and the sequence of input image tokens into a decoder-only Transformer logic, wherein the linear projection of the single token stream bypasses any embedding lookup.

A system for magnitude-invariant image-text agentic interface automation is disclosed. A bit vectorization logic is configured to convert image patches in a plurality of image patches into magnitude-invariant bit vectors, and generate a plurality of lines of magnitude-invariant bit vectors. A tokenization logic is configured to translate the input text sequence into a sequence of input text tokens, and to translate the successive lines of magnitude-invariant bit vectors interleaved with a newline character into a sequence of input magnitude-invariant bit vector tokens. A linear projection logic is configured to linearly project a single token stream of the sequence of input text tokens and the sequence of input magnitude-invariant bit vector tokens into a decoder-only Transformer logic, wherein the linear projection of the single token stream bypasses any embedding lookup.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 10 shows example software code that implements a Transformer block.

FIG. 11 is a pictorial illustration corresponding to the disclosed systems and methods.

FIG. 19 is a pictorial illustration of reliability scores as a result of undertaking a variety of a benchmarks.

FIG. 20 is a pictorial illustration showing some example system actions of the disclosed systems and methods.

FIG. 36 is a pictorial illustration showing an example of training data corresponding to the disclosed systems and methods.

FIG. 37 is a pictorial illustration showing an example of training data corresponding to the disclosed systems and methods.

FIG. 38 is a pictorial illustration showing an example of training data corresponding to the disclosed systems and methods.

FIG. 39 is a pictorial illustration showing an example of training data corresponding to the disclosed systems and methods.

FIG. 40 is a pictorial illustration showing an example of a labeler corresponding to the disclosed systems and methods.

FIG. 41 is a pictorial illustration showing an example of a labeler and a recorder corresponding to the disclosed systems and methods.

FIG. 45 is a pictorial illustration showing one example of the operation of the disclosed systems and methods.

FIG. 49 is a pictorial illustration showing an example mapping between example DSL actuation commands and example corresponding (or resulting) machine-actuated actions.

FIG. 53 is a pictorial illustration showing one example of workflow generated by the disclosed systems and methods.

FIG. 54 is a pictorial illustration showing one example of workflow generated by the disclosed systems and methods.

FIG. 56 is a pictorial illustration showing some example prompts corresponding to the disclosed systems and methods.

FIG. 57 is a pictorial illustration showing example inputs and outputs of the disclosed systems and methods.

FIG. 58 is a pictorial illustration showing one example execution loop of the disclosed systems and methods.

FIG. 59 is a pictorial illustration showing one example operation of the disclosed systems and methods.

FIG. 68 is a pictorial illustration showing examples of a workflow runtime corresponding to the disclosed systems and methods.

FIG. 69 is a pictorial illustration showing examples of a workflow runtime corresponding to the disclosed systems and methods.

FIG. 70 is a pictorial illustration showing an example operation of the disclosed systems and methods.

FIG. 71 is a pictorial illustration showing examples of workflow code and machine actions.

FIGS. 73A and 73B are pictorial illustrations showing examples of workflows corresponding to the disclosed systems and methods.

FIG. 74 is a pictorial illustration showing an example workflow corresponding to the disclosed systems and methods.

FIG. 75 is a pictorial illustration showing an example of agent functions.

FIG. 76 is a pictorial illustration showing examples of agent functions.

FIG. 77 is a pictorial illustration showing examples of agent functions.

FIG. 78 is a pictorial illustration showing examples of agent functions.

FIGS. 79 and 80 are pictorial illustrations showing an AST of the language as an Extended Backus-Naur Form (ENBF) grammar that captures the constructs available in the workflow language (DSL) corresponding to the disclosed systems and methods.

FIGS. 81A and 81B are pictorial illustrations showing example workflows corresponding to the disclosed systems and methods.

FIG. 82 is a pictorial illustration showing an example workflow corresponding to the disclosed systems and methods.

FIG. 83 is a pictorial illustration showing an example workflow corresponding to the disclosed systems and methods.

FIG. 89 is a pictorial illustration showing an example of a dashboard of the disclosed systems and methods.

FIG. 90 is a pictorial illustration showing examples of UI understanding tasks used in training corresponding to the disclosed systems and methods.

FIG. 91 is a pictorial illustration showing example of task execution and assessment corresponding to the disclosed systems and methods.

FIG. 92 is a pictorial illustration showing example of task execution and assessment corresponding to the disclosed systems and methods.

FIG. 96 is a pictorial illustration showing reliability scores corresponding to the disclosed systems and methods across different multimodal benchmarks.

FIG. 100 is a pictorial illustration corresponding to the disclosed systems and methods.

FIG. 101 is a pictorial illustration corresponding to the disclosed systems and methods.

FIG. 103 is a pictorial illustration corresponding to the disclosed systems and methods.

FIGS. 104-114 are pictorial illustrations showing examples of the operation of the disclosed systems and methods generating an executing an example workflow.

FIGS. 123-126 are pictorial illustrations showing example workflows corresponding to the disclosed systems and methods.

FIG. 127 is a pictorial illustration showing an example workflow corresponding to the disclosed systems and methods.

FIG. 129 is a pictorial illustration showing an example workflow corresponding to the disclosed systems and methods.

FIG. 133 is a pictorial illustration showing reliability scores corresponding to the disclosed systems and methods across different multimodal benchmarks.

FIG. 134 discloses another implementation of the technology disclosed.

FIG. 135 discloses another implementation of the technology disclosed.

FIG. 137 is a pictorial illustration showing examples of the disclosed systems and methods executing VQA.

FIG. 139 is a pictorial illustration showing examples of the disclosed systems and methods executing VQA.

FIG. 146 shows a flow diagram illustrating one example method of effectively collecting on-policy feedback for ongoing agent fine-tuning.

FIG. 147 shows a flow diagram illustrating one example method for constructing prompts that cause an agent to automate multimodal workflows.

FIG. 148 shows a flow diagram illustrating one example method for implementing (e.g., client-side implementing) of an interface automation language at runtime.

FIG. 149 shows a flow diagram illustrating one example method for providing artificial intelligence agents that automate software usage.

FIGS. 150A and 150B (herein referred to as FIG. 150) show a flow diagram illustrating one example method for image-text agentic interface automation.

FIG. 151 shows a flow diagram illustrating one example method for image-text agentic interface automation.

FIG. 152 shows a flow diagram illustrating one example method for image-text agentic interface automation.

FIGS. 153A and 153B (herein referred to as FIG. 153) show a flow diagram illustrating one example method for magnitude-invariant image-text agentic interface automation.

FIG. 154 shows a flow diagram illustrating one example method for magnitude-invariant image-text agentic interface automation.

FIG. 155 shows a flow diagram illustrating one example method for magnitude-invariant image-text agentic interface automation.

FIG. 156 shows a flow diagram illustrating one example method for magnitude-invariant image-text agentic interface automation.

FIG. 157 shows a flow diagram illustrating one example method for magnitude-invariant image-text agentic interface automation.

Figure 158:
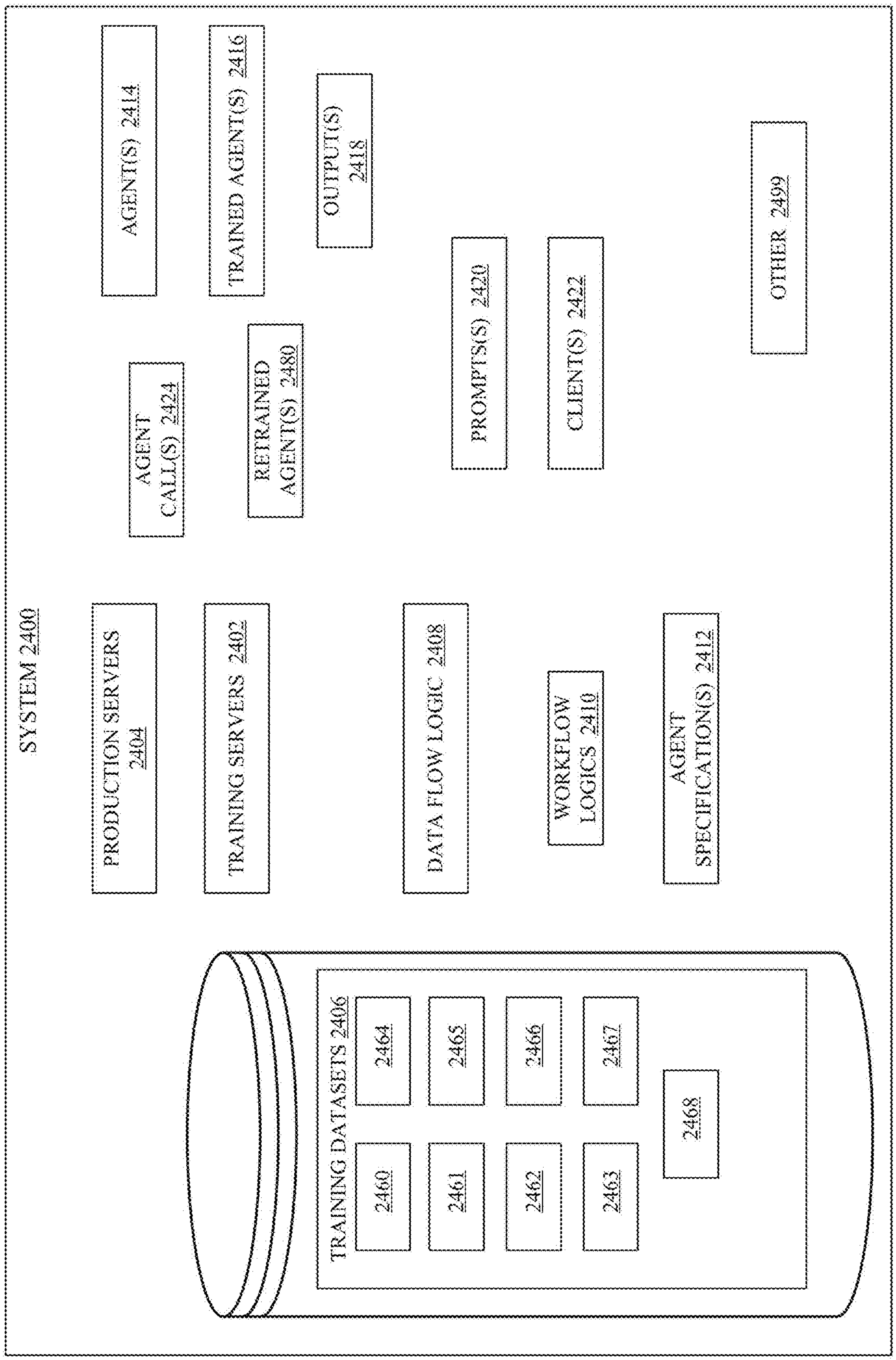

FIG. 158 is a block diagram showing an example system corresponding to the disclosed systems and methods.

Figure 159:
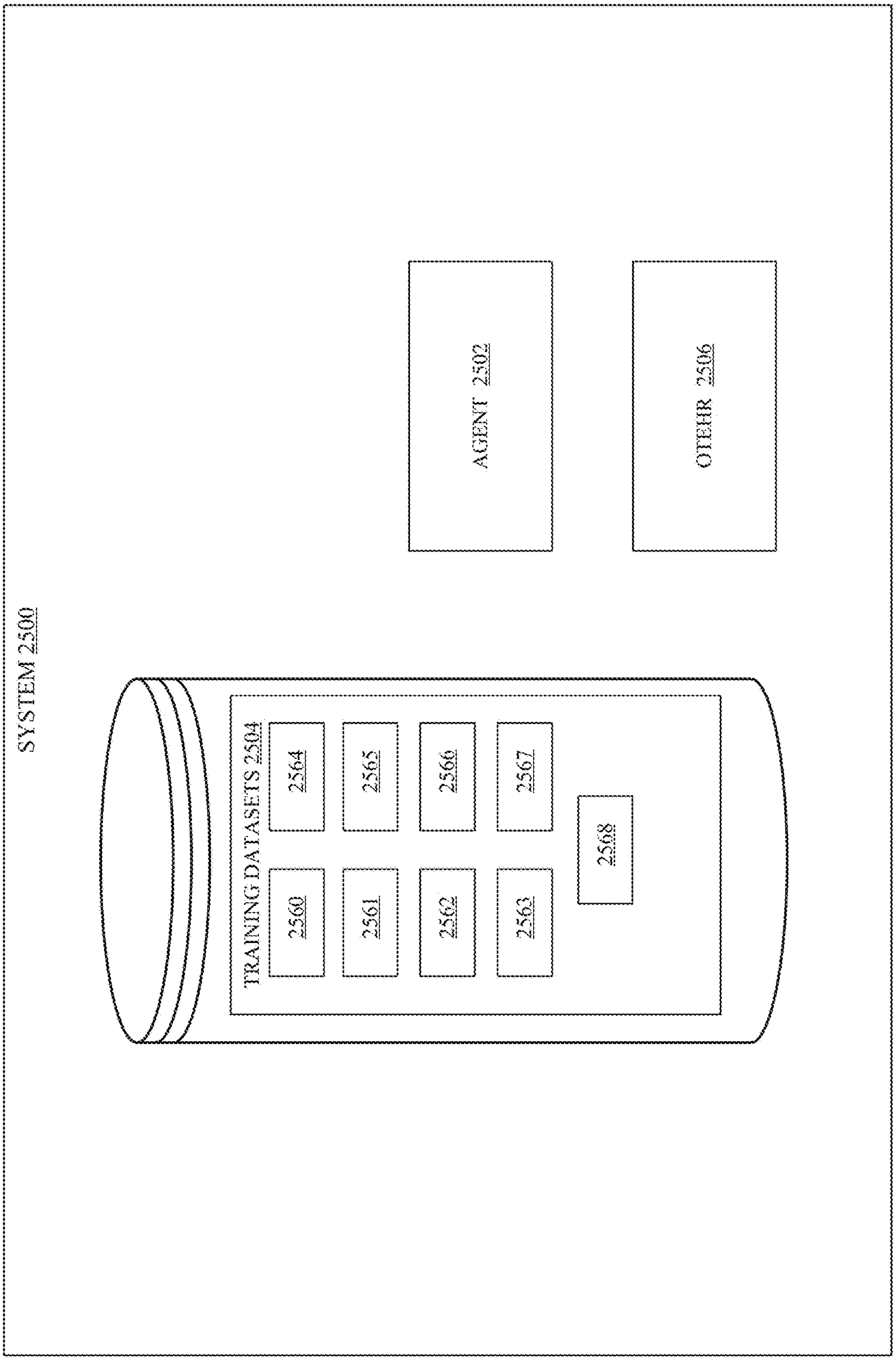

FIG. 159 is a block diagram showing an example system corresponding to the disclosed systems and methods.

Figure 160:
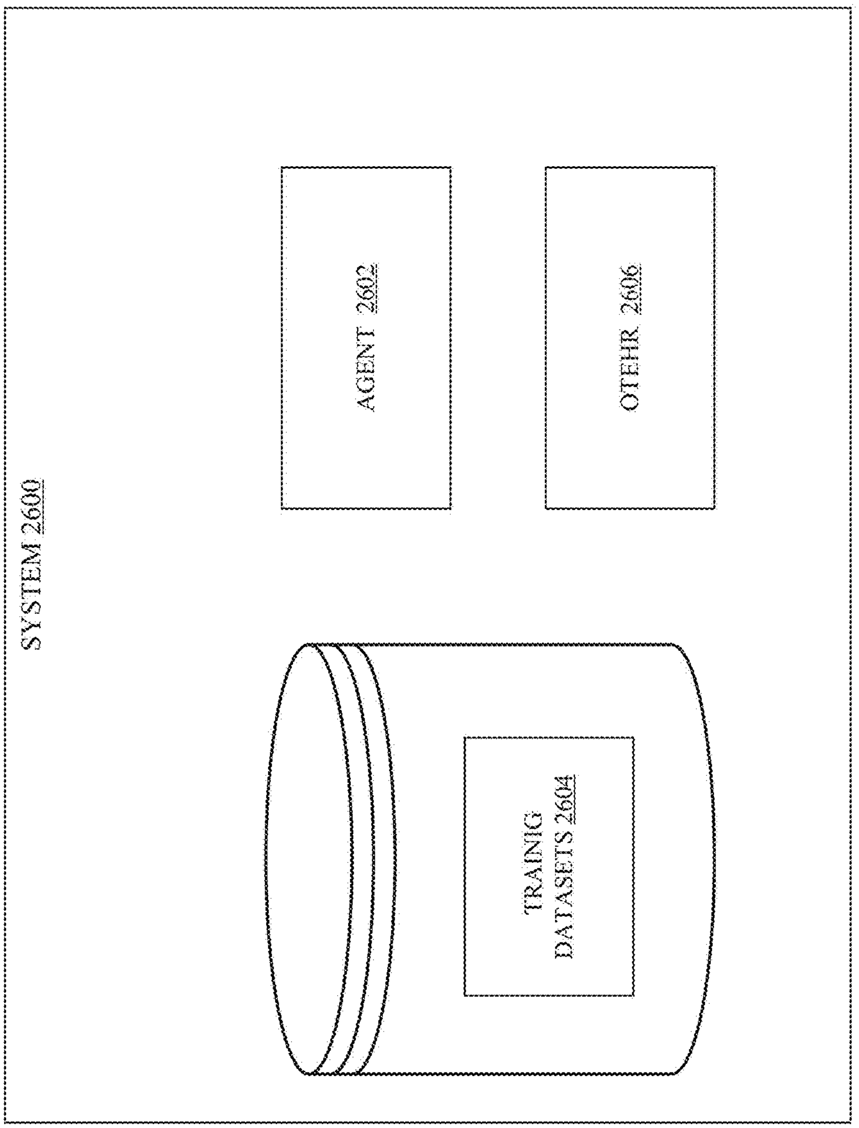

FIG. 160 is a block diagram showing an example system corresponding to the disclosed systems and methods.

Figure 161:
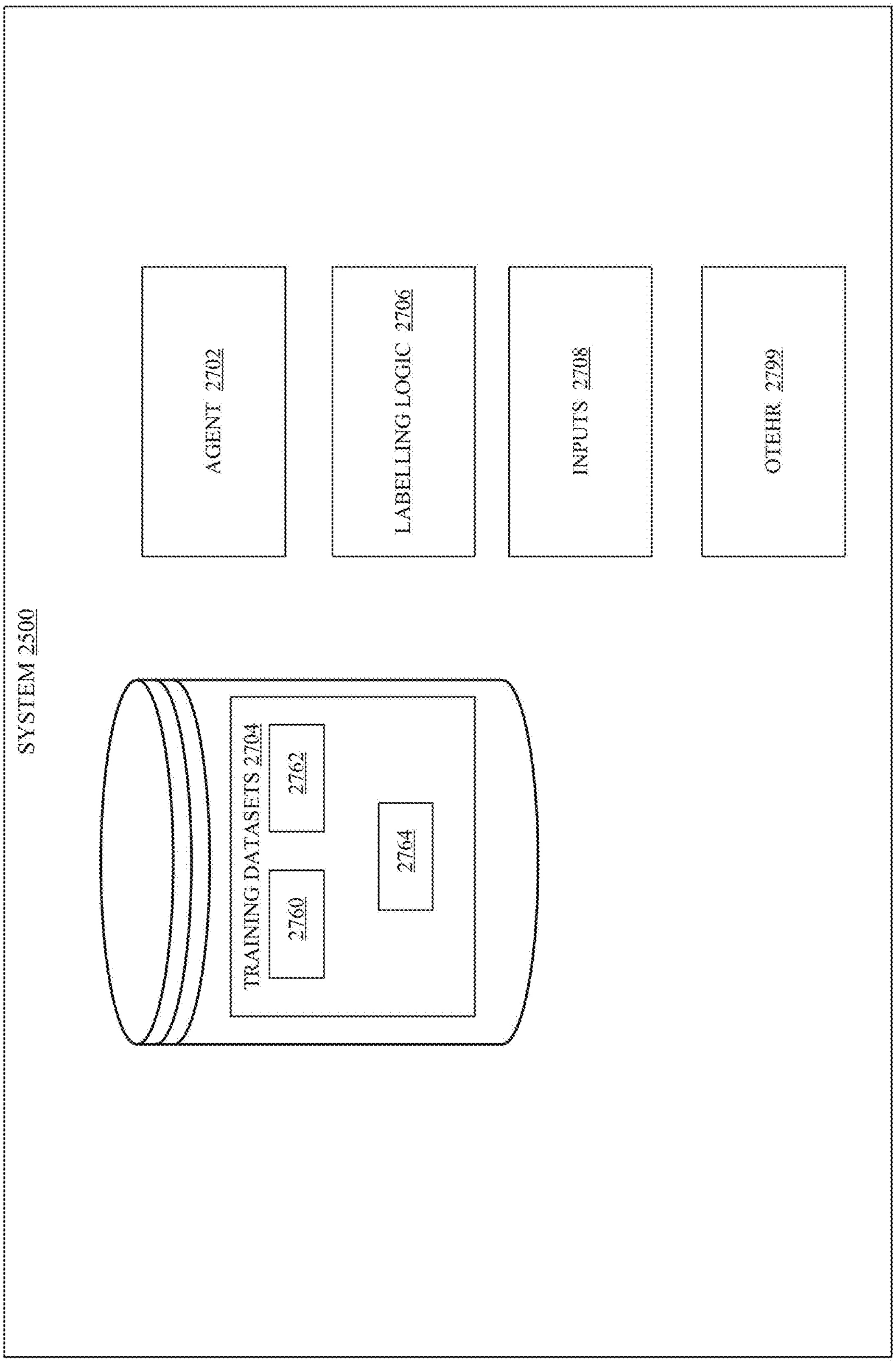

FIG. 161 is a block diagram showing an example system corresponding to the disclosed systems and methods.

Figure 162:
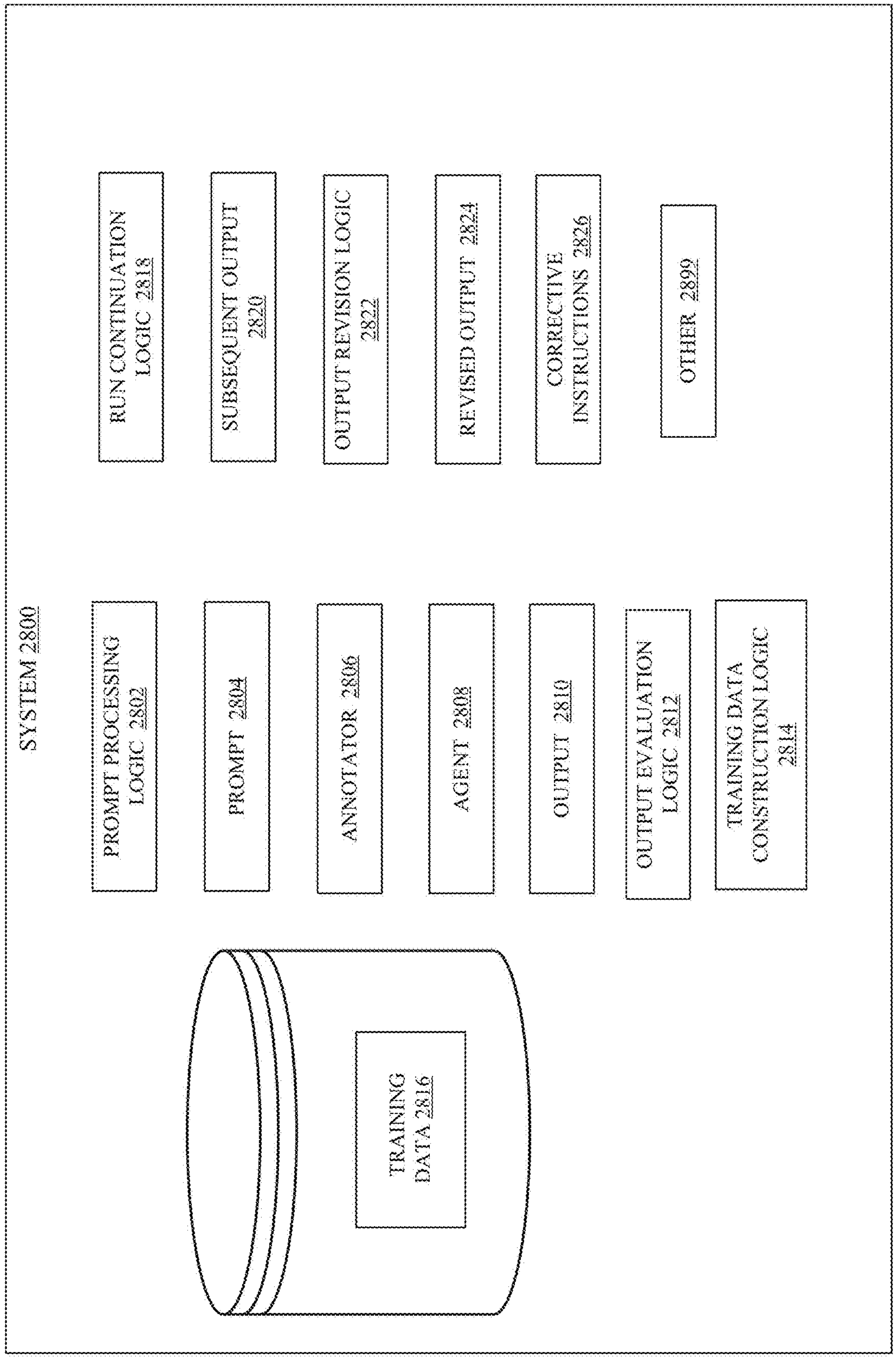

FIG. 162 is a block diagram showing an example system corresponding to the disclosed systems and methods.

Figure 163:
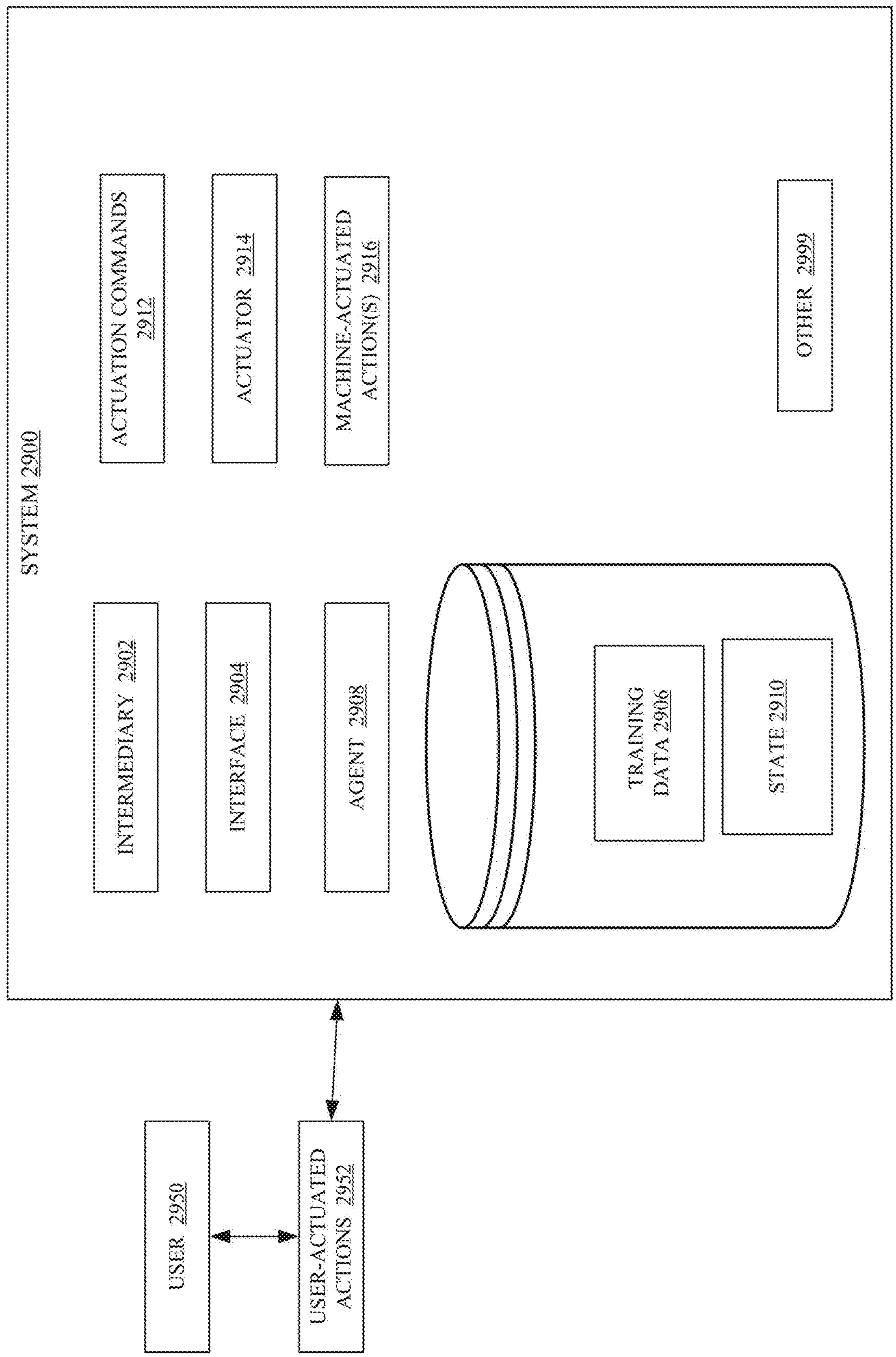

FIG. 163 is a block diagram showing an example system corresponding to the disclosed systems and methods.

Figure 164:
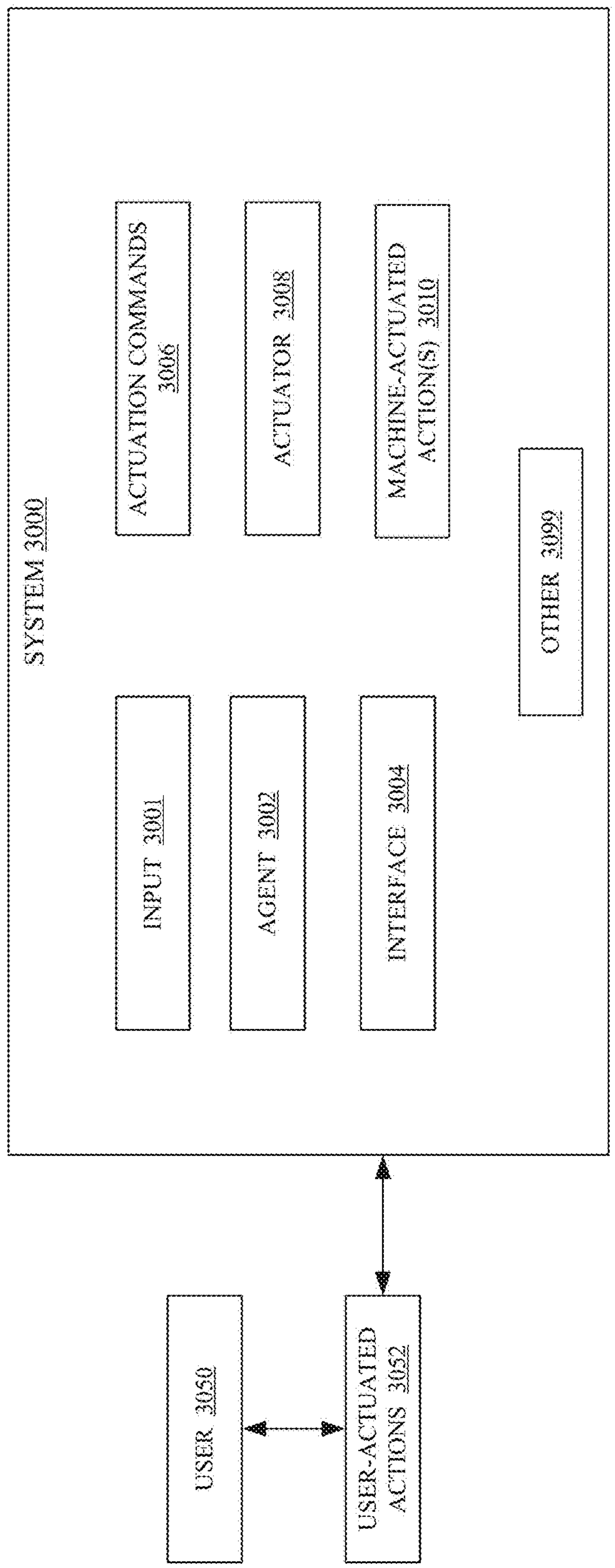

FIG. 164 is a block diagram showing an example system corresponding to the disclosed systems and methods.

Figure 165:
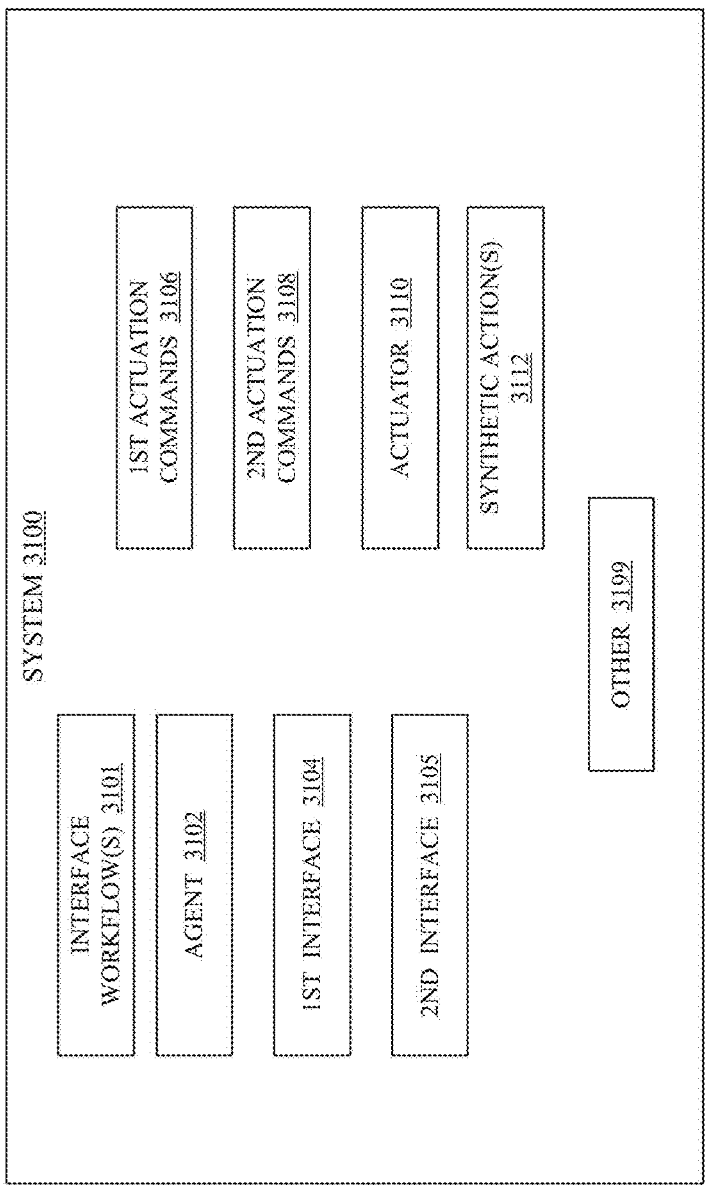

FIG. 165 is a block diagram showing an example system corresponding to the disclosed systems and methods.

Figure 166:
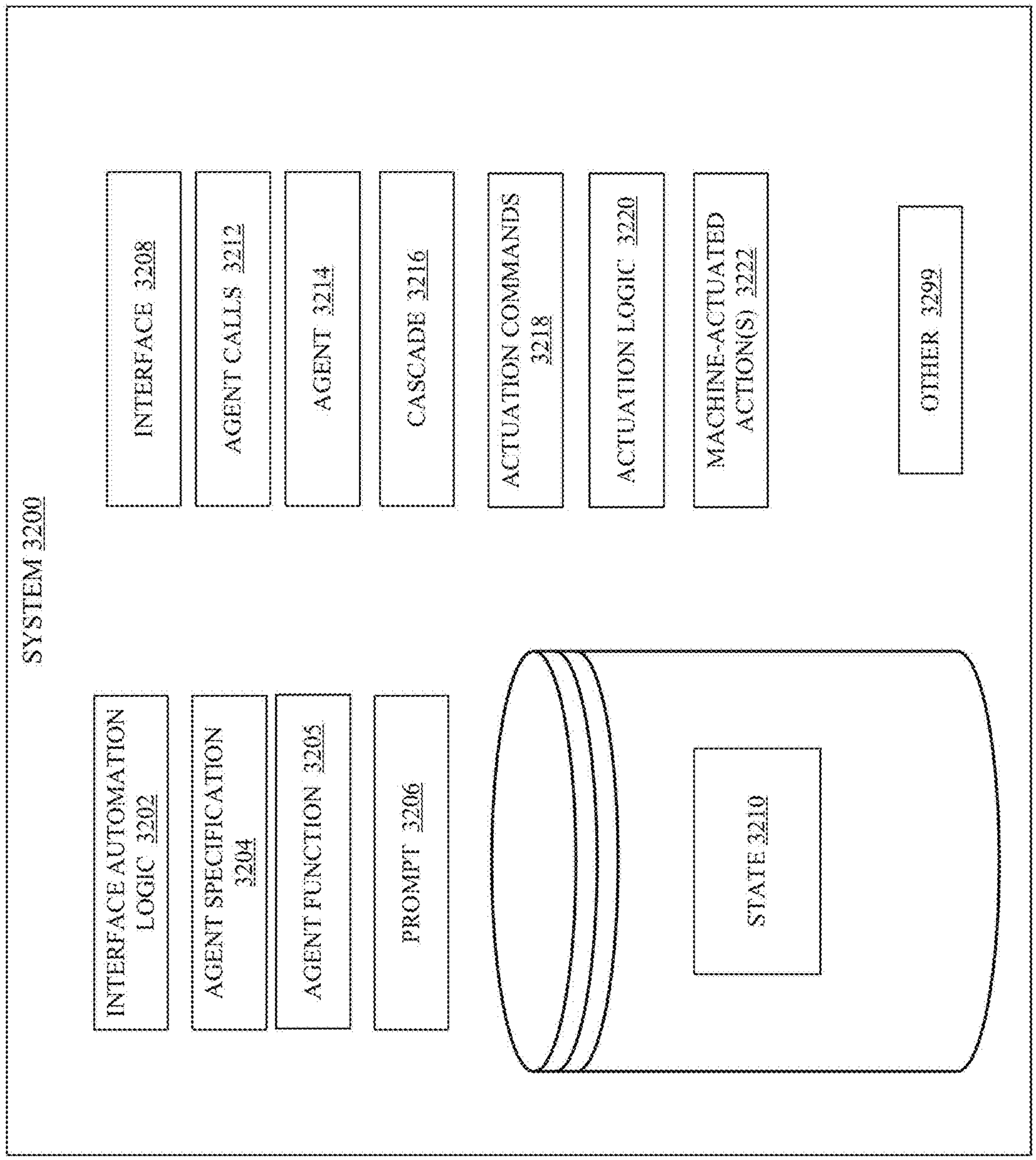

FIG. 166 is a block diagram showing an example system corresponding to the disclosed systems and methods.

Figure 167:
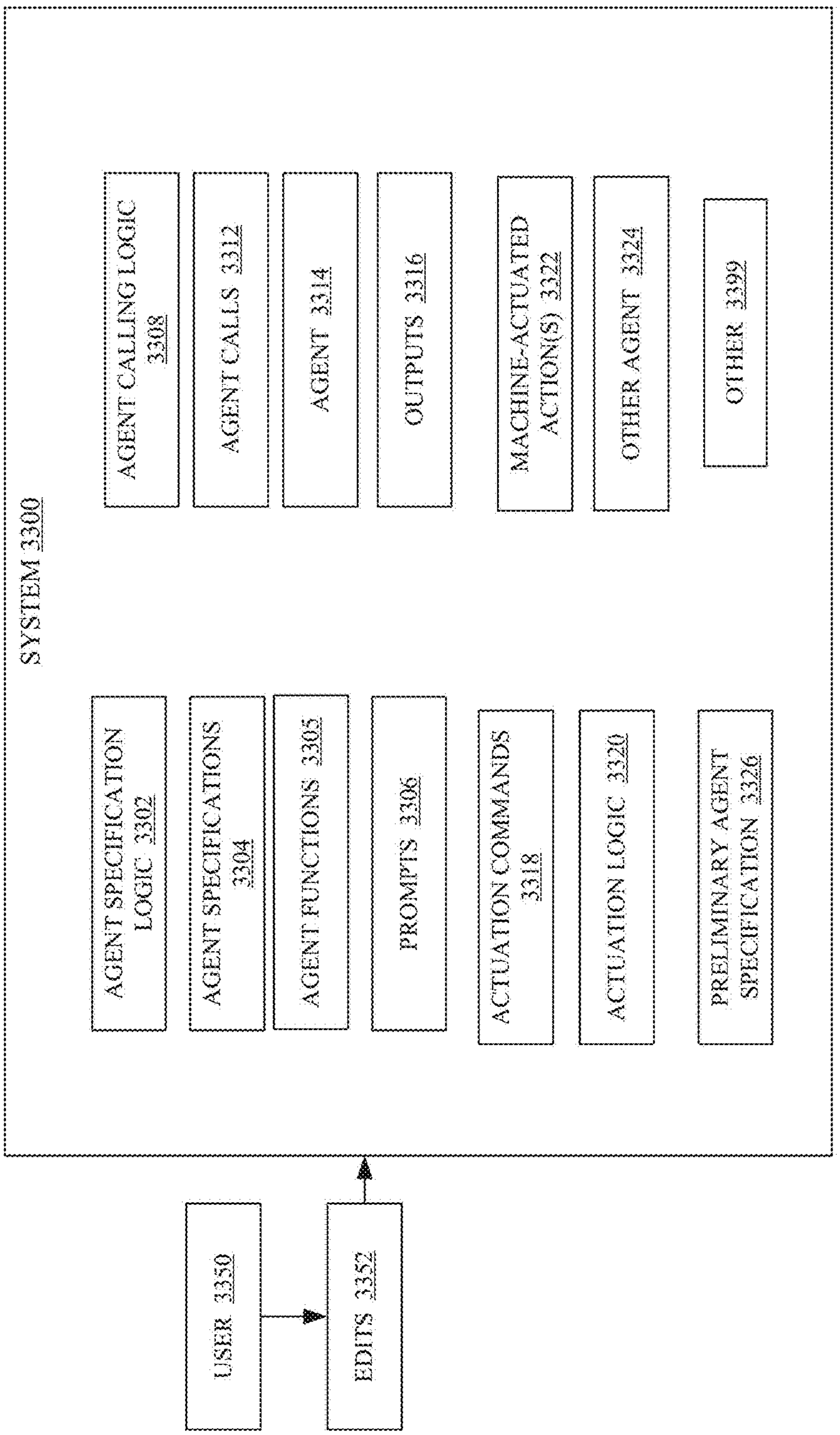

FIG. 167 is a block diagram showing an example system corresponding to the disclosed systems and methods.

Figure 168:
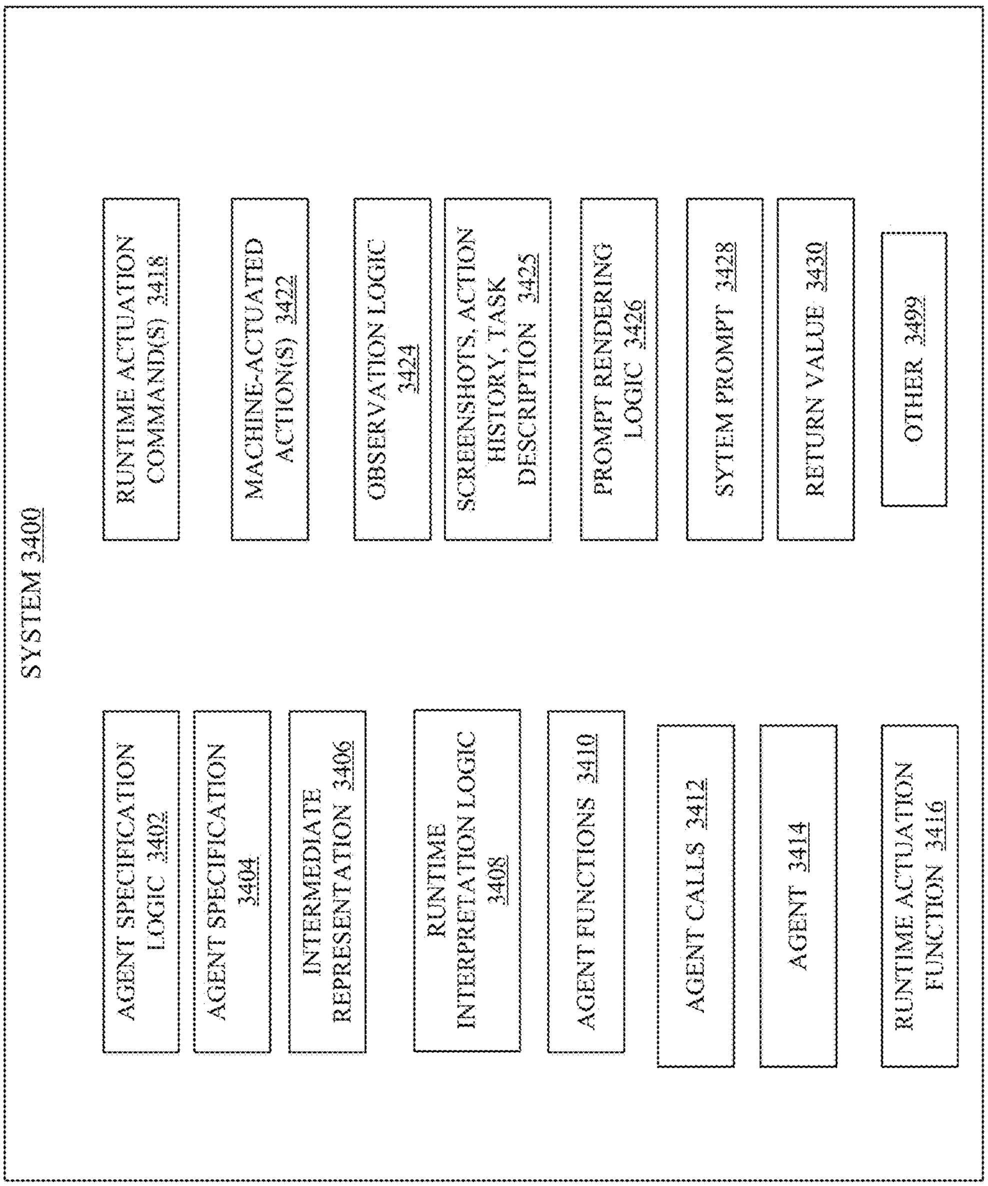

FIG. 168 is a block diagram showing an example system corresponding to the disclosed systems and methods.

Figure 169:
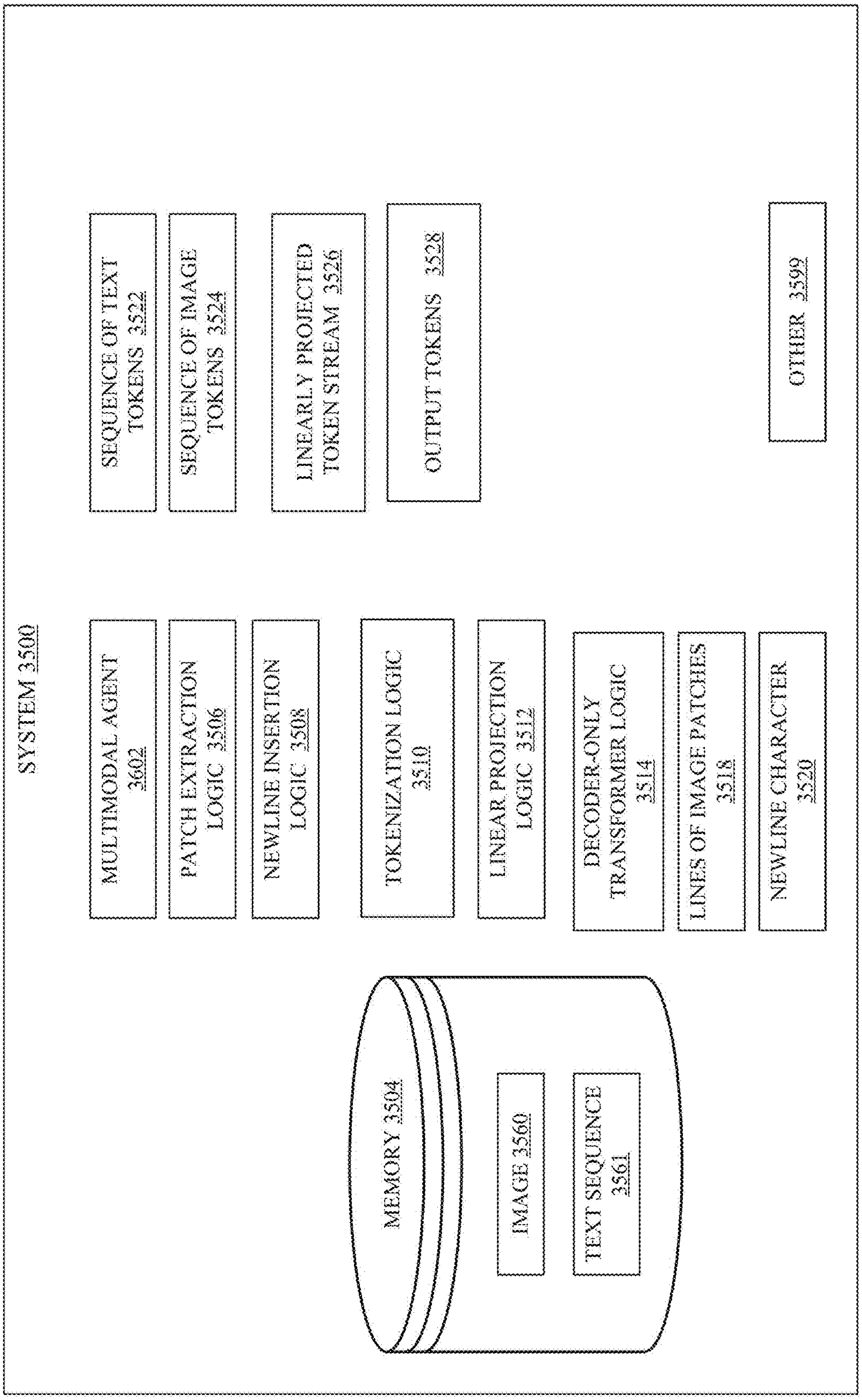

FIG. 169 is a block diagram showing an example system corresponding to the disclosed systems and methods.

Figure 170:
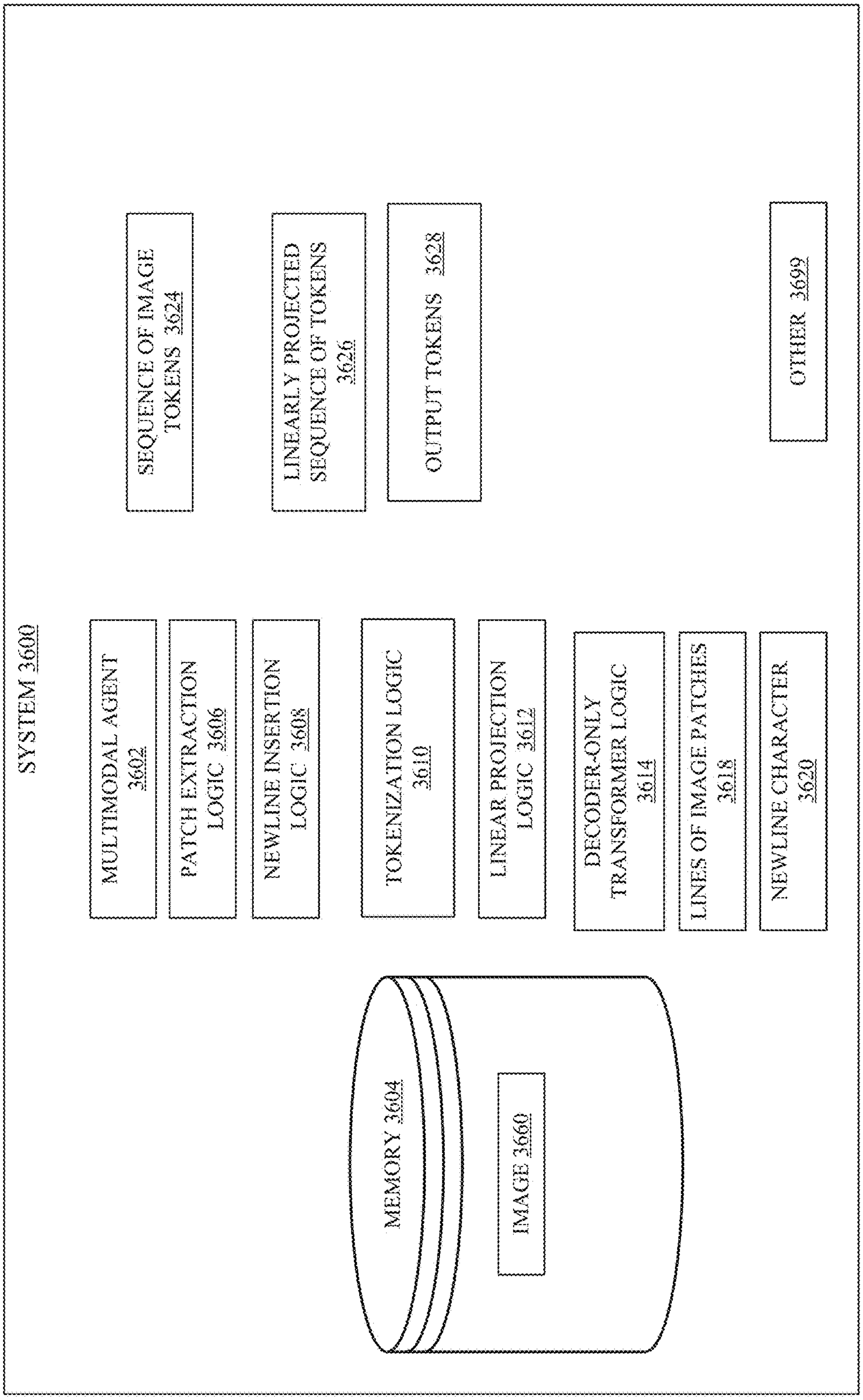

FIG. 170 is a block diagram showing an example system corresponding to the disclosed systems and methods.

Figure 171:
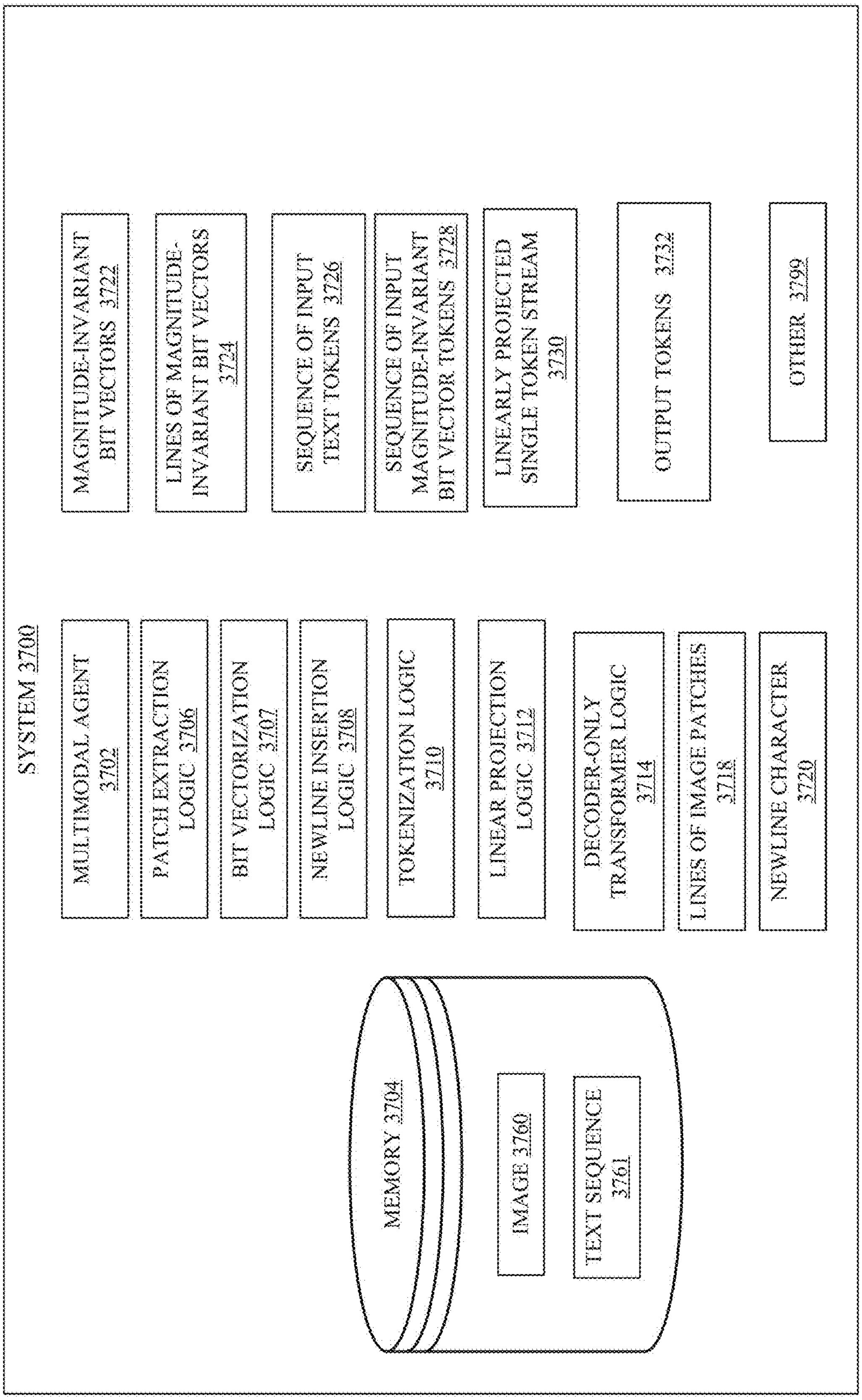

FIG. 171 is a block diagram showing an example system corresponding to the disclosed systems and methods.

Figure 172:
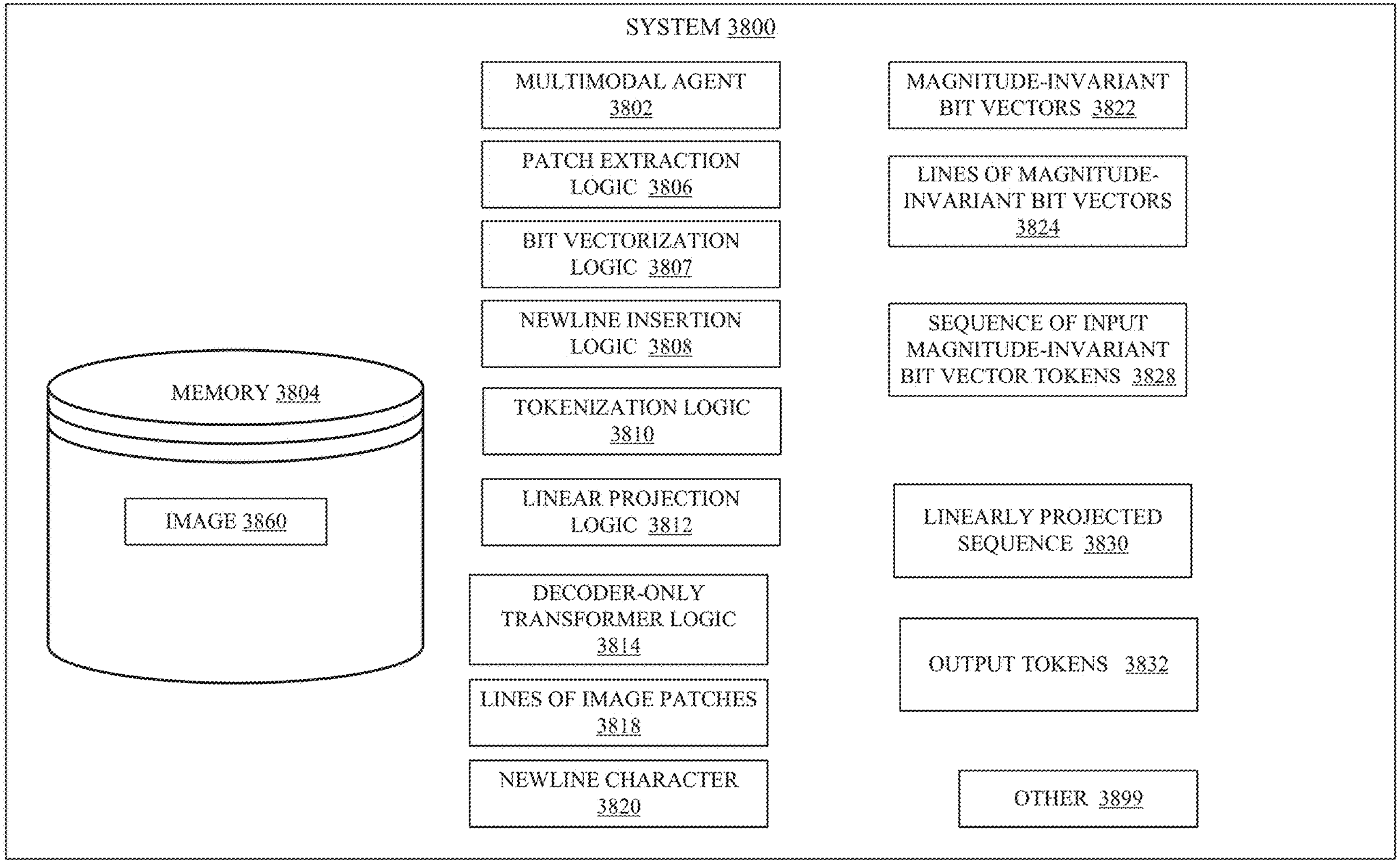

FIG. 172 is a block diagram showing an example system corresponding to the disclosed systems and methods.

Figure 173:
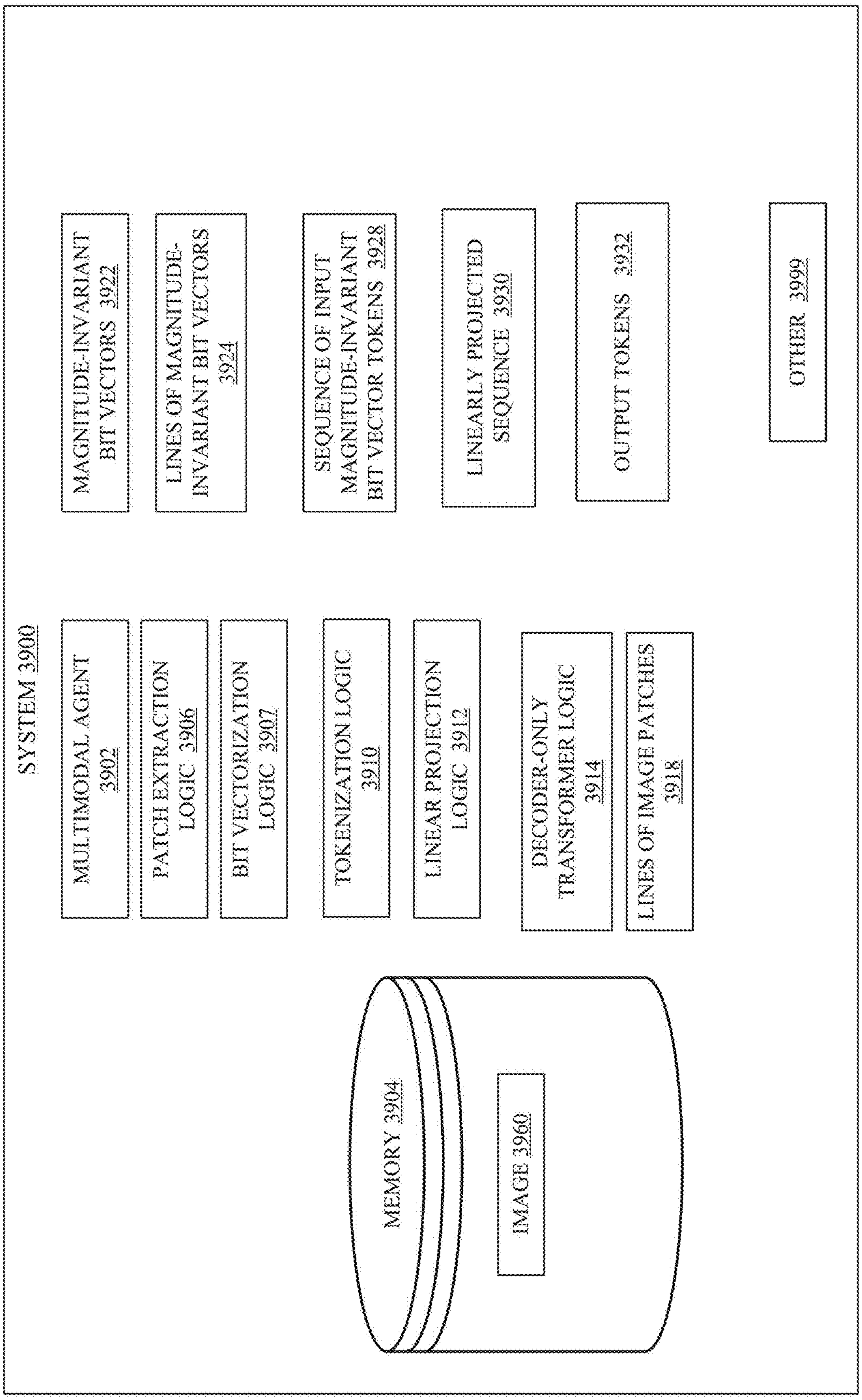

FIG. 173 is a block diagram showing an example system corresponding to the disclosed systems and methods.

Figure 174:
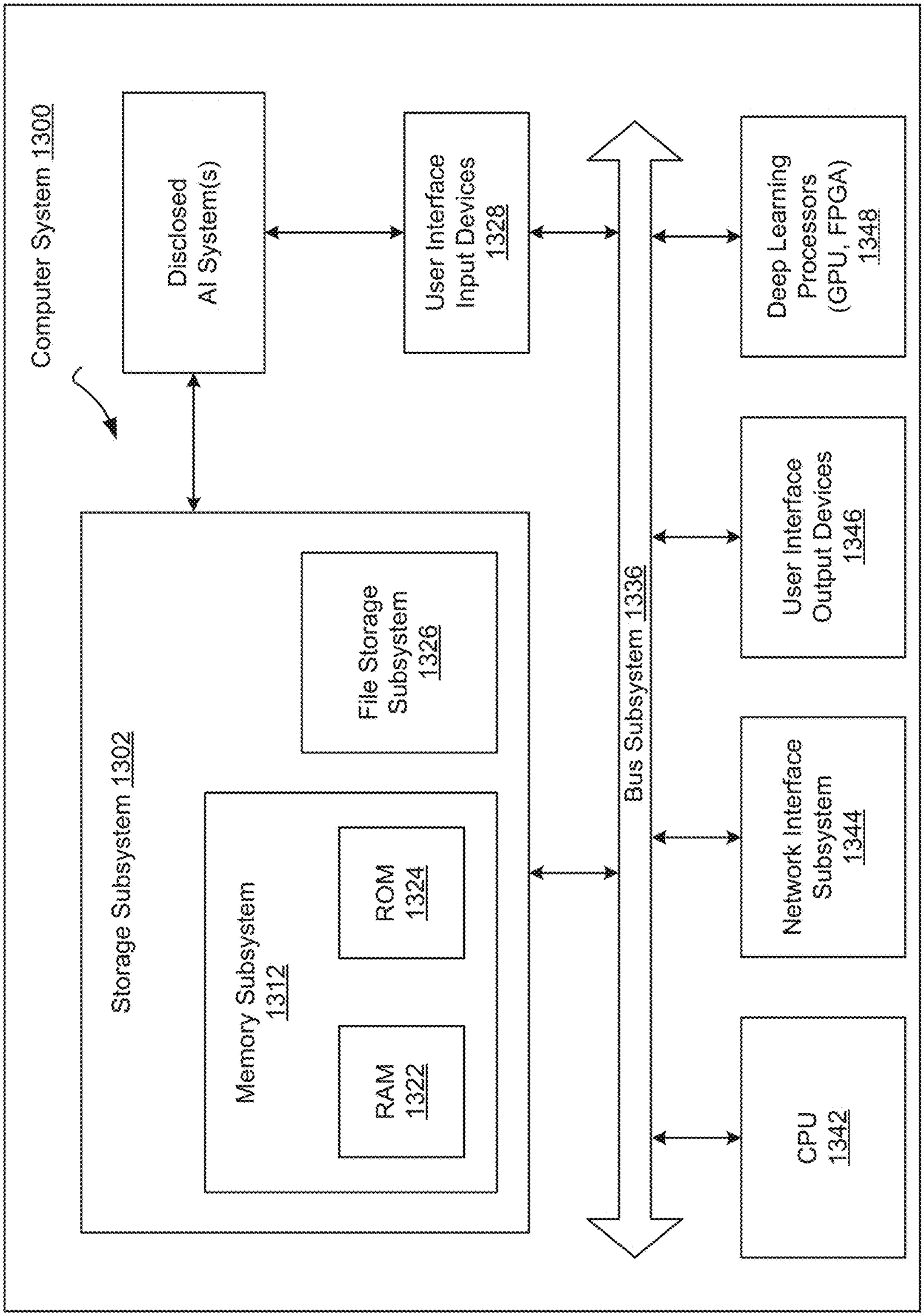

FIG. 174 illustrates an example configuration of a computing device that can be used to implement the systems and techniques described herein.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Some implementations of the technology disclosed relate to using a Transformer model to provide an AI system. In particular, the technology disclosed proposes an AI management system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLaMA versions, BERT, SpanBERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 1:
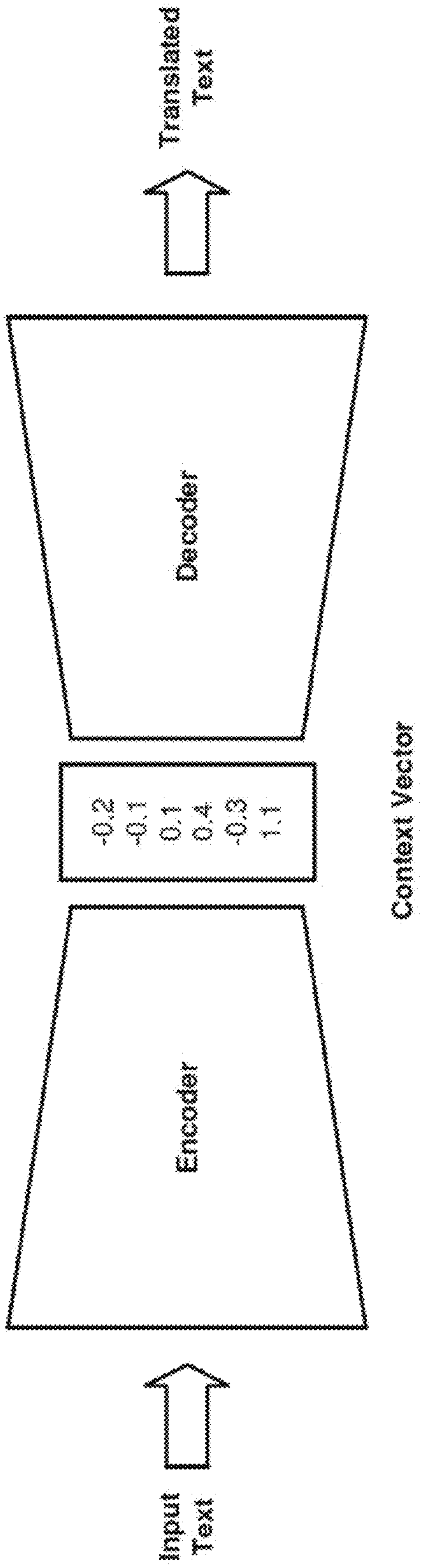
FIG. 1 is a schematic representation of an encoder-decoder architecture.

FIG. 1 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t-1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t-1, and the output generated at time step, t-1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Figure 2:
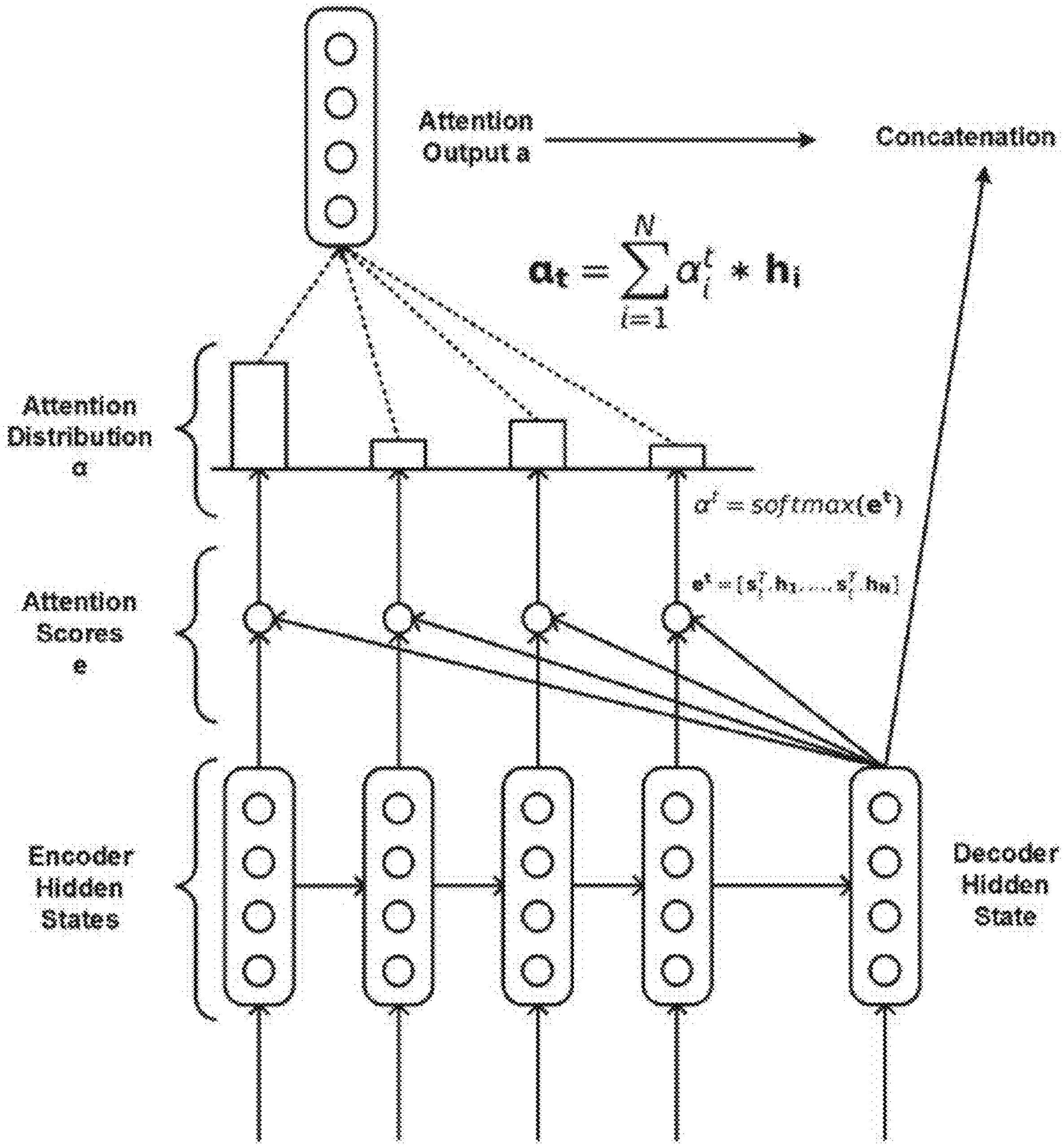
FIG. 2 shows an overview of an attention mechanism added onto an RNN encoder-decoder architecture.

Attention mechanisms distinguish Transformers from other machine learning models. The attention mechanism provides a solution for the vanishing gradient problem. FIG. 2 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 3:
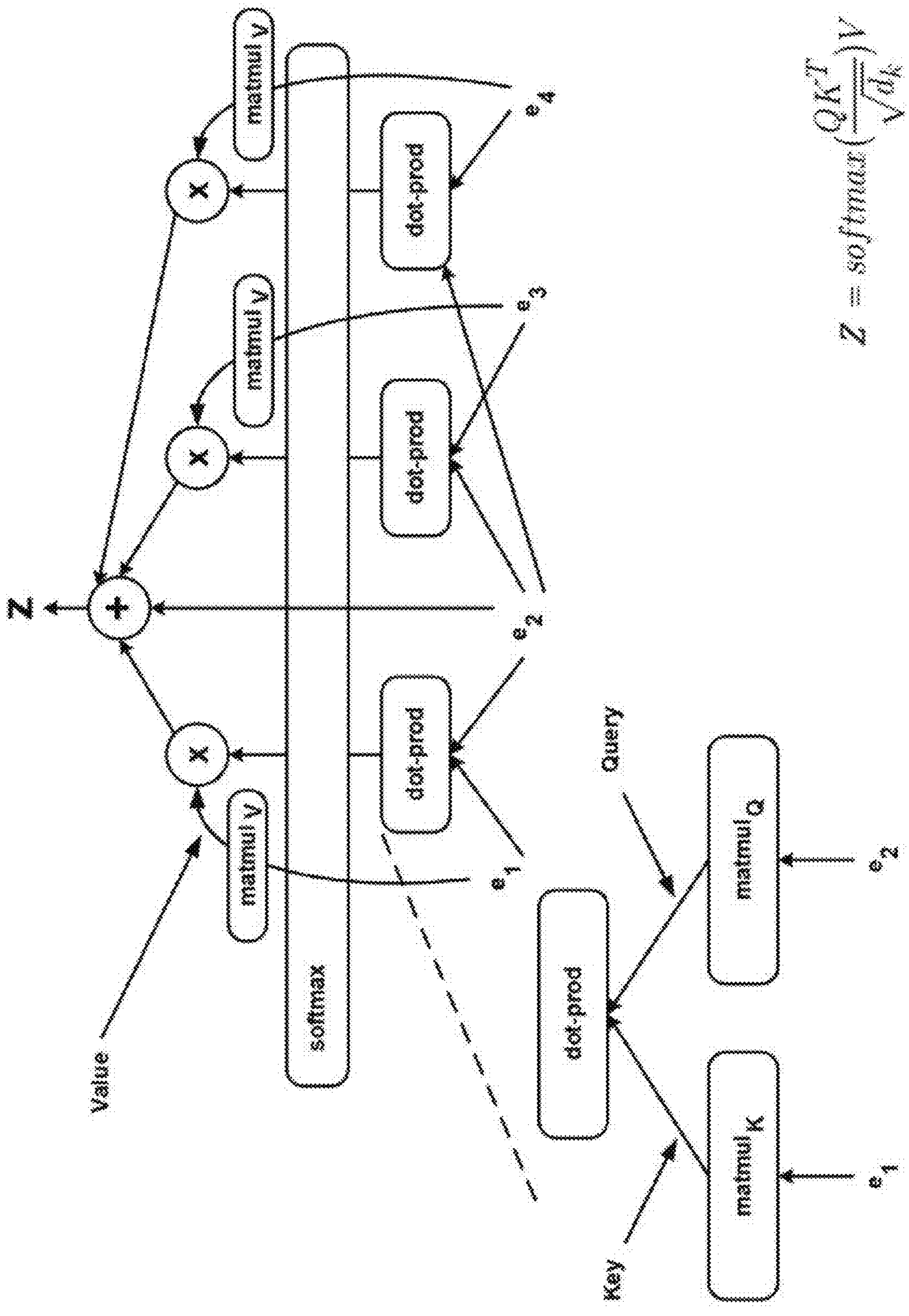
FIG. 3 is a schematic representation of the calculation of self-attention showing one attention head.

Multi-headed attention is executed in the Transformer. FIG. 3 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 4:
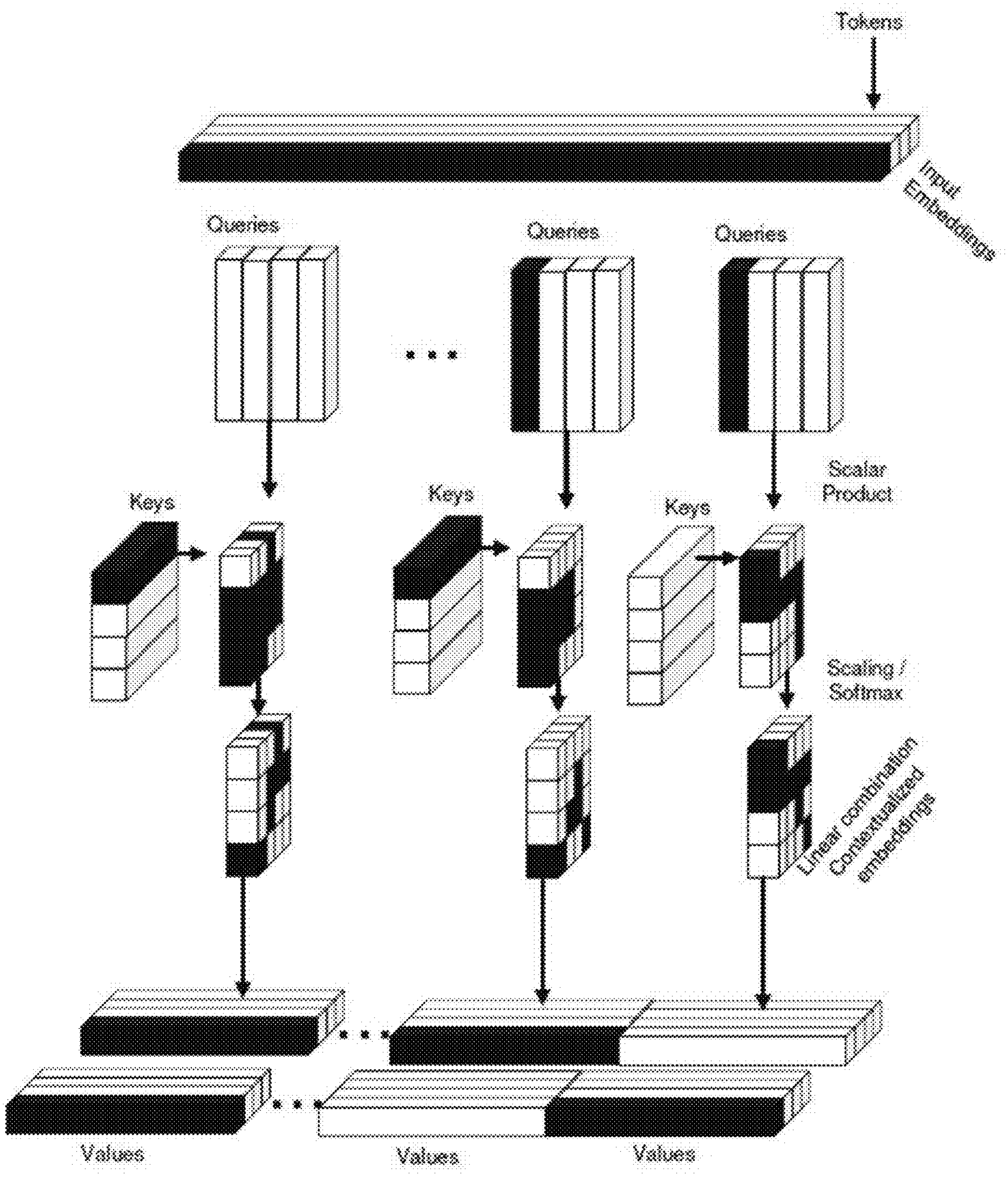
FIG. 4 is a depiction of several attention heads in a Transformer block.

FIG. 4 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention}(Q, K, V) = \text{SoftMax}\left(\frac{QK^T}{\sqrt{dk}}\right)V$$

where Q, K, V are computed as:

$$X \cdot W_Q, X \cdot W_K, X \cdot W_V$$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$\text{MultiHeadAttention}(Q,K,V)=[\text{head}_1, \ldots ,\text{head}_h]W_0$$
$$\text{where head}_i=\text{Attention}(QW_i^Q,KW_i^K,VW_i^V).$$

The outputs of all heads are concatenated together and projected again using the learned weights matrix W0 to match the dimensions expected by the next block of heads or the output of the Transformer. Using the multi-head attention instead of the simpler scaled dot-product attention enables Transformers to jointly attend to information from different representation subspaces at different positions.

Figure 5:
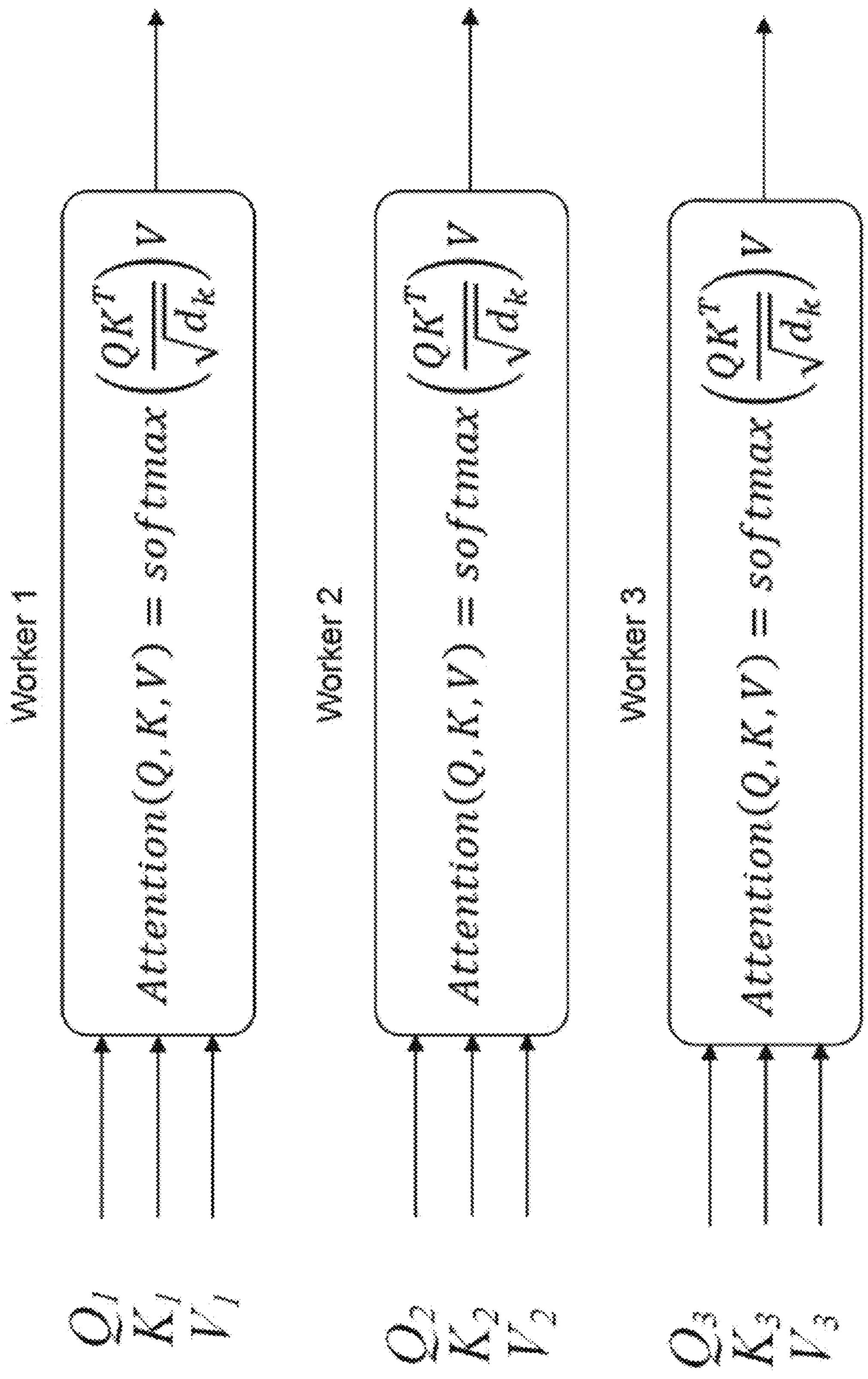
FIG. 5 is an illustration that shows how one can use multiple workers to compute the multi-head attention in parallel, as the respective heads compute their outputs independently of one another.

As shown in FIG. 5, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot WQ, X \cdot WK, X \cdot WV$$

The matrix X is of shape (n, d) where n is the number of patches and d is the hidden vector dimension. The weights $W_Q$, $W_K$, $W_V$ are all of shape (d, d). Omitting the constant factor 3, the resulting complexity is:

$$n \cdot d2$$

We can proceed to the estimation of the complexity of the attention function itself, i.e., of SoftMax $$\frac{QK^T}{\sqrt{dk}}.$$

The matrices Q and K are both of shape (n, d). The transposition operation does not influence the asymptotic complexity of computing the dot product of matrices of shapes (n, d)·(d, n), therefore its complexity is:

$$n2 \cdot d$$

Scaling by a constant factor of $\sqrt{\text{dk}}$, where dk is the dimension of the keys vector, as well as applying the SoftMax function, both have the complexity of a·b for a matrix of shape (a, b), hence they do not influence the asymptotic complexity. Lastly the dot product SoftMax is $$\frac{QK^T}{\sqrt{dk}}$$

between matrices of shapes (n, n) and (n, d) and so its complexity is:

$$n2 \cdot d$$

The final asymptotic complexity of scaled dot-product attention is obtained by summing the complexities of computing Q, K, V, and of the following attention function:

$$n \cdot d2 + n2 \cdot d.$$

The asymptotic complexity of multi-head attention is the same since the original input matrix X is projected into h matrices of shapes $$\left(n, \frac{d}{h}\right)$$

where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 6:
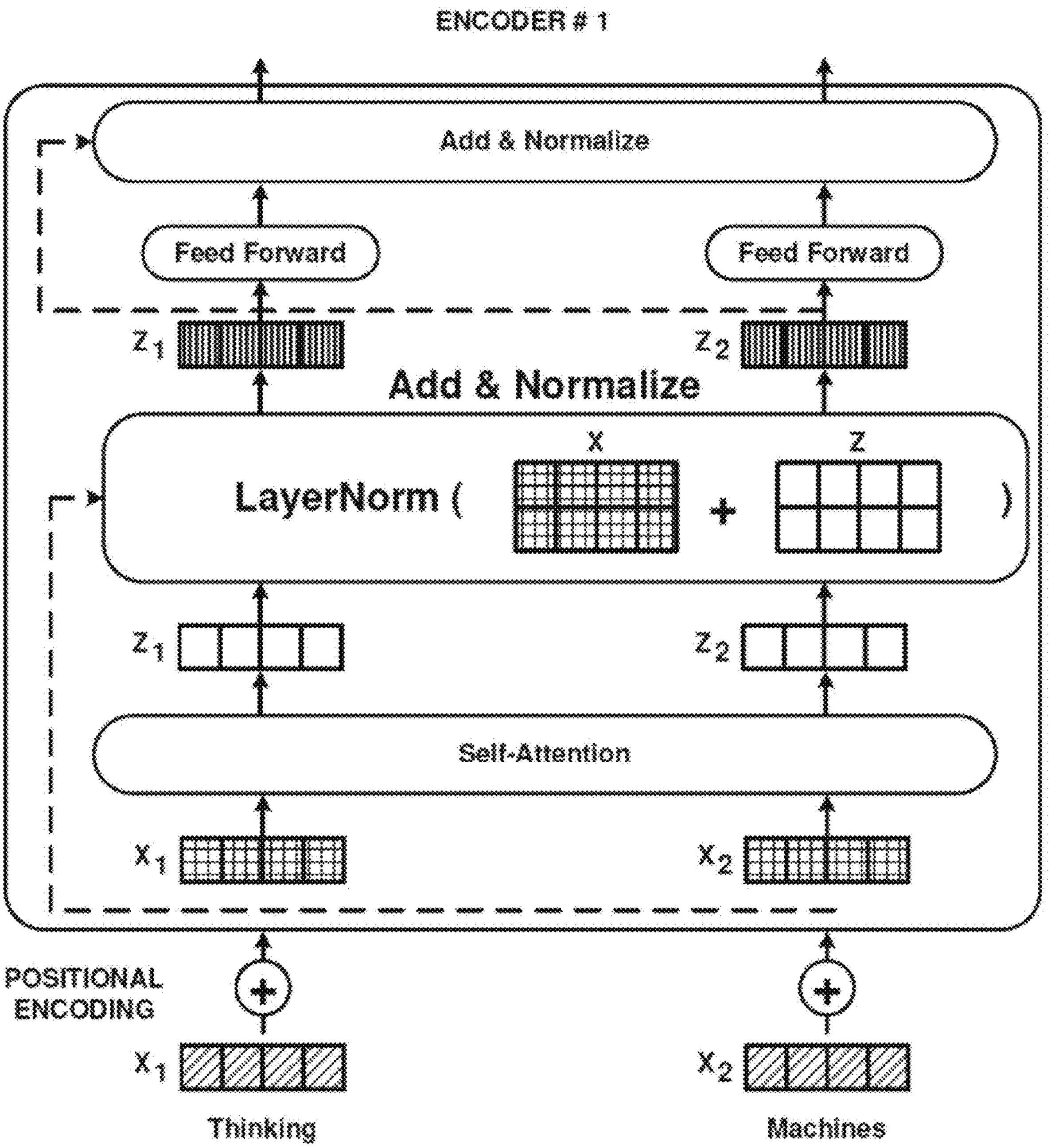
FIG. 6 is a portrayal of one encoder layer of a Transformer network.

FIG. 6 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 7:
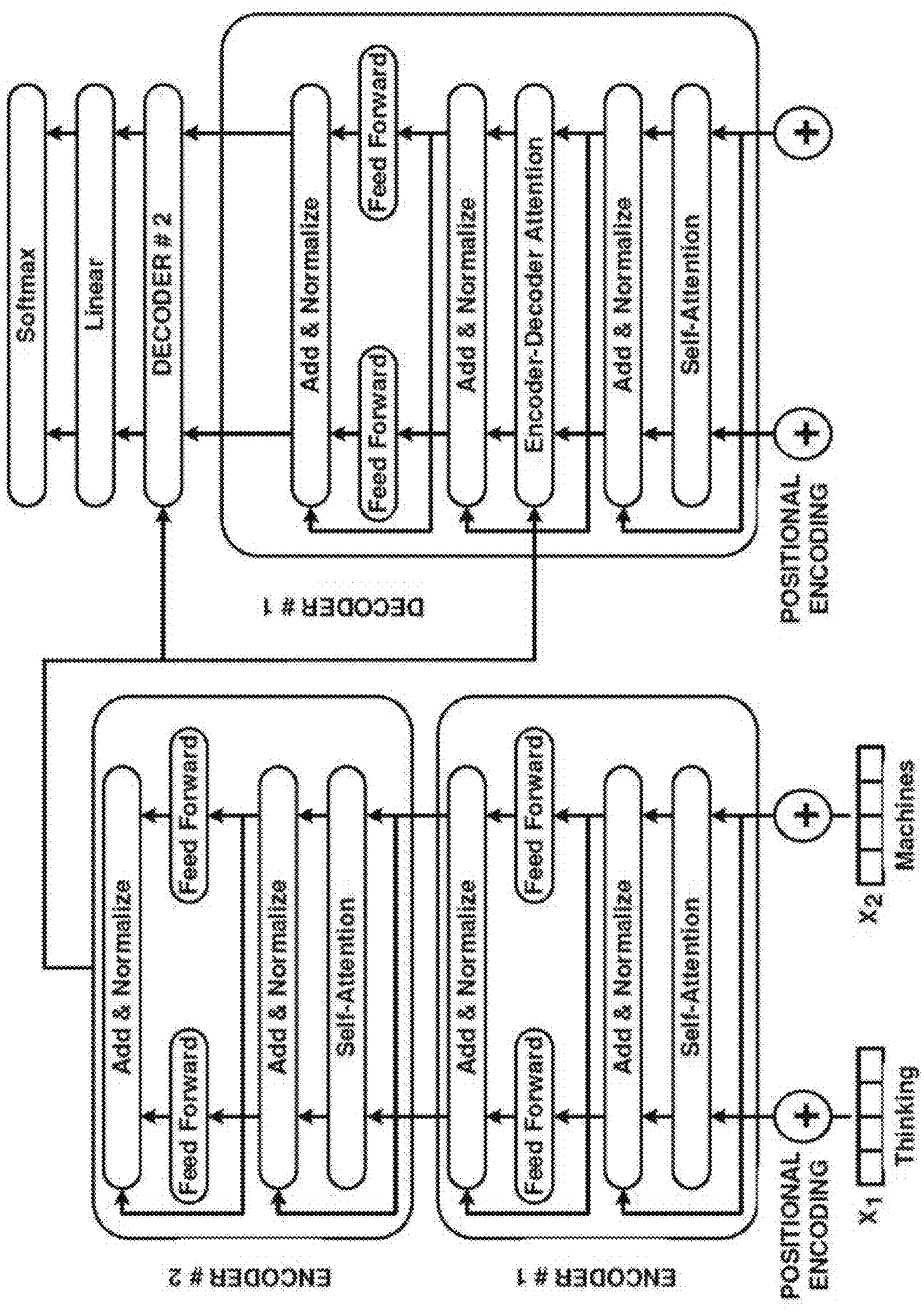
FIG. 7 shows a schematic overview of a Transformer model.

FIG. 7 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIGS. 8A, 8B, 9A, 9B, 9C, and 9D. Unfortunately, important positional information is lost because image sets are position-invariant. This problem is solved by adding a learned positional encoding into the image patches.

Figure 8B:
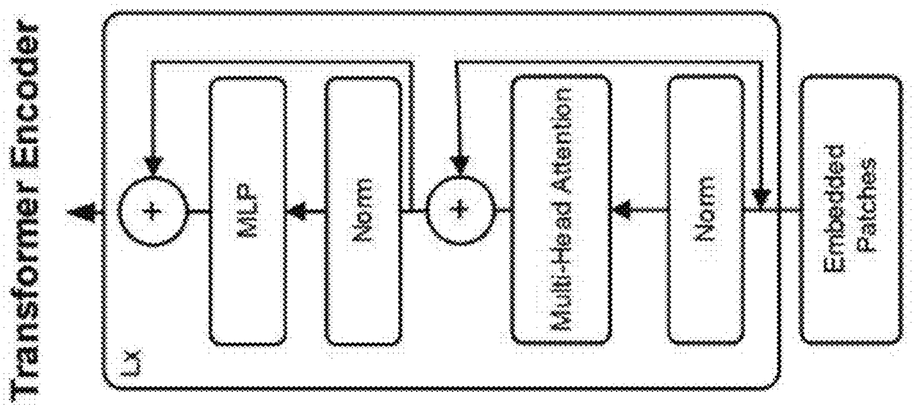
FIGS. 8A and 8B is a depiction of a Vision Transformer (ViT).
Figure 8A:
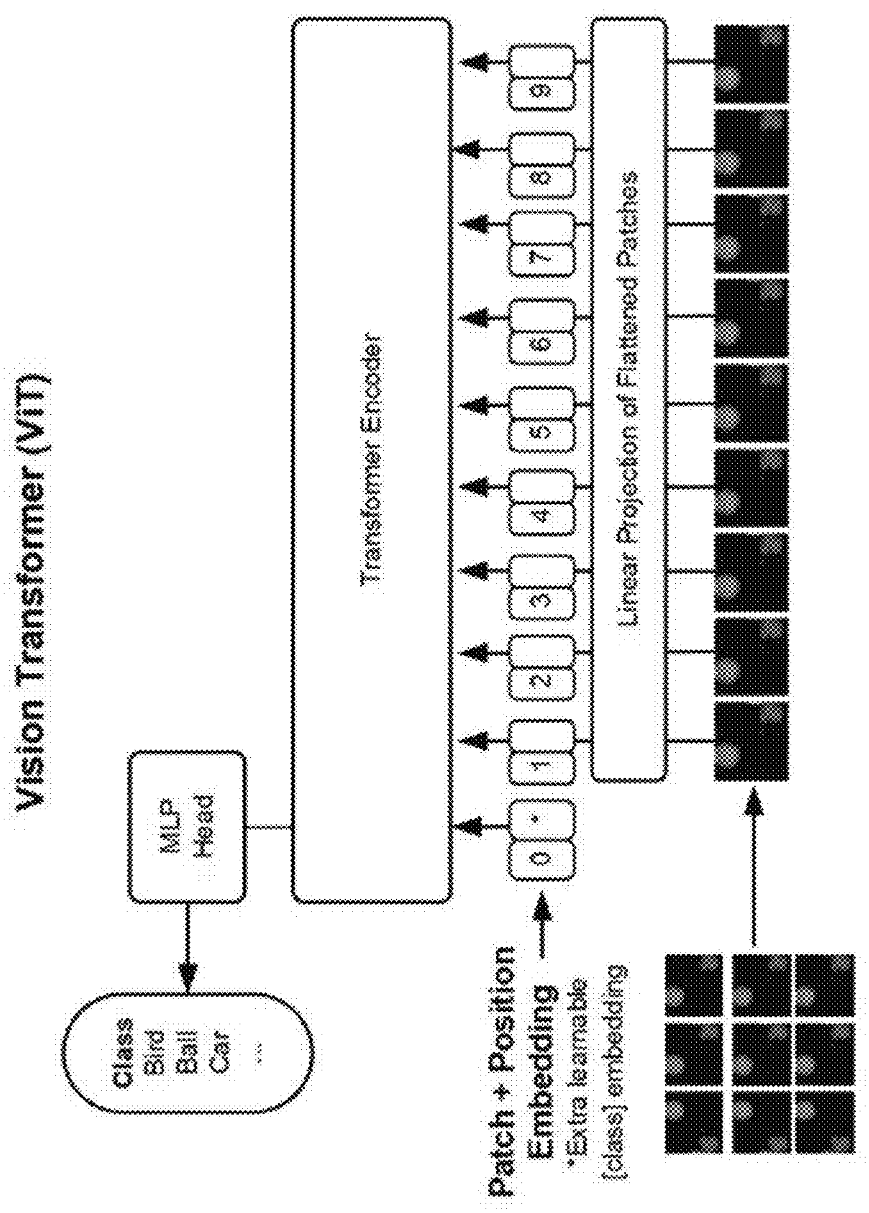
Figures 9A, 9B, 9C, 9D:
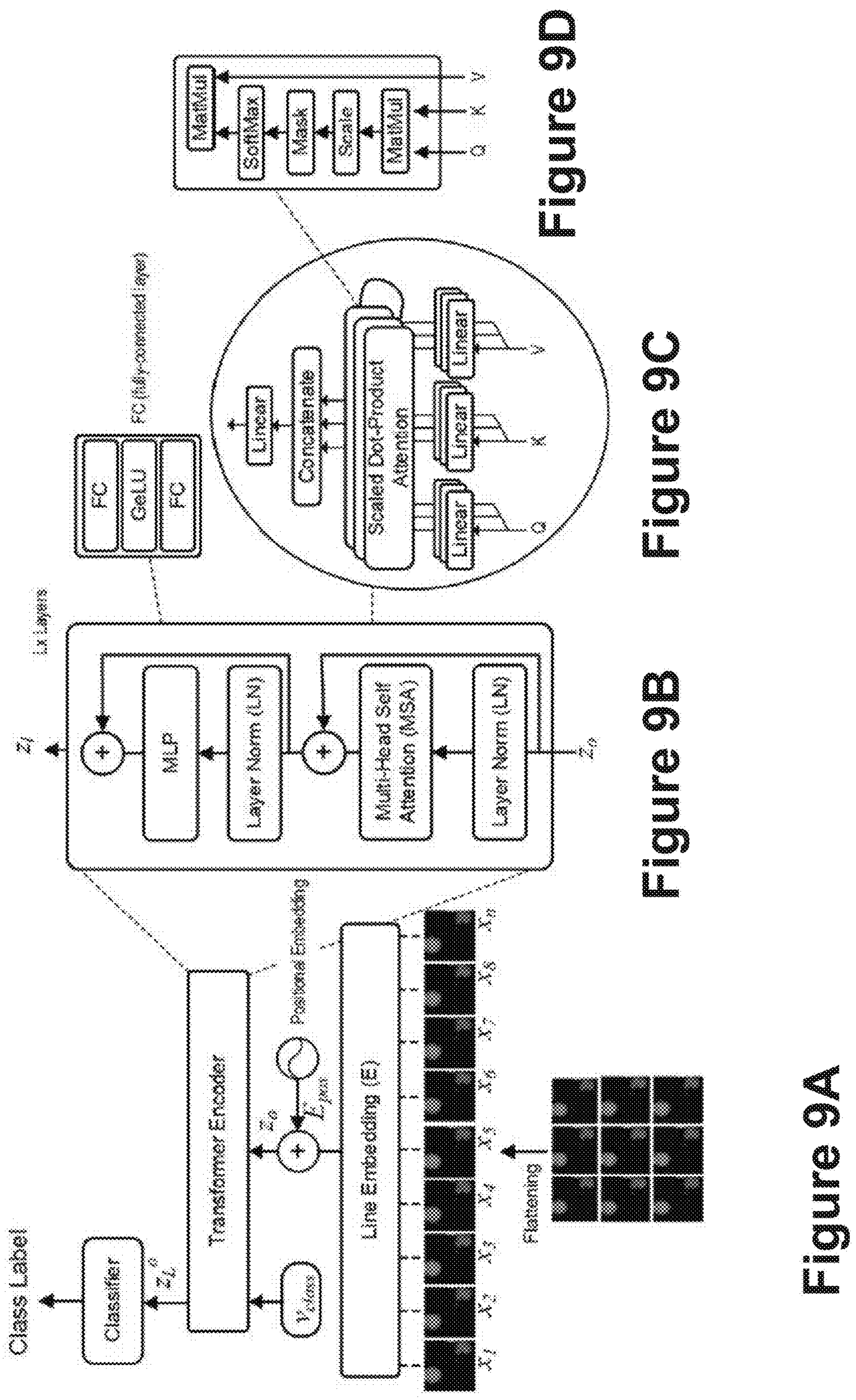
FIG. 9A-D illustrates a processing flow of the Vision Transformer (ViT).

The computations of the ViT architecture can be summarized as follows. The first layer of a ViT extracts a fixed number of patches from an input image (FIG. 8A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 10.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 8B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the present disclosure, examples of which are illustrated in the accompanying drawings. Wherever possible, the same reference numbers will be used throughout the drawings to refer to the same or like parts.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

AI Agent Translation of User Intent into Actions

There is a desire for Artificial Intelligence (AI) agents (e.g., models) to translate user intent into actions. FIG. 11 is a pictorial illustration that depicts the short fall of current approaches and the advantages of the systems and methods disclosed herein. As shown in FIG. 11, current approaches struggle (or fail) to interact with or understand User Interfaces (UIs) visually, have an over-reliance on Application Programming Interface (API) coverage and text generation, result in hallucinations, and have low reliability. For example, some current approaches (e.g., GPT-4) have a 59% score (e.g., reliability) on a given enterprise task benchmark. The systems and methods disclosed herein have an 88% score (e.g., reliability) on the same given enterprise task benchmark. The systems and methods disclosed provide a three-pronged approach that is more robust, reliable, and future-proof. The systems and methods disclose herein provide model(s) that see pixels natively and excel at Visual Question Answering (VQA) and thus, can understand software UIs and know how to proceed. The model(s) excel at localization and knows where to interact (e.g., click) with a UI. Additionally, the systems and methods disclosed herein provide a custom actuation layer that translates model instructions into real actions (e.g., real web events).

Figure 12:
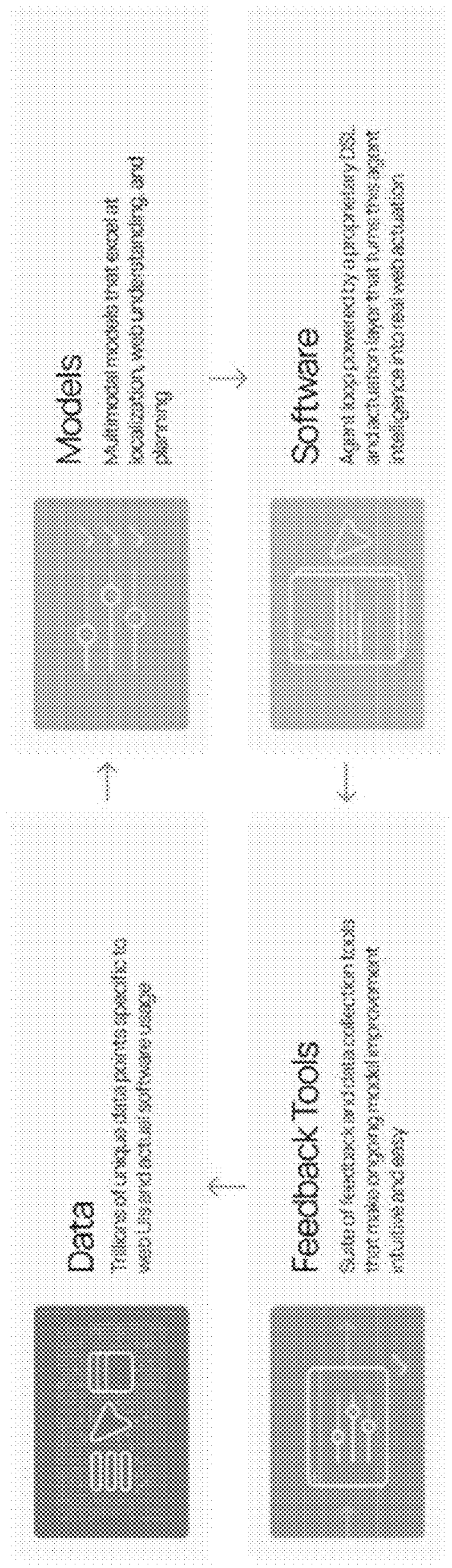
FIG. 12 is a pictorial illustration of transforming user intent into system actions.

FIG. 12 is a pictorial illustration that shows aspects of the systems and method disclosed herein. As shown in FIG. 12, the systems and method disclosed herein include (and utilize) data comprising trillions of unique data points specific to web UIs and actual software usage. The systems and method disclosed herein include model(s) (e.g., multimodal model(s)) that excel at localization, web understanding, and planning. The systems and method disclosed herein include software that includes an agent loop powered by a Domain Specific Language (DSL) and an actuation layer that turns agent intelligence (e.g., output model instructions) into real actions (e.g., real web actuation/events). The systems and method disclosed herein include a suite of feedback and data collection tools that improve a user experience in improving the model(s).

Figure 13:
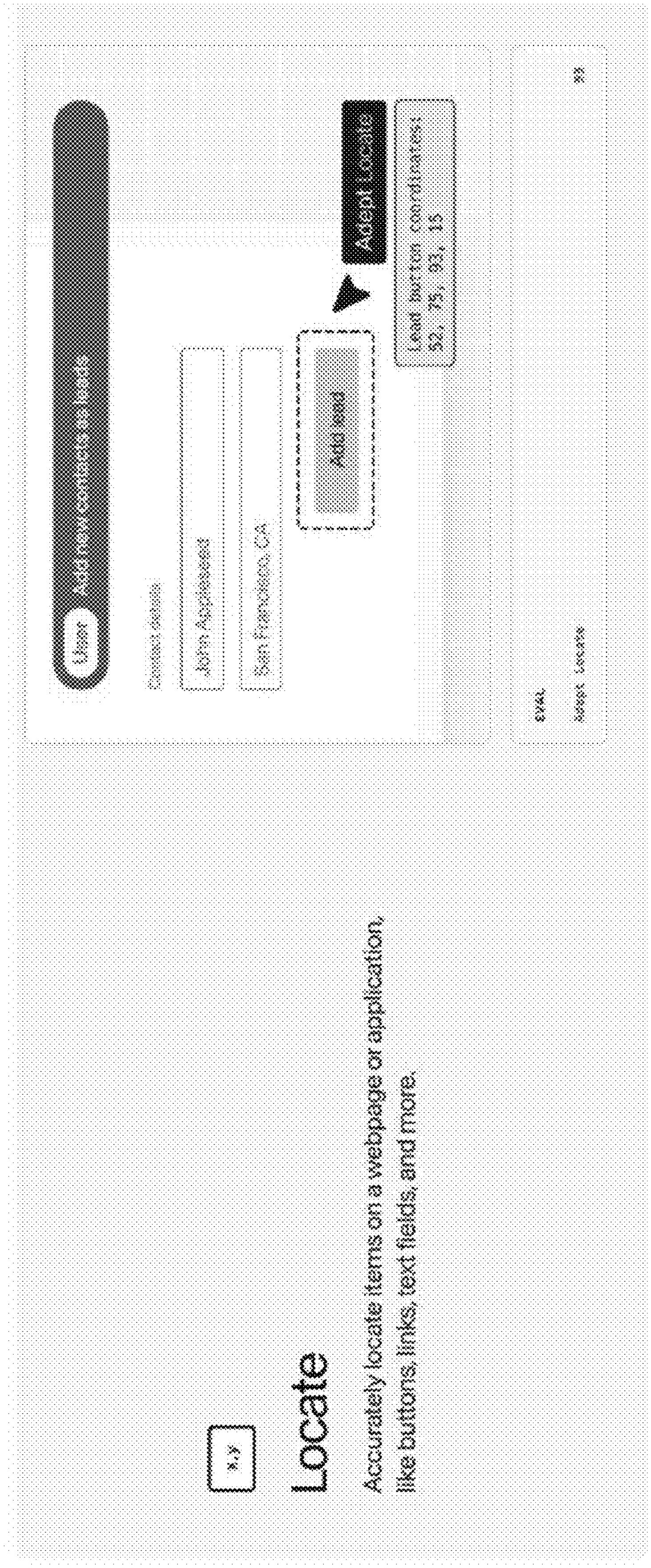
FIG. 13 is a pictorial illustration of transforming user intent into system actions.

FIG. 13 is a pictorial illustration showing one example of translating user intent into actions. As shown in FIG. 13, the systems and methods disclosed herein provide for accurately locating items on a UI (e.g., of a webpage or application), such as buttons, links, text fields, as well as various other items (or elements) of a UI. As shown in FIG. 13, a user has provided the prompt "Add new contacts as leads" and has provided details of the contact (i.e., John Appleseed of San Fransisco, California). As illustrated in FIG. 13, the systems and methods disclosed herein provide for translating the user intent (represented by the prompt "Add new contacts as leads") into one or more actions. As shown in FIG. 13, a first action, of the one or more actions, comprises a locate action in which the systems and methods locate a UI item (or element) (the "Add lead" button) on the UI (e.g., coordinates of the UI item or element are identified).

Figure 14:
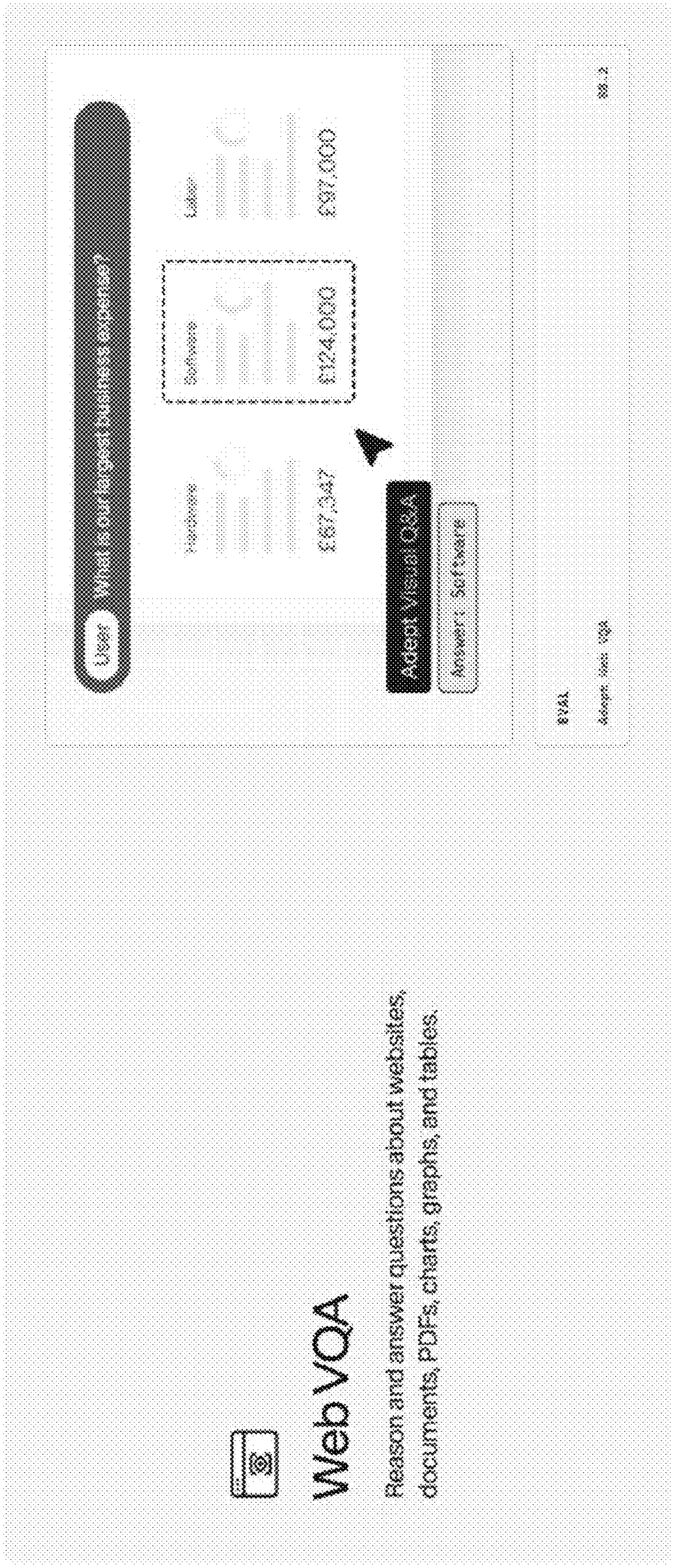
FIG. 14 is a pictorial illustration of transforming user intent into system actions.

FIG. 14 is a pictorial illustration showing one example of translating user intent into actions. As shown in FIG. 14, the systems and methods disclosed herein provide for reasoning and answering questions in relation to websites, documents, forms, charts, graphs, tables, etc. FIG. 14 illustrates an example of VQA. As shown in FIG. 14, a user has provided the prompt "What is our target business expense?" in relation to a website (or webpage). The systems and methods disclosed herein provide for translating the user intent (represented by the prompt "What is our target business expense?") into one or more actions. As shown, a first action, of the one or more actions, comprises an answer action in which the systems and methods answer the query (represented by the prompt) (as shown the systems and methods provide the correct answer of "Software").

Figure 15:
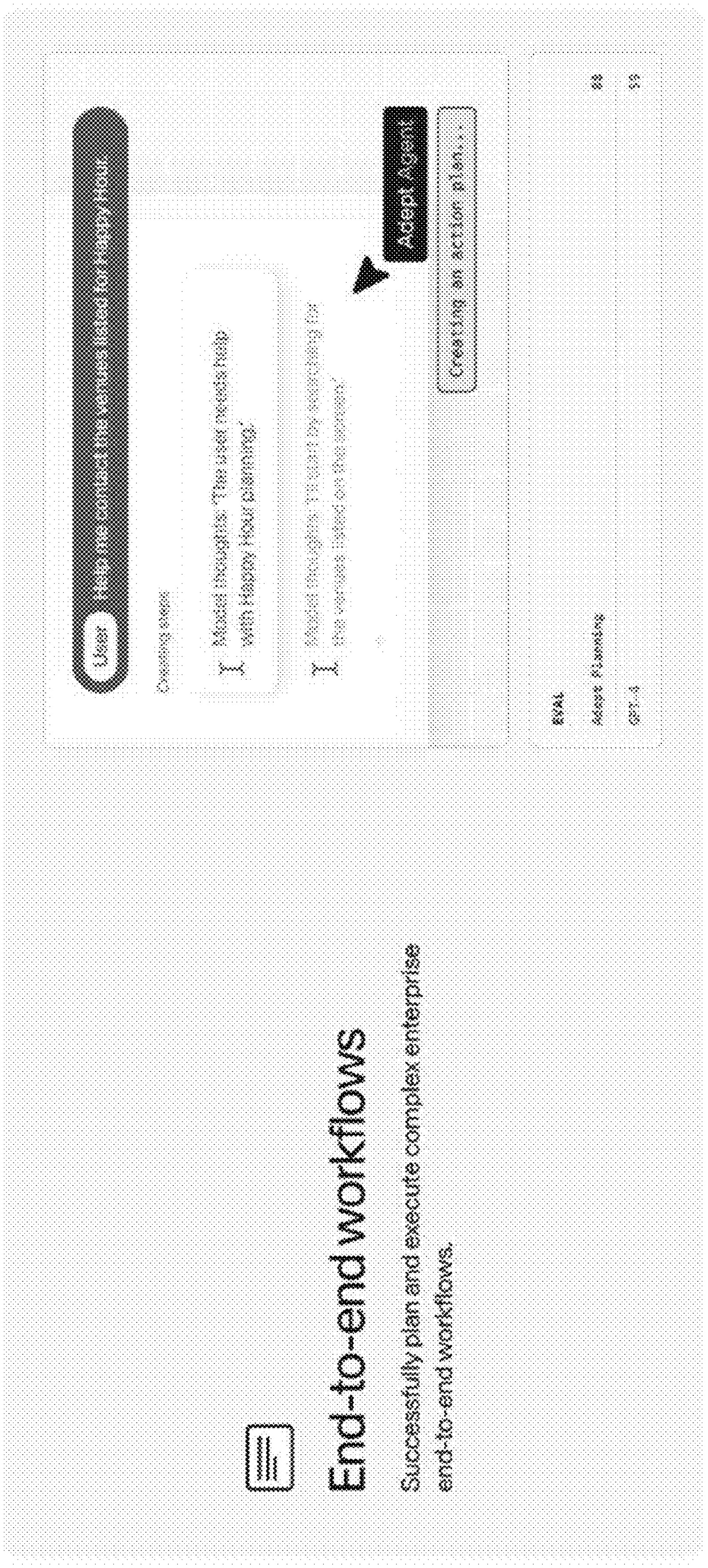
FIG. 15 is a pictorial illustration of transforming user intent into system actions.

FIG. 15 is a pictorial illustration showing one example of translating user intent into actions. As shown in FIG. 15, the systems and methods disclosed herein disclosed herein provide for generating and executing end-to-end workflows. FIG. 15 shows an example of planning (or generation an action plan, such as an end-to-end workflow). As shown in FIG. 15, a user has provided the prompt "Help me contact the venues listed for Happy Hour". Though not shown in FIG. 15, the user also provides context information (the UI includes information) listing various venues. The systems and methods disclosed herein provide for translating the user intent (represented by the prompt "Help me contact the venues listed for Happy Hour") into one or more actions. The systems and methods disclosed herein infer the user intent (model(s) infer that "The user needs help with Happy Hour planning."). Further, the systems and methods disclosed translate the user intent into an action of planning or generating an action plan (end-to-end workflow) including one or more actions. As shown, a first action, of the one or more actions, of the action plan, comprises a search action. As shown, the systems and methods disclosed herein have generated an action plan that include searching for the venues provided in the context information (i.e., "I'll start by searching for venues listed on the screen.").

Figure 16:
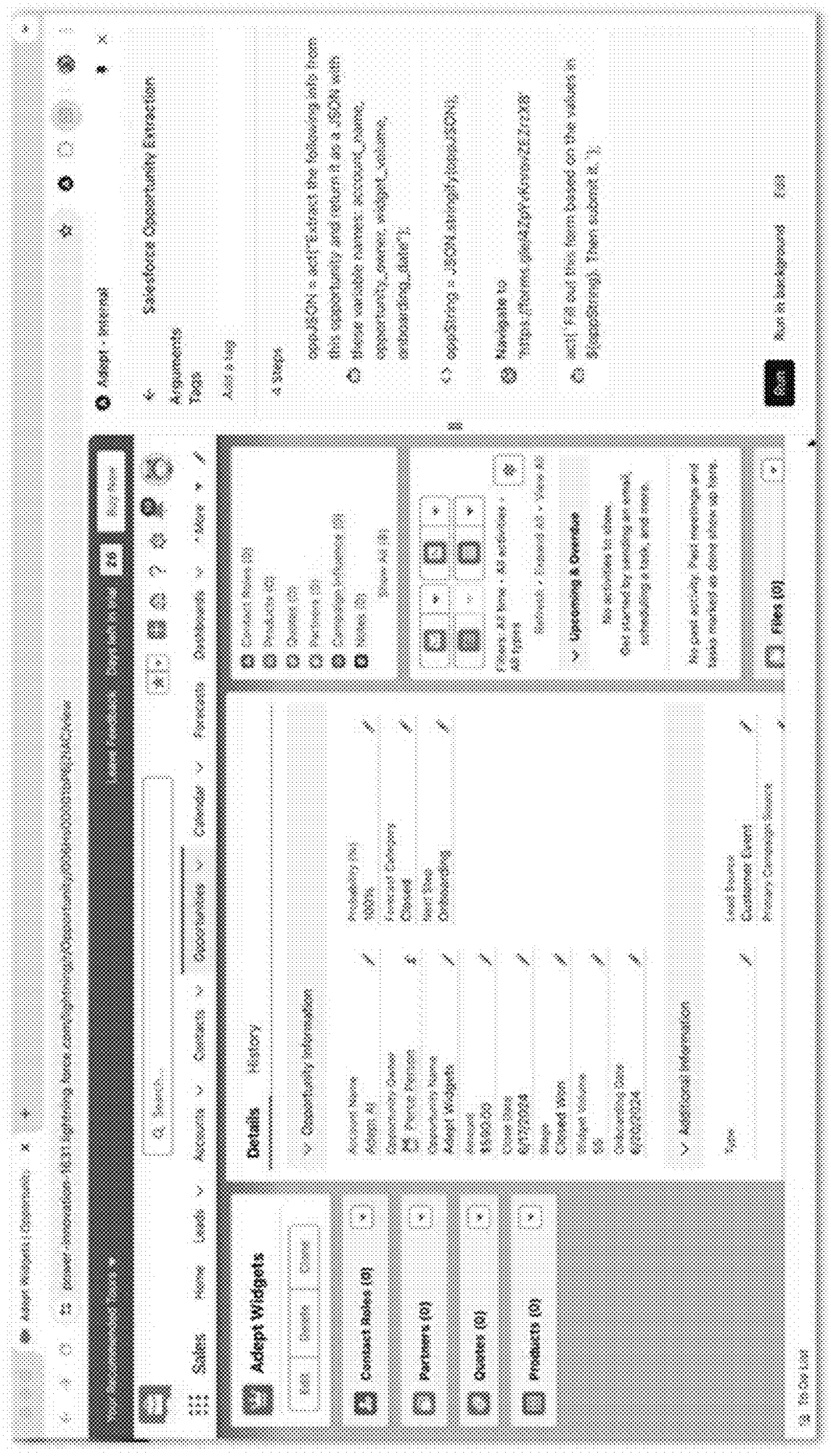
FIG. 16 is a pictorial illustration of transforming user intent into system actions.

FIG. 16 is a pictorial illustration showing one example of translating user intent into actions. As shown in FIG. 16, the systems and methods disclosed herein provide for extracting information from a first information source (e.g., website), processing the extracted information, navigating to another information source (e.g., a different website), and interacting with the other information source, such as by filling out a form (e.g., filling out the form of the other website with information extracted from the first website). FIG. 16 illustrates an example of generating an end-to-end work flow that includes one or more actions. Though not shown in FIG. 16, a user has provided a prompt (e.g., "Provide me with a sales opportunity form"). The systems and methods disclosed herein provide for translating the user intent (represented by the prompt) into one or more actions. As shown, a first action, of the one or more actions, comprises an extraction action in which the disclosed systems and methods extract information relative to a sales opportunity (e.g., Account Name (account_name), Opportunity Owner (opportunity_owner), Widget Volume (widget_volume), and Onboarding Date (onboarding_date) from an opportunity webpage and to return the information as a JavaScript Object Notation (JSON). A second action, of the one or more actions, comprises a data processing action in which the disclosed systems and methods convert the JOSN into a string (using the stringify method). A third action, of the one or more actions, comprises a navigate action in which the systems and methods navigate to a URL corresponding to a fillable form (opportunity form). A fourth action, of the one or more actions, comprises a fill (or fill form) action in which the disclosed systems and methods interact with the UI to fill out the fillable form with information (or values) in the string and then submit the form.

Figure 17:
FIG. 17 is a pictorial illustration of the disclosed systems and methods undertaking a multimodal benchmark.

FIG. 17 is pictorial illustration of the disclosed systems and methods undertaking a multimodal benchmark that assesses multimodal large language models (MLLMs), such as those of the disclosed systems and methods, on human-curated task (e.g., web tasks). As shown in FIG. 17, the disclosed systems and methods are disclosed with a plurality of prompts, each prompt corresponding to a different task. In the illustrated example, there are 7 different tasks. In the testing phase, the disclosed systems and methods are tested on 139 different websites (though only one is shown in FIG. 17). As illustrated, the disclosed systems and methods are asked to perform element grounding, element optical character recognition (OCR), heading OCR, captioning, WebQA (or VQA on a website), action grounding, and action prediction. As a result of the undertaking of the multimodal benchmark, the disclosed systems and methods are given a reliability score, as will be shown in FIG. 17.

Figure 18:
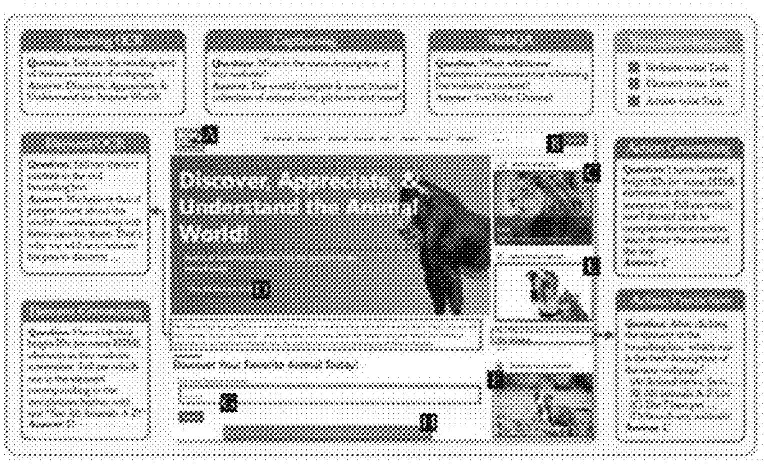
FIG. 18 is a pictorial illustration of reliability scores as a result of undertaking the multimodal benchmark of FIG. 17.

FIG. 18 is a pictorial illustration showing reliability scores as a result of undertaking the multimodal benchmark illustrated in FIG. 17. As can be seen, the disclosed systems and methods, received a 75.09 in Action Prediction, a 95.16 in Element Grounding, a 89.75 in Element OCR, a 71.84 in Action Grounding, a 24 in Captioning, a 78.83 in WebQA (or VQA on a website), a 66.11 in Heading OCR, resulting in an overall average of 71.5.

FIG. 19 is a pictorial illustration showing reliability scores for different example embodiments of the systems and methods disclosed herein as a result of undertaking different benchmarks. As illustrated each embodiment undertakes 5 different benchmarks (Web Locates, Web VQA, E2E Agent Evals, MMLU, and MMMU) and receives a corresponding reliability score (Evaluation performance %).

FIG. 20 is a pictorial illustration showing example actions that can be performed by the disclosed systems and methods. As shown in FIG. 20, the disclosed systems and methods can perform a location action in which the disclosed systems and methods can locate coordinates of elements and/or text description on a UI. As further shown in FIG. 20, the disclosed systems and methods can answer questions about UIs and documents, for example, answer the question "What is the data mentioned at the top right corner of the page?"

FIGS. 21-30 are pictorial illustrations showing of the disclosed systems and methods generating and executing an end-to-end work flow. The example shown in FIGS. 21-30 shows the disclosed systems and methods performing event planning (Happy Hour event planning). As shown in the example of FIGS. 21-30. the disclosed systems and methods operate as a browser extension that includes a dialogue feed (chat feed) that includes a prompt input bar and an enter bar.

Figure 21:
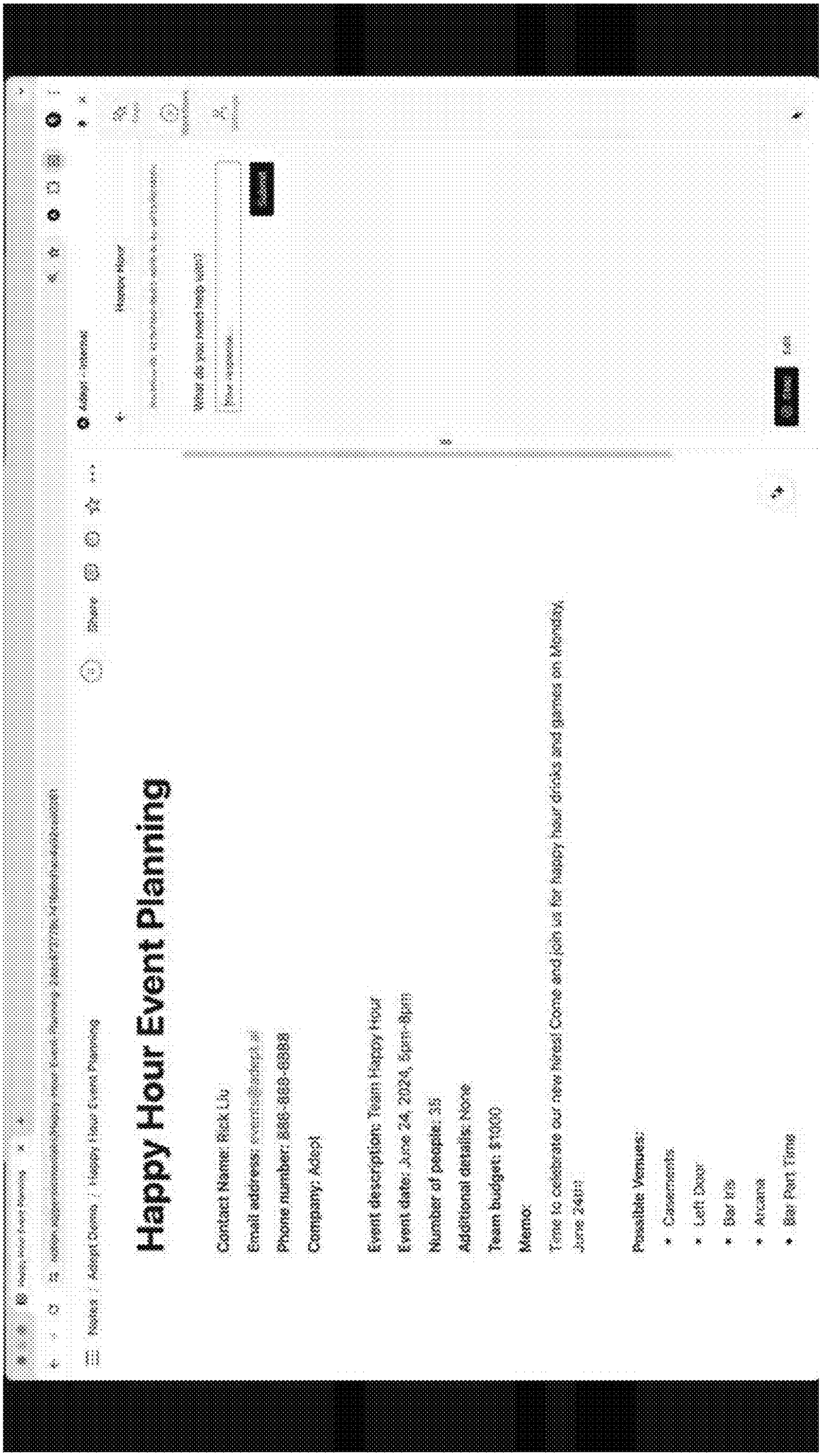
FIGS. 21, 22, 23, 24, 25, 26, 27, 28, 29, and 30 are pictorial illustrations showing some showing one example of the disclosed systems and methods in planning and executing an end-to-end work flow.
Figure 22:
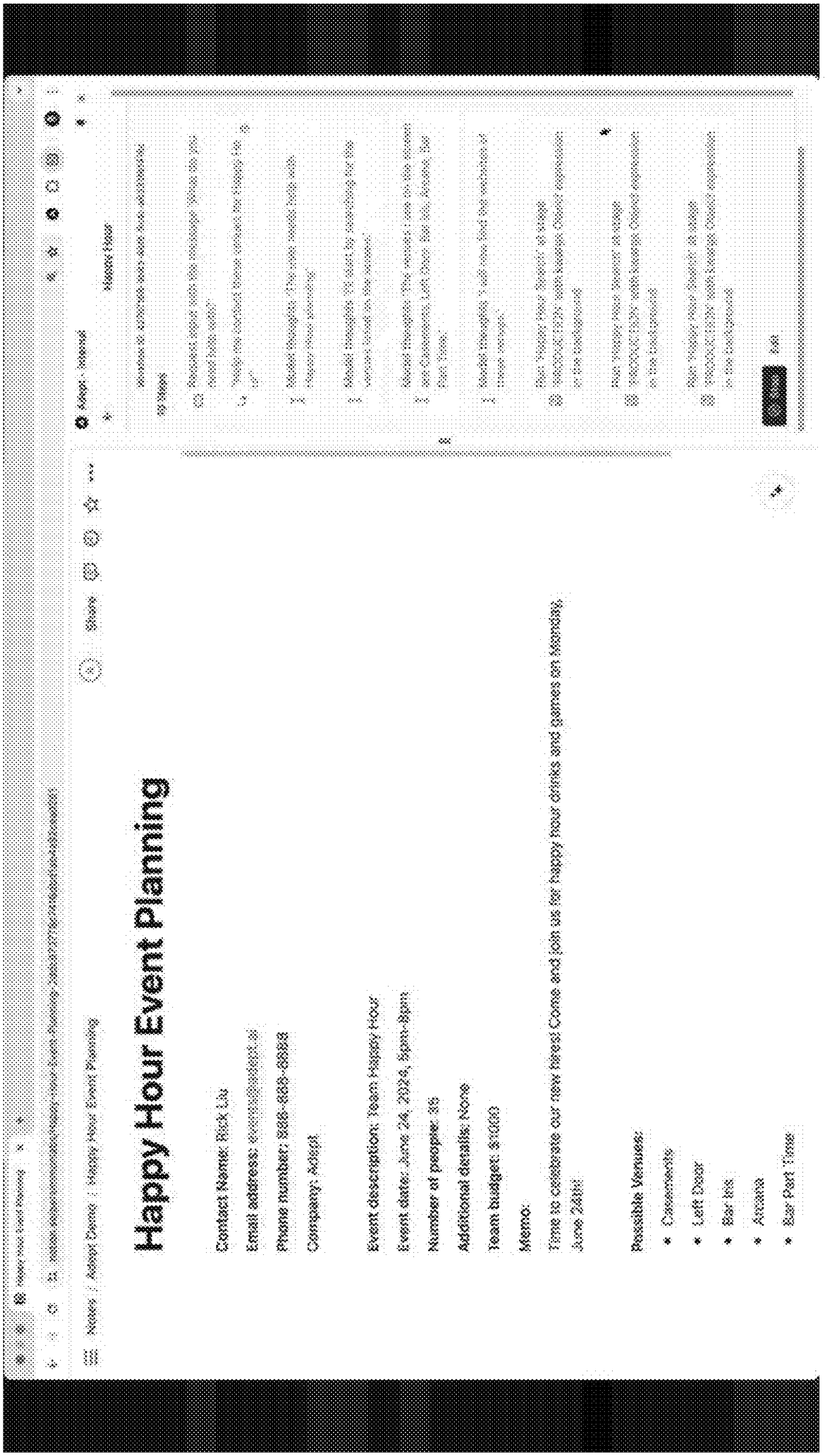
Figure 23:
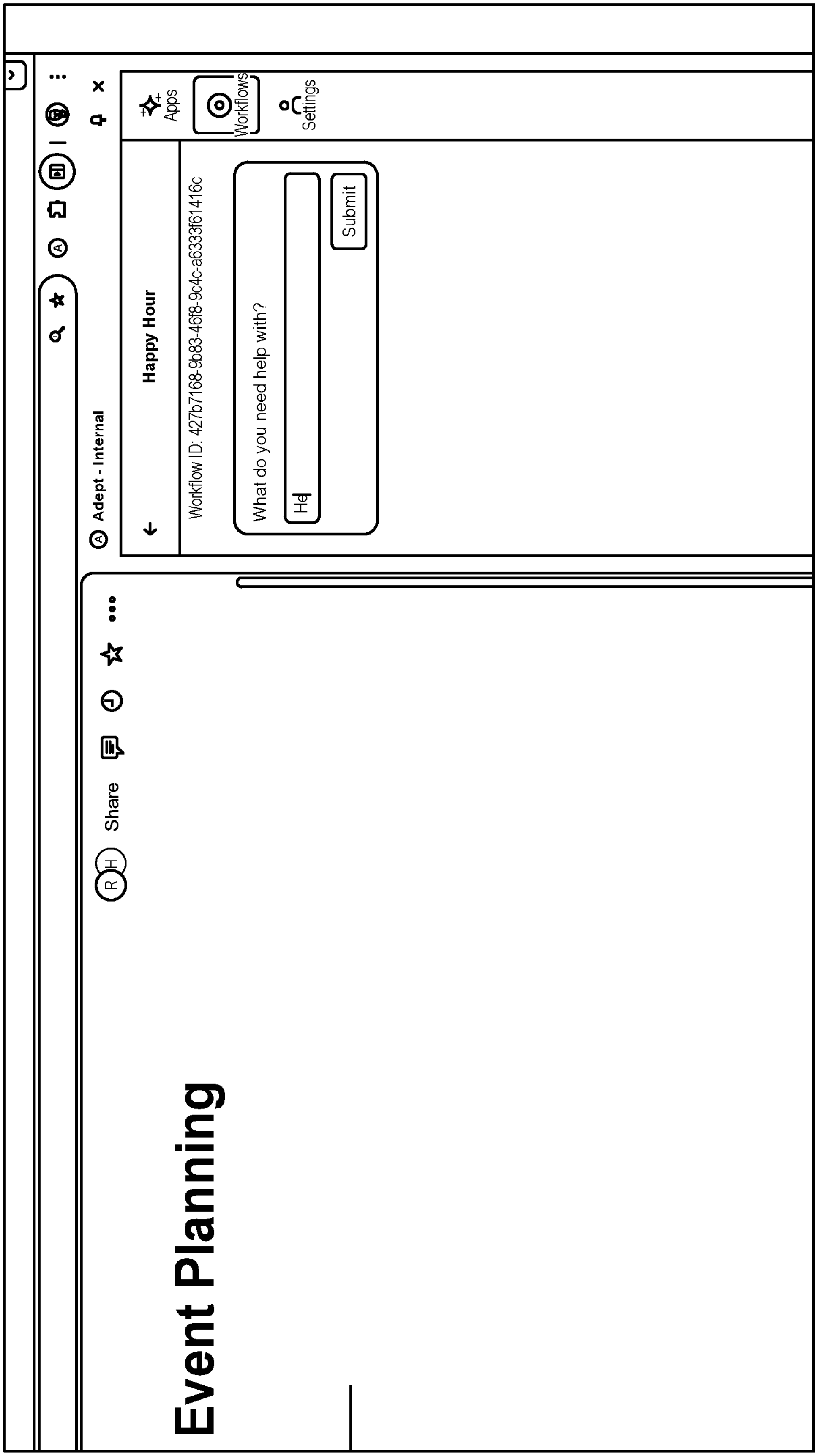
Figure 24:
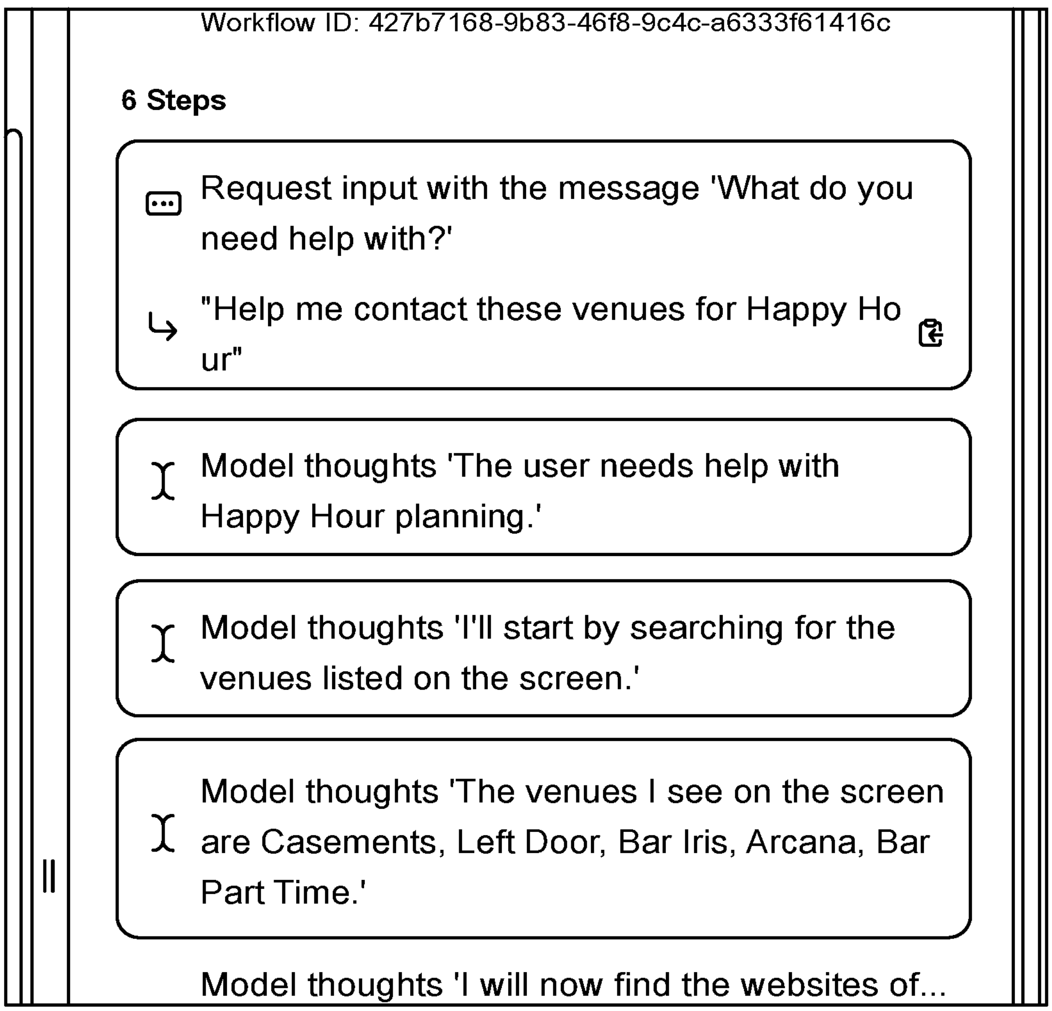

As shown in FIG. 21, the browser screen is open to a document (or page) that includes various information corresponding to a Happy Hour event. The browser extension includes a prompt ("What can I help you with?") that prompts a user to provide a prompt into the prompt input bar. As shown in FIG. 23, a user has begin interacting with the prompt input bar to provide a prompt. As shown in FIGS. 22 and 24, the user has provided the prompt "Help me contact these venues for Happy Hour." In response, the disclosed systems and methods begin planning and executing an end-to-end work flow. As illustrated, the disclosed systems and methods infer the user's intent ("The user needs helps with Happy Hour planning") corresponding to the user's prompt. The disclosed systems and methods then plan the work flow ("I'll start by searching for the venues listed on the screen" which results in the action of extracting information from the UI ("The venues I see on the screen are Casements, Left Door, Bar Iris, Arcana, Part Time."). The disclosed systems and methods then plan the work flow ("I will now find the websites of these venues.") which results in the actions of navigating to the website for each of the identified venues (i.e., multiple iterations of "Run 'Happy Hour Search' at stage 'PRODUCTION' with kwargs Object expression in the background").

Figure 25:
Figure 26:
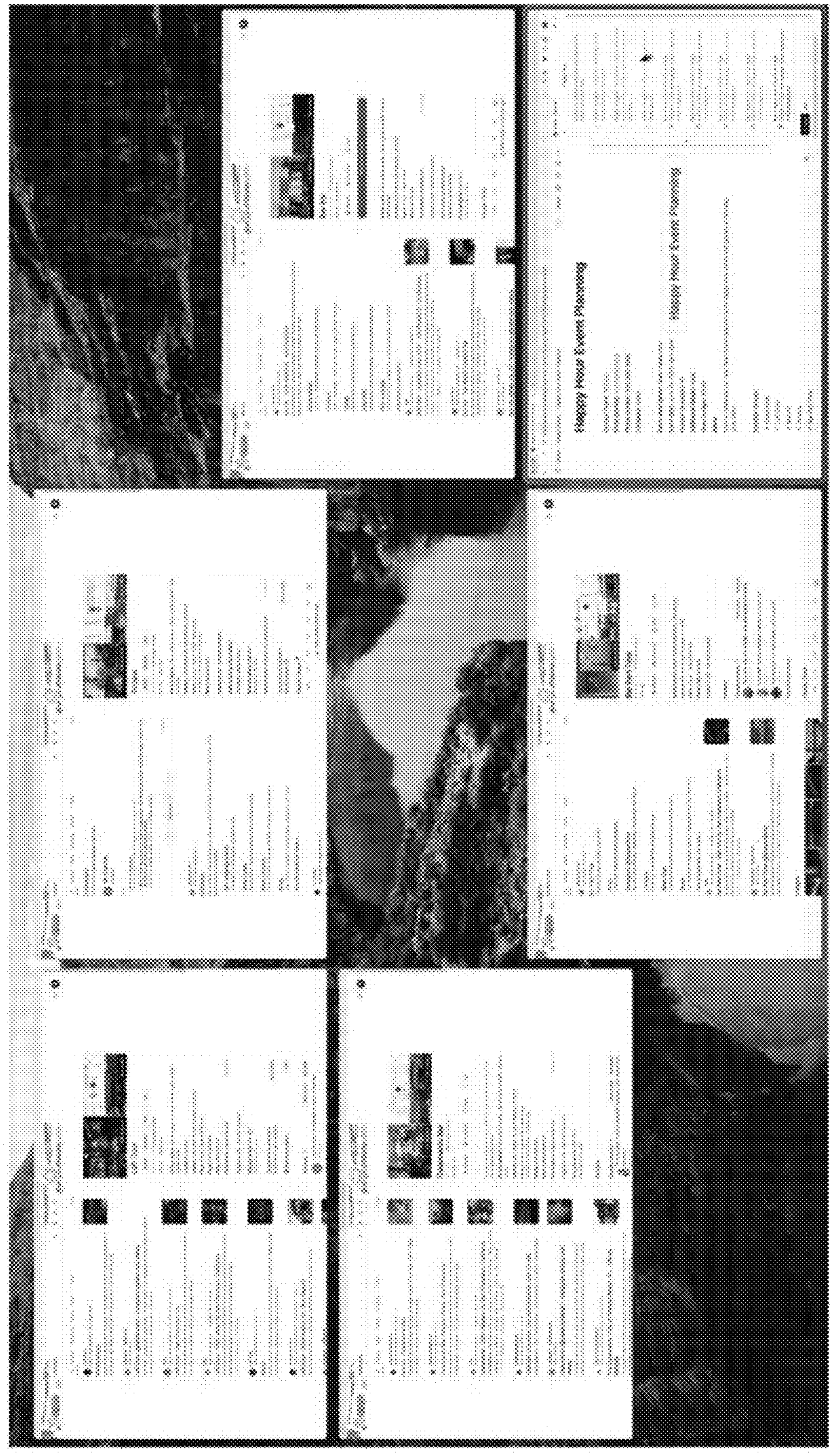
Figure 27:

As shown in FIGS. 25, 26, and 27, the disclosed systems and methods provide for simultaneously operating multiple browser windows, including one corresponding to each identified venue to navigate to the corresponding website for each venue.

Figure 28:

As shown in FIG. 28, the disclosed systems and methods provide for interacting with the UI of the website corresponding to a venue and for planning and executing an end-to-end work flow. As shown, the disclosed systems and methods execute a locate and interaction actions ("Click 'search bar' with the bounding box '<box>392,340,407,712,</box>'"). Further, the disclosed systems and methods execute a type action ("Type 'Left Door'"). The disclosed systems and methods further evaluate past actions ("'My last action was to search for 'Left Door' on Google. The current screen shot shows the search results, indicating that the action was successful.'") and responsively plan further action ("'The next step is to click on the appropriate search result to visit the website for the venue called Left Door.'"). As shown, this results in locate and interaction actions ("Click 'Left door website link' with the bounding box '<box>172,120,188,348,</box>'"). As shown, the disclosed systems and methods further evaluate past actions ("'My last action was clicking on the Left Door website link. The current screenshot shows the Left Door website's reservation page, indicating that the action was successful.'") and responsively plan further action ("'The next step is to navigate to the Events section to fill out an events inquiry form.'"). As shown, this results in locate and interaction actions ("Click 'Events' with the bounding box '<box>42,834,64,888,</box>'").

Figure 29:

As shown in FIG. 29, the disclosed systems and methods plan and generate an end-to-end work flow including filling out an events inquiry form corresponding to an identified venue. As shown, the disclosed systems and methods provide execute an interaction action ("Type '5:00 PM'"). As shown, the disclosed systems and methods further evaluate past actions ("'My last action was to fill out the Start Time field with '5:00 PM'.'") and responsively plan further action ("'Now I need to fill out the End Time field with '8:00 PM'.'") which results in location and interaction actions ("Click 'End Time field' with the bounding box '<box>600,148,632,260,</box>'"). Further, the disclosed systems and methods execute a type action ("Type '8:00 PM'.'"). As shown, the disclosed systems and methods further evaluate past actions ("'My last action was to fill out the End Time field with '8:00 PM'.'") and responsively plan further action ("'Now I need to fill out the Number of People field with '35'.'") which results which results in location and interaction actions ("Click 'Number of People field' with the bounding box '<box>672,24,704,264,</box>'"). As shown, the disclosed systems and methods provide execute an interaction action ("Type '35'"). As shown, the disclosed systems and methods further evaluate the UI for remaining tasks ("'I see a field for additional information.'") and for planning and executing additional actions ("'I will summarize the event details according to the user's past sample message.'").

Figure 30:

As shown in FIG. 30, the disclosed systems and methods further provide for surfacing a verification (or feedback)

interface with elements prompting user response ("Does this look good to you?") and elements providing for user response ("Yes" and "No" buttons). Further, as can be seen in at least FIG. 30, the extension interface provides a user interactable interface element ("Stop" button) that allows a user to stop the end-to-end workflow generation and execution. Further, the extension interface provides a user interactable interface element ("Edit" button) that allows a user to edit the end-to-end workflow.

System Architecture

Figure 31:
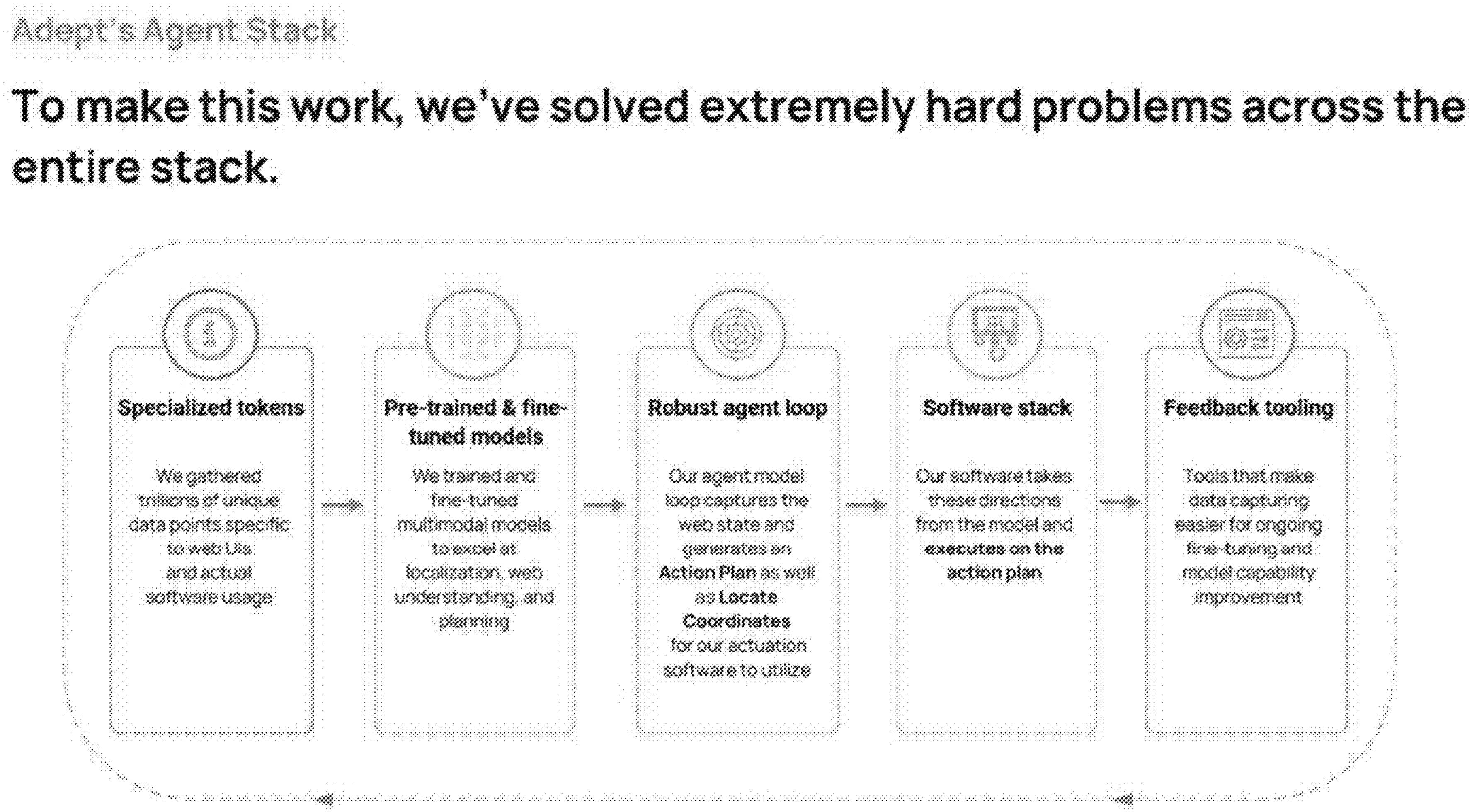
FIG. 31 is a pictorial illustration showing an agent stack of the disclosed systems and methods.

FIG. 31 is a pictorial illustration illustrating an agent stack of the disclosed systems and methods. As shown, the agent stack includes: data with specialized tokens that comprises trillions of unique data points specific to web UIs and actual software usage; pre-trained and fine-tuned models (multimodal models) that excel at localization, web understanding, and planning; an agent model loop hat captures the web state and generates an Action Plan (e.g., end-to-end work flow) as well as Locate Coordinates utilization by actuation software; actuation software that utilizes the directions from the model(s) (Action Plan (e.g., end-to-end work flow) and executes on the directions; and feedback tools that provide for easier data capture for ongoing fine-tuning and model capability improvement. An Action Plan (e.g., end-to-end workflow) can also be referred to as actuation commands and can be expressed in DSL.

Figure 32:
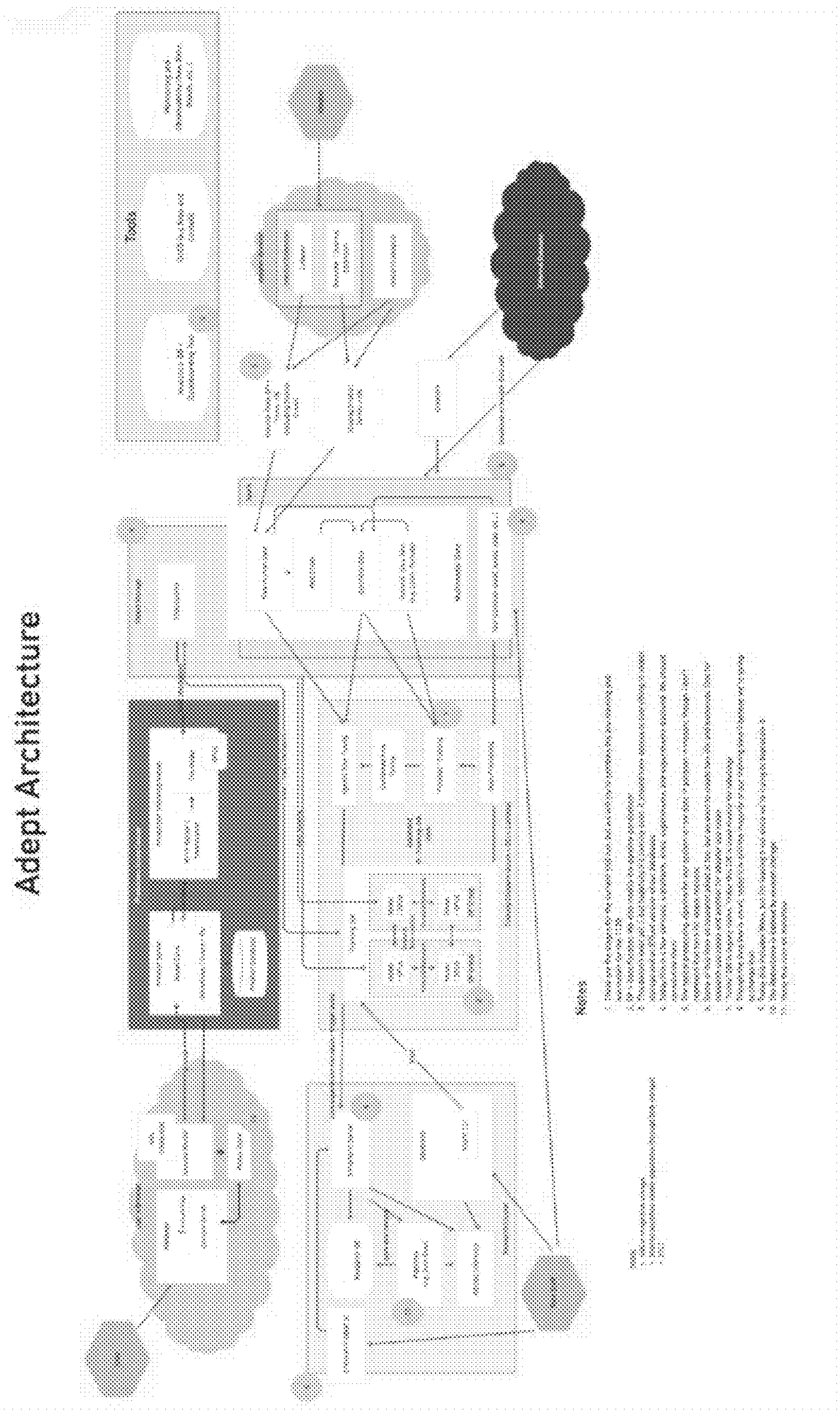
FIG. 32 is a pictorial illustration showing an example system architecture corresponding to the disclosed systems and methods.

FIG. 32 is a pictorial illustration showing an example system architecture corresponding to the disclosed systems and methods.

Figure 149:
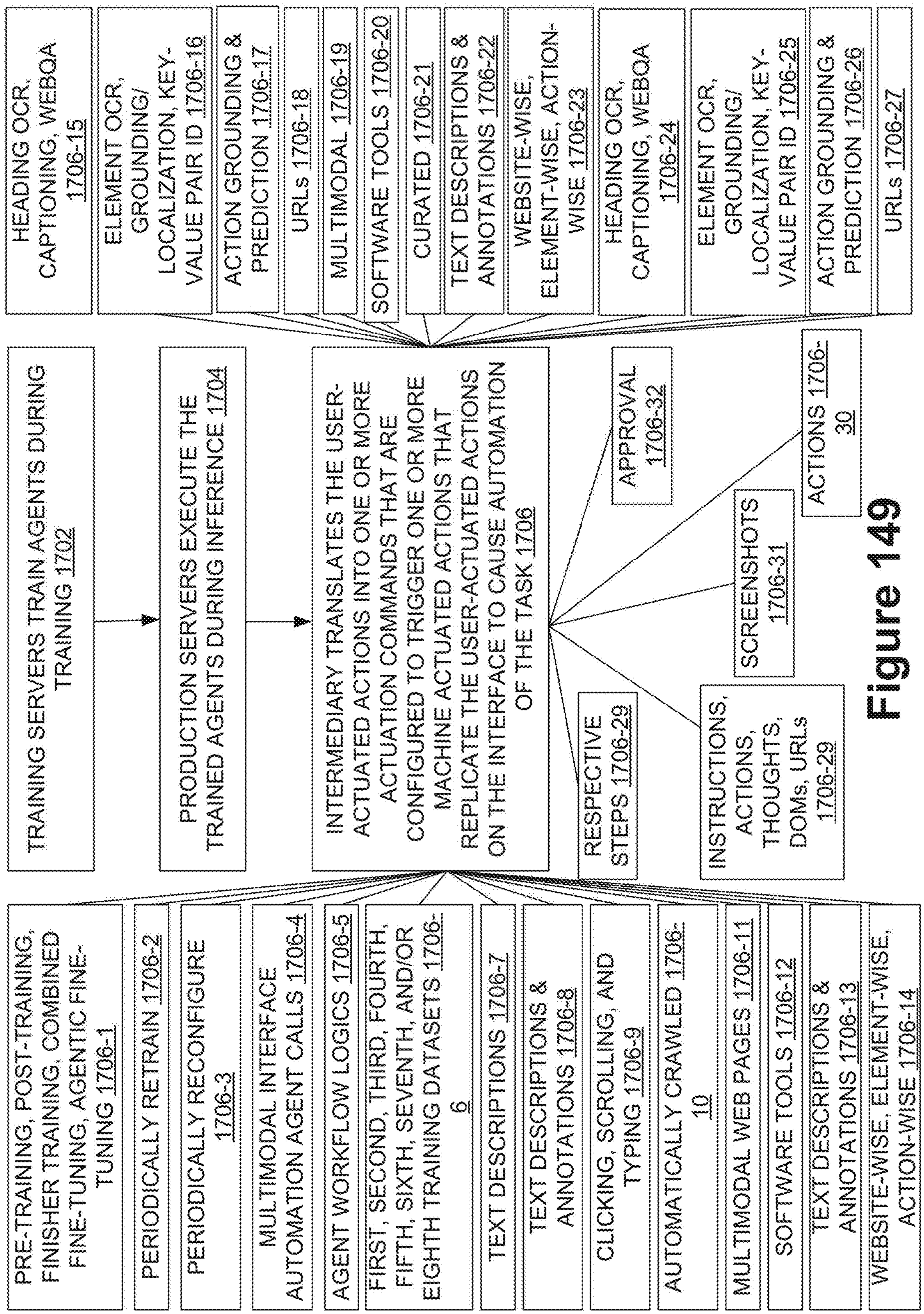

FIG. 149 shows a flow diagram illustrating one example method of operation of the systems disclosed herein. The method shown in FIG. 149 comprises a method for providing artificial intelligence agents that automate software usage.

At block 1702, training servers train agents during training.

At block 1704, production servers execute the trained agents during inference.

At block 1706, data flow logic provides, during the training, the agents and a plurality of training datasets to the training servers to cause the training servers to train the agents on the plurality of training datasets and thereby produce the trained agents; configure the production servers with the trained agents for use during inference; provide, during the inference, prompts issues by clients to the production servers to translate the prompts into agent calls to the trained agents that in turn cause the trained agents to generate outputs that are responsive to the prompts; and make the outputs available to the client.

As indicated by block 1706-1, in some examples, the data flow logic uses some training datasets in the plurality of training datasets for pre-training the agents, for post-training the agents, for finisher training the agents, for combined fine-tuning of the agents, and for agentic fine-tuning of the agents. As indicated by block 1706-2, in some examples, the data flow logic causes the training servers to periodically retrain the trained agents. As indicated by block 1706-3, in some examples, the data flow logic periodically reconfigures the production servers with the retrained agents.

As indicated by block 1706-4, in some examples, the agent calls are multimodal interface automation agent calls. As indicated by block 1706-5, the data flow logic periodically configures the clients with agent workflow logics that construct, based on the prompts, agent specifications that are configured to issue the multimodal interface automation agent calls to the trained agents.

As indicated by block 1706-6, in some examples, the plurality of training datasets includes a first training dataset including documents containing text interleaved with images, a second training dataset including text embedded in images, a third training dataset including recorded videos of software usage, a fourth training dataset including portable document format (PDF) documents, a fifth training dataset including recorded videos of software tool usage trajectories, a sixth training dataset including images of open-domain web pages, a seventh training dataset including images of specific-domain web pages, and/or an eighth training dataset including images of agentic trajectories of the agent performing interface automation task workflows. As indicated by block 1706-7, in some examples, images in the recorded videos of software tool usage trajectories are interleaved with text descriptions of tasks executed in the recorded videos through the software tool usage trajectories. As indicated by block 1706-8, in some examples, the images in the recorded videos of software tool usage trajectories are further interleaved with text descriptions of actions executed on the images and image annotations resulting from execution of the actions. As indicated by block 1706-9, in some examples, the actions include, but are not limited to, clicking, scrolling, and typing. As indicated by block 1706-10, in some examples, the images of open-domain web pages are automatically crawled. As indicated by block 1706-11, the open-domain web pages are multimodal web pages. As indicated by block 1706-12, in some examples, the open-domain web pages are part of software tools. As indicated by block 1706-13, in some examples, the images of open-domain web pages are interleaved with text descriptions of synthetic tasks and image annotations resulting from execution of the synthetic tasks. As indicated by block 1706-14, in some examples, the synthetic tasks include website-wise tasks, element-wise tasks, and action-wise tasks. As indicated by block 1706-15, in some examples, the website-wise tasks include heading optical character recognition (OCR), captioning, and web question answering (WebQA). As indicated by block 1706-16, in some examples, the element-wise tasks include element optical character recognition (OCR), element grounding/localization, and key-value pair identification. As indicated by block 1706-17, in some examples, the action-wise tasks include action grounding and action prediction.

As indicated by block 1706-18, in some examples, the images of open-domain web pages are further interleaved with unified resource locators (URLs) of the open-domain web pages. As indicated by block 1706-19, in some examples, the specific-domain web pages are multimodal web pages. As indicated by block 1706-20, in some examples, the specific-domain web pages are part of software tools. As indicated by block 1706-21, in some examples, the images of specific-domain web pages are curated at complex states of the software tools. As indicated by block 1706-22, in some examples, the images of specific-domain web pages are interleaved with text descriptions of synthetic tasks and image annotations resulting from execution of the synthetic tasks. As indicated by block 1706-23, in some examples, the synthetic tasks include website-wise tasks, element-wise tasks, and action-wise tasks. As indicated by block 1706-24, in some examples, the website-wise tasks include heading optical character recognition (OCR), captioning, and web question answering (WebQA). As indicated by block 1706-25, in some examples, the element-wise tasks include element optical character recognition (OCR), element grounding/localization, and key-value pair identification. As indicated by block 1706-26, in some examples, the action-wise tasks include action grounding and action prediction.

As indicated by block 1706-27, in some examples, the images of specific-domain web pages are further interleaved with unified resource locators (URLs) of the specific-domain web pages. As indicated by block 1706-28, in some examples, the images of agentic trajectories of the agent performing interface automation task workflows are interleaved with agent instructions, agent actions, agent thoughts, interface document object models (DOMs), and interface unified resource locators (URLs). As indicated by block 1706-29, in some examples, the images of agentic trajectories of the agent performing interface automation task workflows are organized as respective training examples that correspond to respective steps in the interface automation task workflows. As indicated by block 1706-30, in some examples, the agent actions include current and previous actions. As indicated by block 1706-31, in some examples, the images of agentic trajectories of the agent performing interface automation task workflows include current and previous interface screenshots. As indicated by block 1706-32, in some examples, the images of agentic trajectories of the agent performing interface automation task workflows are selected based on approval from a human oracle on how well the agent performed the interface automation task workflows.

FIG. 158 is a block diagram showing an example system 2400 corresponding to the disclosed systems and methods. The system 2400, in one example, can be used to perform the method described in FIG. 149. The system 2400 is operable to provide artificial intelligence agents that automate software usage. As shown, system 2400 includes training servers 2402, production servers 2404, training datasets 2406, data flow logic 2408, workflow logics 2410, agent specifications 2412, agents 2414, trained agents 2416, outputs 2418, prompts 2420, clients 2422, agent calls 2424, retrained agents 2480, and can include other items and functionality 2499.

Training servers 2402 are configured to train agents 2414 during training to provide trained agents 2416.

Production servers 2404 are configured to execute the trained agents 2416 during inference.

Training datasets 2406 can include a plurality of training datasets, such as a first training dataset 2460, a second training dataset 2461, a third training dataset 2462, a fourth training dataset 2463, a fifth training dataset 2464, a sixth training dataset 2465, a seventh training dataset 2466, and/or an eighth training dataset 2467. Training datasets 2406 can, additionally or alternatively, include other training datasets 2468.

In one example, the first training dataset 2460 includes documents containing text interleaved with images.

In one example, the second training dataset 2461 includes text embedded in images.

In one example, the third training dataset 2462 includes recorded videos of software usage.

In one example, the fourth training dataset 2463 includes portable document format (PDF) documents.

In one example, the fifth training dataset 2464 includes recorded videos of software tool usage trajectories. In one example, images in the recorded videos of software tool usage trajectories are interleaved with text descriptions of tasks executed in the recorded videos through the software tool usage trajectories. In one example, the images in the recorded videos of software tool usage trajectories are further interleaved with text descriptions of actions executed on the images and image annotations resulting from execution of the actions. In one example, the actions include clicking, scrolling, and typing.

In one example, the sixth training dataset 2465 includes images of open-domain web pages. In one example, the images of open-domain web pages are automatically crawled. In one example, the open-domain web pages are multimodal web pages. In one example, the open-domain web pages are part of software tools. In one example, the images of open-domain web pages are interleaved with text descriptions of synthetic tasks and image annotations resulting from execution of the synthetic tasks. In one example, the synthetic tasks include website-wise tasks, element-wise tasks, and action-wise tasks. In one example, the website-wise tasks include heading optical character recognition (OCR), captioning, and web question answering (WebQA). In one example, the element-wise tasks include element optical character recognition (OCR), element grounding/localization, and key-value pair identification. In one example, the action-wise tasks include action grounding and action prediction. the images of open-domain web pages are further interleaved with unified resource locators (URLs) of the open-domain web pages.

In one example, the seventh training dataset 2466 includes images of specific-domain web pages. In one example, the specific-domain web pages are multimodal web pages. In one example, the specific-domain web pages are part of software tools. In one example, the images of specific-domain web pages are curated at complex states of the software tools. In one example, the images of specific-domain web pages are interleaved with text descriptions of synthetic tasks and image annotations resulting from execution of the synthetic tasks. In one example, the synthetic tasks include website-wise tasks, element-wise tasks, and action-wise tasks. In one example, the website-wise tasks include heading optical character recognition (OCR), captioning, and web question answering (WebQA). In one example, the element-wise tasks include element optical character recognition (OCR), element grounding/localization, and key-value pair identification. In one example, the action-wise tasks include action grounding and action prediction. In one example, the images of specific-domain web pages are further interleaved with unified resource locators (URLs) of the specific-domain web pages.

In one example, the eighth training dataset 2467 includes images of agentic trajectories of the agent 2414 performing interface automation task workflows. In one example, the images of agentic trajectories of the agent 2414 performing interface automation task workflows are interleaved with agent instructions, agent actions, agent thoughts, interface document object models (DOMs), and interface unified resource locators (URLs). In one example, the images of agentic trajectories of the agent 2414 performing interface automation task workflows are organized as respective training examples that correspond to respective steps in the interface automation task workflows. In one example, the agent actions include current and previous actions. In one example, the images of agentic trajectories of the agent 2414 performing interface automation task workflows include current and previous interface screenshots. In one example, the images of agentic trajectories of the agent 2414 performing interface automation task workflows are selected based on approval from a human oracle on how well the agent 2414 performed the interface automation task workflows.

Data flow logic 2408 is configured to, during the training, provide the agents 2414 and the training datasets 2406 to the training servers 2402 to train the agents 2414 on the training datasets 2406 to thereby produce the trained agents 2416. Data flow logic 2408 is further configured to configure the production servers 2404 with the trained agents 2416 for use during the inference. Data flow logic 2408 is further configured to, during the inference, provide prompts 2420 issued by clients 2422 to the production servers 2404 to cause the production servers 2404 to translate the prompts 2420 into agent calls 2424 to the trained agents 2416 that in turn cause the trained agents to generate outputs 2418 that are responsive to the prompts 2420. The data flow logic 2408 is further configured to make the outputs 2418 available to the clients 2422.

Data flow logic 2408, in some examples, is further configured to use at least some training datasets 2406 for pre-training the agents 2414, for post-training the agents 2414, for finisher training the agents 2414, for combined fine-tuning of the agents 2414, and for agentic-fine tuning of the agents 2414. Data flow logic 2408, in some examples, is further configured to cause the training servers 2402 to periodically retrain the trained agents 2416 to provide retrained agents 2480. Data flow logic 2408, in some examples, is further configured to periodically reconfigured the production servers 2404 with the retrained agents 2480.

In some examples, the agent calls 2424 are multimodal interface automation agent calls. Data flow logic 2408, in some examples, is further configured to periodically configure the clients 2422 with agent workflow logics 2410 that construct, based on the prompts 2420, agent specifications 2412 that are configured to issue the multimodal interface automation agent calls (e.g., 2424) to the trained agents 2416.

Agent Training

Figure 33:
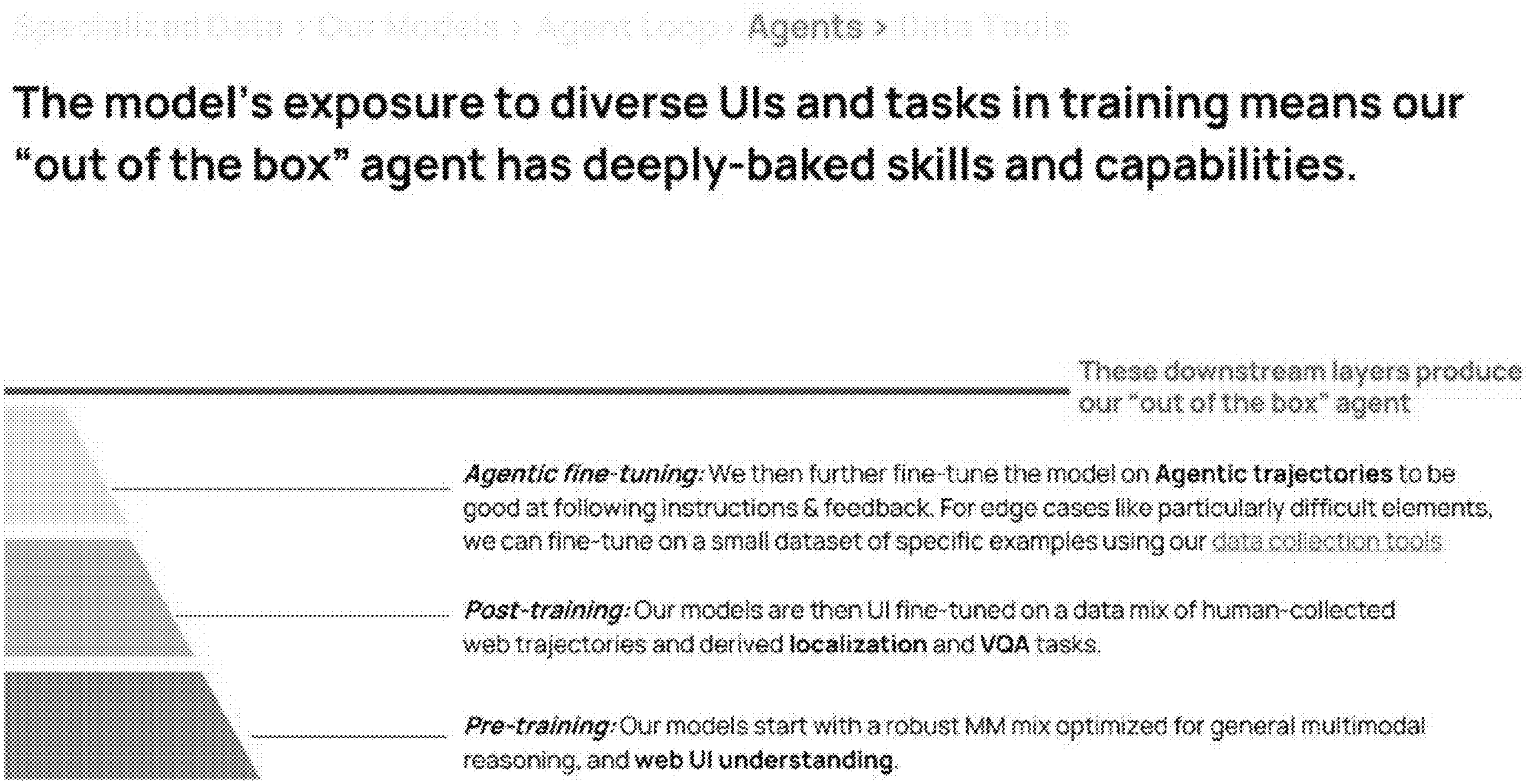
FIG. 33 is a pictorial illustration showing examples of training corresponding to the disclosed systems and methods.

FIG. 33 is a pictorial illustration showing examples of training corresponding to the disclosed systems and methods, including agentic fine-tuning, post-training, and pre-training.

Figure 34:
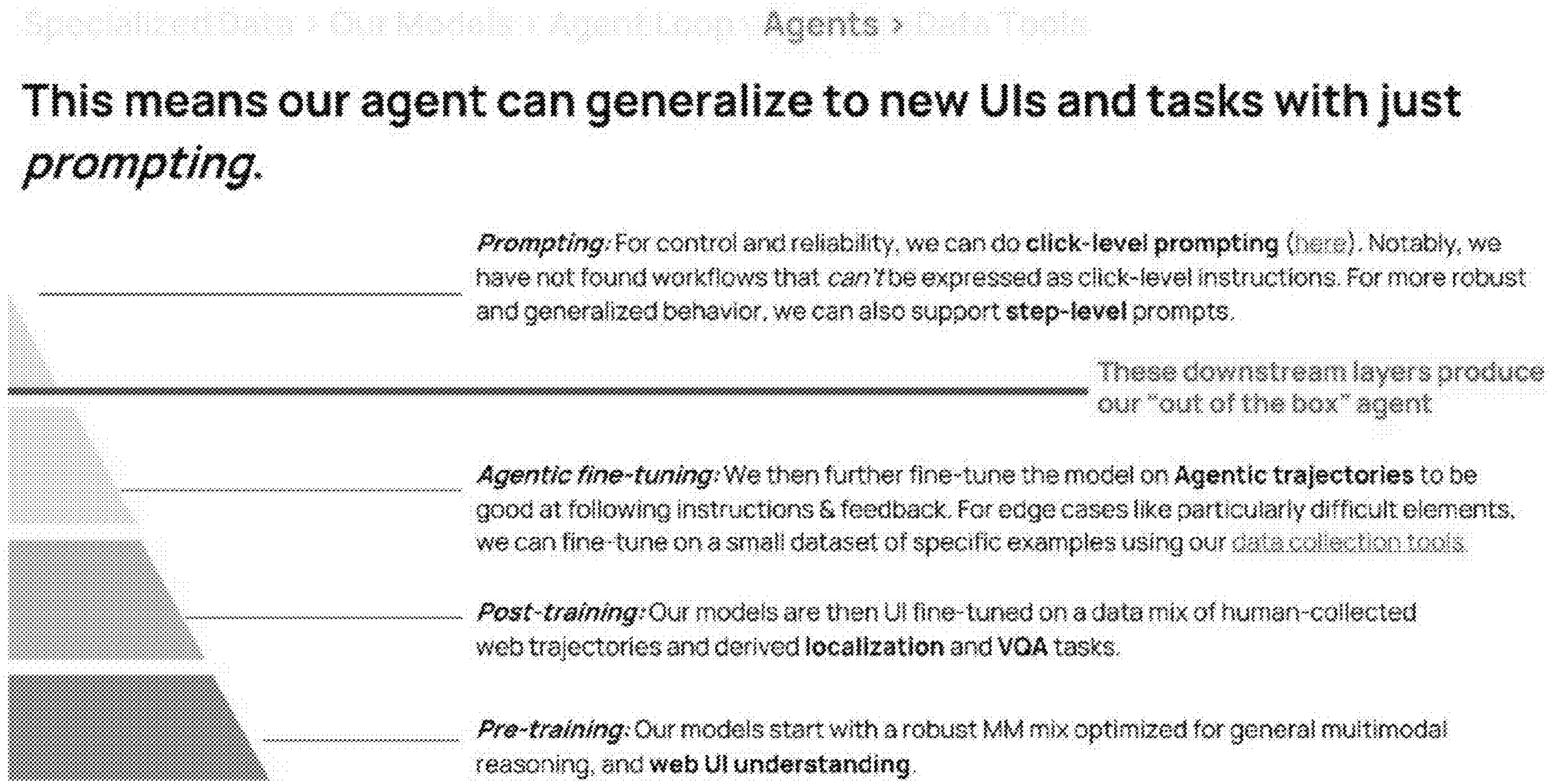
FIG. 34 is a pictorial illustration showing examples of prompting corresponding to the disclosed systems and methods.

FIG. 34 is a pictorial illustration showing examples of prompting corresponding to the trained agent (model(s)) of the disclosed systems and methods. As shown, the trained agent (model(s)) are operable to receive click-level prompting and step-level prompting.

Figure 35:
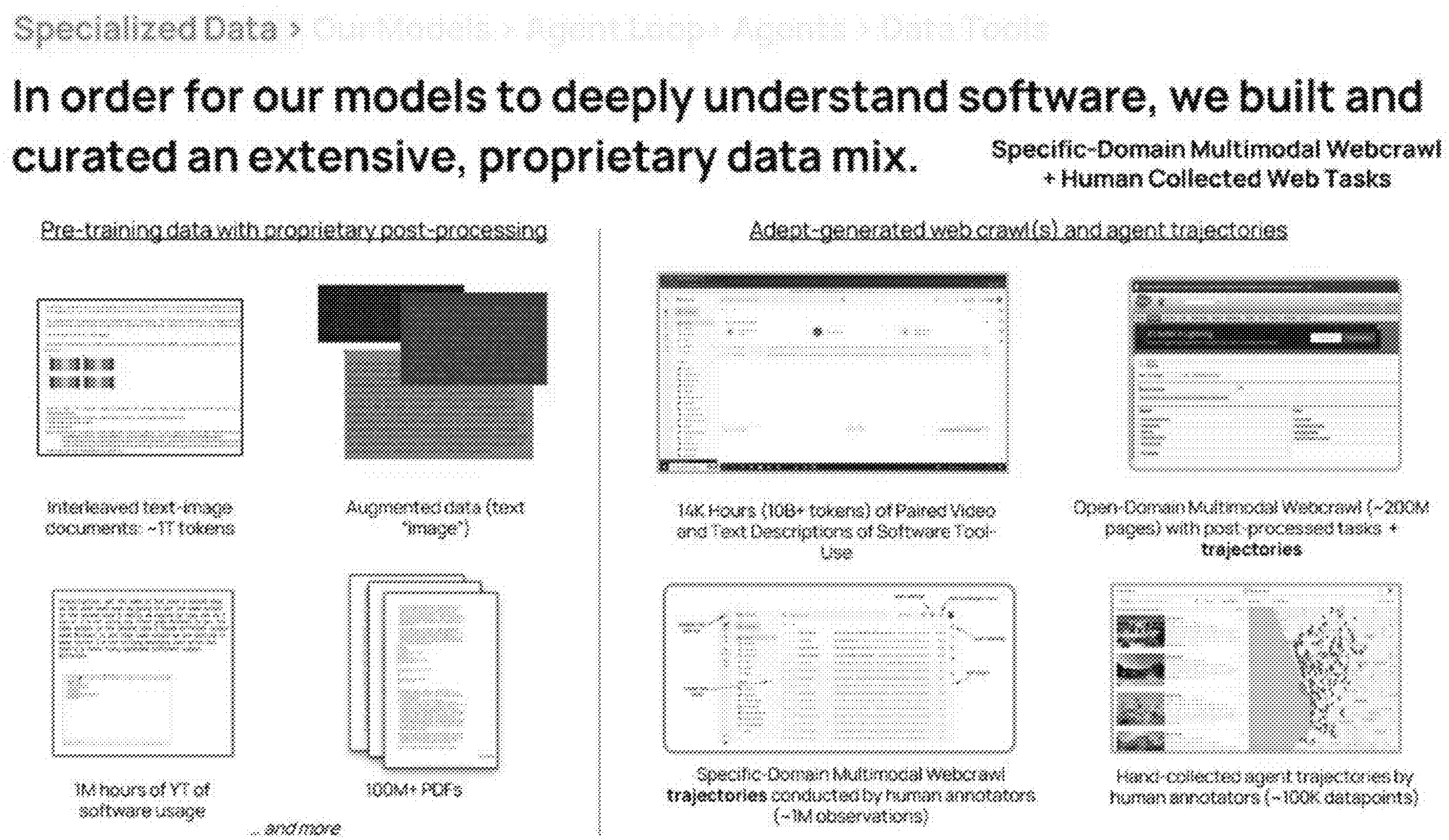
FIG. 35 is a pictorial illustration showing examples of training data corresponding to the disclosed systems and methods.

FIG. 35 is a pictorial illustration showing examples of training data corresponding to the disclosed systems and methods. As shown, training data can include interleaved text-image documents, augmented data (text embedded in images), recorded videos of software usage, PDFs, paired video and text descriptions of software tool-use (e.g., tool usage trajectories), images of open-domain web pages (e.g., multimodal web pages), images of specific-domain web pages (e.g., multimodal web pages), and recordings (e.g., images, videos) of agentic trajectories.

FIG. 36 is a pictorial illustration showing an example of training data corresponding to the disclosed systems and methods. FIG. 36 shows an example of training data comprising paired video and text of descriptions of software tool-use (e.g., tool usage trajectories).

FIG. 37 is a pictorial illustration showing an example of training data corresponding to the disclosed systems and methods. FIG. 37 shows an example of training data comprising specific-domain web pages (e.g., multimodal web pages).

FIG. 38 is a pictorial illustration showing an example of training data corresponding to the disclosed systems and methods. FIG. 38 shows an example of training data comprising recordings of agentic trajectories.

FIG. 39 is a pictorial illustration showing an example of training data corresponding to the disclosed systems and methods. FIG. 39 shows an example of training data comprising open-domain web pages (e.g., multimodal web pages).

FIG. 40 is a pictorial illustration showing an example of a labeler corresponding to the disclosed systems and methods.

FIG. 41 is a pictorial illustration showing an example of a labeler and a recorder corresponding to the disclosed systems and methods.

Figure 42:
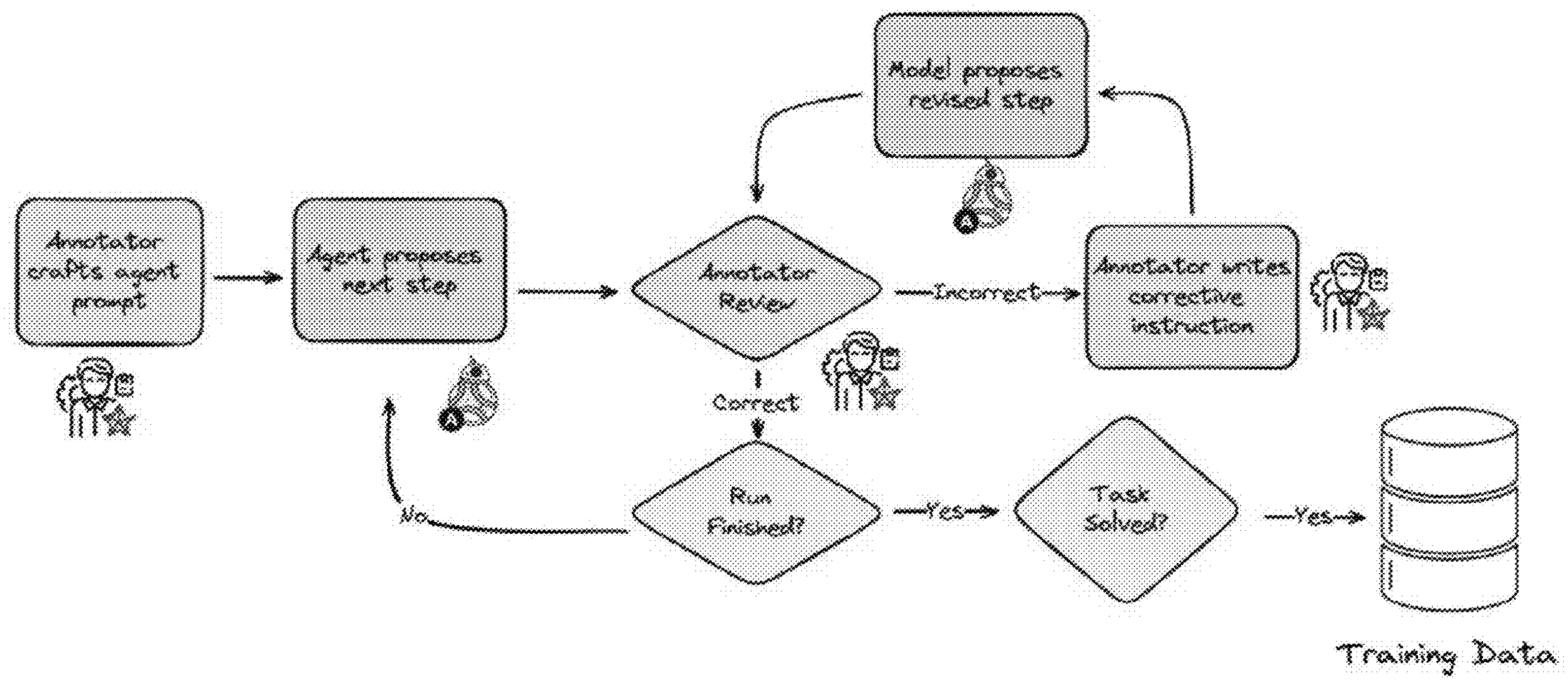
FIG. 42 is a pictorial illustration showing an example of operation of the disclosed systems and methods.

FIG. 42 is a pictorial illustration showing an example of operation of the disclosed systems and methods. As shown in FIG. 42 an annotator crafts an agent prompt and an agent (e.g., model) proposes a next step.

The annotator then reviews the proposed next step.

If the annotator determines that the proposed next step is incorrect, the annotator writes a corrective instruction. The model (e.g., agent) proposes a revised next step based on the corrective instruction and the annotator determines if the proposed revised next step is correct.

If the annotator determines that the proposed next step is correct, it is determined if the run is finished.

If the run is not finished, processing returns to the agent where the agent proposes another next step.

If the run is finished, it is determined if the task is solved. If the task is solved, the various data is stored as training data (e.g., prompt, proposed step(s), etc.).

Figure 143:
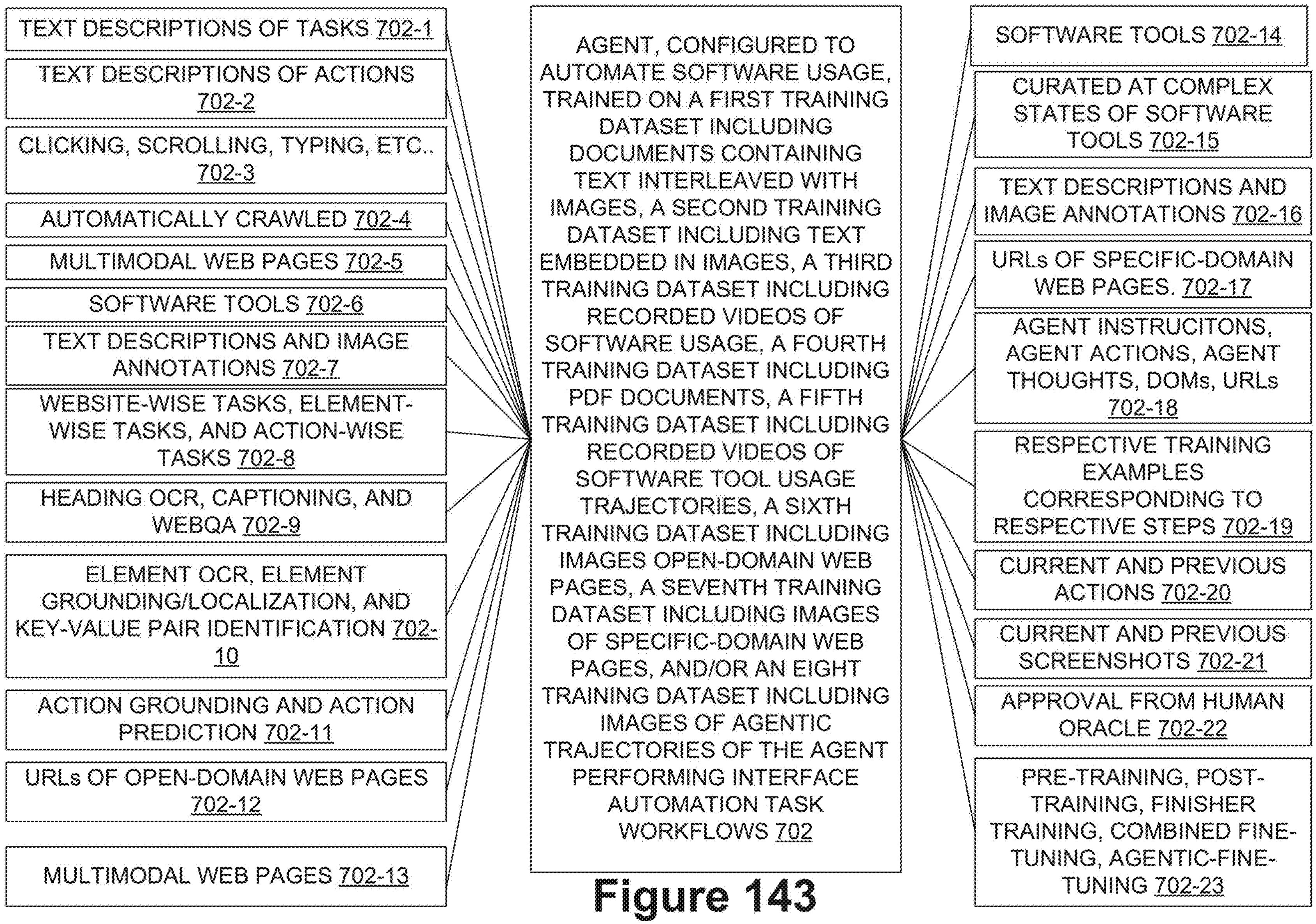
FIG. 143 shows a flow diagram illustrating one example method for automating software usage.

FIG. 143 shows a flow diagram illustrating one example method of operation of the systems disclosed herein. The method shown in FIG. 143 comprises a method for automating software usage.

At block 702, an agent, configured to automate software usage, is trained on a first training dataset including documents containing text interleaved with images, a second training dataset including text embedded in images, a third training dataset including recorded videos of software usage, a fourth training dataset including PDF documents, a fifth training dataset including recorded videos of software tool usage trajectories, a sixth training dataset including images of open-domain web pages, a seventh training dataset including images of specific-domain web pages, and/or an eight training dataset including images of agentic trajectories of the agent performing interface automation task workflows.

As indicated by block 702-1, in some examples, images in the recorded videos of software tool usage trajectories are interleaved with text descriptions of tasks executed in the recorded videos through the software tool usage trajectories. As indicated by block 702-2, in some examples, images in the recorded videos of software tool usage trajectories are further interleaved with text descriptions of actions executed on the images and image annotations resulting from execution of the actions. As indicated by block 702-3, in some examples, the actions include, but are not limited to, clicking, scrolling, and typing. As indicated by block 702-4, in some examples, the images of open-domain web pages are automatically crawled. As indicated by block 702-5, in some examples, the open-domain web pages are multimodal web pages. As indicated by block 702-6, in some examples, the open-domain web pages are part of software tools.

As indicated by block 702-7, in some examples, the open-domain web pages are interleaved with text descriptions of synthetic tasks and image annotations resulting from execution of the synthetic tasks. As indicated by block 702-8, in some examples, the synthetic tasks include website-wise tasks, element-wise tasks, and action-wise tasks.

As indicated by block 702-9, in some examples, the website-wise tasks include heading OCR, captioning, and WebQA (or VQA on website). As indicated by block 702-10, in some examples, the element-wise tasks include element OCR, element grounding/localization, and key-value pair identification. As indicated by block 702-11, in some examples, the action-wise tasks include action grounding and action prediction.

As indicated by block 702-12, in some examples, images of open-domain web pages are further interleaved with unified resource locators (URLs) of the open-domain web pages. As indicated by block 702-13, in some examples, the specific-domain web pages are multimodal web pages. As indicated by block 702-14, in some examples, the specific-domain web pages are part of software tools. As indicated by block 702-15, in some examples, the images of specific-domain web pages are curated at complex states of the software tools. As indicated by block 702-16, in some examples, the images of specific-domain web pages are interleaved with text descriptions of synthetic tasks and image annotations resulting from execution of the synthetic tasks. As indicated by block 702-17, in some examples, the images of specific-domain web pages are further interleaved with unified resource locators (URLs) of the specific-domain web pages.

As indicated by block 702-18, in some examples, the images of agentic trajectories of the agent performing interface automation task workflows are interleaved with agent instructions, agent actions, agent thoughts, interface document object models (DOMs), and interface unified resource locators (URLs). As indicated by block 702-19, in some examples, the images of agentic trajectories of the agent performing interface automation task workflows are organized as respective training examples that correspond to respective steps in the interface automation task workflows. As indicated by block 702-20, in some examples, the agent actions include current and previous actions. As indicated by block 702-21, in some examples, the images of agentic trajectories of the agent performing interface automation task workflows include current and previous interface screenshots. As indicated by block 702-22, in some examples, the images of agentic trajectories of the agent performing interface automation task workflows are selected based on approval from a human oracle on how well the agent performed the interface automation task workflows. As indicated by block 702-23, in some examples, the system is configured to use some of the first, second, third, fourth, fifth, sixth, seventh, and eights training datasets for pre-training the agent, for post-training the agent, for finisher training the agent, for combined fine-tuning of the agent, and for agentic-fine tuning of the agent.

Figure 144:
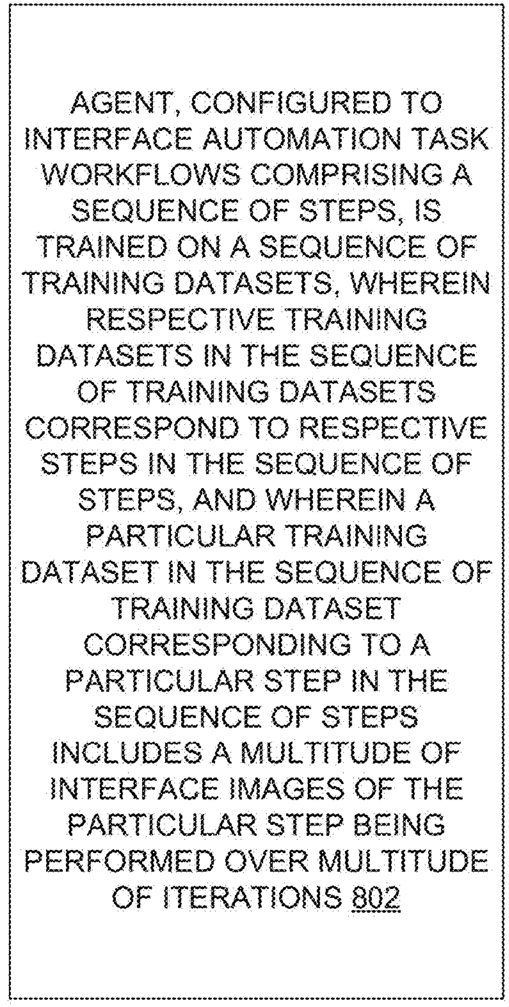
FIG. 144 shows a flow diagram illustrating one example method for automating software usage.

FIG. 144 shows a flow diagram illustrating one example method of operation of the systems disclosed herein. The method shown in FIG. 144 comprises a method for automating software usage.

At block 802, an agent, configured to interface automation task workflows comprising a sequence of steps, is trained on a sequence of training datasets, wherein respective training datasets in the sequence of training datasets correspond to respective steps in the sequence of steps, and wherein a particular training dataset in the sequence of training dataset corresponding to a particular step in the sequence of steps includes a multitude of interface images of the particular step being performed over multitude of iterations.

Figure 145:
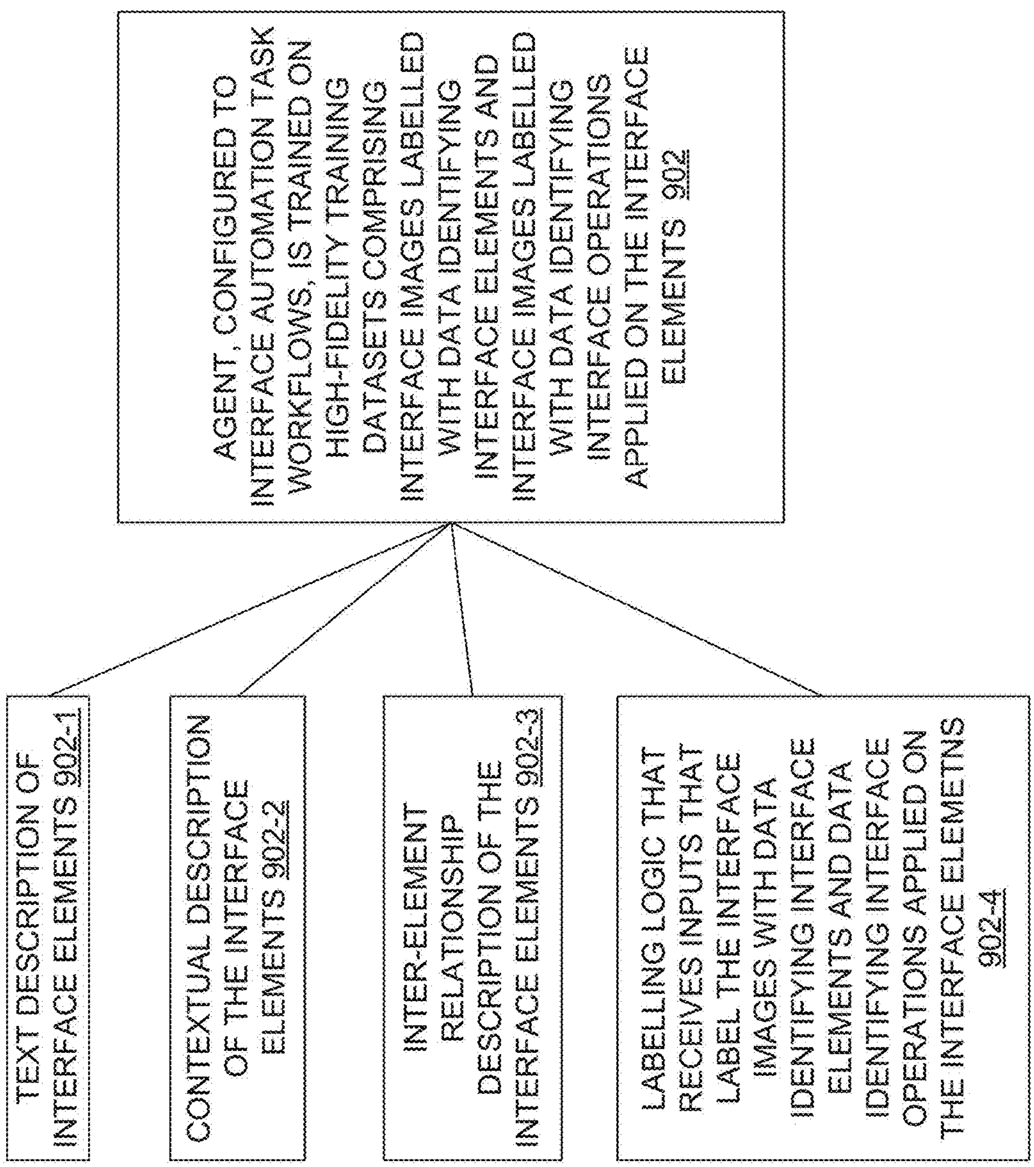
FIG. 145 shows a flow diagram illustrating one example method for automating software usage.

FIG. 145 shows a flow diagram illustrating one example method of operation of the systems disclosed herein. The method shown in FIG. 145 comprises a method for automating software usage.

At block 902, an agent, configured to interface automation task workflows, is trained on high-fidelity training datasets comprising interface images labelled with data identifying interface elements and interface images labelled with data identifying interface operations applied on the interface elements.

As indicated by block 902-1, in some examples, the data identifying the interface elements includes text description of the interface elements. As indicated by block 902-2, in some examples, the data identifying the interface elements includes contextual description of the interface elements. As indicated by block 902-3, in some examples, the data identifying the interface elements includes inter-element relationship description of the interface elements. As indicated by block 902-4, in some examples, the system further includes labelling logic configured to receive inputs that labels the interface images with the data identifying interface elements and the data identifying interface operations applied on the interface elements.

Figure 146:
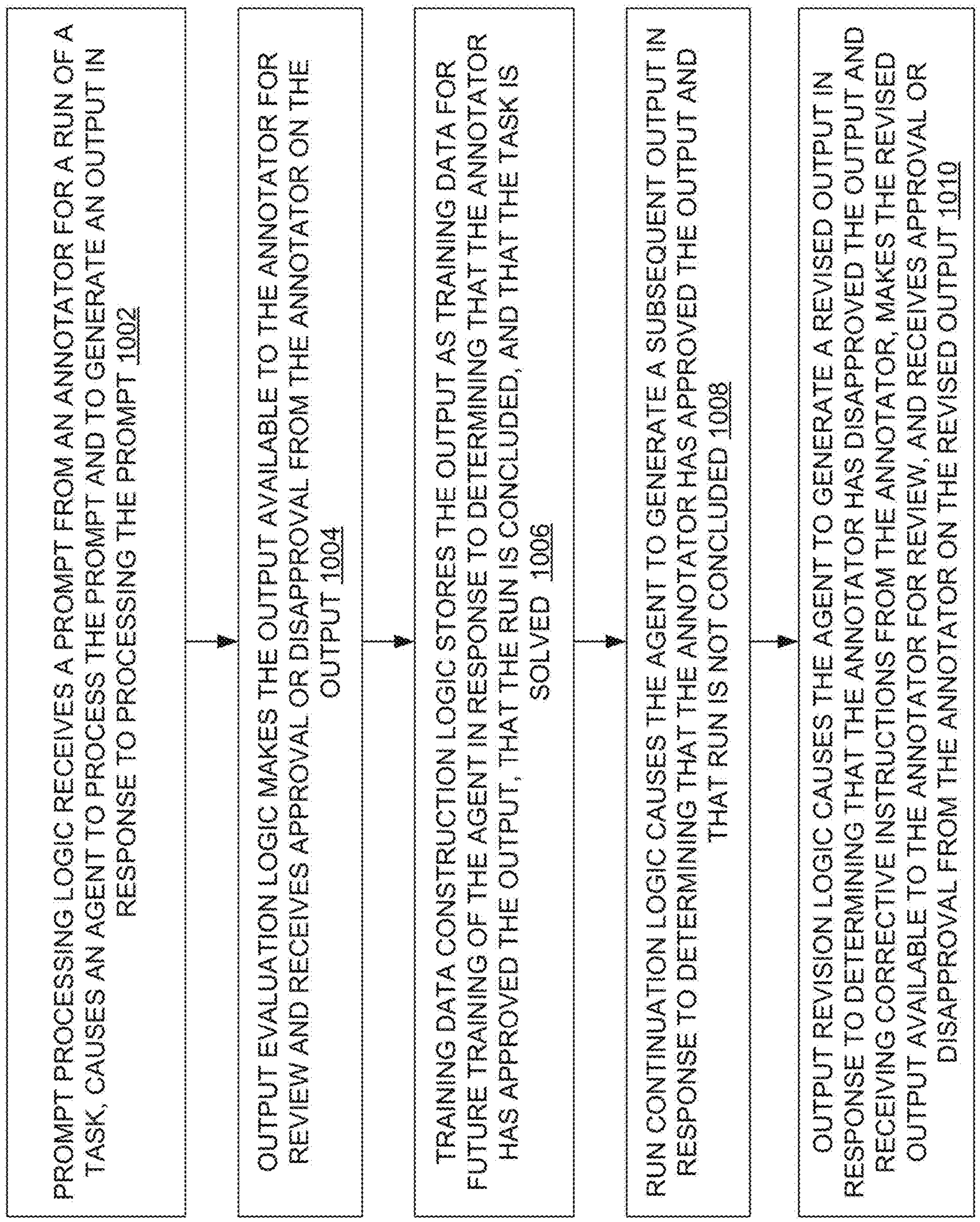

FIG. 146 shows a flow diagram illustrating one example method of operation of the systems disclosed herein. The method shown in FIG. 146 comprises a method of effectively collecting on-policy feedback for ongoing agent fine-tuning.

At block 1002, prompt processing logic receives a prompt from an annotator for a run of a task, causes an agent to process the prompt and to generate an output in response to processing the prompt.

At block 1004, output evaluation logic makes the output available to the annotator for review and receives approval or disapproval from the annotator on the output.

At block 1006, training data construction logic stores the output as training data for future training of the agent in response to determining that the annotator has approved the output, that the run is concluded, and that the task is solved.

At block 1008, run continuation logic causes the agent to generate a subsequent output in response to determining that the annotator has approved the output and that the run is not concluded.

At block 1010, output revision logic causes the agent to generate a revised output in response to determining that the annotator has disapproved the output and receiving corrective instructions from the annotator, makes the revised output available to the annotator for review, and receives approval or disapproval from the annotator on the revised output.

FIG. 159 is a block diagram showing an example system 2500 corresponding to the disclosed systems and methods. The system 2500, in one example, can be used to perform the method described in FIG. 143. The system 2500 is operable to automate software usage. As shown, system 2500 includes an agent 2502, training datasets 2504, and can include various other items and functionality 2506.

Agent 2502 is configured to automate software usage. In one example, agent 2502 is trained on training datasets 2504.

Training datasets 2504 can include a plurality of training datasets, such as a first training dataset 2560, a second training dataset 2561, a third training dataset 2562, a fourth training dataset 2563, a fifth training dataset 2564, a sixth training dataset 2565, a seventh training dataset 2566, and/or an eighth training dataset 2567. Training datasets 2504 can, additionally or alternatively, include other training datasets 2568.

In one example, the first training dataset 2560 includes documents containing text interleaved with images.

In one example, the second training dataset 2561 includes text embedded in images.

In one example, the third training dataset 2562 includes recorded videos of software usage.

In one example, the fourth training dataset 2563 includes portable document format (PDF) documents.

In one example, the fifth training dataset 2564 includes recorded videos of software tool usage trajectories. In one example, images in the recorded videos of software tool usage trajectories are interleaved with text descriptions of tasks executed in the recorded videos through the software tool usage trajectories. In one example, the images in the recorded videos of software tool usage trajectories are further interleaved with text descriptions of actions executed on the images and image annotations resulting from execution of the actions. In one example, the actions include clicking, scrolling, and typing.

In one example, the sixth training dataset 2565 includes images of open-domain web pages. In one example, the images of open-domain web pages are automatically crawled. In one example, the open-domain web pages are multimodal web pages. In one example, the open-domain web pages are part of software tools. In one example, the images of open-domain web pages are interleaved with text descriptions of synthetic tasks and image annotations resulting from execution of the synthetic tasks. In one example, the synthetic tasks include website-wise tasks, element-wise tasks, and action-wise tasks. In one example, the website-wise tasks include heading optical character recognition (OCR), captioning, and web question answering (WebQA). In one example, the element-wise tasks include element optical character recognition (OCR), element grounding/localization, and key-value pair identification. In one example, the action-wise tasks include action grounding and action prediction. In one example, the images of open-domain web pages are further interleaved with unified resource locators (URLs) of the open-domain web pages.

In one example, the seventh training dataset 2566 includes images of specific-domain web pages. In one example, the specific-domain web pages are multimodal web pages. In one example, the specific-domain web pages are part of software tools. In one example, the images of specific-domain web pages are curated at complex states of the software tools. In one example, the images of specific-domain web pages are interleaved with text descriptions of synthetic tasks and image annotations resulting from execution of the synthetic tasks. In one example, the synthetic tasks include website-wise tasks, element-wise tasks, and action-wise tasks. In one example, the website-wise tasks include heading optical character recognition (OCR), captioning, and web question answering (WebQA). In one example, the element-wise tasks include element optical character recognition (OCR), element grounding/localization, and key-value pair identification. In one example, the action-wise tasks include action grounding and action prediction. In one example, the images of specific-domain web pages are further interleaved with unified resource locators (URLs) of the specific-domain web pages.

In one example, the eighth training dataset 2567 includes images of agentic trajectories of the agent 2502 performing interface automation task workflows. In one example, the images of agentic trajectories of the agent 2502 performing interface automation task workflows are interleaved with agent instructions, agent actions, agent thoughts, interface document object models (DOMs), and interface unified resource locators (URLs). In one example, the images of agentic trajectories of the agent 2502 performing interface automation task workflows are organized as respective training examples that correspond to respective steps in the interface automation task workflows. In one example, the agent actions include current and previous actions. In one example, the images of agentic trajectories of the agent 2502 performing interface automation task workflows include current and previous interface screenshots. In one example, the images of agentic trajectories of the agent 2502 performing interface automation task workflows are selected based on approval from a human oracle on how well the agent 2502 performed the interface automation task workflows.

In some examples, some of the first, second, third, fourth, fifth, sixth, seventh, and eights training datasets for pre-training the agent 2502, for post-training the agent 2502, for finisher training the agent 2502, for combined fine-tuning of the agent 2502, and for agentic-fine tuning of the agent 2502.

FIG. 160 is a block diagram showing an example system 2600 corresponding to the disclosed systems and methods. The system 2600, in one example, can be used to perform the method described in FIG. 144. The system 2600 is operable to automate software usage. As shown, system 2600 includes an agent 2602, training datasets 2604, and can include various other items and functionality 2606.

Agent 2602 is configured to interface automation task workflows comprising a sequence of steps. Agent 2602 is trained on a sequence of the training datasets 2604. In one example, respective training datasets 2604 in the sequence of training datasets 2604 correspond to respective steps in the sequence of steps. In one example, a particular training dataset 2604 in the sequence of training datasets 2604 corresponding to a particular step in the sequence of steps includes a multitude of interface images of the particular step being performed over a multitude of iterations.

FIG. 161 is a block diagram showing an example system 2700 corresponding to the disclosed systems and methods. The system 2700, in one example, can be used to perform the method described in FIG. 145. The system 2700 is operable to automate software usage. As shown, system 2700 includes an agent 2702, high-fidelity training datasets 2704, labelling logic 2706, and can include various other items and functionality 2799.

Agent 2702 is configured to interface automation task workflows and is trained on high-fidelity training datasets 2704.

High-fidelity training datasets 2704 include interface images 2760 and interface images 2762. High-fidelity training datasets 2704 can include various other data 2764.

In one example, interface images 2760 are labelled with data identifying interface elements. In one example, the data identifying the interface elements includes text description of the interface elements. In one example, the data identifying the interface elements includes contextual description of the interface elements. In one example, the data identifying the interface elements includes inter-element relationship description of the interface elements.

In one example, interface images 2762 are labelled with data identifying interface operations applied on the interface elements.

Labelling logic 2706 is configured to receive inputs 2708 that labels the interface images with the data identifying interface elements and the data identifying interface operations applied on the interface elements.

FIG. 162 is a block diagram showing an example system 2800 corresponding to the disclosed systems and methods. The system 2800, in one example, can be used to perform the method described in FIG. 146. The system 2800 is operable to effectively collect on-policy feedback for ongoing agent fine-tuning. As shown, system 2800 includes prompt processing logic 2802, prompt 2804, annotator 2806, agent 2808, output 2810, output evaluation logic 2812, training data construction logic 2814, training data 2816, run continuation logic 2818, subsequent output 2820, output revision logic 2822, revised output 2824, corrective instructions 2826, and can include various other items and functionality 2899.

Prompt processing logic 2802 is configured to receive a prompt 2804 from an annotator 2806 for a run of a task. Prompt processing logic 2802 is configured to cause an agent 2808 to process the prompt 2804 and to generate an output 2810 in response to processing the prompt 2804.

Output evaluation logic 2812 is configured to make the output 2804 available to the annotator 2806 for review. Output evaluation logic 2812 is configured to receive approval or disapproval from the annotator 2806 on the output 2804.

Training data construction logic 2814 is configured to store the output 2804 as training data 2816 for future training of the agent 2808 in response to determining that the annotator 2806 has approved the output 2804, that the run is concluded, and that the task is solved.

Run continuation logic 2818 is configured to cause the agent 2808 to generate a subsequent output 2820 in response to determining that the annotator 2806 has approved the output 2804 and that the run is not concluded.

Output revision logic 2822 is configured to cause the agent 2808 to generate a revised output 2824 in response to determining that the annotator 2806 has disapproved the output 2804 and receiving corrective instructions 2826 from the annotator. Output revision logic 2822 is configured to make the revised output 2824 available to the annotator 2806 for review and to receive approval or disapproval from the annotator 2806 on the revised output 2824.

Training Agents to Automate Tasks Otherwise Performed by Users

Figure 43A:
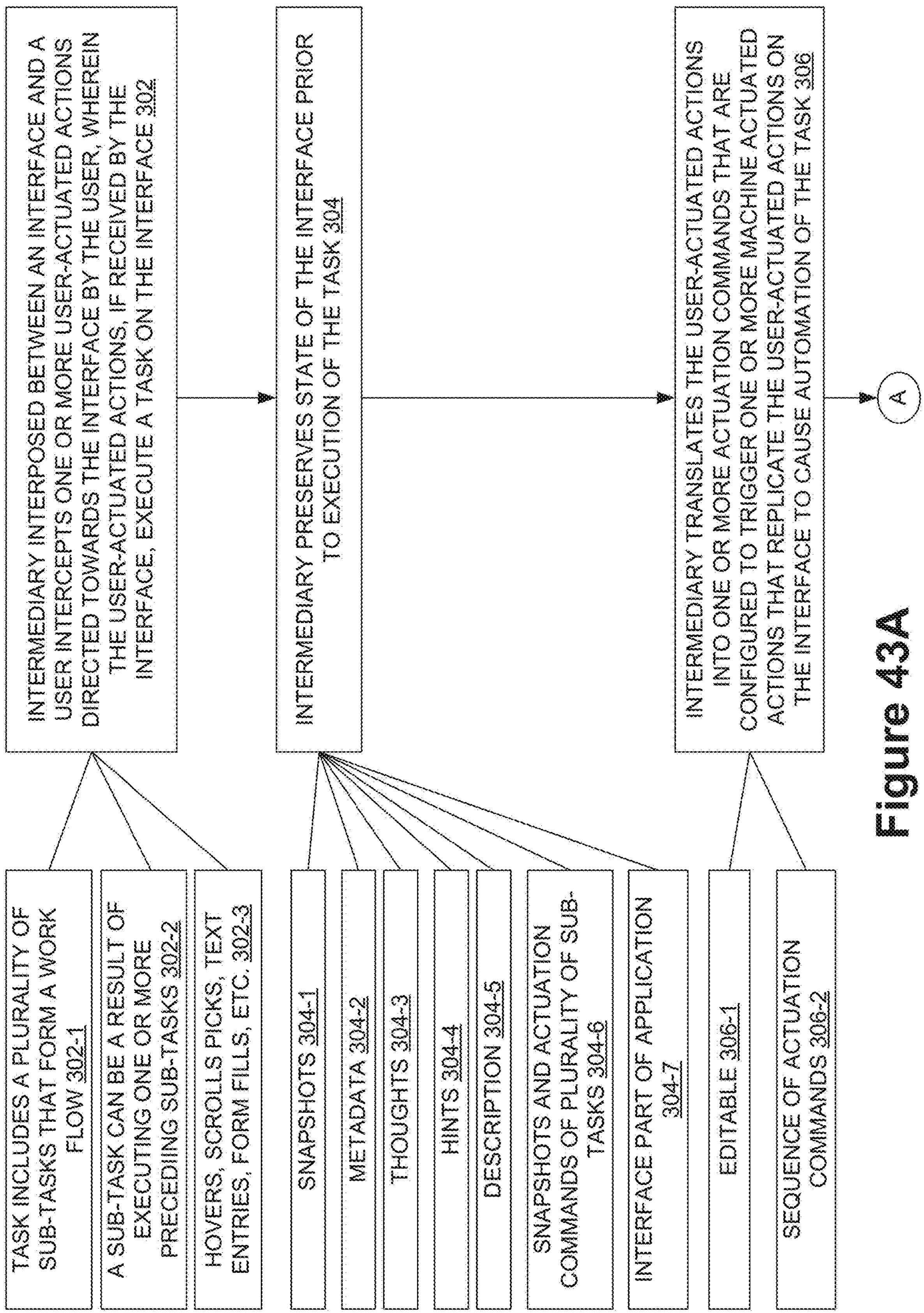
FIGS. 43A and 43B (collectively FIG. 43) show a flow diagram illustration one example method for generating training data to train agents to automate tasks otherwise done by users.
Figure 43B:
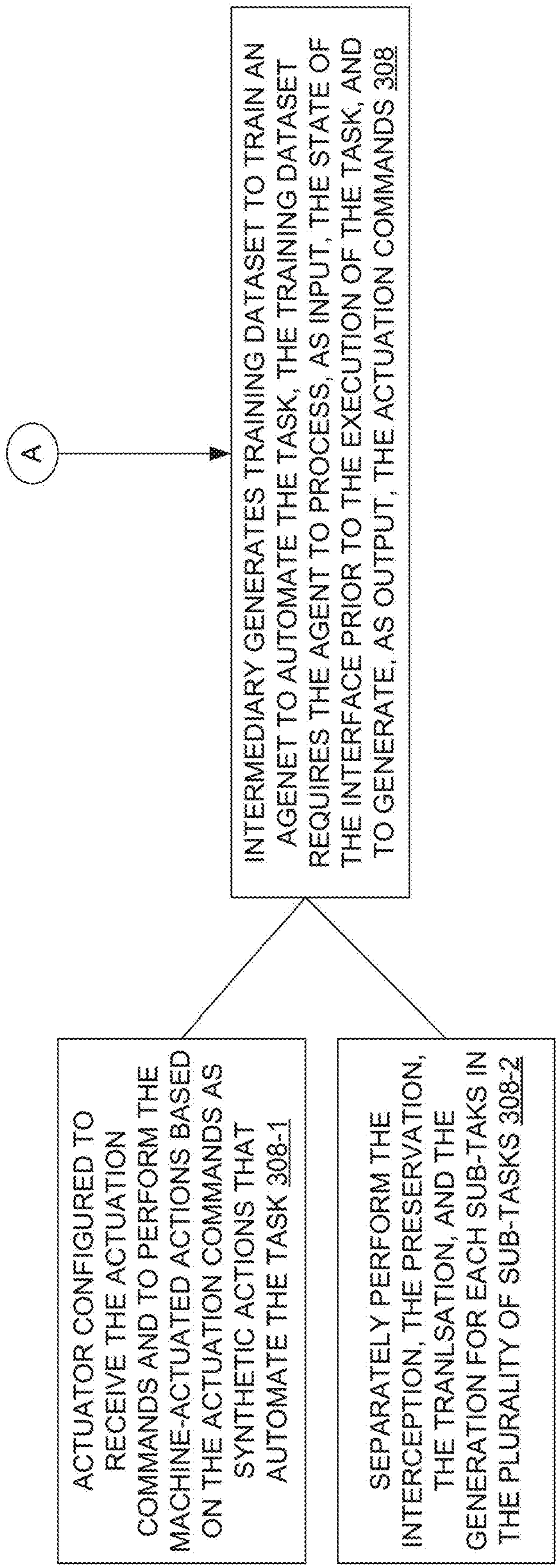

FIGS. 43A and 43B (collectively referred to as FIG. 43) show a flow diagram illustrating one example method of operation of the systems disclosed herein. The method shown in FIG. 43 comprises a method for generating training data to train agents to automate tasks otherwise done by users. At block 302 an intermediary (e.g., the recorder), interposed between an interface and a user, intercepts one or more user-actuated actions directed towards the interface by the user, wherein the user-actuated actions, if received by the interface, execute a task on the interface.

As indicated by block 302-1, in some examples, the task includes a plurality of sub-tasks that form a workflow (e.g., interface workflow). As indicated by block 302-2, in some examples, one (e.g., a current) sub-task in the plurality of sub-tasks is a result of executing one or more preceding sub-tasks in the plurality of sub-tasks. As indicated by block 302-3, user-actuated actions can include, but are not limited to, clicks, hovers, scrolls, picks, text entries, and form fills.

At block 304, the intermediary preserves (e.g., records) a state of the interface prior to the execution of the task. As indicated by block 304-1, in some examples, the state of the interface prior to the execution of the task includes one or more snapshots of the interface. As indicated by block 304-2, in some examples, the state of the interface prior to the execution of the task includes metadata about the interface (e.g., variables, browser metadata, etc.). As indicated by block 304-3, in some examples, the state of the interface prior to the execution of the task includes one or more thoughts from the user that contextualize the state of the interface (e.g., "the page is not loading", etc.). As indicated by block 304-4, in some examples, the state of the interface prior to the execution of the task includes one or more hints from the user that contextualize the task (e.g., "the page is not loading", etc.). As indicated by block 304-5, in some examples, the state of the interface prior to the execution of the task includes a description of the task provided by the user. As indicated by block 304-6, in some examples, the state of the interface to the execution of one (e.g., a current) sub-task includes one or more snapshots of the interface corresponding to the one (e.g., current) sub-task, one or more snapshots of the interface corresponding to the preceding sub-tasks, and one or more actuation commands corresponding to the preceding sub-tasks.

As indicated by block 304-7, in some examples, the interface is part of an application, such as web application (e.g., a browser), or a native application (e.g., a desktop application), or other types of applications.

At block 306, the intermediary translates the user-actuated action into one or more actuation commands that are configured to trigger one or more machine actuated actions (e.g., system actions) that replicate the user-actuated actions on the interface to cause automation of the task. As indicated by block 306-1, in some examples, the actuation commands are editable by the user. As indicated by block 306-2, in some examples, the actuation commands are part of a sequence of actuation commands (e.g., Action Plan/end-to-end workflow).

At block 308, the intermediary generates a training dataset to train an agent to automate the task, the training dataset requires the agent to process, as input, the state of the interface prior to the execution of the task, and to generate, as output, the actuation commands. As indicated by block 308-1, in some examples, an actuator is configured to receive the actuation commands from the intermediary and to perform the machine-actuated actions based on the actuation commands as synthetic actions that automate the tasks. As indicated by block 308-2, in some examples, the intermediary is configured to separately perform the interception, the preservation, the translation, and the generation for each sub-task in the plurality of sub-tasks.

Figure 44:
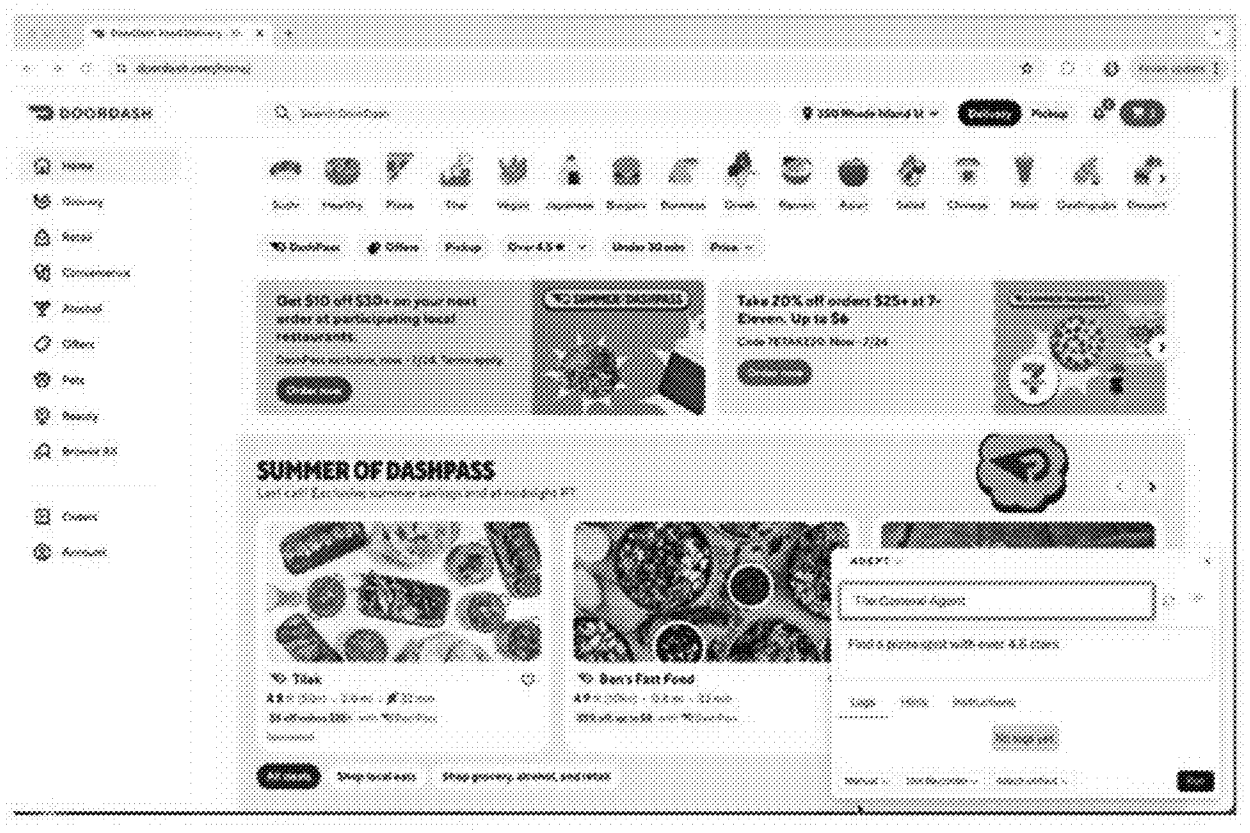
FIG. 44 is a pictorial illustration showing one example of the operation of the disclosed systems and methods.

FIG. 44 is a pictorial illustration illustrating one example of the operation of the recorder of the disclosed systems and methods. As illustrated in FIG. 44, the recorder provides a training interface overlaid the UI (e.g., webpage UI) that includes an interface element that allows a user to create and describe tasks ("find pizza spots with over 4.6 stars") and allows for user interaction to demonstrate how to interact with the UI (e.g., where to click on the UI) and to provide a label describing what the UI represents.

FIG. 45 is a pictorial illustration illustrating one example of the operation of the recorder of the disclosed systems and methods. As illustrated in FIG. 45, the recorder provides for a user to instruct (e.g., prompt), oversee, and intervene on the planning and execution of the workflow and to provide feedback when the systems and methods provide incorrect workflow. In some examples, the recorder provides interface elements (e.g., text) describing each step of the workflow generated by the disclosed systems and methods and interface elements allowing a user to approve or deny the step or to provide input (e.g., a hint) to do something differently.

Figure 46A:
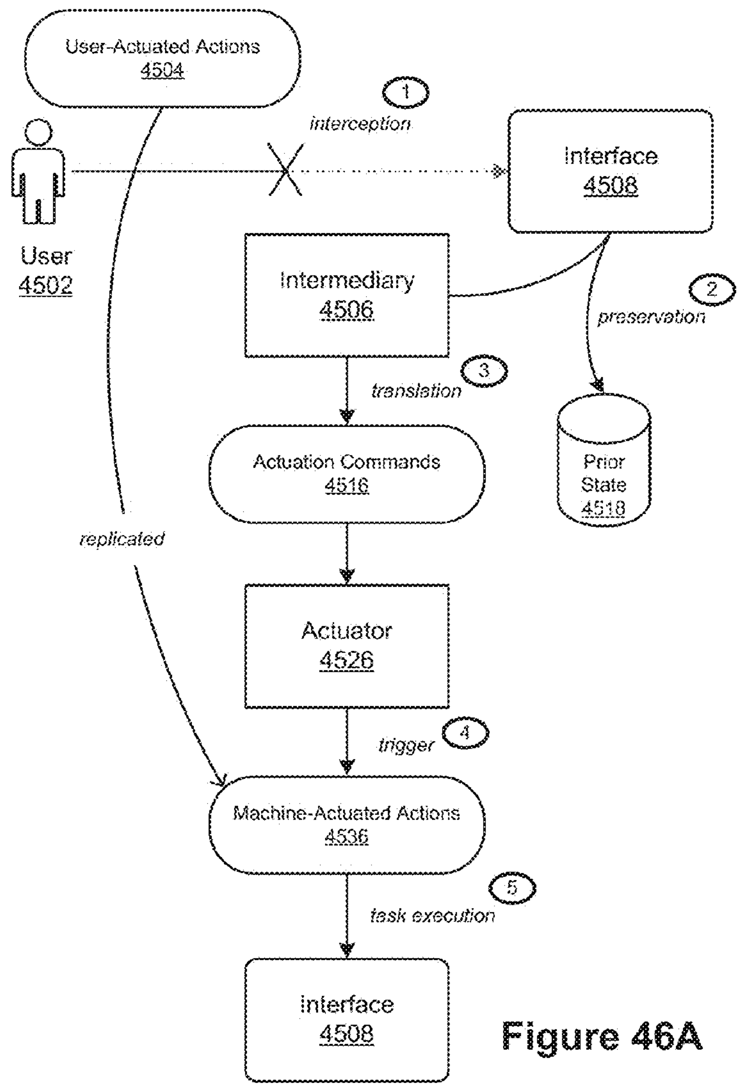
FIGS. 46A, 46B, and 46C (collectively FIG. 46) is a block diagram illustrating one example of a system performing an operation for generating training data to train agents to automate tasks otherwise done by users.
Figure 46B:
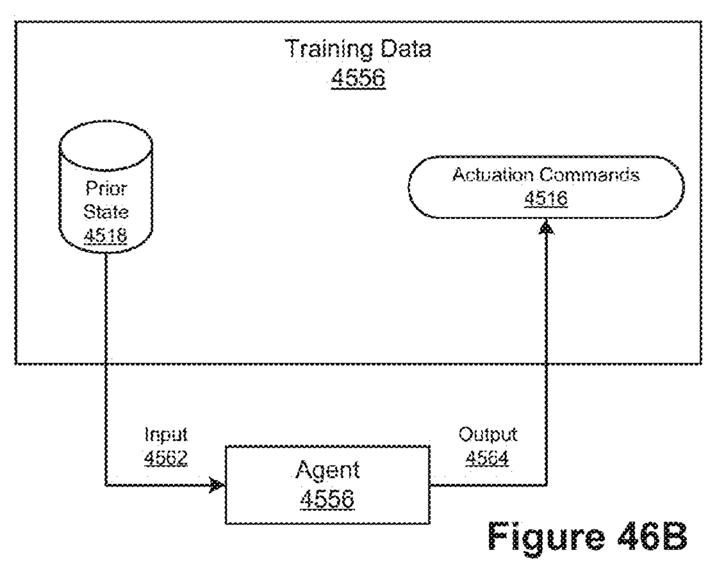
Figure 46C:
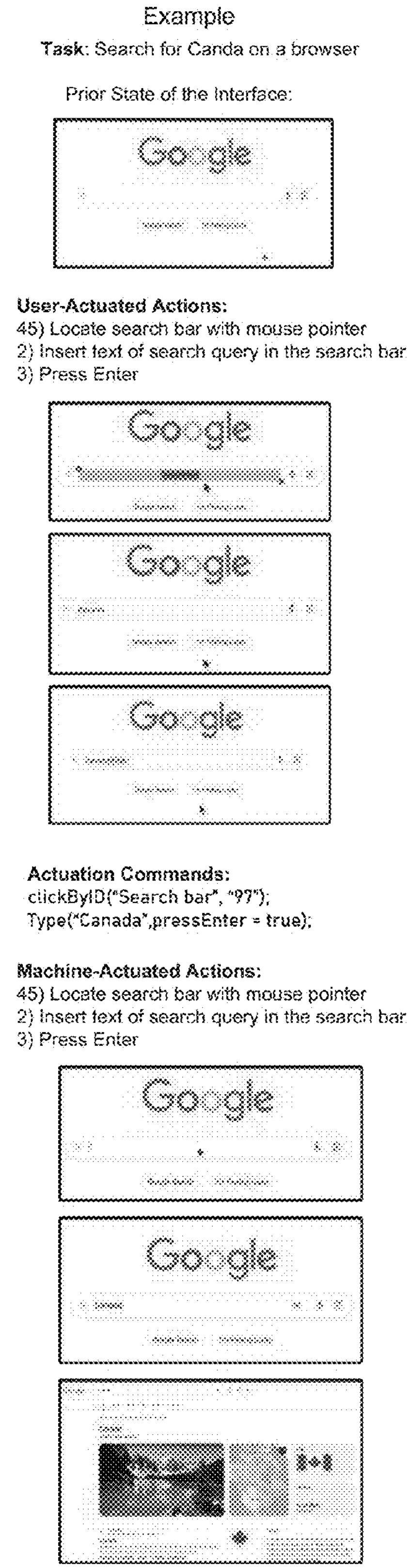

FIGS. 46A, 46B, and 46C (collectively referred to as FIG. 46) show a block diagram illustrating one example operation of a disclosed system performing a disclosed method. The method shown in FIG. 46 comprises a method for generating training data to train agents to automate tasks otherwise done by users. In some examples, the method comprises the method described in FIG. 43. As illustrated, a user 4502, provides one or more user-actuated actions 4504 directed towards an interface 4508. An intermediary 4506 (e.g., recorder), intercepts the user-actuated actions 4504 prior to their reaching the interface 4508. The user-actuated actions 4504 would, if received by the interface 4508, execute a task on the interface 4508.

The intermediary 4506 preserves (e.g., captures and stores) a prior state 4518 of the interface 4508 (e.g., a state of the interface prior to the execution of the task).

The intermediary 4506 translates the user-actuated actions 4504 into one or more actuation commands 4516 that are configured to trigger one or more machine actuated actions 4536 that replicate the user-actuated actions on the interface 4508 to cause automation of the task on the interface 4508. In some examples, an actuator 4526 receives the actuation commands and performs the machine-actuated actions 4536 (e.g., as synthetic actions) to automate the task. In some examples, the actuator 4526 is a component (or functionality) of an agent 4556 or is separate from the agent 4556.

As can be seen, the prior state 4518 and the associated actuation commands comprise training data 4556. The agent 4556 (e.g., model(s), such as multimodal models) are trained on prior state data 4518 to generate actuation commands 4516. Such that, the agent 4556 is configured to receive, as an input 4562, prior state data 4518 (a prior state of a interface) and generate, as an output 4564, actuation commands 4516.

FIG. 163 is a block diagram showing an example system 2900 corresponding to the disclosed systems and methods. The system 2900, in one example, can be used to perform the method described in FIG. 43. The system 2900 is operable to generate training data to train agents to automate tasks otherwise done by users. As shown, system 2900 includes intermediary 2902, interface 2904, training dataset 2906, agent 2908, state of the interface 2910, actuator 2914, and can include various other items and functionality 2999.

Intermediary 2902 is interposed between an interface 2904 and a user 2950. Intermediary 2902 is configured to intercept one or more user-actuated actions 2952 directed towards the interface 2904. The user-actuated actions 2952, if received by the interface 2904, would execute a task on the interface 2904.

Intermediary 2902 is configured to preserve a state of the interface prior to execution of the task 2910.

Intermediary 2902 is configured to translate the user-actuated actions 2952 into one or more actuation commands 2912. The actuation commands 2912 are configured to trigger one or more machine-actuated actions 2916 that replicate the user-actuated actions 2952 on the interface 2904 to cause automation of the task.

Intermediary 2902 is configured to generate a training dataset 2906 to train an agent 2908 to automate the task. The training dataset 2906 requires the agent 2908 to process, as input, the state of the interface prior to the execution of the task 2910 and to generate, as output, the actuation commands 2912.

Actuator 2914 is configured to receive the actuation commands 2912 from the intermediary 2902 and to perform the machine-actuated actions 2916 based on the actuation commands as synthetic actions that automate the task.

In some examples, the state of the interface prior to the execution of the task 2910 includes one or more snapshots of the interface 2904. In some examples, the state of the interface prior to the execution of the task 2910 includes metadata about the interface 2904 (e.g., variables, browser metadata, etc.). In some examples, the state of the interface prior to the execution of the task 2910 includes one or more thoughts from the user 2950 that contextualize the state 2910 (e.g., the page is not loading, etc.). In some examples, the state of the interface prior to the execution of the task 2910 includes one or more hints from the user 2950 that contextualize the task (e.g., the page is not loading, etc.). In some examples, the state of the interface prior to the execution of the task 2910 includes a description of the task provided by the user 2950.

In some examples, the task includes a plurality of sub-tasks that form an interface workflow. In some examples, the interface workflow is a multimodal interface workflow. In some example, the intermediary 2902 is configured to separately perform the interception, the preservation, the translation, and the generation for each sub-task in the plurality of sub-tasks. In some examples, a current sub-task in the plurality of sub-tasks is a result of executing one or more preceding sub-tasks in the plurality of sub-tasks. In some examples, the state of the interface prior to the execution of the current sub-task 2910 includes one or more snapshots of the interface 2904 corresponding to the current sub-task, one or more snapshots of the interface 2904 corresponding to the preceding sub-tasks, and one or more actuation commands 2912 corresponding to the preceding sub-tasks.

In some examples, the user-actuated actions 2952 include clicks, hovers, scrolls, picks, text entries, and form fills.

In some examples, the interface 2904 is part of an application. In some examples, the application is a web application (e.g., a browser). In some examples, the application is a native application (e.g., a desktop application).

In some examples, the actuation commands 2912 are editable by the user 2950. In some examples, the actuation commands 2912 are part of a sequence of actuation commands.

Agent Task Automation

Figure 47:
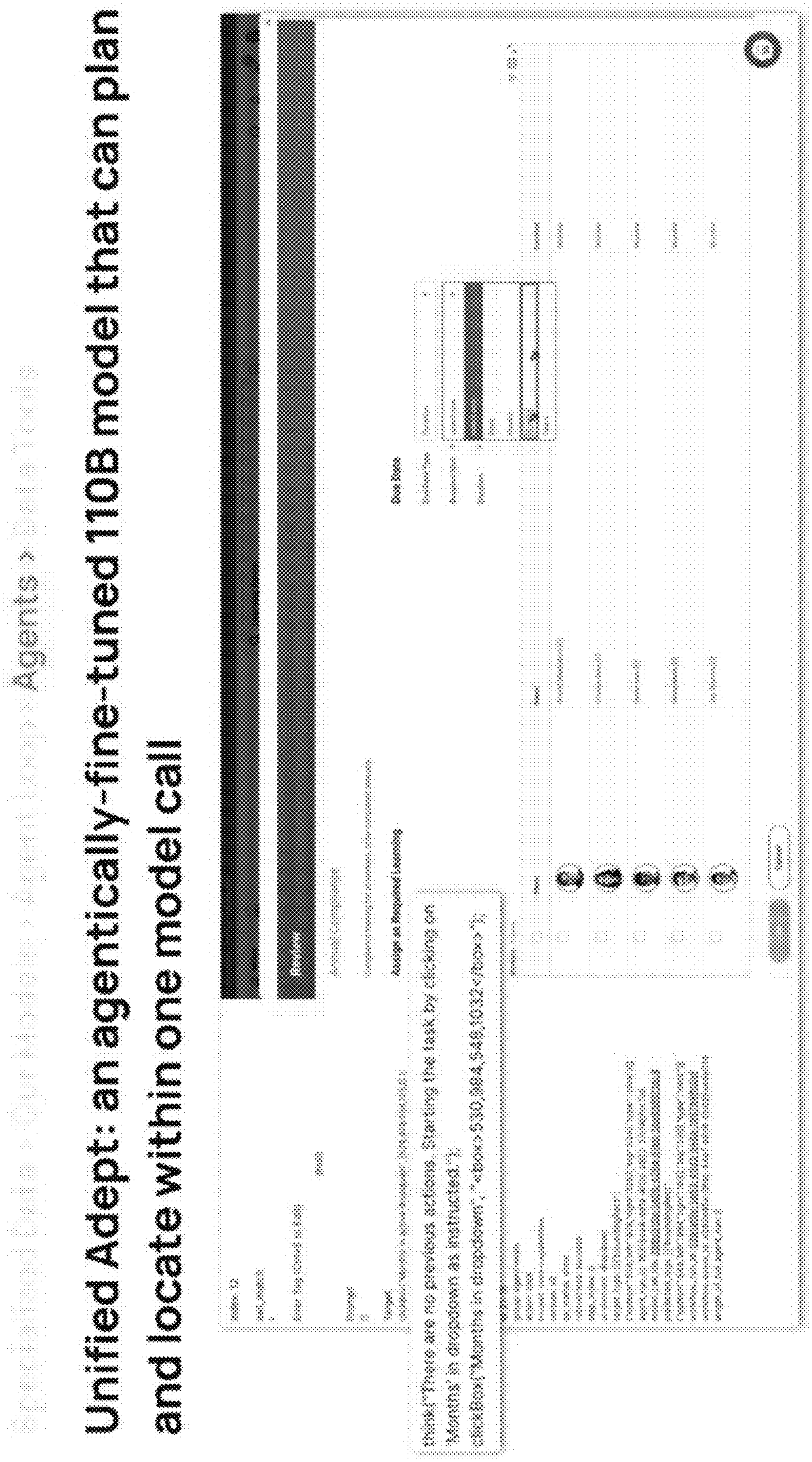
FIG. 47 is a pictorial illustration showing one example of the agent of the disclosed systems and methods.

FIG. 47 is a pictorial illustration showing one example operation of the agent (model(s)) of the disclosed systems and methods. As shown in FIG. 47, the agent is able to plan and locate (generate and executed an Action Plan/end-to-end workflow) within one model call. As illustrated, the agent received a prompt instructing the agent to interact with a dropdown menu to select a an item therefrom. As shown, the agent is operable to plan and execute a workflow. The workflow includes evaluate past actions ("There are no previous actions") and responsively plan further action ("Starting the task by clicking on 'Months' in dropdown as instructed.") which results in location (box '<box>530,984, 548,1032,</box>'"). and interaction ("clickBox ("Months in dropdown") actions.

Figure 48:
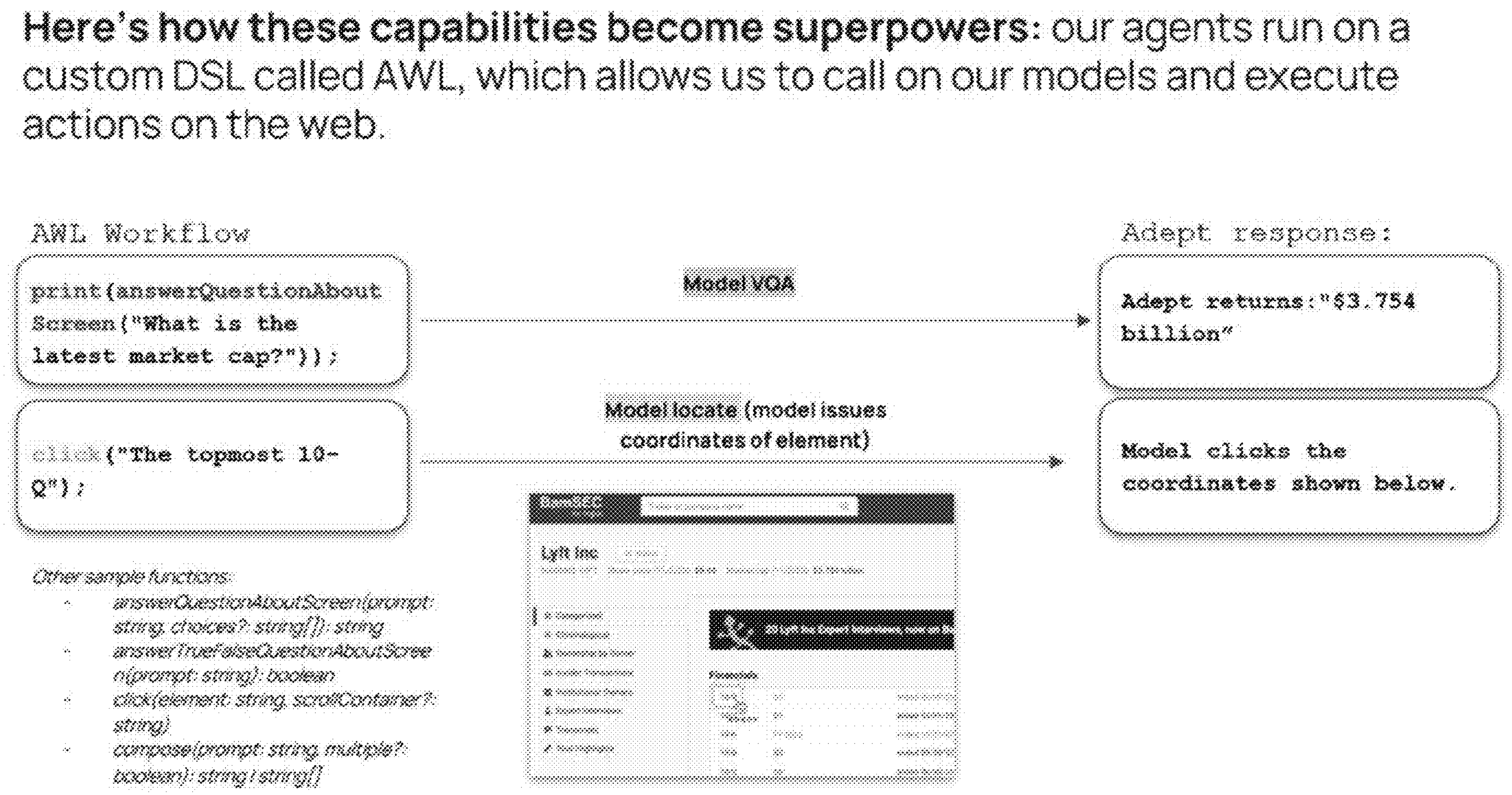
FIG. 48 is a pictorial illustration showing one example operation of the agent of the disclosed systems and methods.

FIG. 48 is a pictorial illustration showing one example operation of the agent of the disclosed systems and methods. As shown, the agent utilizes a custom DSL which provides for models calls and action executions. The workflow DSL comprises actuation commands which result in machine actuated actions to automate a workflow. As shown, one example actuation command comprises "print(answerQuestionAboutScreen('what is the latest market cap?'))" which results in the machine-actuated actions of VQA (or WebQA) and providing the answer ("$3.745 billion"). Another example actuation command comprises "click('The topmost 10-Q') which results in the machine-actuated actions of localization (model issues coordinates of element) and interaction (click on the issued coordinates).

FIG. 49 is a pictorial illustration showing an example mapping between example DSL actuation commands and example corresponding (or resulting) machine-actuated actions.

Figure 50:
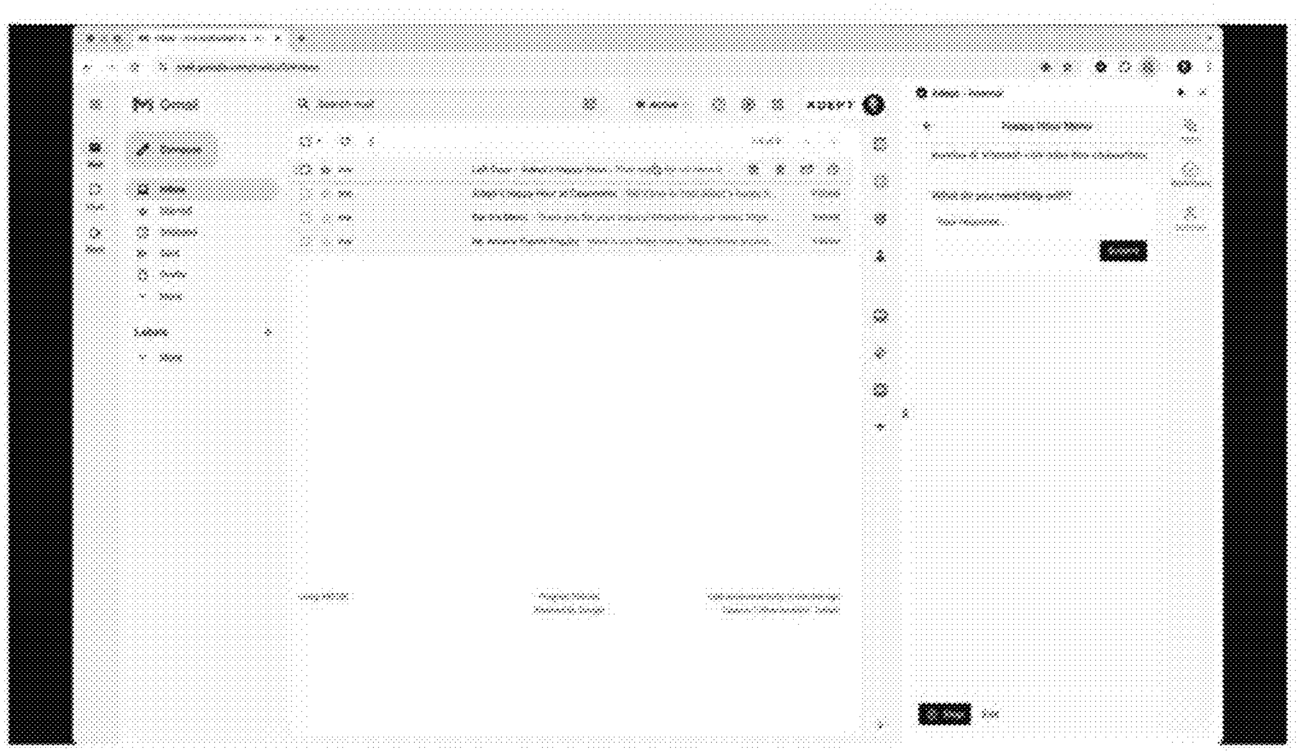
FIG. 50 is a pictorial illustration showing improvements from the use of the DSL disclosed herein.

FIG. 50 is a pictorial illustration showing that the use of the DSL disclosed herein improves creation of long-horizon workflows.

Figure 51:
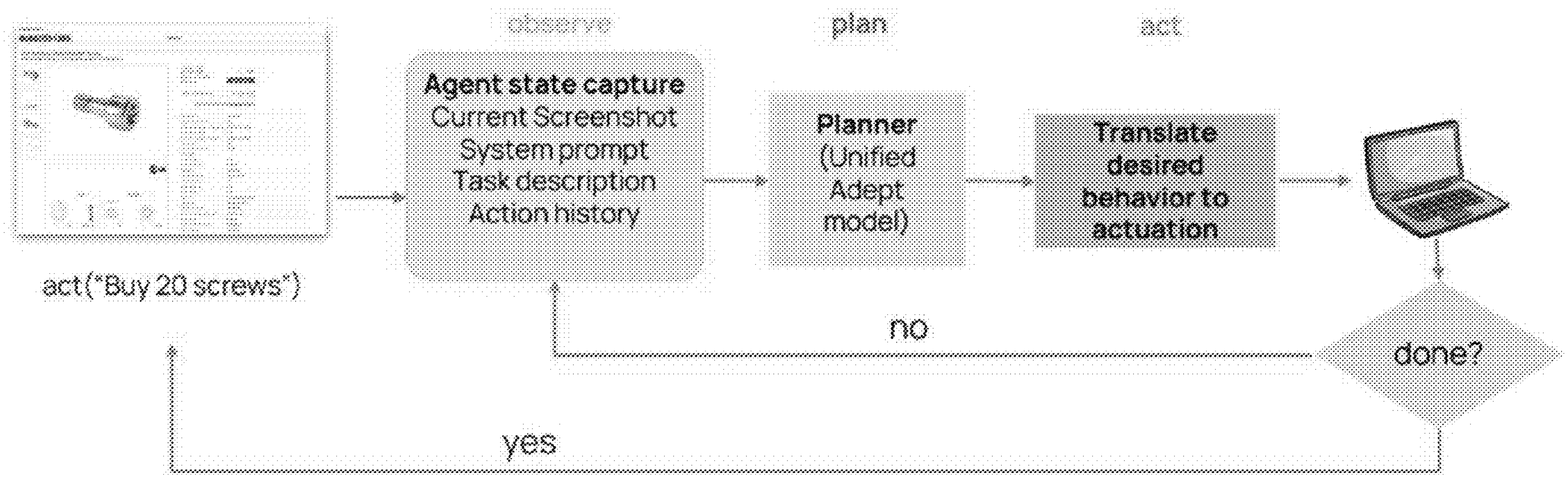
FIG. 51 is a pictorial illustration showing one example agent loop of the disclosed systems and methods.

FIG. 51 is a pictorial illustration showing one example agent loop of the disclosed systems and methods.

Figure 52:
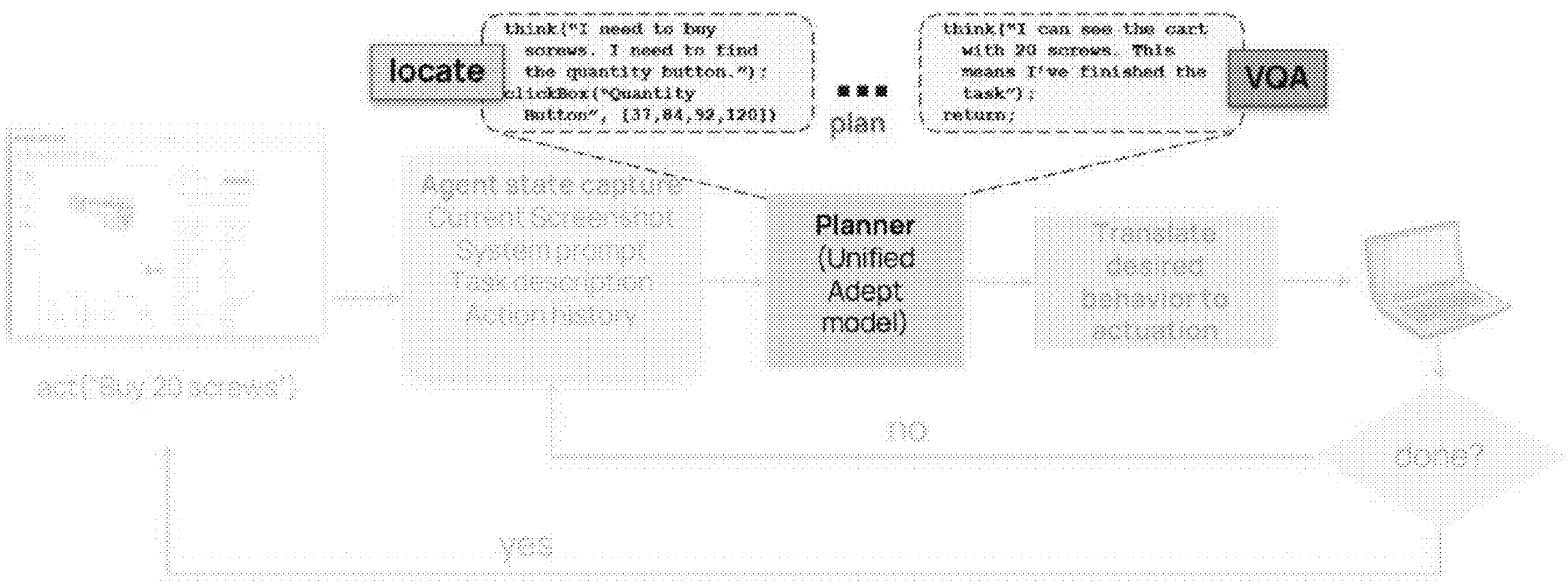
FIG. 52 is a pictorial illustration showing one example operation of the disclosed systems and methods.

FIG. 52 is a pictorial illustration showing one example operation of the disclosed systems and methods. As shown, a function planner (e.g., model(s)) sees a UI and makes a plan (VQA—"I need to buy screws. I need to find the quantity button."), locates and interacts with the UI ("clickBox('Quantity Button', [37, 84, 92, 120])"), and assesses how to proceed (VQA—"I can see the cart with 20 screws. This means I've finished the task.").

FIG. 53 is a pictorial illustration showing one example of a workflow (Action Plan), generated by the disclosed systems and methods.

FIG. 54 is a pictorial illustration showing one example of a workflow (Action Plan), generated by the disclosed systems and methods.

Figure 55:
FIG. 55 is a pictorial illustration showing a reliability score corresponding to the disclosed systems and methods.

FIG. 55 is a pictorial illustration showing a reliability score corresponding to the disclosed systems and methods.

FIG. 56 is a pictorial illustration showing some example prompts, such as user prompts, providable to and useable by the disclosed systems and methods. As illustrated, the prompts, such as user prompts, can include click level, step level, and task level model calls (or prompts).

FIG. 57 is a pictorial illustration showing example inputs and outputs of the disclosed systems and methods. As illustrated (top), some current approaches utilize natural language inputs (prompts) and output commands. As further illustrated (bottom), the disclosed systems and methods are trained on and receive, as input, a state of the interface (e.g., screenshot), a workflow (e.g., functions, parameters, key-value pair, descriptions) and outputs actuation commands.

FIG. 58 is a pictorial illustration showing one example execution loop of the disclosed systems and methods. As illustrated, a function planner (e.g., model(s)) receive, as input a state of the interface (e.g., screenshot), a workflow (e.g., functions, parameters, key-value pair, descriptions), and actions already taken (e.g., preceding tasks executed). The function planner outputs actuation commands (e.g., "click('login field')"). An actuation model (e.g., actuator, actuation logic, etc.) executes machine-actuated actions based on the actuation commands and sends another screenshot of the interface to the function planner. The function planner outputs another actuation command (e.g., "type (username)"). This loop is repeated until, at some point, the function planner outputs a token (e.g., EOS token).

FIG. 59 is a pictorial illustration showing one example operation of the disclosed systems and methods. As shown, the disclosed systems and methods are trained on and configured to receive function-like prompts that include functions, parameters, key-value pairs, and descriptions and output actuation commands.

Figure 60A:
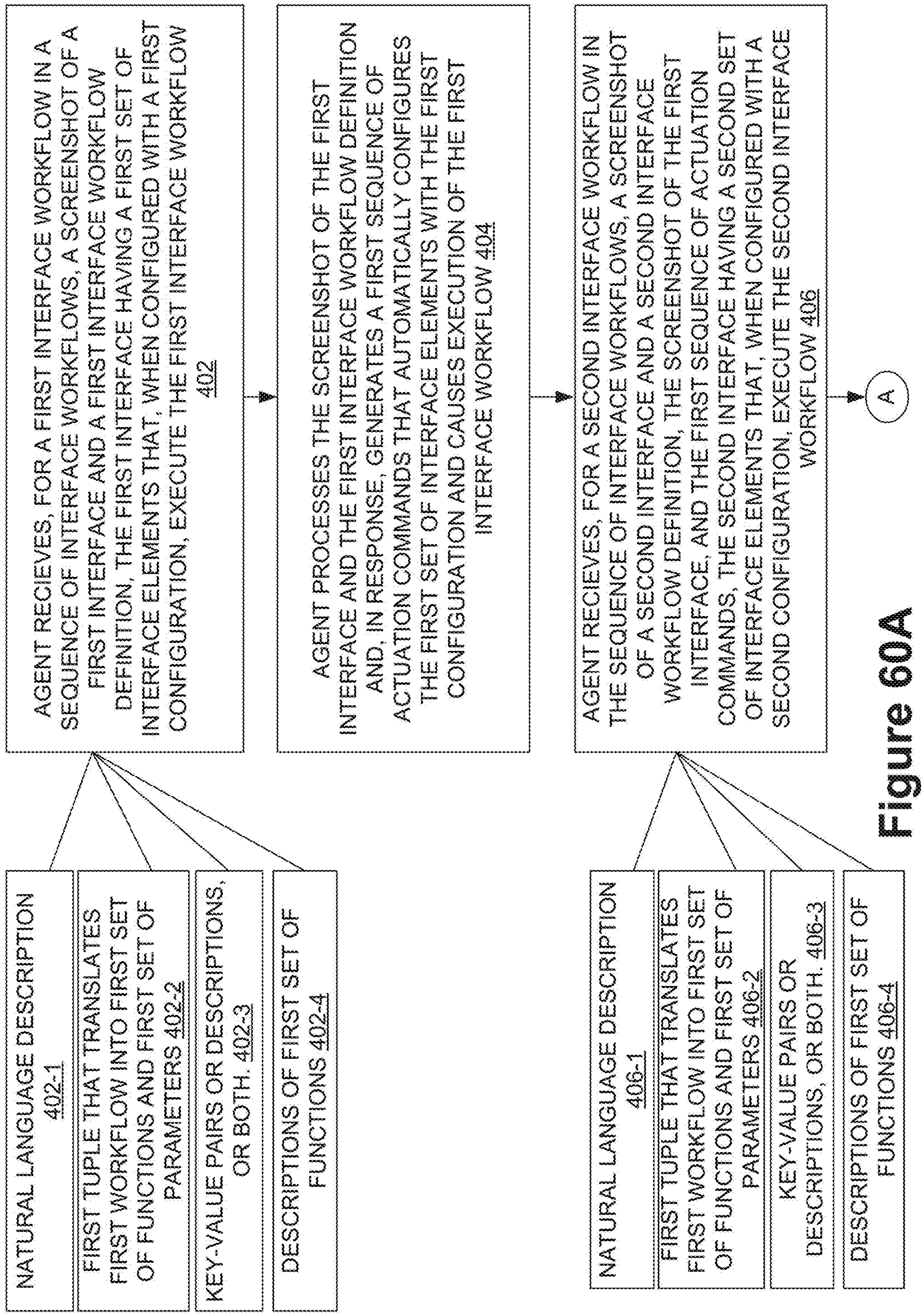
FIGS. 60A and 60B (collectively referred to as FIG. 60) show a flow diagram illustrating one example method for interface automation.
Figure 60B:
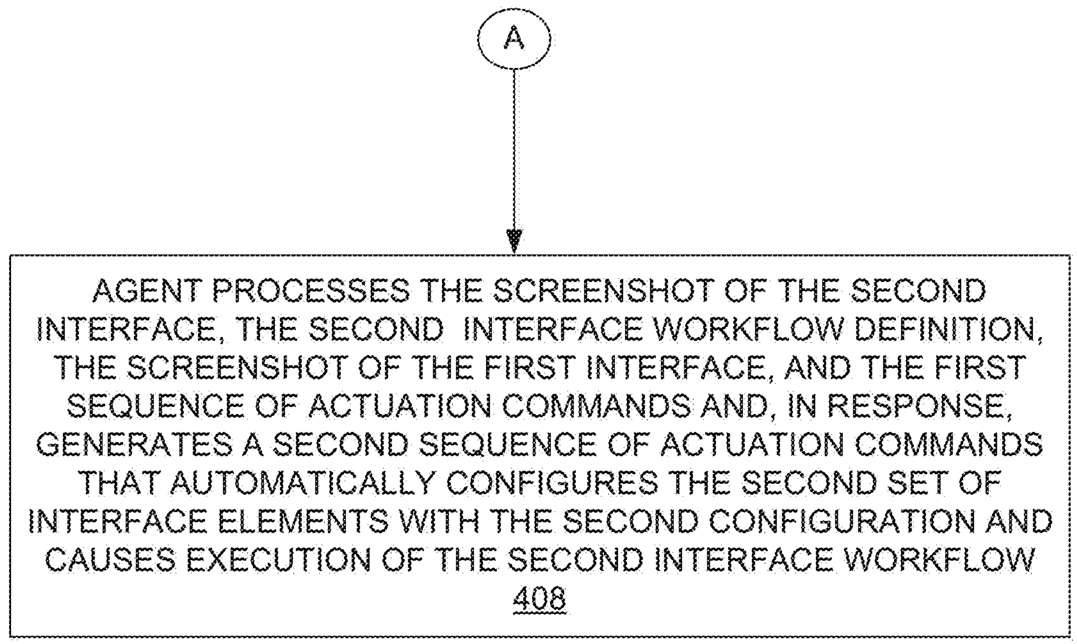

FIGS. 60A and 60B (collectively referred to as FIG. 60) show a flow diagram illustrating one example method of operation of the systems disclosed herein. The method shown in FIG. 60 comprises a method for interface automation.

At block 402 an agent, configured to automate a sequence of workflows (e.g. interface workflows) receives, for a first interface workflow in the sequence of interface workflows, a screenshot of a first interface and a first interface workflow definition, the first interface having a first set of interface elements that, when configured with a first configuration, execute the first interface workflow.

As indicated by block 402-1, in some examples, the first workflow definition is a natural language description of the first workflow. As indicated by block 402-2, in some examples, the first workflow definition is a first tuple that translates the first workflow into a first set of functions and a first set of parameters. As indicated by block 402-3, in some examples, the first set of parameters are key-value pairs or include descriptions, or both. As indicated by block 402-4, in some examples, the first set of parameters include descriptions of the first set of functions.

At block 404, the agent processes the screenshot of the first interface and the first interface workflow definition and, in response, generates a first sequence of actuation commands that automatically configures the first set of interface elements with the first configuration and causes execution of the first interface workflow.

At block 406, the agent receives, for a second interface workflow in the sequence of interface workflows, a screenshot of a second interface, a second interface workflow definition, the screenshot of the first interface, and the first sequence of actuation commands, the second interface having a second set of interface elements that when configured with a second configuration execute the second interface workflow.

As indicated by block 406-1, in some examples, the second workflow definition is a natural language description of the second workflow. As indicated by block 406-2, in some examples, the second workflow definition is a second tuple that translates the second workflow into a second set of functions and a second set of parameters. As indicated by block 406-3, in some examples, the second set of parameters are key-value pairs. As indicated by block 406-4, in some examples, the second set of parameters include descriptions of the second set of functions.

At block 408, the agent processes the screenshot of the second interface, the second interface workflow definition, the screenshot of the first interface, and the first sequence of actuation commands and, in response, generates a second sequence of actuation commands that automatically configures the second set of interface elements with the second configuration and causes execution of the second interface workflow.

As indicated by block 408-1, in some examples, an actuator is configured to receive the first and second sequences of actuation commands from the agent and to execute the first and second sequences of actuation commands as synthetic actions that automate the first and second workflows. As indicated by block 408-2, in some examples, the actuator is configured to send screenshots of the first and second interfaces to the agent.

Figure 61A:
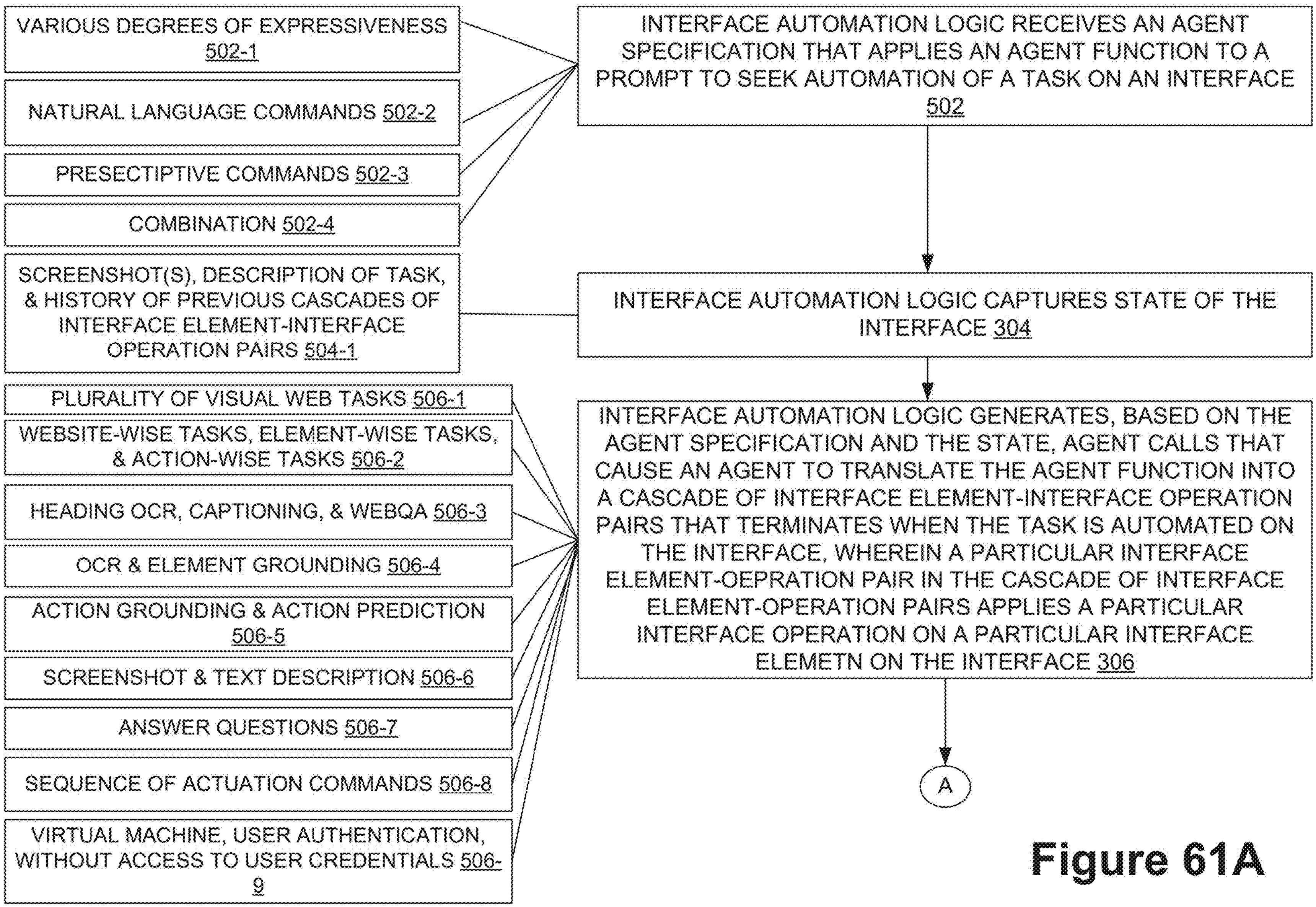
FIGS. 61A and 61B (collectively referred to as FIG. 61) show a flow diagram illustrating one example method for interface automation, such as for automating long-horizon interface workflows.
Figure 61B:
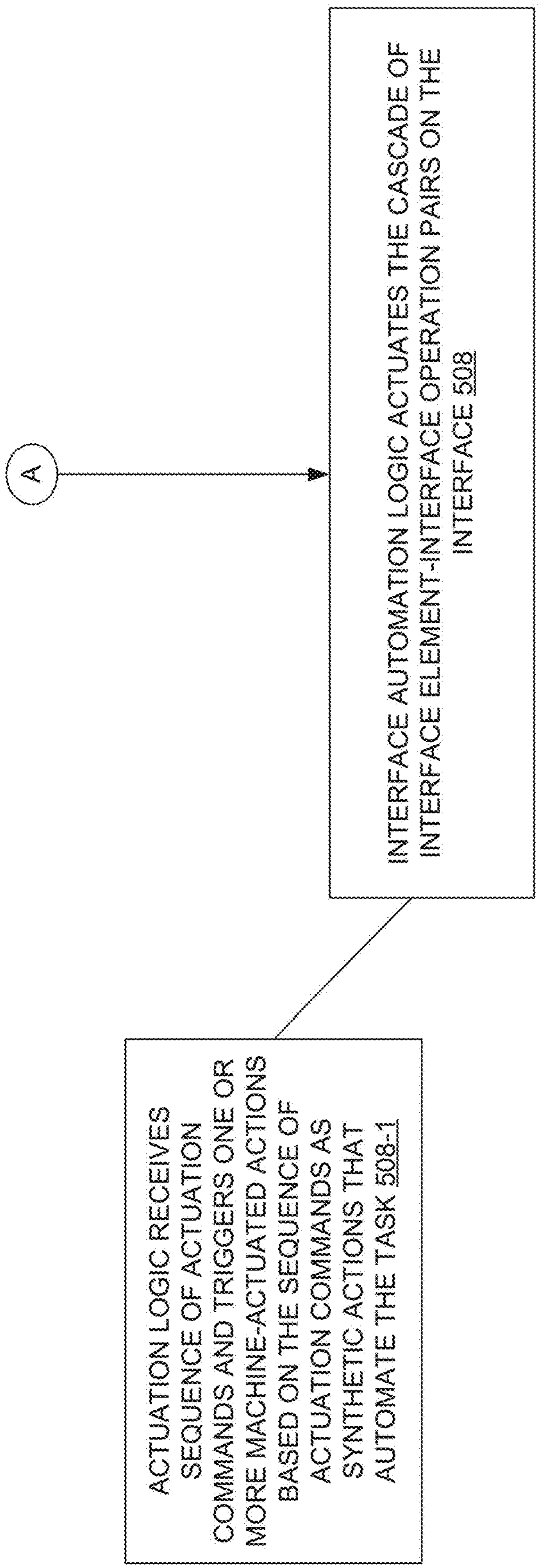

FIGS. 61A and 61B (collectively referred to as FIG. 61) show a flow diagram illustrating one example method of operation of the systems disclosed herein. The method shown in FIG. 61 comprises a method for interface automation, such as for automating long-horizon interface workflows.

At block 502, interface automation logic receives an agent specification that applies an agent function to a prompt to seek automation of a task on an interface.

As indicated by block 502-1, in some examples, the agent specification is constructable using various degrees of expressiveness. As indicated by block 502-2, in some examples, the agent specification is constructed using natural language commands. As indicated by block 502-3, in some examples, the agent specification is constructed using prescriptive commands. As indicated by block 502-4, in some examples, the agent specification is constructed using combination of the natural language commands and the prescriptive commands.

At block 504, interface automation logic captures a state of the interface.

As indicated by block 504-1, in some examples, the state of the interface includes at least one screenshot of the interface, a description of the task, and a history of previous cascades of interface-element-interface operation pairs.

At block 506, interface automation logic generates, based on the agent specification and the state, agent calls that cause an agent to translate the agent function into a cascade of interface element-interface operation pairs that terminates when the task is automated on the interface, wherein a particular interface element-interface operation pair in the cascade of interface element-interface operation pairs applies a particular interface operation on a particular interface element on the interface.

As indicated by block 506-1, in some examples, the interface operations in the cascade of interface element-interface operation pairs include a plurality of visual web tasks that the agent is trained to perform. As indicated by block 506-2, in some examples, the plurality of visual web tasks includes website-wise tasks, element-wise tasks, and action-wise tasks. As indicated by block 506-3, in some examples, the website-wise tasks include heading OCR, captioning, and WebQA (or VQA on website). As indicated by block 506-4, in some examples, the element-wise tasks include element OCR and element grounding. As indicated by block 506-5, in some examples, the action-wise tasks include action grounding and action prediction.

As indicated by block 506-6, in some examples, the agent locates elements on the interface based on processing a screenshot of the interface and a text description seeking coordinates of a particular element on the interface. As indicated by block 506-7, in some examples, the agent further answers questions about screenshots of websites and documents.

As indicated by block 506-8, in some examples, the agent outputs the cascade of interface element-interface operation pairs as a sequence of actuation commands. As indicated by block 506-9, in some examples, the agent operates in a virtual machine after user authentication into the virtual machine and takes a plurality of actions in the virtual machine without access to user credentials used for the user authentication.

At block 508, interface automation logic actuates the cascade of interface element-interface operation pairs on the interface.

As indicated by block 508-1, in some examples, actuation logic in communication with the interface automation logic, receives the sequence of actuation commands from the agent and triggers one or more machine-actuated actions based on the sequence of actuations commands as synthetic actions that automate the task.

Figure 62A:
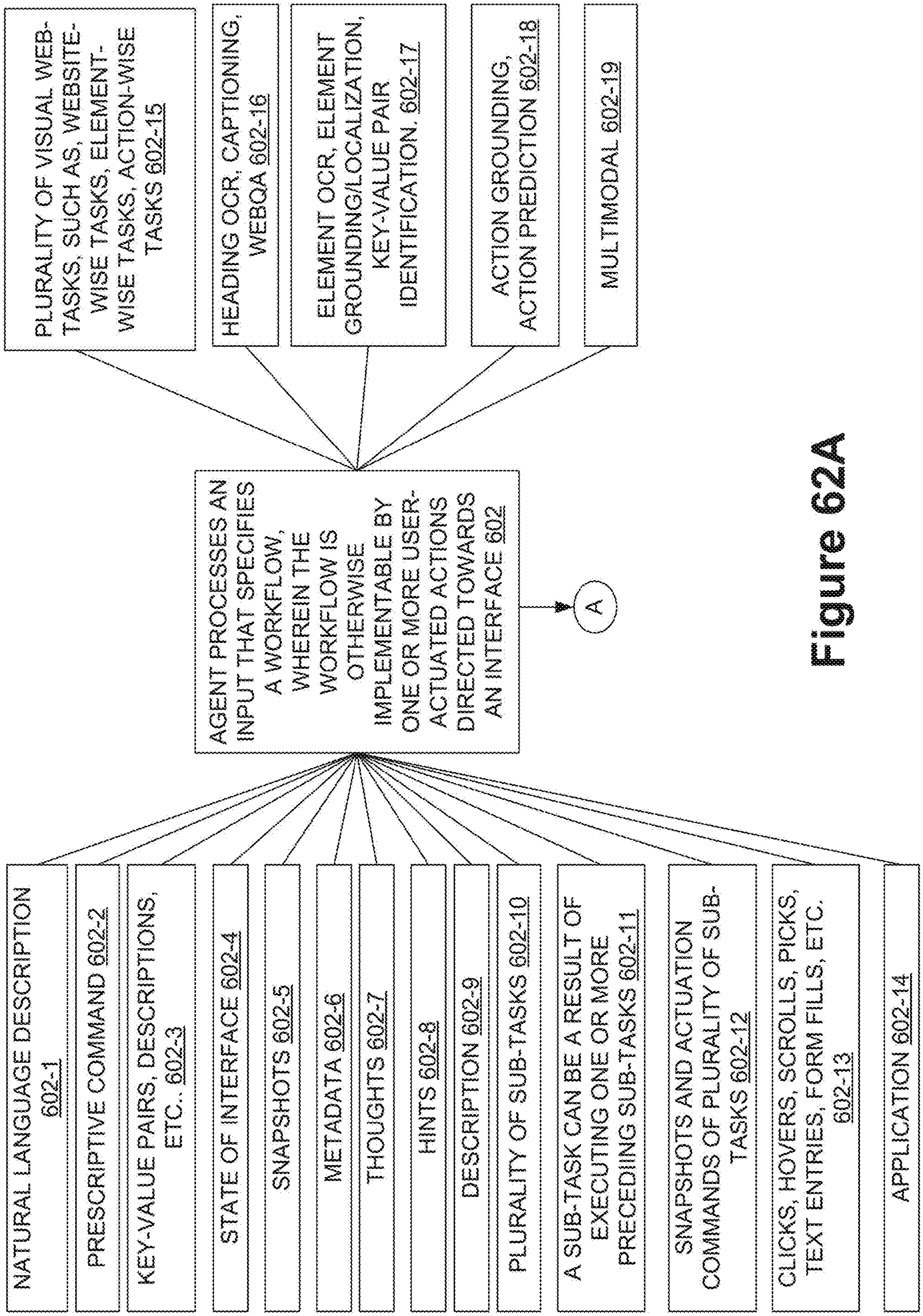
FIGS. 62A and 62B (collectively referred to as FIG. 62) show a flow diagram illustrating one example method for interface automation.
Figure 62B:
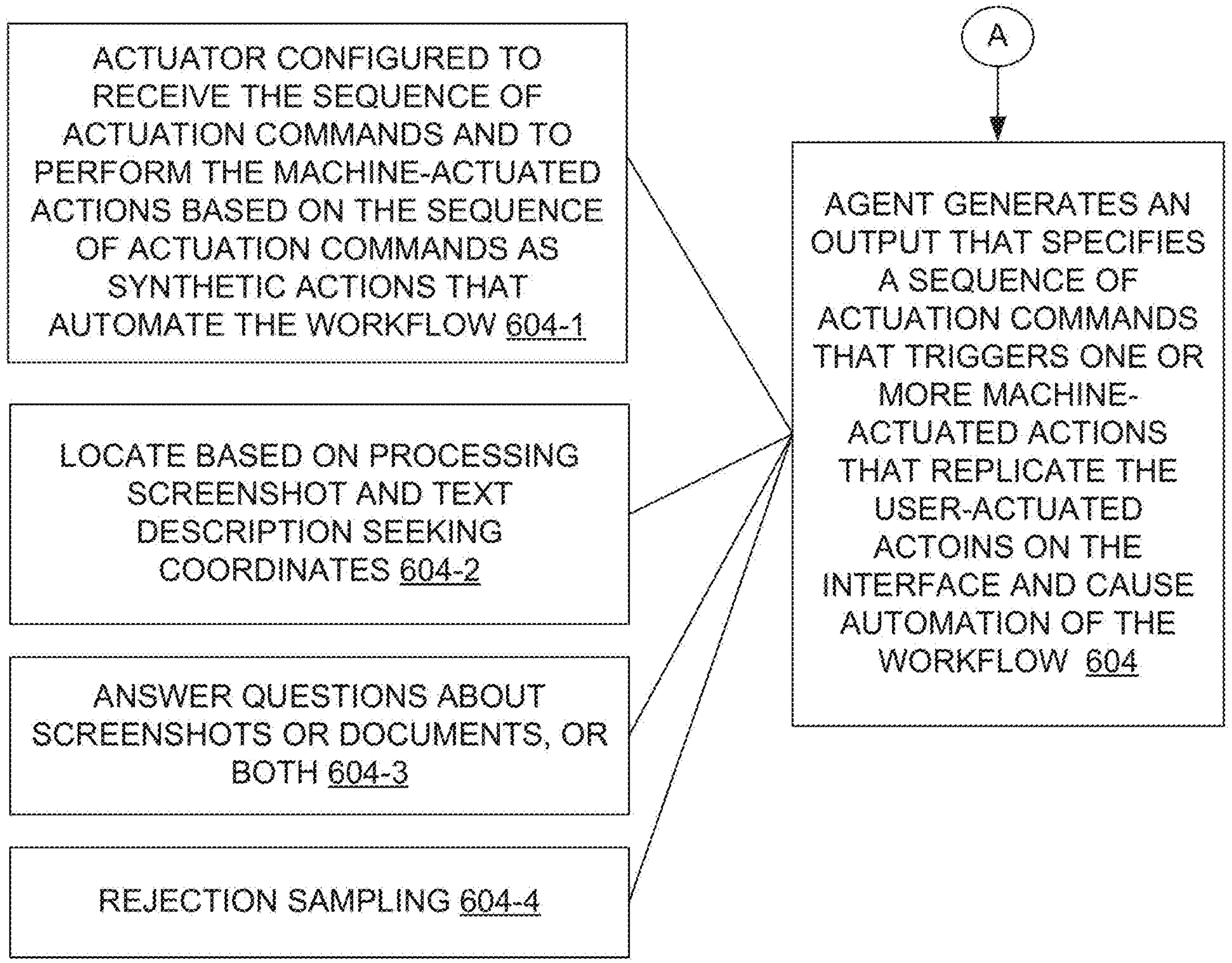

FIGS. 62A and 62B (collectively referred to as FIG. 62) show a flow diagram illustrating one example method of operation of the systems disclosed herein. The method shown in FIG. 62 comprises a method for interface automation.

At block 602 an agent (e.g., model(s), such as multimodal model(s)) processes an input that specifies a workflow (e.g., interface workflow), wherein the workflow is otherwise implementable by one or more user-actuated actions directed towards an interface.

As indicated by block 602-1, in some examples, the input is a natural language description of the workflow. As indicated by block 602-2, in some examples, the input is a prescriptive command (e.g., a tuple) that translates the interface workflow into one or more functions and one or more parameters. As indicated by block 602-3 in some examples, the parameters can be key-value pairs or can include descriptions of the functions, or both, as well as other items or information. As indicated by block 602-4, in some examples, the input includes a state of the interface prior to the execution of the workflow. As indicated by block 602-5, in some examples, the state of the interface prior to the execution of the workflow includes one or more snapshots of the interface. As indicated by block 602-6, in some examples, the state of the interface prior to the execution of the workflow includes metadata about the interface (e.g., variables, browser metadata). As indicated by block 602-7, in some examples, the state of the interface prior to the execution of the workflow includes one or more thoughts from the user that contextualize the state (e.g., "the page is not loading"). As indicated by block 602-8, in some examples, the state of the interface prior to the execution of the workflow includes one or more hints from the user that contextualize the workflow (e.g., "the page is not loading"). As indicated by block 602-9, in some examples, the state of the interface prior to the execution of the workflow includes a description of the workflow provided by the user.

As indicated by block 602-10, in some examples, the workflow includes a plurality of sub-tasks. As indicated by block 602-11, in some examples, one (e.g., a current) sub-task in the plurality of sub-tasks is a result of executing one or more preceding sub-tasks in the plurality of sub-tasks. As indicated by block 602-12, in some examples, the state of the interface prior to the execution of the one (e.g. current) sub-task includes one or more snapshots of the interface corresponding to the one (e.g., current) sub-task, one or more snapshots of the interface corresponding to the preceding sub-tasks, and one or more sequences of actuation commands corresponding to the preceding sub-task.

As indicated by block 602-13, in some examples, the user-actuated actions can include, but are not limited to, clicks, hovers, scrolls, picks, text entries, and form fills.

As indicated by block 602-14, in some examples, the interface is part of an application, such as a web application (e.g., a browser), a native application (e.g., desktop application), or another type of application.

As indicated by block 602-15, in some examples, the agent is trained to perform a plurality of visual web tasks, such as, but not limited to, website-wise tasks, element-wise tasks, and action-wise tasks. As indicated by block 602-16, in some examples, the website-wise task include heading OCR, captioning, and WebQA (or VQA on a website). As indicated by block 602-17, in some examples, the element-wise tasks include element-wise tasks include element OCR, element grounding/localization, and key-value pair identification. As indicated by block 602-18, in some examples, the action-wise tasks include action grounding and action prediction.

As indicated by block 602-19, in some examples, the workflow is a multimodal workflow (e.g., a multimodal interface workflow).

At block 604, the agent generates an output that specifies a sequence of actuation commands, where the sequence of actuation commands triggers one or more machine-actuated actions that replicate the user-actuated actions on the interface and cause automation of the workflow.

As indicated by block 604-1, in some examples, an actuator is configured to receive the sequence of actuation commands from the agent and to perform the machine-actuated actions based on the sequence of actuation commands as synthetic actions that automate the workflow.

As indicated by block 604-2, in some examples, the agent is configured to locate elements on the interface based on processing a screenshot of the interface and a text description seeking coordinates of a particular element on the interface. As indicated by block 604-3, in some examples, the agent is configured to answer questions about screenshots of websites and documents.

As indicated by block 604-4, in some examples, the agent is configured to use rejection sampling to output the sequence of actuation commands.

FIG. 164 is a block diagram showing an example system 3000 corresponding to the disclosed systems and methods. The system 3000, in one example, can be used to perform the method described in FIG. 62. The system 3000 is a system for interface automation. As shown, system 3000 includes agent 3002, and can include various other items and functionality 3099.

Agent 3002 is configured to process an input 3001. The input 3001 specifies an interface workflow. The interface workflow is otherwise implementable by one or more user-actuated actions 3052 directed towards an interface 3004 by a user 3050.

Agent 3002 is configured to generate output that species a sequence of actuation commands 3006. The sequence of actuation commands 3006 triggers one or more machine-actuated actions 3010 that replicate the user-actuated actions 3052 on the interface 3004 and cause automation of the interface workflow.

In some examples, the input 3001 is a natural language description of the interface workflow. In some examples, the input 3001 is a prescriptive command (e.g., a tuple) that translates the interface workflow into one or more functions and one or more parameters. In some examples, the parameters are key-value pairs. In some examples, the parameters include descriptions of the functions. In some examples, the input 3001 includes a state of the interface prior to execution of the interface workflow. In some examples, the state of the interface prior to execution of the interface workflow includes one or more snapshots of the interface 3004. In some examples, the state of the interface prior to execution of the interface workflow includes metadata about the interface (e.g., variables, browser metadata, etc.). In some examples, the state of the interface prior to execution of the interface workflow includes one or more thoughts from the user 3050 that contextualize the state (e.g., the page is not loading, etc.). In some examples, the state of the interface prior to execution of the interface workflow includes one or more hints from the user that contextualize the interface workflow (e.g., the page is not loading, etc.). In some examples, the state of the interface prior to execution of the interface workflow includes a description of the interface workflow provided by the user 3050. In some examples, the interface workflow includes a plurality of sub-tasks. In some examples, a current sub-task in the plurality of sub-tasks is a result of executing one or more preceding sub-tasks in the plurality of sub-tasks. In some examples, the state of the interface prior to execution of the interface workflow includes one or more snapshots of the interface 3004 corresponding to the current sub-task, one or more snapshots of the interface 3004 corresponding to the preceding sub-tasks, and one or more sequences of actuation commands 3006 corresponding to the preceding sub-tasks.

In some examples, an actuator 3008 is configured to receive the sequence of actuation commands 3006 from the agent 3002. The actuator 3008 is configured to perform the machine-actuated actions 3010 based on the sequence of actuation commands 3006 as synthetic actions that automate the interface workflow.

In some examples, the user-actuated actions 3052 include clicks, hovers, scrolls, picks, text entries, and form fills.

In some examples, the interface 3004 is part of an application. In some examples, the application is a web application (e.g., a browser). In some examples, the application is a native application (e.g., a desktop application).

In some example, the agent 3002 is configured to use rejection sampling to output the sequence of actuation commands 3006. In some examples, the agent 3002 is configured to be trained to perform a plurality of visual web tasks. In some examples, the plurality of visual web tasks includes website-wise tasks, element-wise tasks, and action-wise tasks. In some examples, the website-wise tasks include heading optical character recognition (OCR), captioning, and web question answering (WebQA). In some examples, the element-wise tasks include element optical character recognition (OCR), element grounding/localization, and key-value pair identification. In some examples, the action-wise tasks include action grounding and action prediction.

In some examples, the agent 3002 is configured to locate elements on the interface 3004 based on processing a screenshot of the interface and a text description seeking coordinates of a particular element on the interface. In some examples, the agent 3002 is configured to answer questions about screenshots of websites and documents.

In some examples, the interface workflow is a multimodal interface workflow.

FIG. 165 is a block diagram showing an example system 3100 corresponding to the disclosed systems and methods. The system 3100, in one example, can be used to perform the method described in FIG. 60. The system 3100 is a system for interface automation. As shown, system 3100 includes agent 3102, and can include various other items and functionality 3199.

Agent 3102 is configured to automate a sequence of interface workflows.

Agent 3102 is configured to receive, for a first interface workflow in the sequence of interface workflows 3101, a screenshot of a first interface 3104 and a first interface workflow definition. The first interface 3104 has a first set of interface elements that, when configured with a first configuration, execute the first interface workflow.

Agent 3102 is configured to configured to process the screenshot of the first interface 3104 and the first interface workflow definition, and, in response, generate a first sequence of actuation commands 3106 that automatically configures the first set of interface elements with the first configuration and causes execution of the first interface workflow.

Agent 3102 is configured to receive, for a second interface workflow in the sequence of interface workflows, a screenshot of a second interface 3105, a second interface workflow definition, the screenshot of the first interface 3104, and the first sequence of actuation commands 3106, wherein the second interface 3105 has a second set of interface elements that when configured with a second configuration execute the second interface workflow.

Agent 3102 is configured to process the screenshot of the second interface 3105, the second interface workflow definition, the screenshot of the first interface 3104, and the first sequence of actuation commands 3106, and, in response, generate a second sequence of actuation commands 3108 that automatically configures the second set of interface elements with the second configuration and causes execution of the second interface workflow.

Actuator 3110 is configured to receive the first sequence of actuation commands 3106 and second sequence of actuation commands 3108 from the agent 3102, and to execute the first sequence of actuation commands 3106 and the second sequence of actuation commands 3108 as synthetic actions 3112 that automate the first and second interface workflows.

Actuator 3110 is configured to send the screenshot of the first interface 3104 and the screenshot of the second interface 3105 to the agent 3102.

In some examples, the first interface workflow definition is a natural language description of the first interface workflow. In some examples, the second interface workflow definition is a natural language description of the second interface workflow.

In some examples, the first interface workflow definition is a first tuple that translates the first interface workflow into a first set of functions and a first set of parameters. In some examples, the second interface workflow definition is a second tuple that translates the second interface workflow into a second set of functions and a second set of parameters. In some examples, the first set of parameters are key-value pairs. In some examples, the second set of parameters are key-value pairs. In some examples, the first set of parameters include descriptions of the first set of functions. In some examples, the second set of parameters include descriptions of the second set of functions.

FIG. 166 is a block diagram showing an example system 3200 corresponding to the disclosed systems and methods. The system 3200, in one example, can be used to perform the method described in FIG. 61. The system 3200 is operable to automate long-horizon interface workflows. As shown, system 3200 includes interface automation logic 3202, and can include various other items and functionality 3299.

Interface automation logic 3202 is configured to receive an agent specification 3204 that applies an agent function 3205 to a prompt 3206 to seek automation of a task on an interface 3208.

Interface automation logic 3202 is configured to capture a state of the interface 3210.

Interface automation logic 3202 is configured to generate agent calls 3212 based on the agent specification 3204. The agent calls 3212 cause an agent 3214 to translate the agent function 3205 into a cascade of interface element-interface operation pairs 3216 that terminates when the task is automated on the interface 3208. A particular interface element-interface operation pair in the cascade of interface element-interface operation pairs 3216 applies a particular interface operation on a particular interface element of the interface 3208.

Interface automation logic 3202 is configured to actuate the cascade of interface element-interface operation pairs 3216 on the interface 3208.

In some examples, interface operations in the cascade of interface element-interface operation pairs 3216 include a plurality of visual web tasks that the agent 3214 is trained to perform. In some examples, the plurality of visual web tasks includes website-wise tasks, element-wise tasks, and action-wise tasks. In some examples, the website-wise tasks include heading optical character recognition (OCR), captioning, and web question answering (WebQA). In some examples, the element-wise tasks include element optical character recognition (OCR) and element grounding. In some examples, the action-wise tasks include action grounding and action prediction.

In some examples, the agent 3214 is configured to locate elements on the interface 3208 based on processing a screenshot of the interface 3208 and a text description seeking coordinates of a particular element on the interface. In some examples, the agent 3214 is configured to answer questions about screenshots of websites and documents.

In some examples, the state 3210 includes at least one screenshot of the interface 3208, a description of the task, and a history of previous cascades of interface element-interface operation pairs. In some examples, the agent 3214 is configured to output the cascade of interface element-interface operation pairs as a sequence of actuation commands 3218.

In some examples, actuation logic 3220 is in communication with the interface automation logic 3202. The actuation logic 3220 is configured to receive the sequence of actuation commands 3218 from the agent 3214, and to trigger one or more machine-actuated actions 3222 based on the sequence of actuation commands 3218 as synthetic actions that automate the task.

In some examples, the agent specification 3204 is constructed using natural language commands. In some examples, the agent specification 3204 is constructed using prescriptive commands. In some examples, the agent specification 3204 is constructed using a combination of the natural language commands and the prescriptive commands.

In some examples, the agent calls 3212 are multimodal agent calls.

In some examples, the agent 3214 is configured to operate in a virtual machine after user authentication into the virtual machine and to take a plurality of actions in the virtual machine without access to user credentials used for the user authentication.

Adept Workflow Language (AWL)—Custom Domain-Specific Language (DSL)

Figure 63:
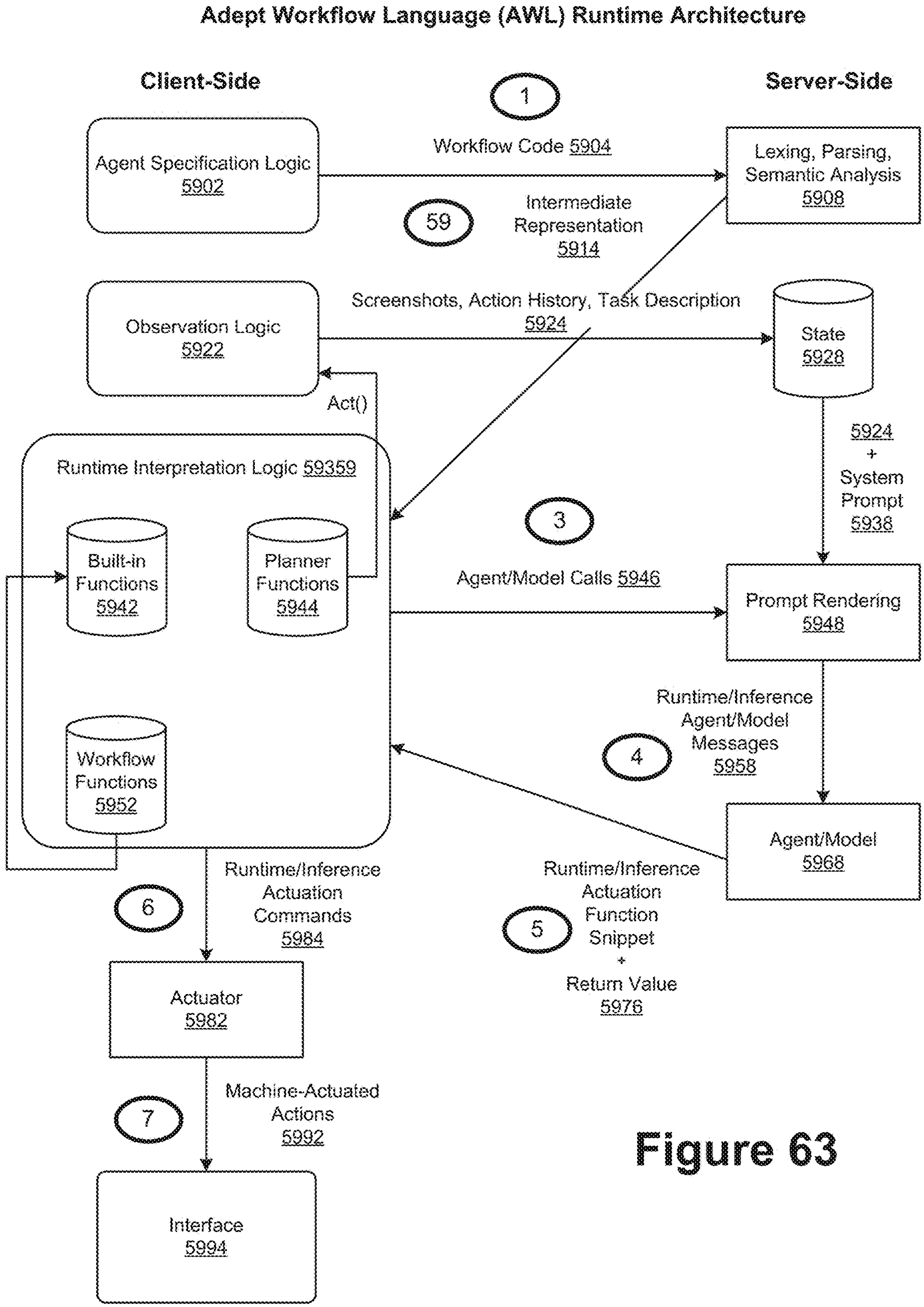
FIG. 63 is a block diagram illustrating one example of a system performing an operation to implement interface automation language at runtime.

FIG. 63 is a block diagram illustrating one example of a system performing an operation to implement interface automation language at runtime.

As can be seen, agent specification logic 5902, operating on the client-side, constructs a workflow code 5904 (e.g., agent specification) that is made available for server-side translation (e.g. lexing, parsing, semantic analysis 5908) into an intermediate representation 5914. The workflow code 5904 (e.g., agent specification) is configured to automate a workflow (e.g., a multimodal interface workflow).

Runtime interpretation logic 5935 obtains the intermediate representation 5914, detects one or more agent functions (e.g., built-in functions 5942, planner functions 5944, workflow functions 5952) in the intermediate representation 5914. Built-in functions can include answerQuestionAboutScreen, goToURL, typeIntoElement, click, type, wait, goToSong, compose, answerTrueFalseQuestionAboutScreen, composeAndType, getCurrentDate, isVisible, keydown, print, scroll, and spotlight. Planner functions can include act, fillform, and pickdate.

Runtime interpretation logic 5935 generates an agent (model) call 5946 based on the one or more agent functions and provides the call 5946 to the agent (model) 5968. In response, runtime interpretation logic 5935 receives at least one runtime/inference actuation function and return value 5976. The return value can specify whether the workflow has concluded.

Runtime interpretation logic 5935 translates the function 5976 into at least one runtime/inference actuation command 5984 which is provided to an actuator 5982 to trigger at least one machine-actuated action 5992 to automate a workflow (e.g., a multimodal interface workflow) on an interface 5994. In some examples, the at least one machine-actuated action 5992 is runtime synthetic action.

In some examples, runtime interpretation logic 5935 invokes observation logic 5922 in response to detecting an agent function (e.g., planner function 5944, such as act planner function). Observation logic 5922 is operable to send one or more interface screenshots, action history, and task descriptions 5924, as a state 5928, to the agent (model) 5968. The interface screenshots can include a current screenshot and one or more previous screenshots. The action history can include a current runtime actuation command and one or more previous runtime actuation commands. The task description can include a description of the workflow (e.g., multimodal interface workflow).

In some examples, prompt rendering logic 5948 is operable to send the screenshots, action history, and task description 5924 and a system prompt 5938 as a runtime/inference agent (or model) message 5958.

Figure 64:
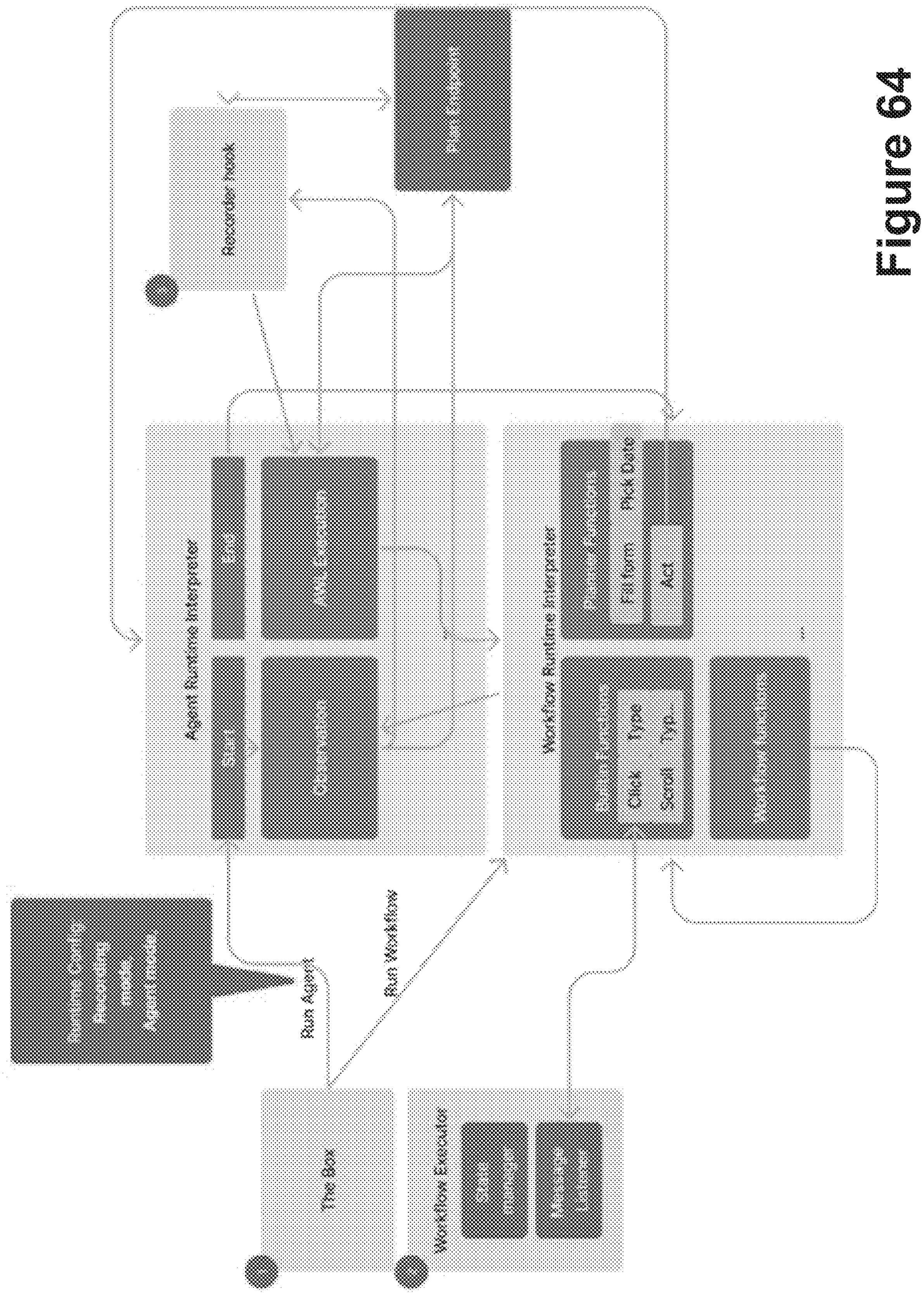
FIG. 64 is a pictorial illustration showing one example of a system architecture corresponding to the disclosed systems and methods.

FIG. 64 is a pictorial illustration showing an example system architecture corresponding to the disclosed systems and methods.

Figure 65:
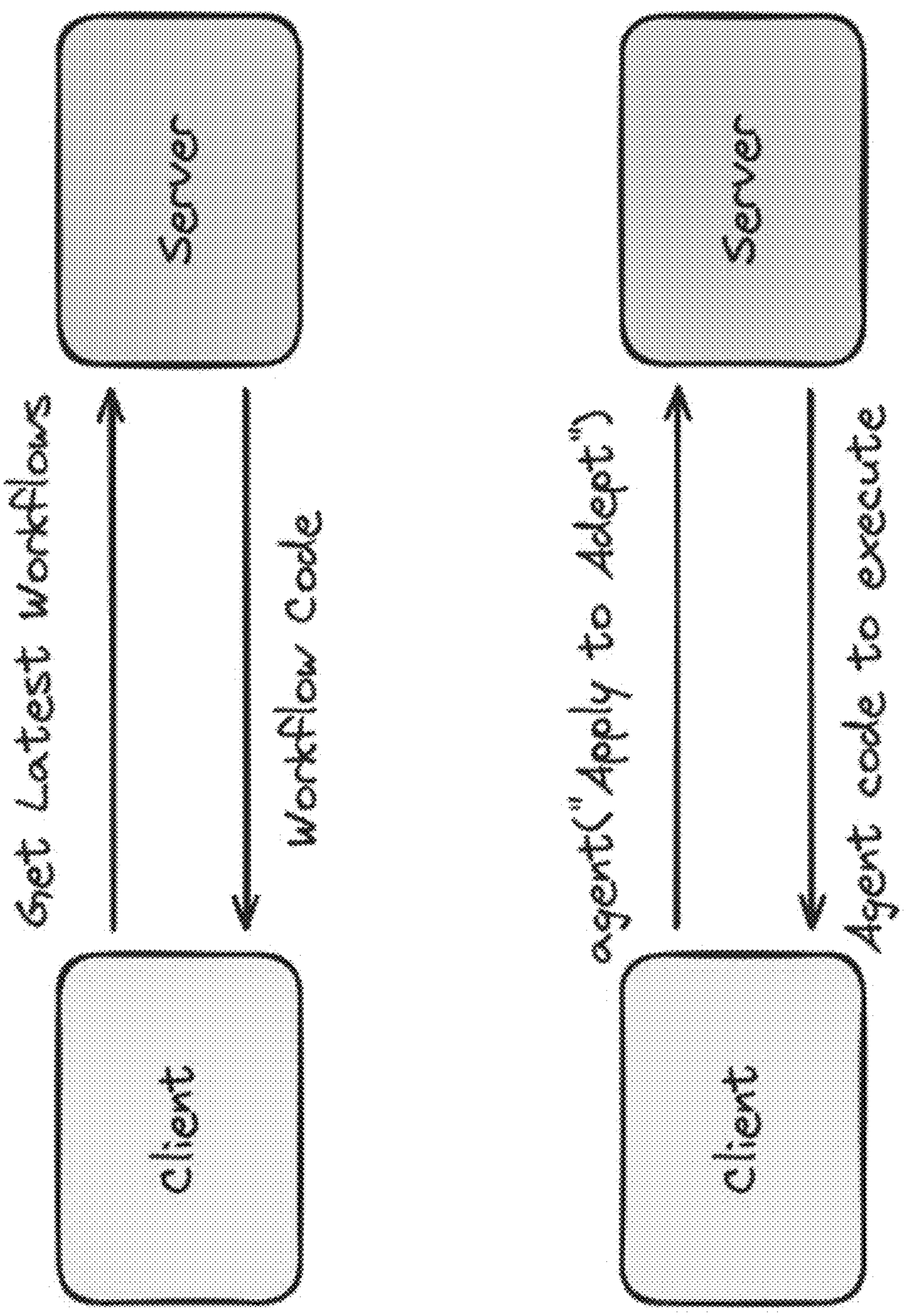
FIG. 65 is a pictorial illustration showing example interaction between a client-side and server-side corresponding to the disclosed systems and methods.

FIG. 65 is a pictorial illustration showing example interaction between a client-side and server-side corresponding to the disclosed systems and methods. As shown (top), the client-side requests to "get latest workflows" and, in response, receives "workflow code". As shown (bottom), the client-side requests "agent('Apply to Adept')" and, in response, receives "agent code to execute."

Figure 66A:
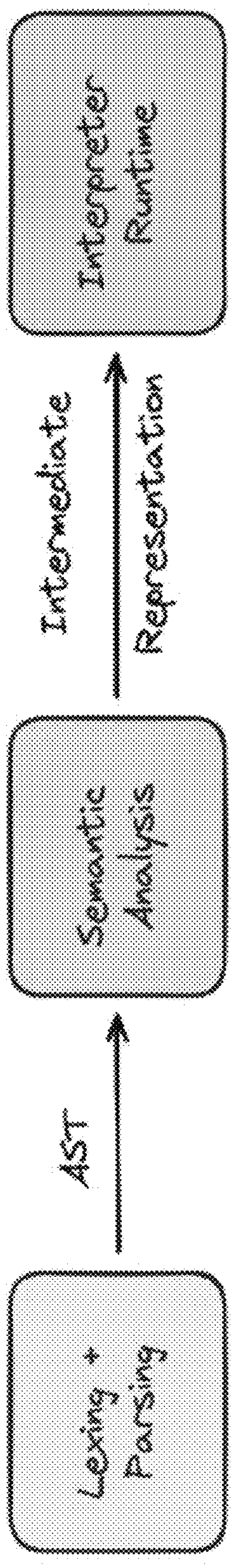
FIGS. 66A and 66B show examples of server-side translation of code into intermediate representations.
Figure 66B:
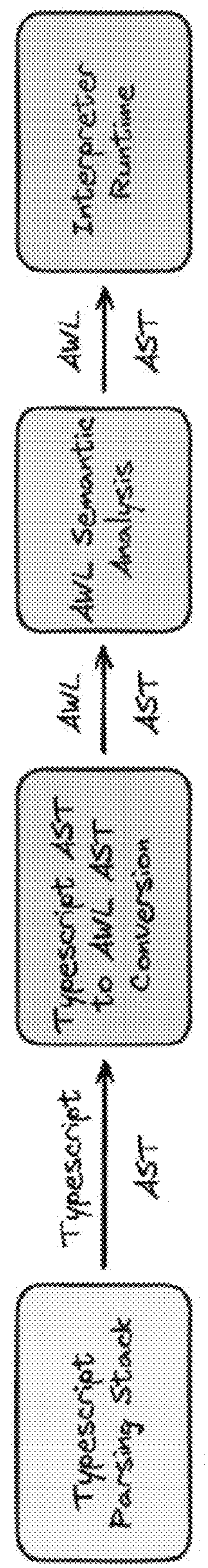

FIGS. 66A and 66B show examples of server-side translation of code (workflow code) into intermediate representations. As shown in FIG. 66A, code goes through lexing and parsing to output a representation of the code (e.g., Abstract Syntax Tree (AST)) which is then undergoes semantic analysis to output the intermediate representation which is provided to a runtime interpreter (e.g., logic 5935). As shown in FIG. 66B, code goes through a typescript parsing stack to output a typescript representation of the cod (e.g., Typescript AST) which is then undergoes a conversion to be converted from the Typescript AST to a DSL AST of the DSL disclosed herein and is output as a DSL AST. The DSL AST then undergoes semantic analysis and is output, as intermediate representation which is provided to a runtime interpreter (e.g., logic 5935).

Figure 67:
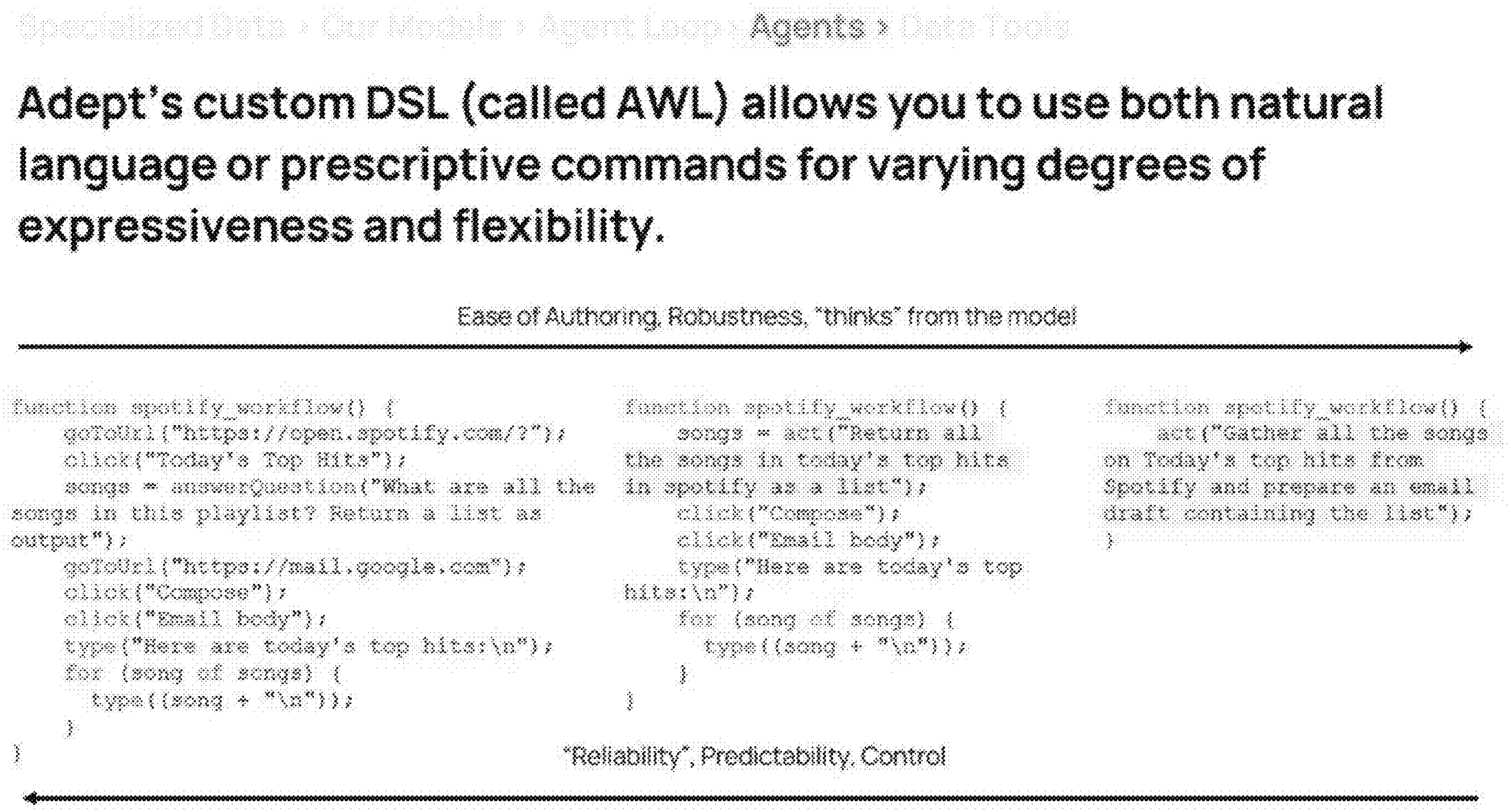
FIG. 67 is a pictorial illustration showing examples of the DSL of the disclosed systems and methods.

FIG. 67 is a pictorial illustration showing examples of the DSL of the disclosed systems and methods. As shown, the disclosed DSL allows varying degrees of expressiveness and flexibility including allowing use of both natural language and prescriptive commands.

FIG. 68 is a pictorial illustration showing examples of a workflow runtime corresponding to the disclosed systems and methods.

FIG. 69 is a pictorial illustration showing examples of a workflow runtime corresponding to the disclosed systems and methods.

FIG. 70 is a pictorial illustration showing an example operation of the disclosed systems and methods. FIG. 70 shows, among other things, generation of a system prompt (e.g. 5938) including other items of information (e.g., 5924).

FIG. 71 is a pictorial illustration showing examples of workflow code and machine actions. As illustrated in FIG. 71, workflow code (e.g., actuation commands) are provided as input (e.g., to an actuator) and automated machine-actuated actions are triggered causing interaction with an interface.

Figure 72:
FIG. 72 is a pictorial illustration showing examples of an agent function.

FIG. 72 is a pictorial illustration showing examples of an agent function. The illustrated example shows one example of a built-in function (click). As can be seen, the disclosed systems and methods utilize a virtual mouse to interact with (click) on the UI.

FIGS. 73A and 73B are pictorial illustrations showing examples of workflows corresponding to the disclosed systems and methods. FIG. 73A shows an example of a workflow to conduct a search, such as a search for images (e.g., cat images). FIG. 73B shows an example of a workflow to find financial statements for public companies.

FIG. 74 is a pictorial illustration showing an example workflow corresponding to the disclosed systems and methods. FIG. 74 shows an example workflow corresponding to a webplayer that causes adds songs from an artists to a queue.

FIG. 75 is a pictorial illustration showing an example of agent functions. The example shown in FIG. 75 shows, among other things, an example of a built-in function ("answerQeustionAboutScreen").

FIG. 76 is a pictorial illustration showing examples of agent functions. The illustrated example shows, among other things, examples of built-in functions ("click", "answerTrueFalseQuestionAboutScreen", "compose", "composeandType").

FIG. 77 is a pictorial illustration showing examples of agent functions. The illustrated examples show, among other things, examples of built-in functions ("getCurrentDate", "goToUrl", "isVisible", "keydown").

FIG. 78 is a pictorial illustration showing examples of agent functions. The illustrated examples show, among other things, examples of built-in functions ("print", "scroll", "spotlight", "type", "typeIntoElement", "wait").

FIGS. 79 and 80 are pictorial illustrations showing an AST of the language as an Extended Backus-Naur Form (ENBF) grammar that captures the constructs available in the workflow language (DSL) corresponding to the disclosed systems and methods.

FIGS. 81A and 81B are pictorial illustrations showing example workflows corresponding to the disclosed systems and methods. FIG. 81A shows a workflow to conduct a search. FIG. 81B shows a workflow to draft and send an email.

FIG. 82 is a pictorial illustration showing an example workflow corresponding to the disclosed systems and methods. The illustrated example shows a workflow to draft and send an email.

FIG. 83 is a pictorial illustration showing an example workflow corresponding to the disclosed systems and methods. The illustrated example shows a workflow to create a sales lead.

Figure 84:
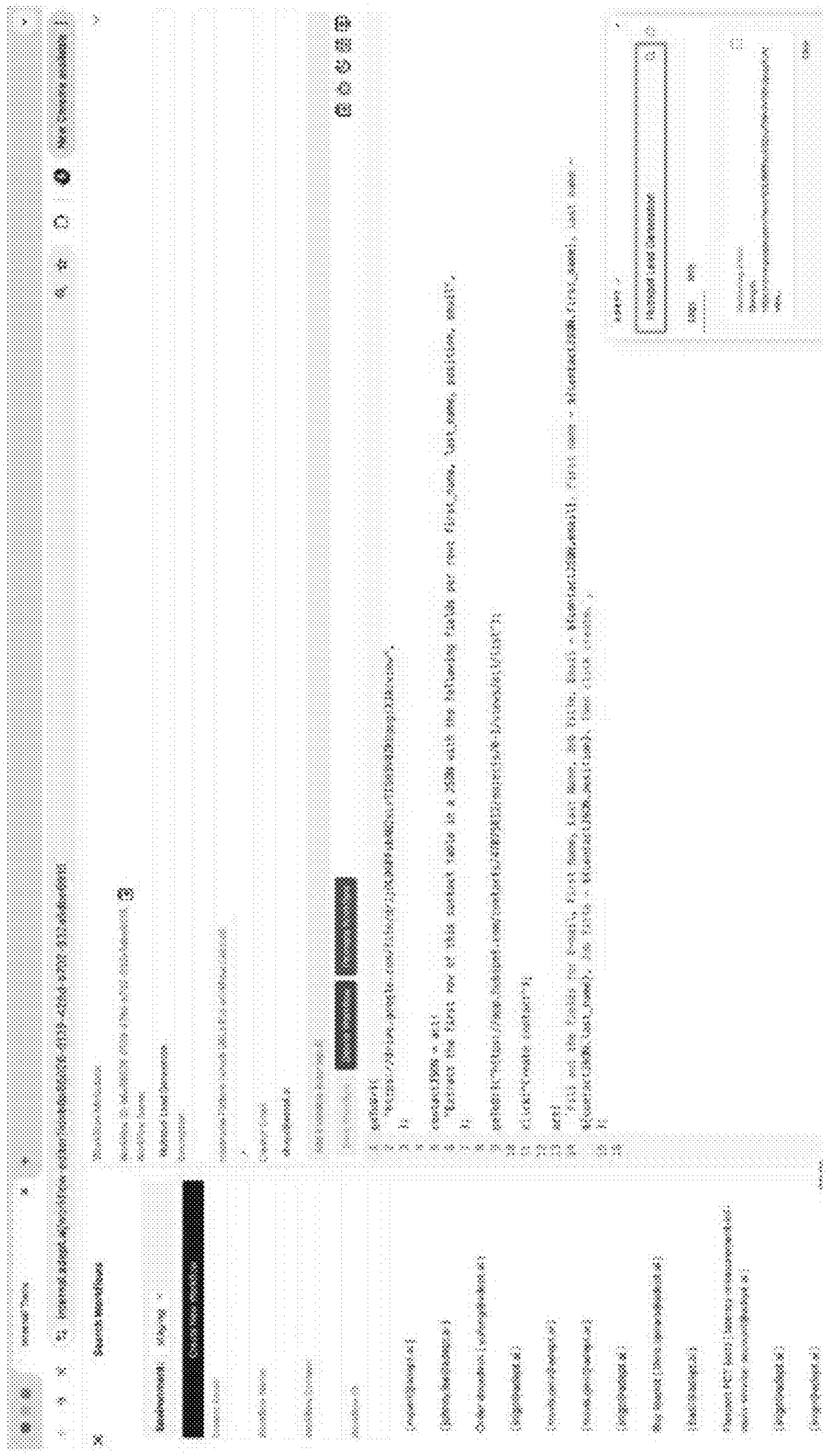
FIG. 84 is a pictorial illustration showing an example of the disclosed systems and methods executing the workflow shown in FIG. 83.

FIG. 84 is a pictorial illustration showing an example of the disclosed systems and methods executing the workflow shown in FIG. 83.

Figure 85:
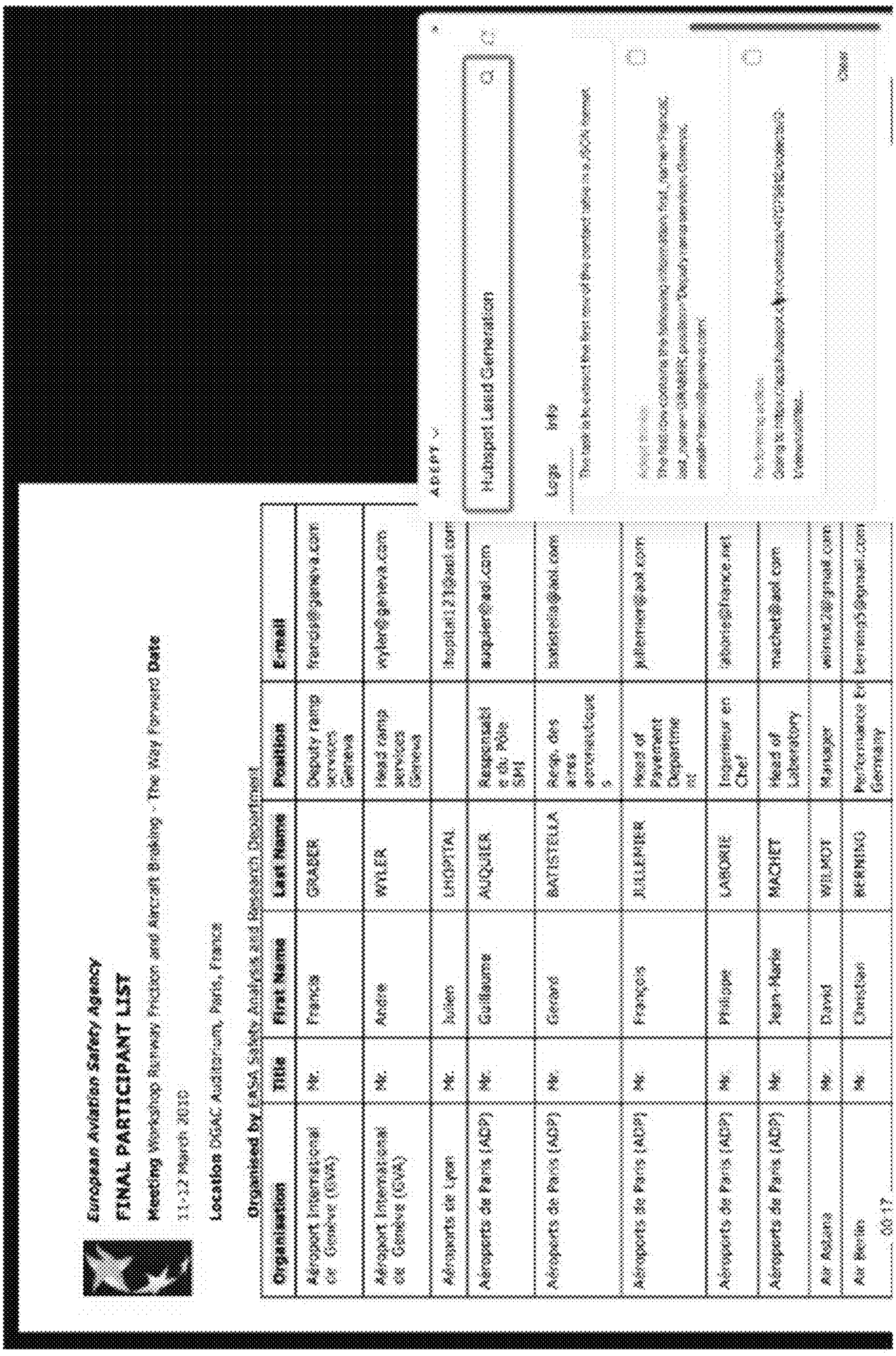
FIG. 85 is a pictorial illustration showing an example of the disclosed systems and methods executing a workflow.

FIG. 85 is a pictorial illustration showing an example of the disclosed systems and methods executing a workflow. The illustrated example shows a workflow to extract information from a table.

Figure 86:
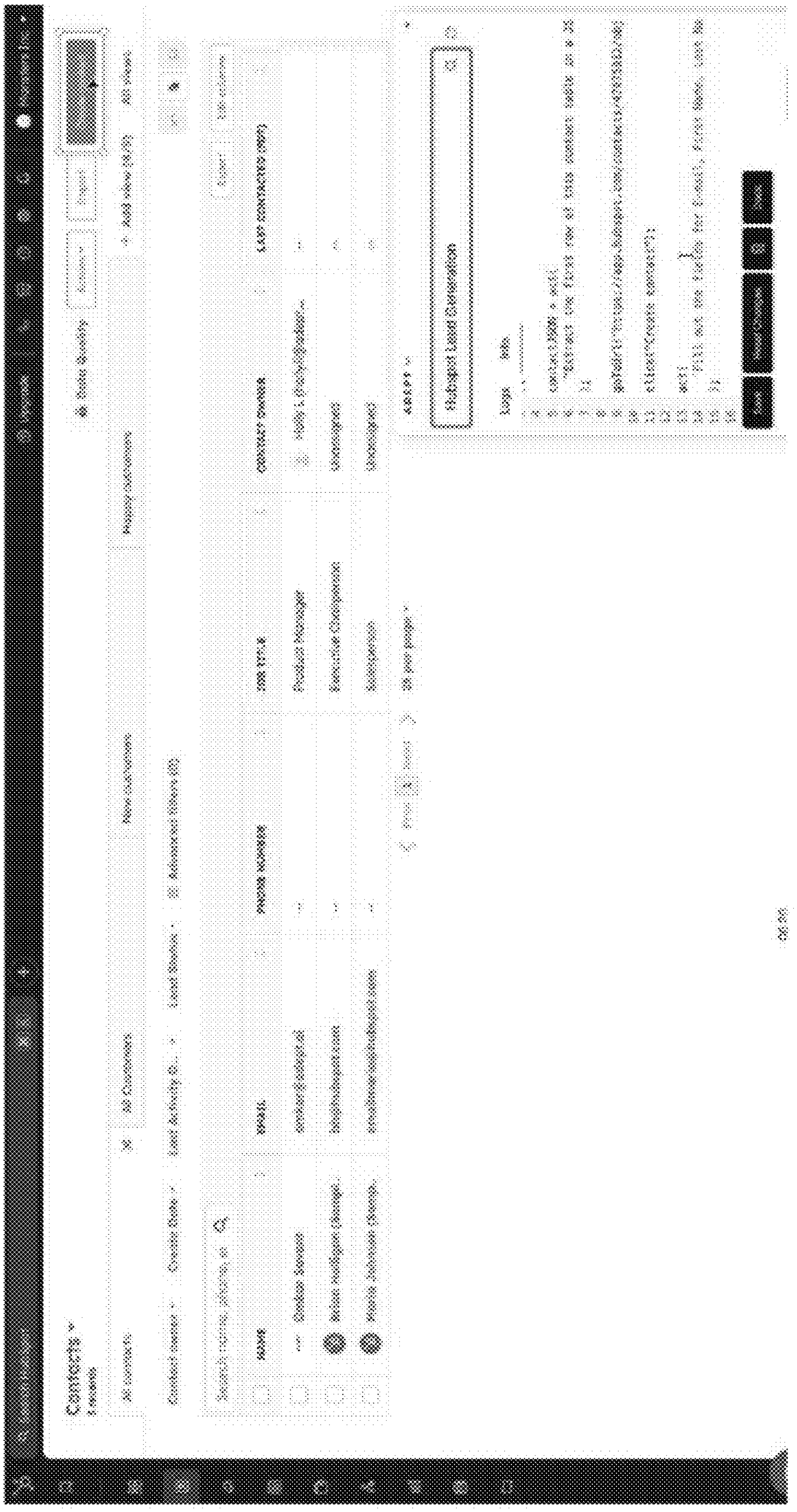
FIGS. 86, 87, and 88 are pictorial illustrations showing an example of the disclosed systems and methods executing a workflow.
Figure 87:
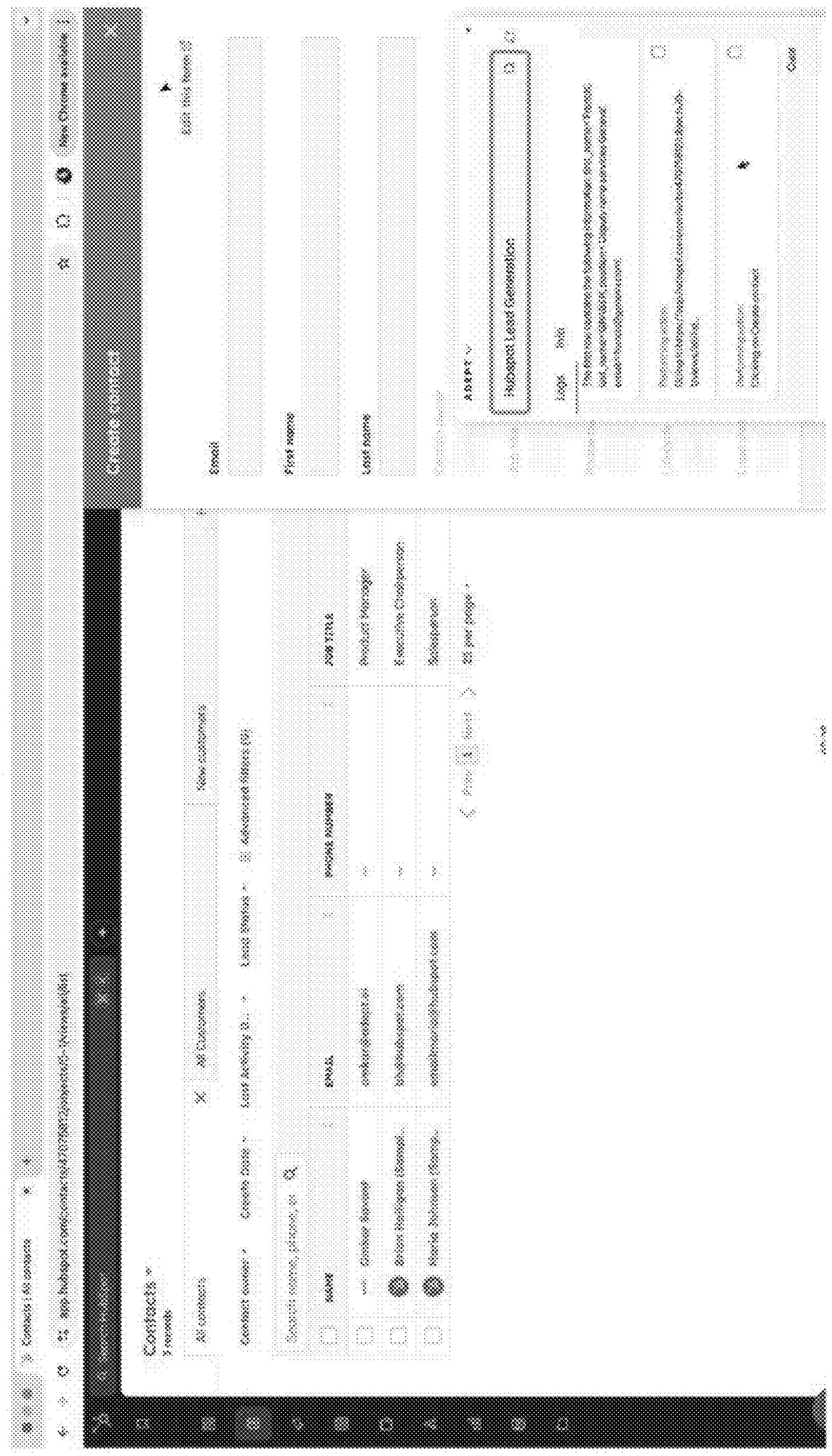
Figure 88:
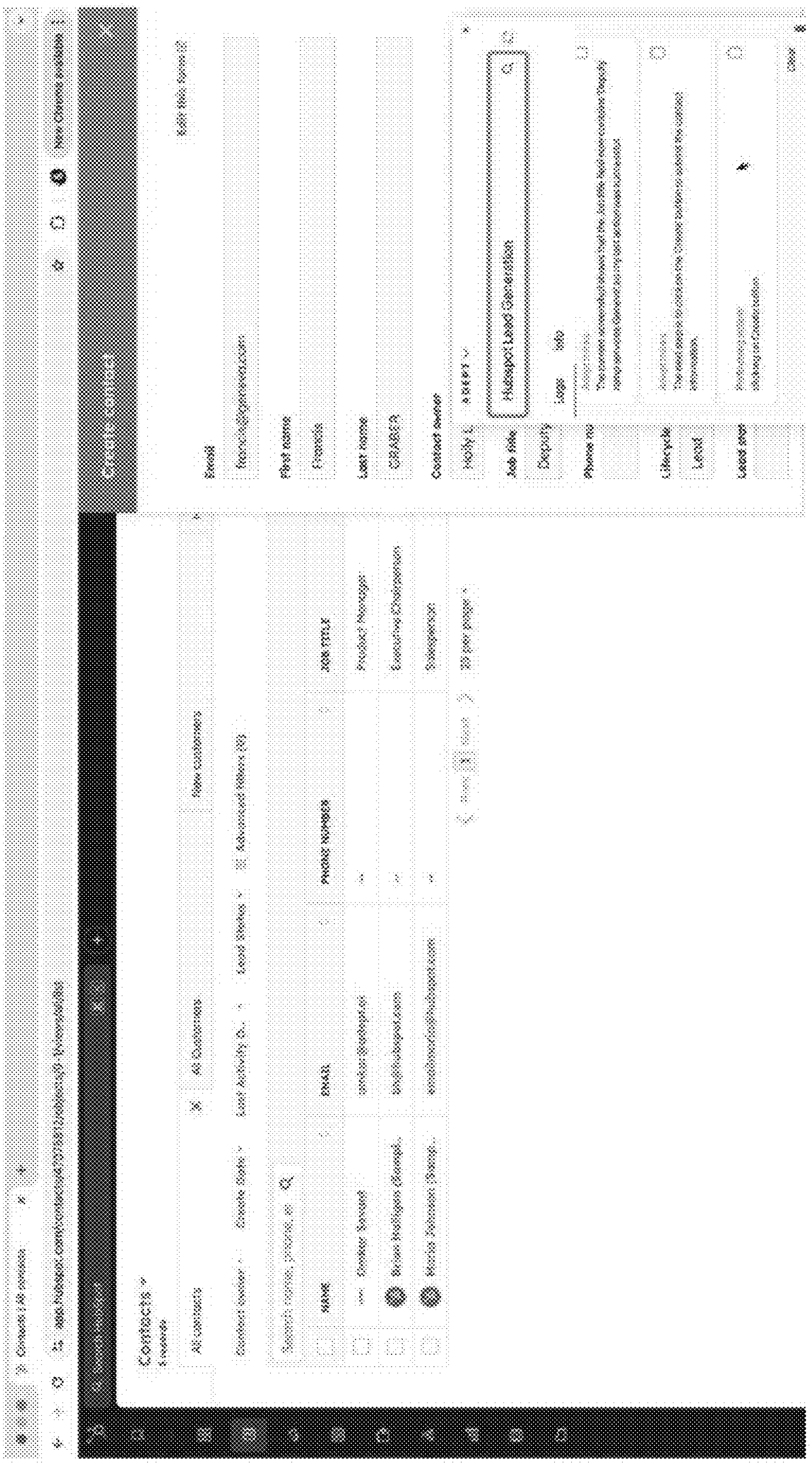

FIGS. 86, 87, and 88 are pictorial illustrations showing an example of the disclosed systems and methods executing a workflow. The illustrated example shows a workflow to create a sales lead.

FIG. 89 is a pictorial illustration showing an example of a dashboard of the disclosed systems and methods. The illustrated dashboard allows for breaking down a long-horizon workflow by turning each step of the workflow into a column.

FIG. 90 is a pictorial illustration showing examples of UI understanding tasks used in training corresponding to the disclosed systems and methods.

FIG. 91 is a pictorial illustration showing example of task execution and assessment corresponding to the disclosed systems and methods. The illustrated example shows an example of the disclosed systems and methods executing a locate task.

FIG. 92 is a pictorial illustration showing example of task execution and assessment corresponding to the disclosed systems and methods. The illustrated example shows an example of the disclosed systems and methods executing a Web VQA task.

Figure 93:
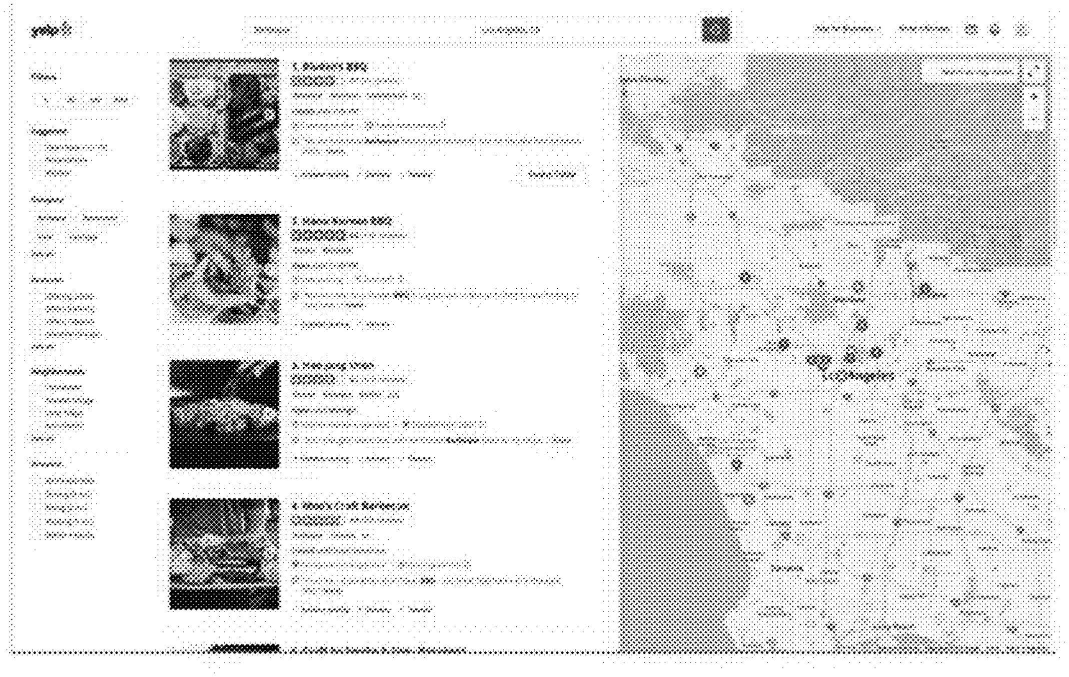
FIGS. 93 and 94 are pictorial illustrations showing examples of the disclosed systems and methods executing Web VQA.
Figure 94:

FIGS. 93 and 94 are pictorial illustrations showing examples of the disclosed systems and methods executing Web VQA.

Figure 95:
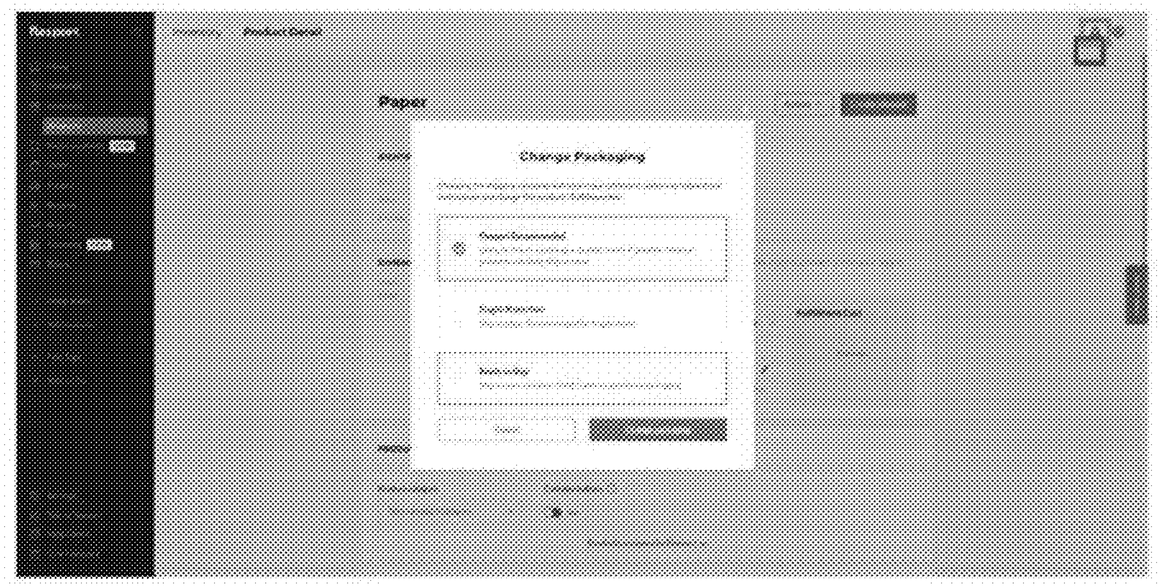
FIG. 95 is a pictorial illustration showing an example of the disclosed systems and methods executing localization.

FIG. 95 is a pictorial illustration showing an example of the disclosed systems and methods executing localization.

FIG. 96 is a pictorial illustration showing reliability scores corresponding to the disclosed systems and methods across different multimodal benchmarks.

Figure 97:
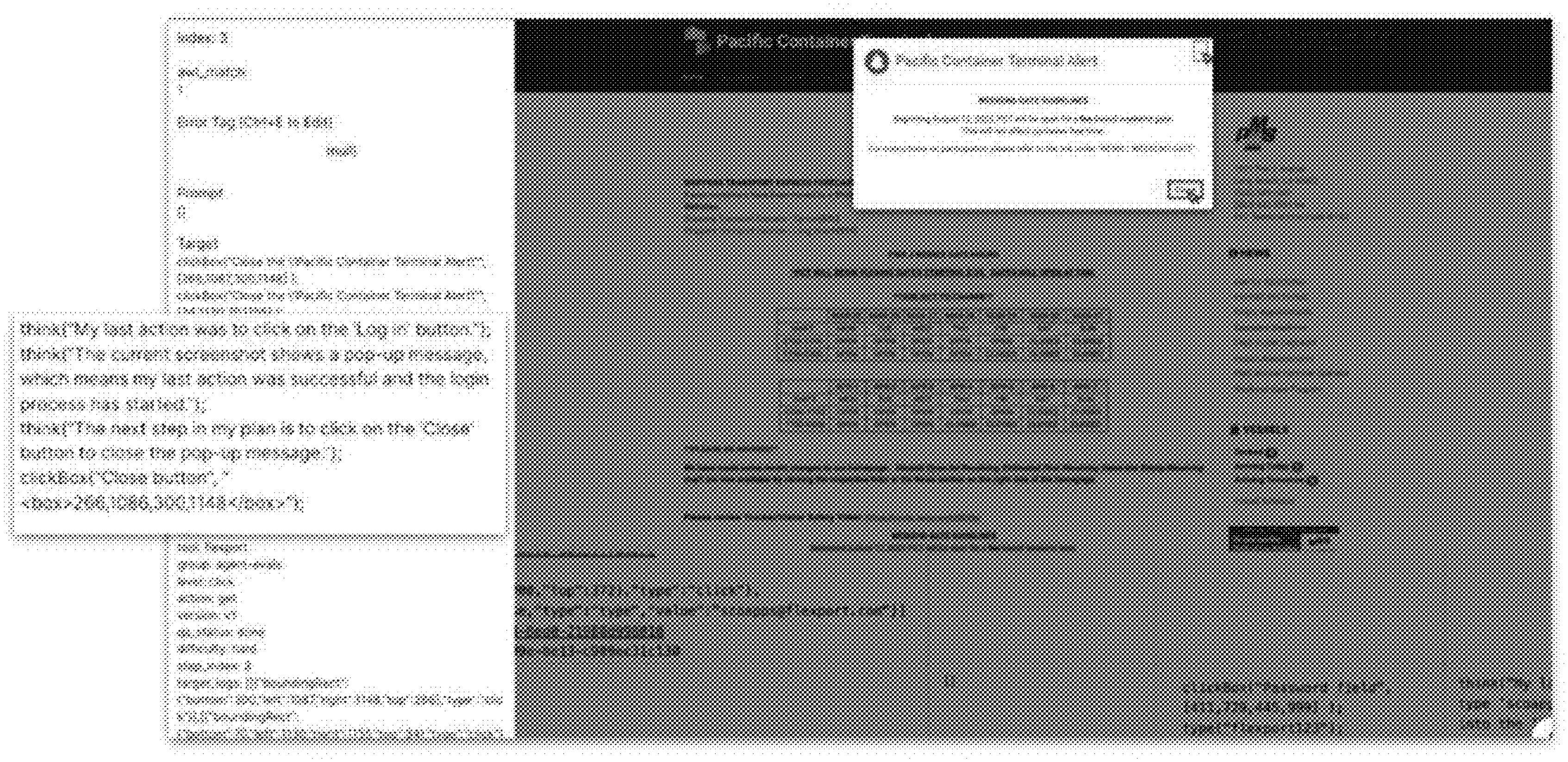
FIG. 97 is a pictorial illustration shown an operation of the disclosed systems and methods.

FIG. 97 is a pictorial illustration shown an operation of the disclosed systems and methods. The illustrated example shows the disclosed systems and methods handling an unexpected situation (e.g., a pop-up).

Figure 98:
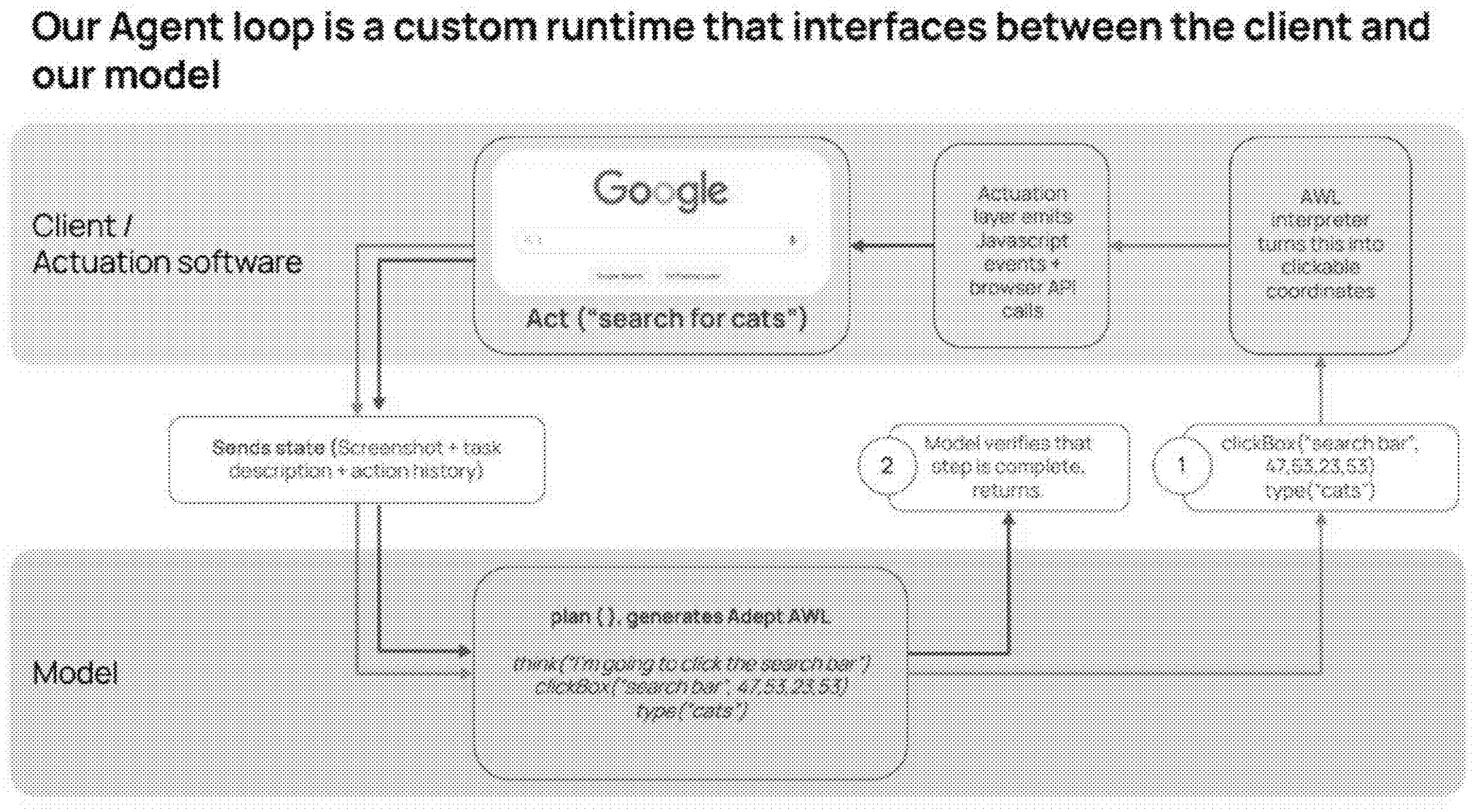
FIG. 98 is a pictorial illustration showing an agent loop (e.g., custom runtime (custom workflow runtime)) corresponding to the disclosed systems and methods.

FIG. 98 is a pictorial illustration showing an agent loop (e.g., custom runtime (custom workflow runtime)) corresponding to the disclosed systems and methods. As shown the agent (model) receives, an input, screenshot of a UI, a task description, and action history and generates, as an output, actuation commands ("clickBox . . . ") that are provided to an interpreter and actuation layer (e.g., actuator) and trigger machine-actuated actions.

Figure 99:
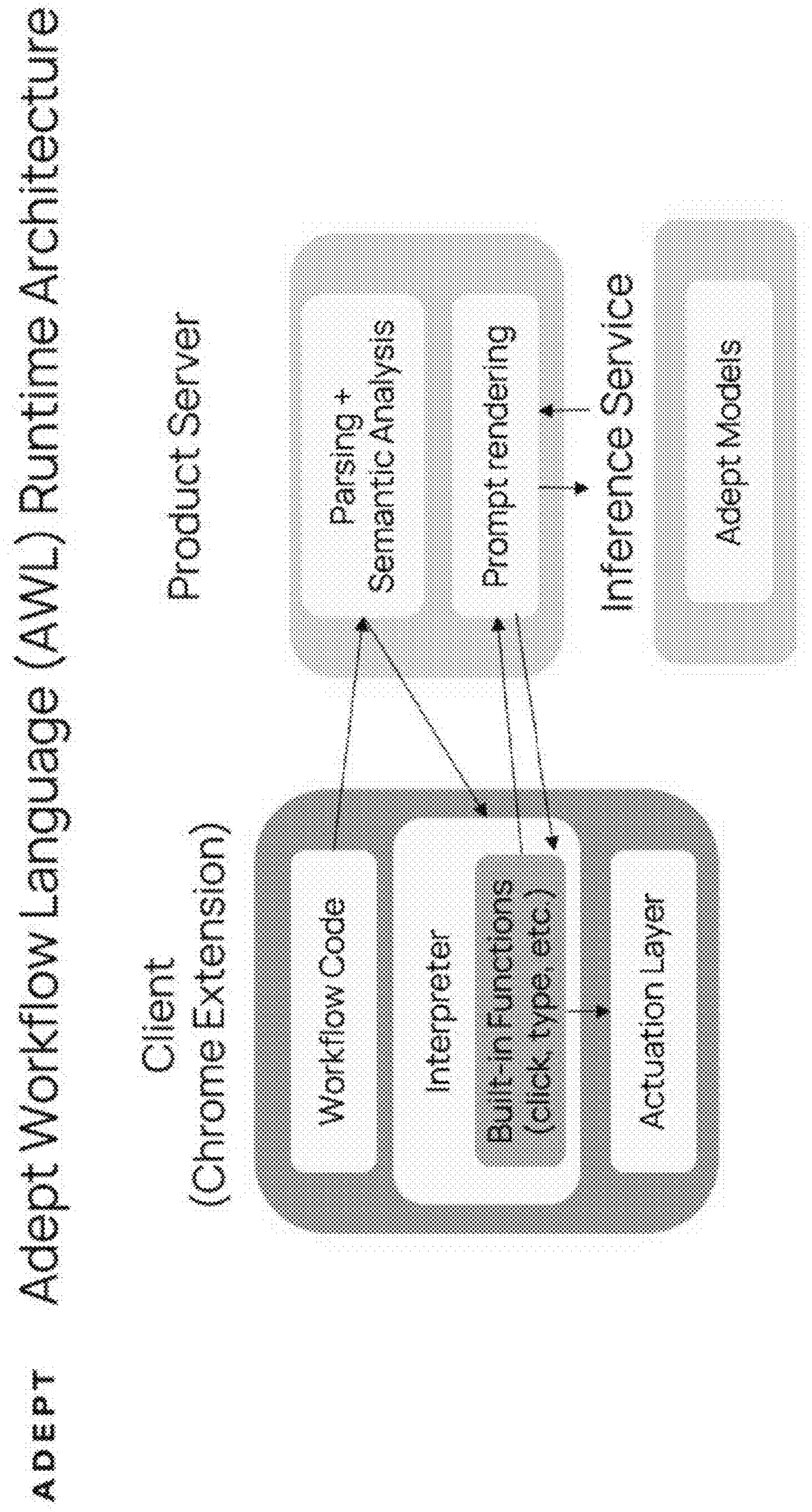
FIG. 99 is a pictorial illustration showing an example of a runtime architecture corresponding to the disclosed systems and methods.

FIG. 99 is a pictorial illustration showing an example of a runtime architecture corresponding to the disclosed systems and methods.

FIG. 100 is a pictorial illustration corresponding to the disclosed systems and methods.

FIG. 101 is a pictorial illustration corresponding to the disclosed systems and methods. As shown, the disclosed DSL provides for invoking multimodal models with the expressivity of a full-fledge programming language.

Figure 102:
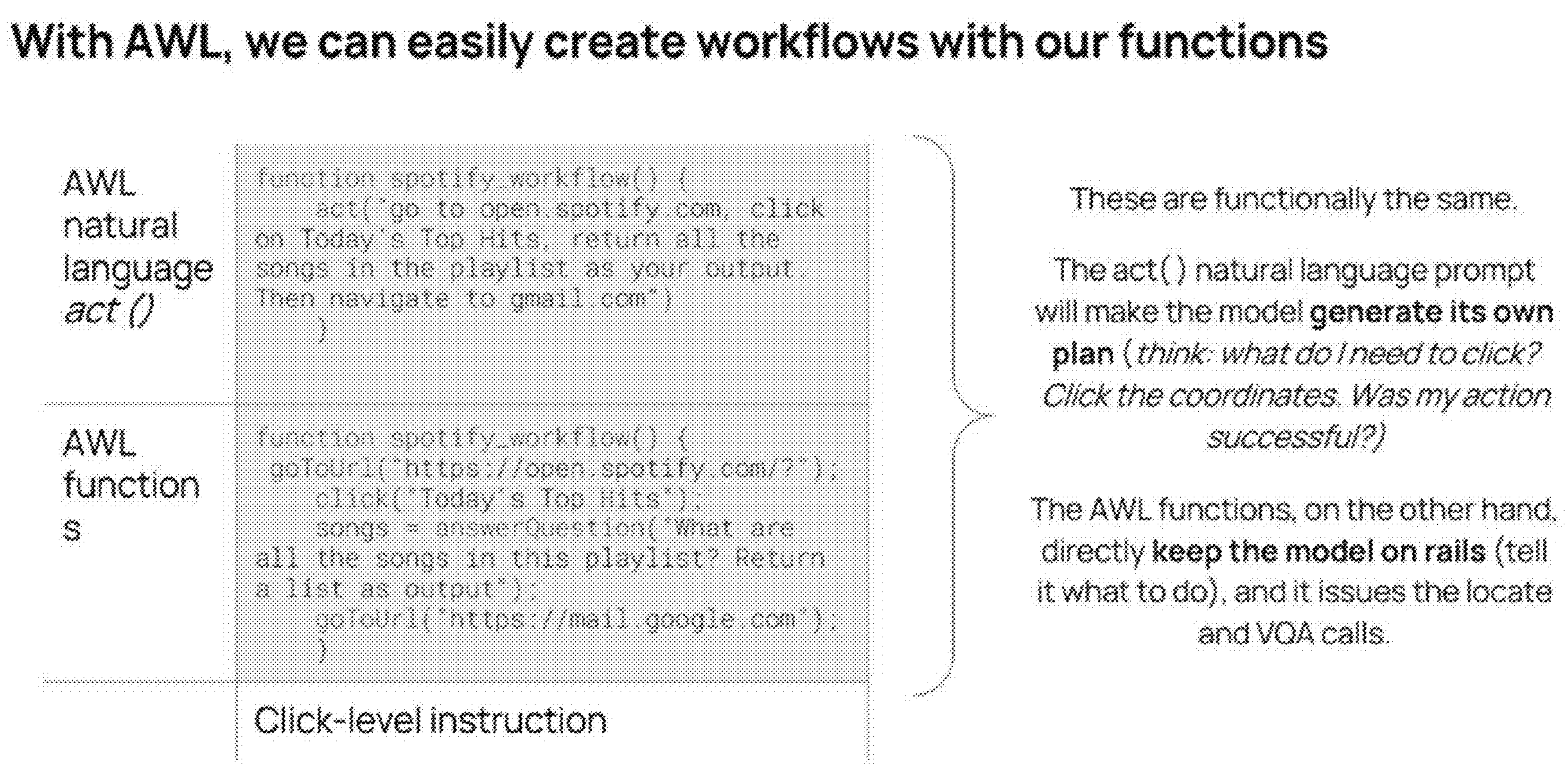
FIG. 102 is a pictorial illustration corresponding to the disclosed systems and methods.
Figure 104:
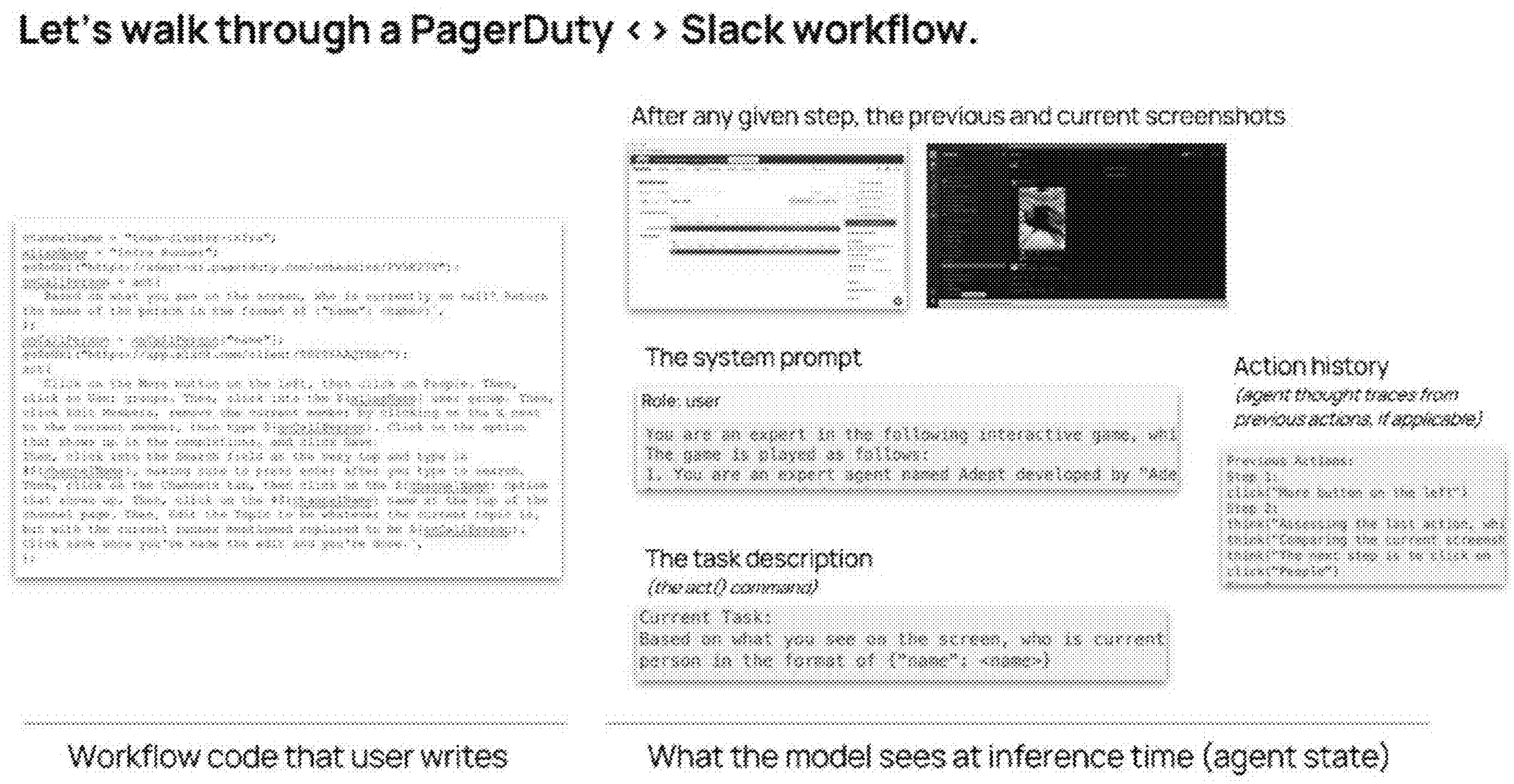
Figure 112:
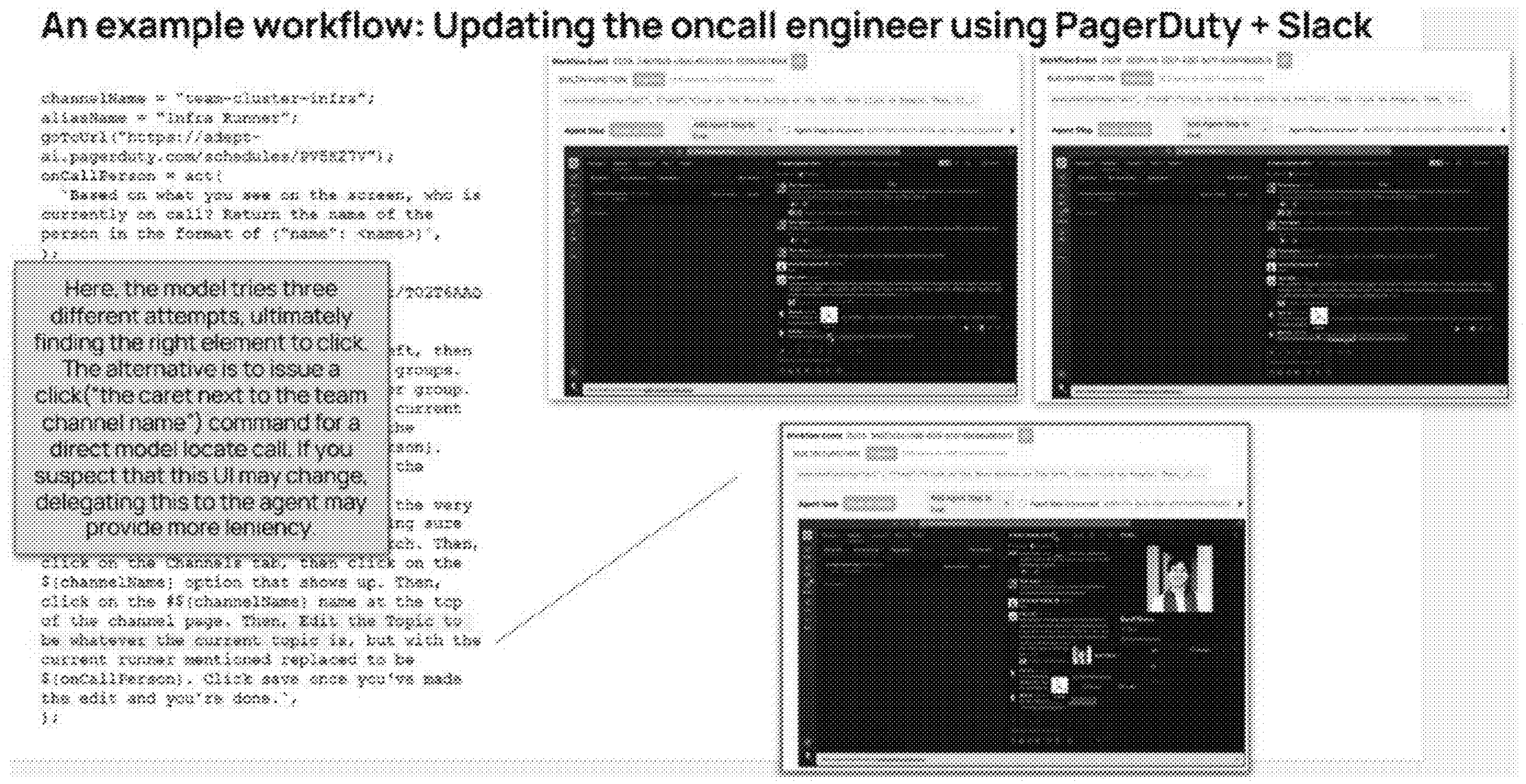

FIG. 102 is a pictorial illustration corresponding to the disclosed systems and methods. As shown, the disclosed DSL provides for generation of workflows with functions, including workflows using natural language.

FIG. 103 is a pictorial illustration corresponding to the disclosed systems and methods. As shown, the disclosed DSL provides for generation of workflows including examples of click-level instruction and step-level instruction.

FIGS. 104-114 are pictorial illustrations showing examples of the operation of the disclosed systems and methods generating an executing an example workflow. The example workflow comprises updating an on-call engineer.

Figure 115:
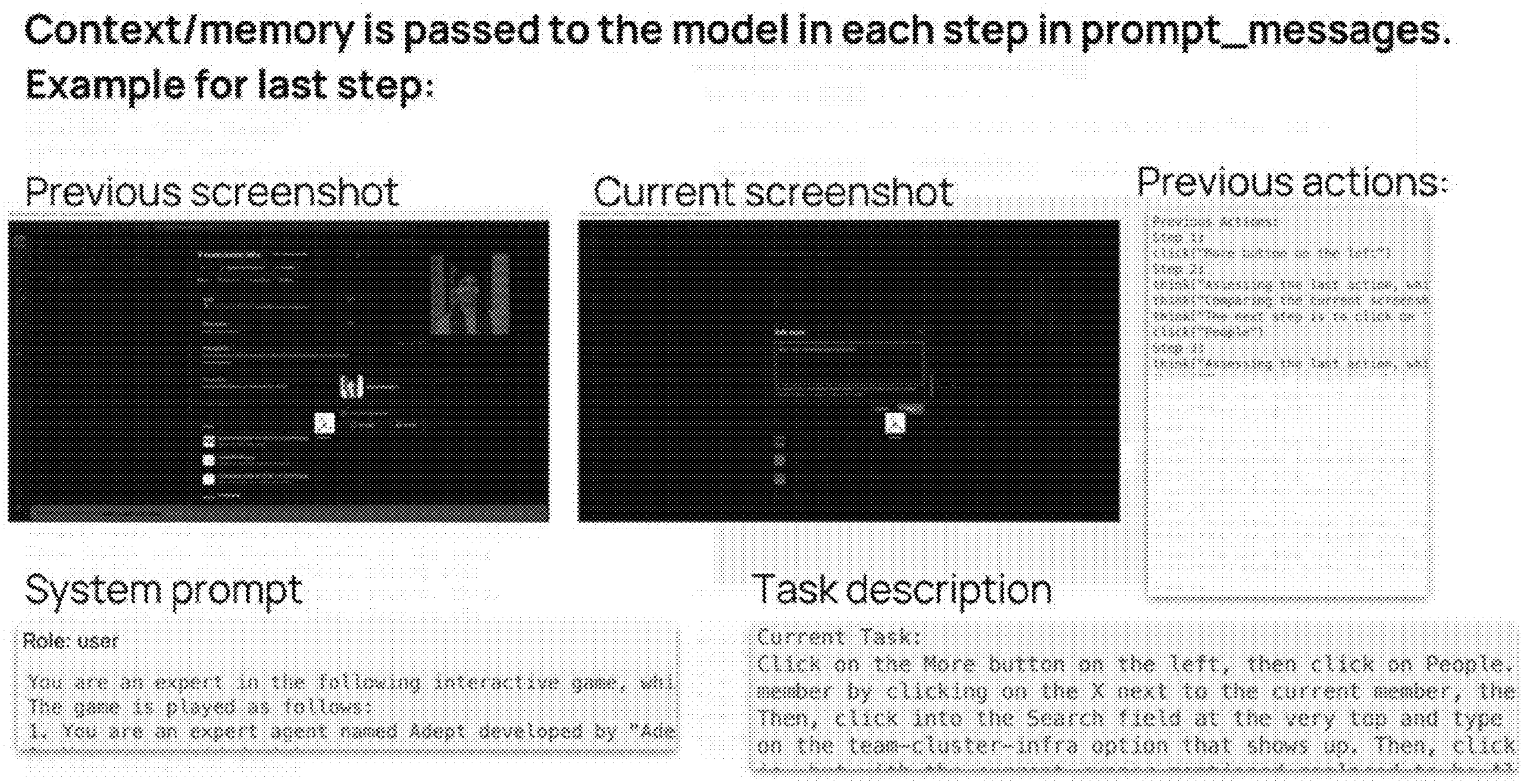
FIGS. 115 and 116 are pictorial illustrations showing prompt messages with state that are provided to the agent (model) in each step of an example workflow.
Figure 116:
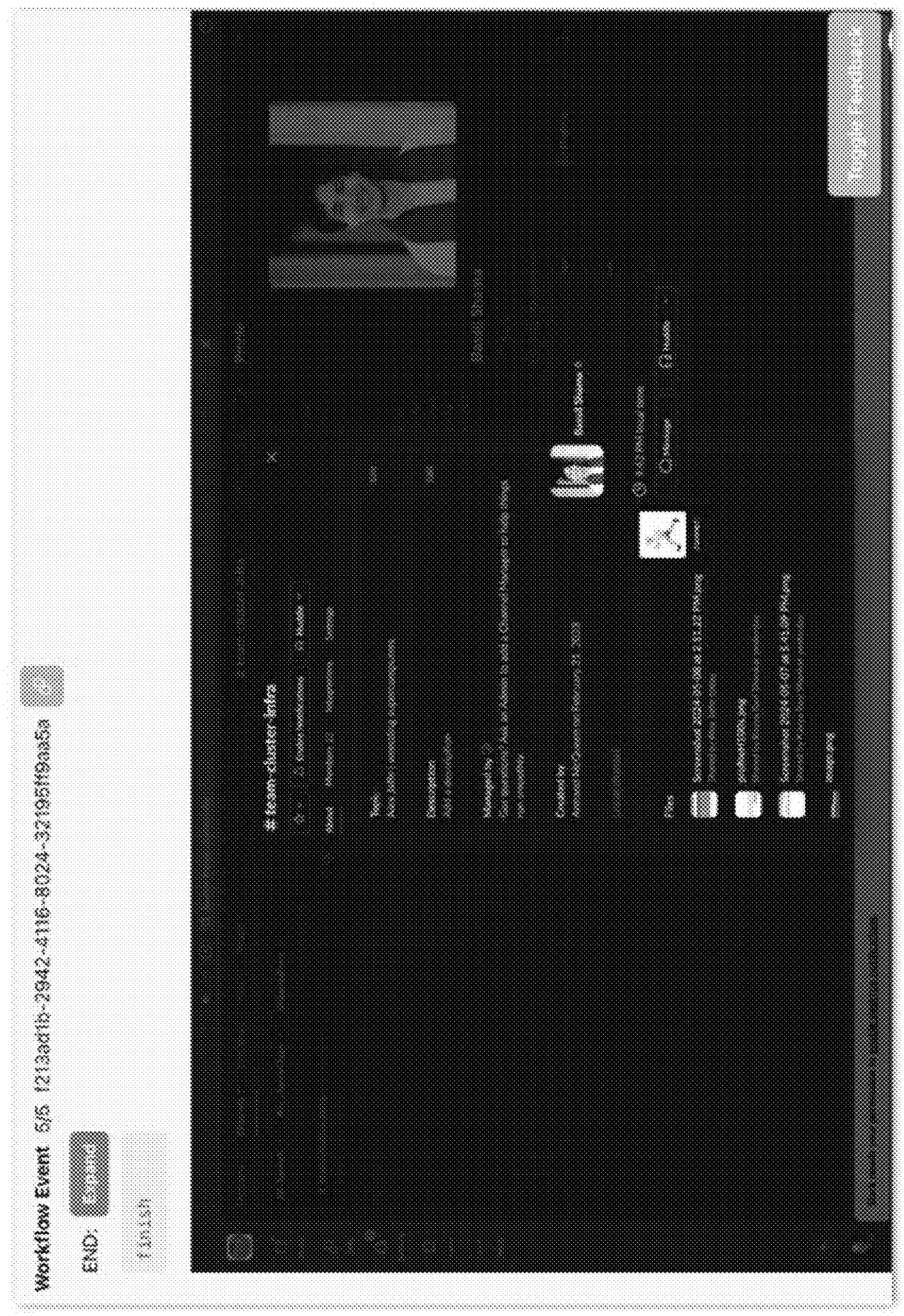

FIGS. 115 and 116 are pictorial illustrations showing prompt messages with state that are provided to the agent (model) in each step of an example workflow. As shown, a prompt message with state includes a previous screenshot, a current screenshot, a system prompt, a task description, and previous actions.

Figure 117:
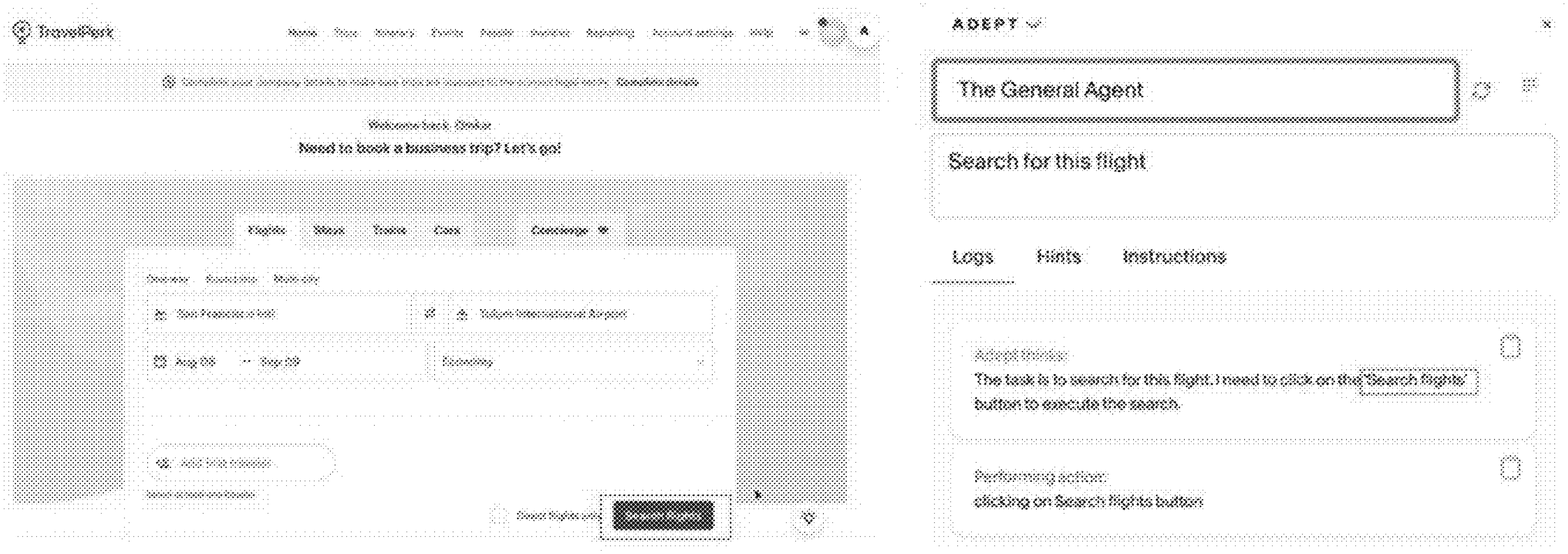
FIGS. 117 and 118 are pictorial illustrations showing an example of the disclosed systems and methods handling changes on a UI (e.g., website).
Figure 118:
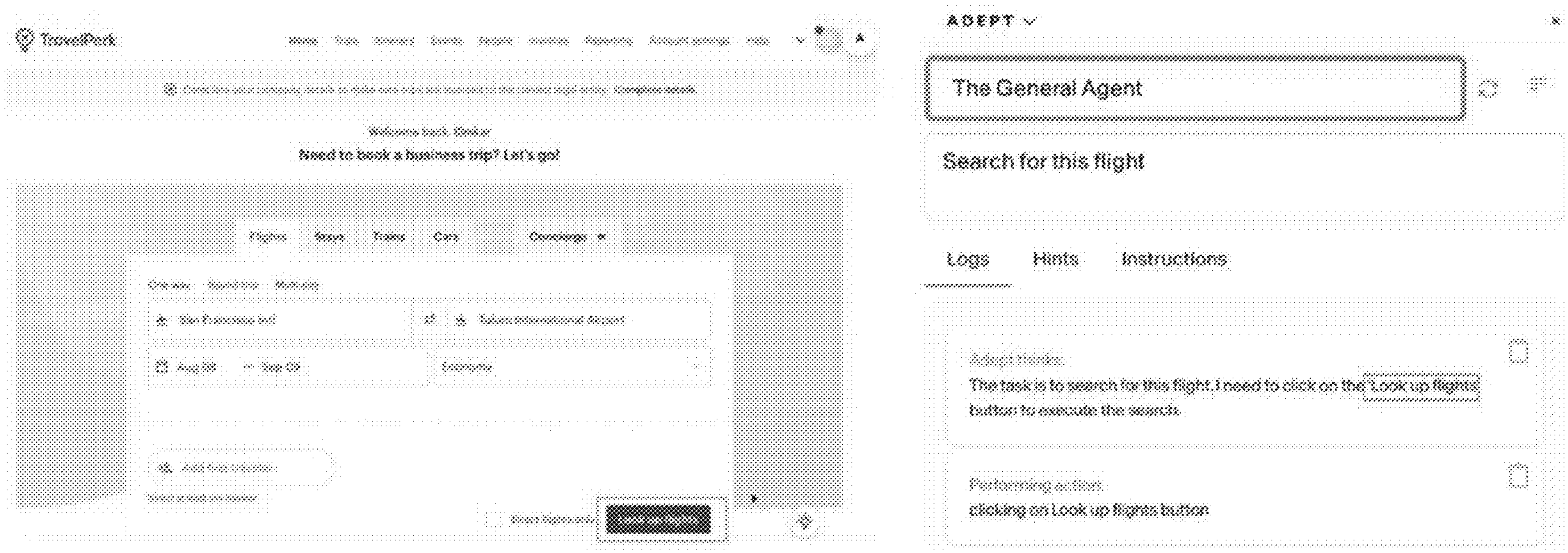

FIGS. 117 and 118 are pictorial illustrations showing an example of the disclosed systems and methods handling changes on a UI (e.g., website). As illustrated, the disclosed systems and methods are operable to handle a change to a UI, as illustrated, a change to an interface element.

Figure 119:
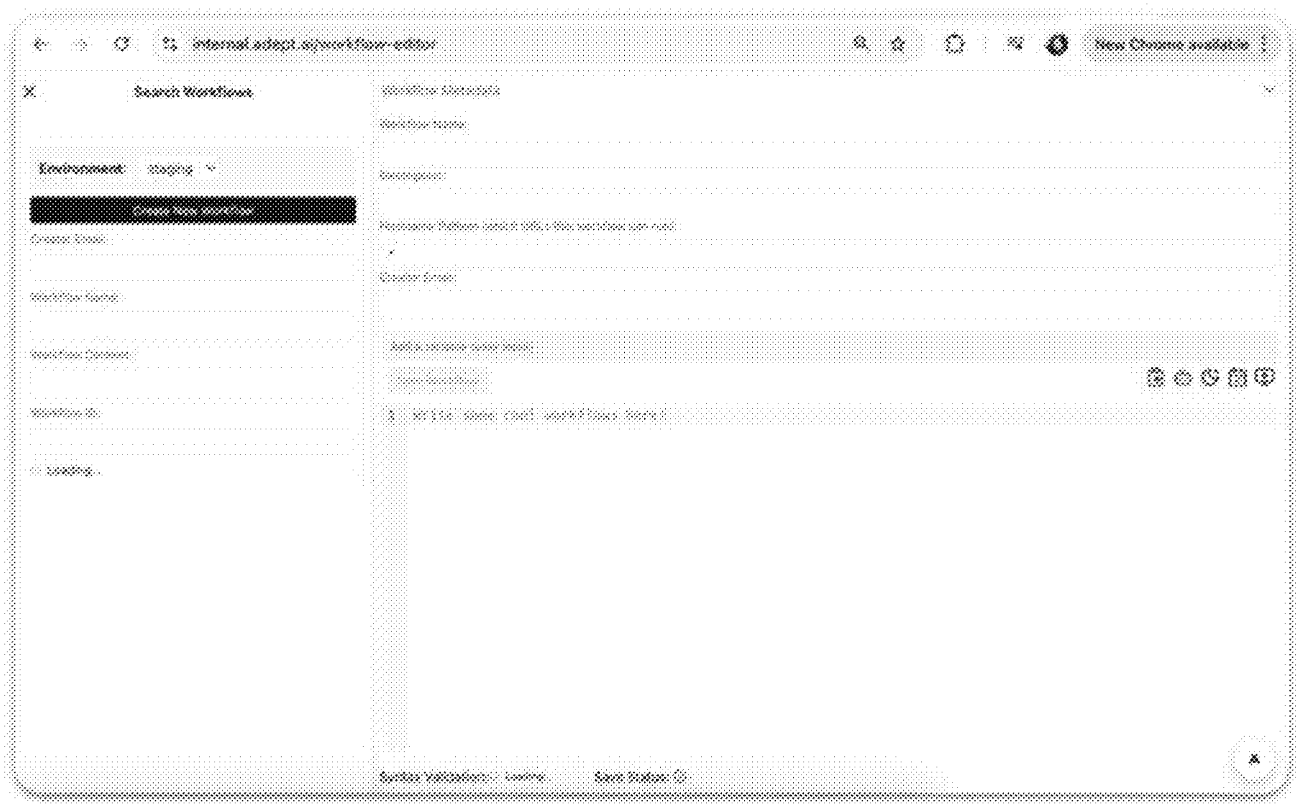
FIG. 119 is a pictorial illustration showing an example tool corresponding to the disclosed systems and methods.

FIG. 119 is a pictorial illustration showing an example tool corresponding to the disclosed systems and methods. The illustrated example shows an example workflow editor that provides a user capability to author workflows.

Figure 120:
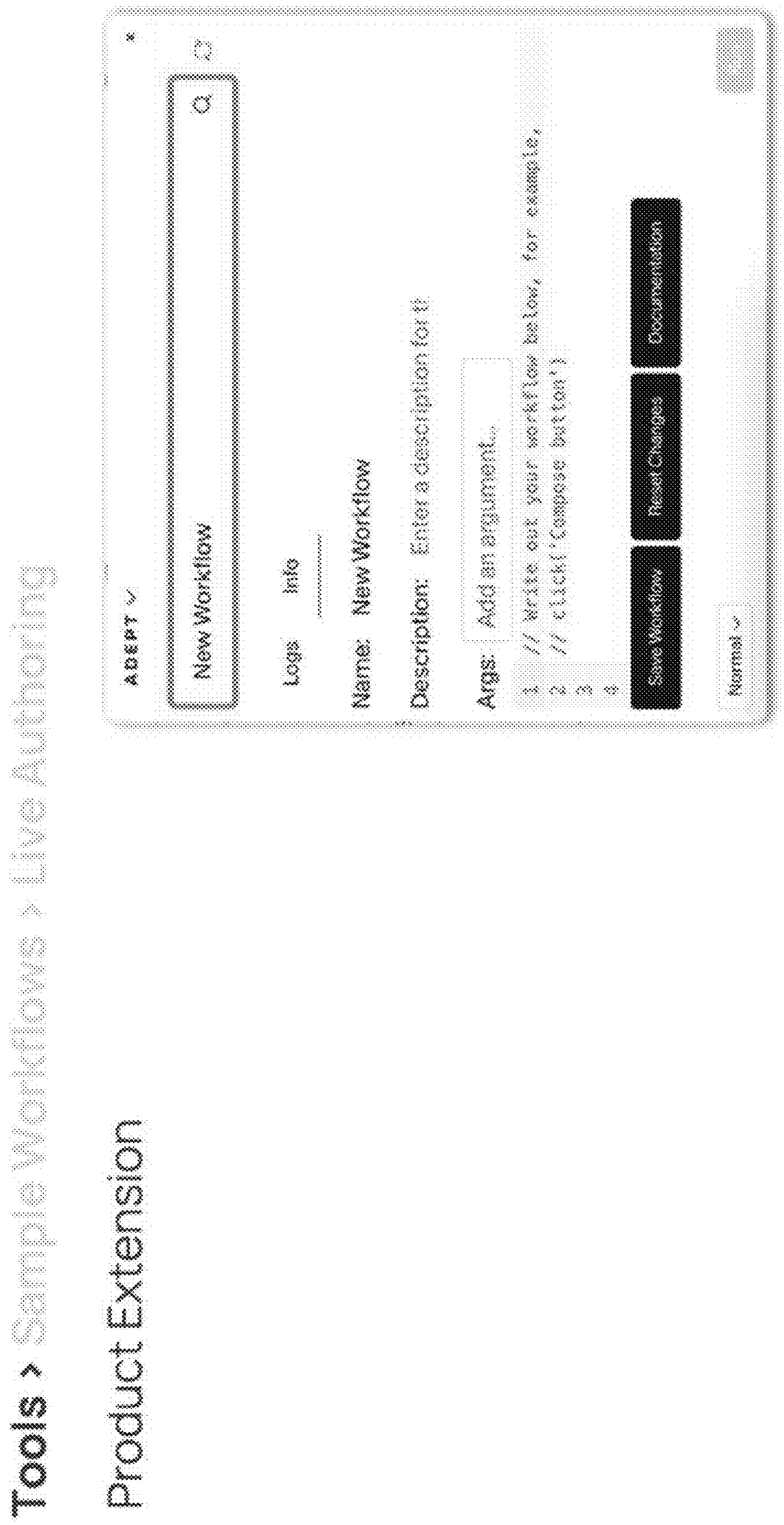
FIG. 120 is a pictorial illustration showing an example tool corresponding to the disclosed systems and methods.

FIG. 120 is a pictorial illustration showing an example tool corresponding to the disclosed systems and methods. The illustrated example shows an example extension that provides a user capability to author workflows.

Figure 121:
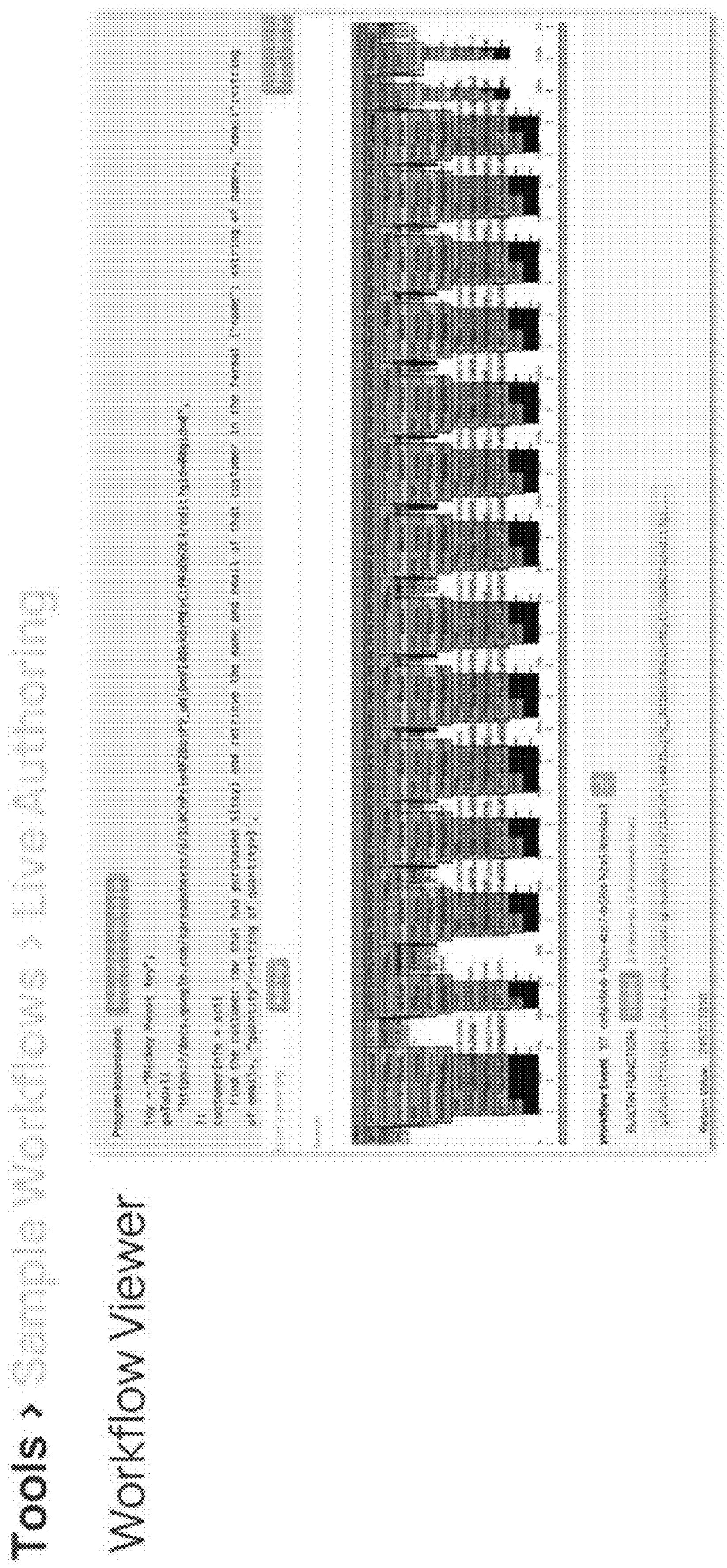
FIG. 121 is a pictorial illustration showing an example tool corresponding to the disclosed systems and methods.

FIG. 121 is a pictorial illustration showing an example tool corresponding to the disclosed systems and methods. The illustrated example shows an example workflow viewer that provides a user capability to view a workflow.

Figure 122:
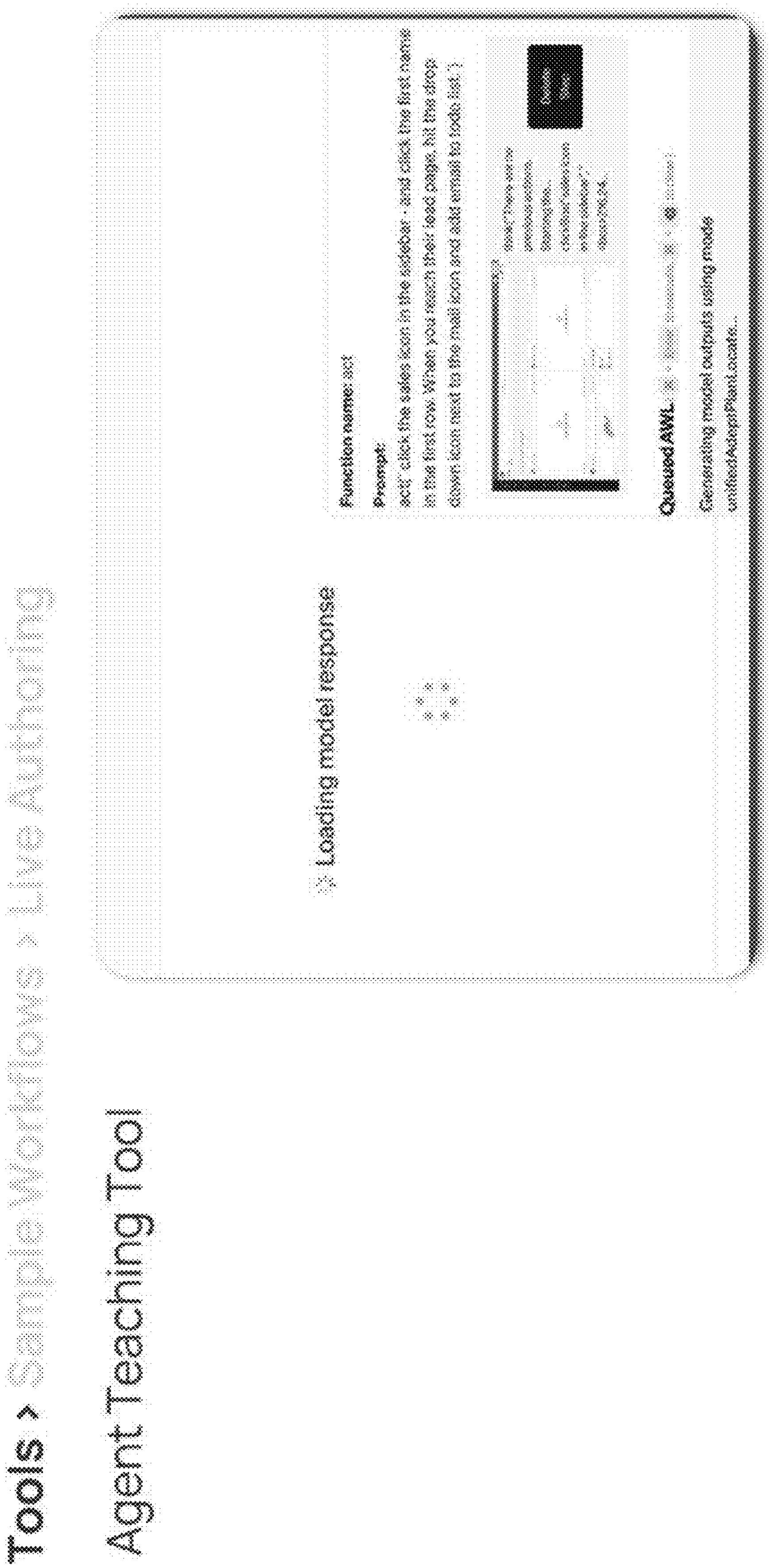
FIG. 122 is a pictorial illustration showing an example tool corresponding to the disclosed systems and methods.
Figure 124:
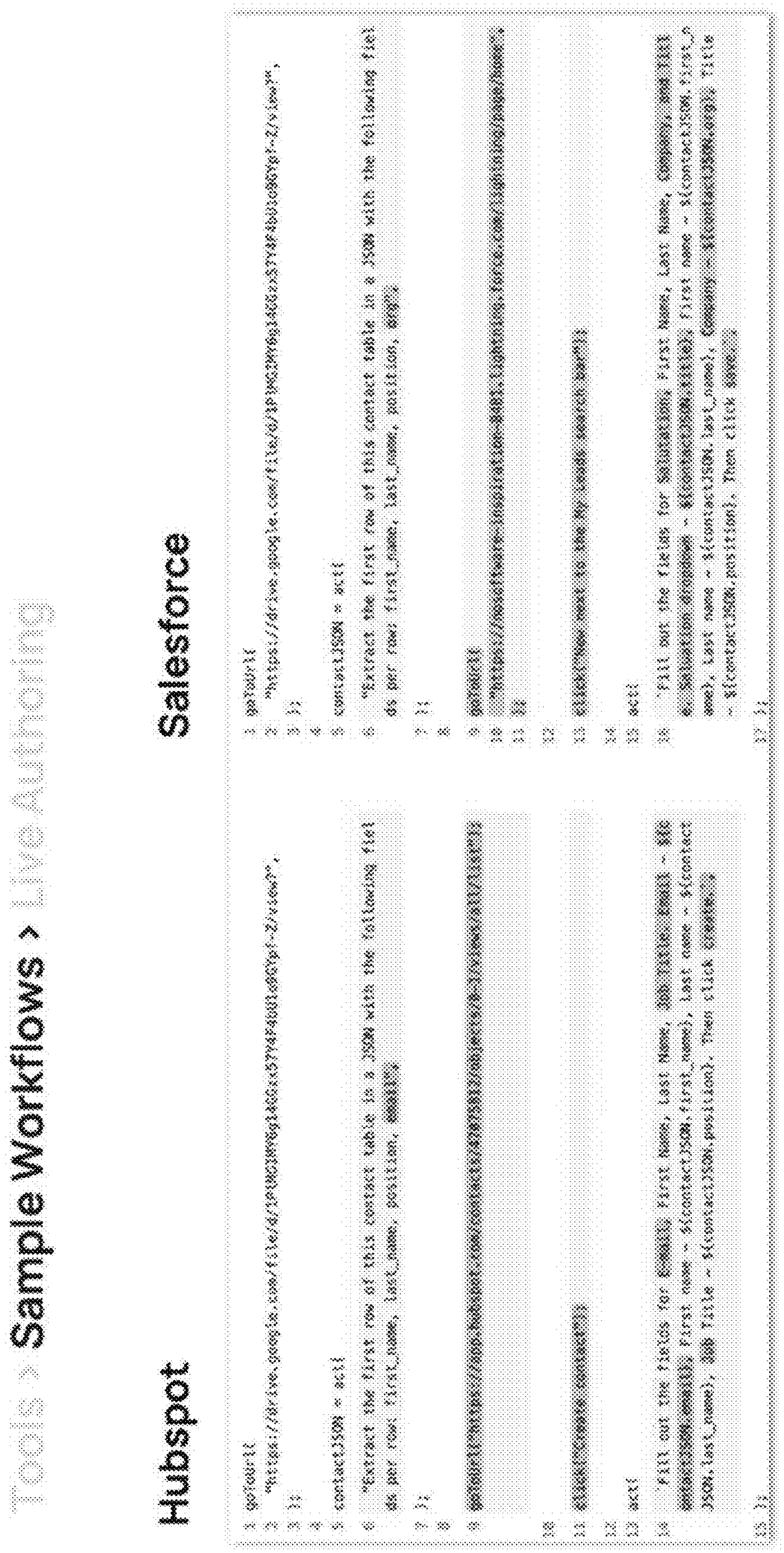
Figure 126:
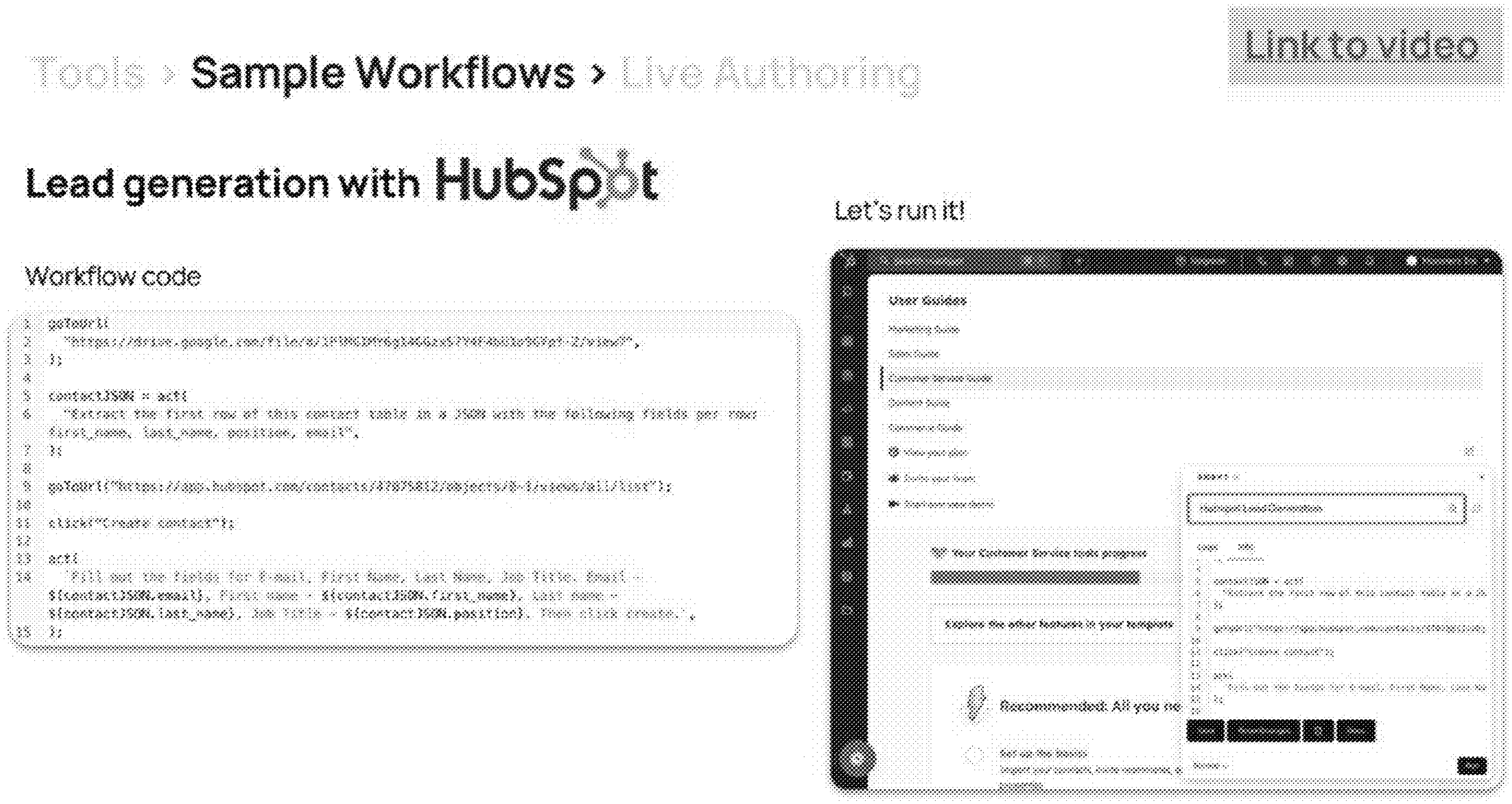

FIG. 122 is a pictorial illustration showing an example tool corresponding to the disclosed systems and methods. The illustrated example shows an example agent teaching tool that provides for teaching an agent (model).

FIGS. 123-126 are pictorial illustrations showing example workflows corresponding to the disclosed systems and methods. The illustrated examples show example lead generation workflows.

FIG. 127 is a pictorial illustration showing an example workflow corresponding to the disclosed systems and methods. The illustrated example shows an example system entry from a patient appoint PDF workflow.

Figure 128:
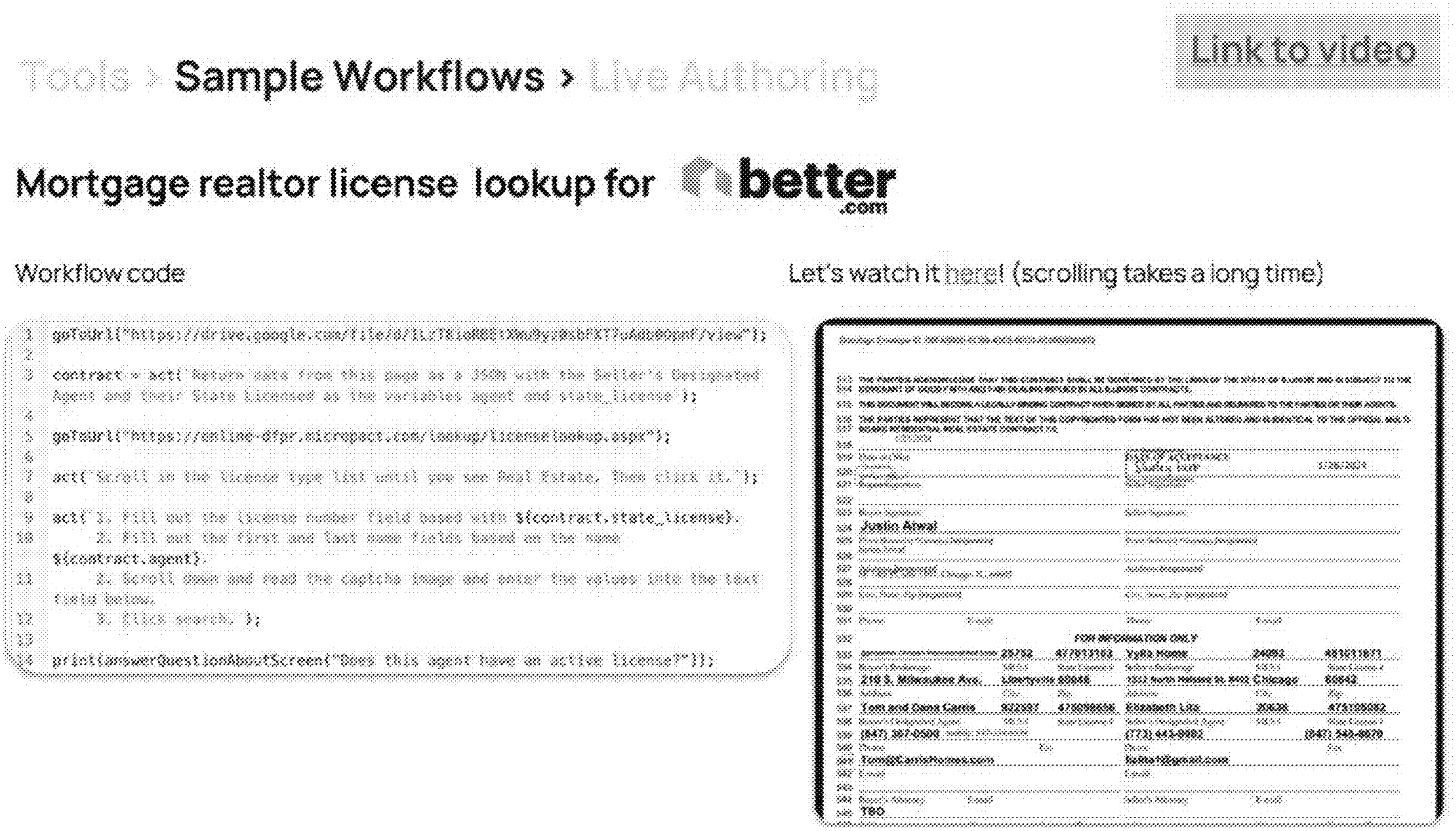
FIG. 128 is a pictorial illustration showing an example workflow corresponding to the disclosed systems and methods.

FIG. 128 is a pictorial illustration showing an example workflow corresponding to the disclosed systems and methods. The illustrated example shows an example mortgage realtor license lookup workflow.

FIG. 129 is a pictorial illustration showing an example workflow corresponding to the disclosed systems and methods. The illustrated example shows an example revenue recovery workflow.

Figure 130:
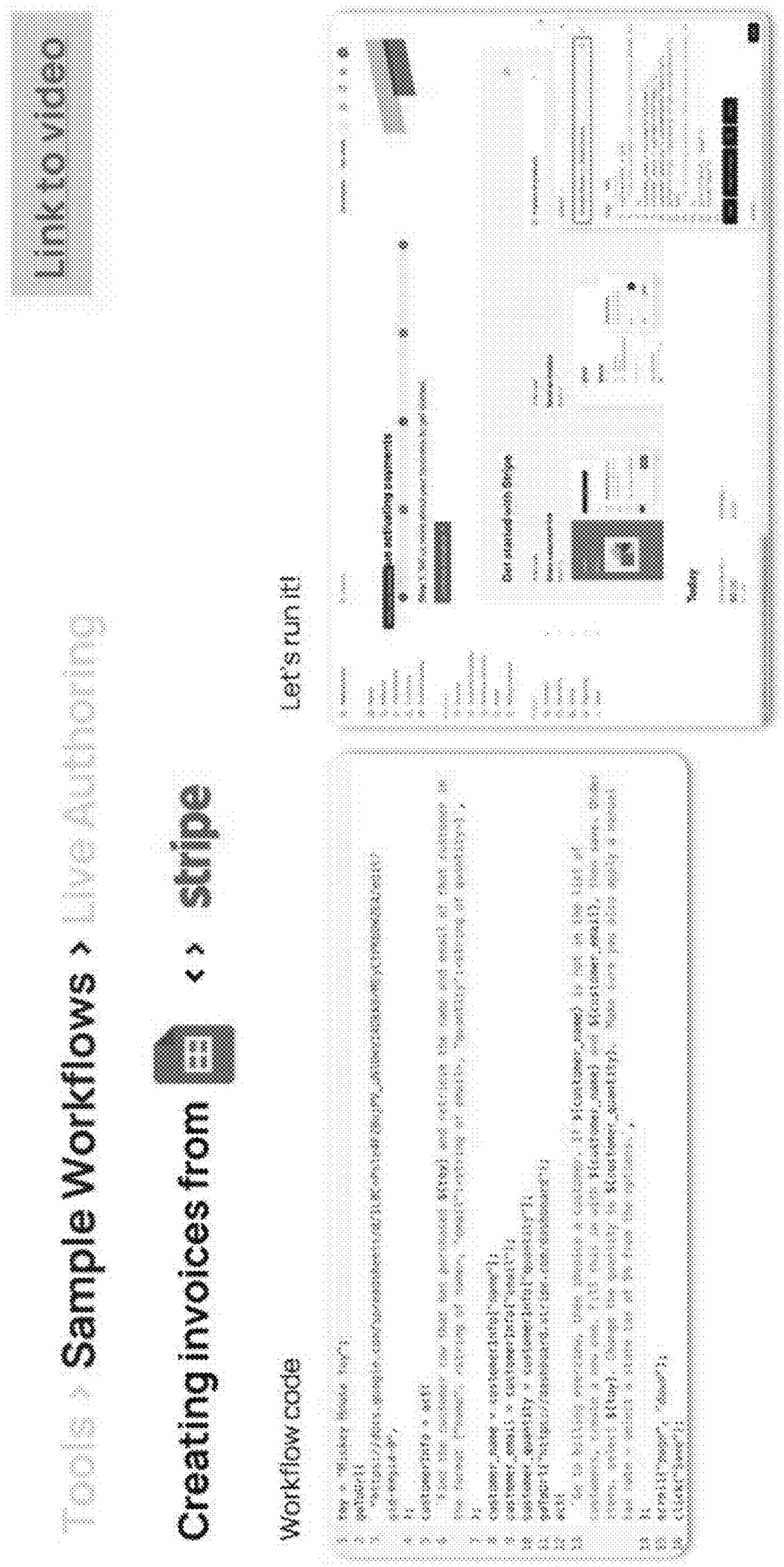
FIG. 130 is a pictorial illustration showing an example workflow corresponding to the disclosed systems and methods.

FIG. 130 is a pictorial illustration showing an example workflow corresponding to the disclosed systems and methods. The illustrated example shows an example invoice creation workflow.

Figure 131:
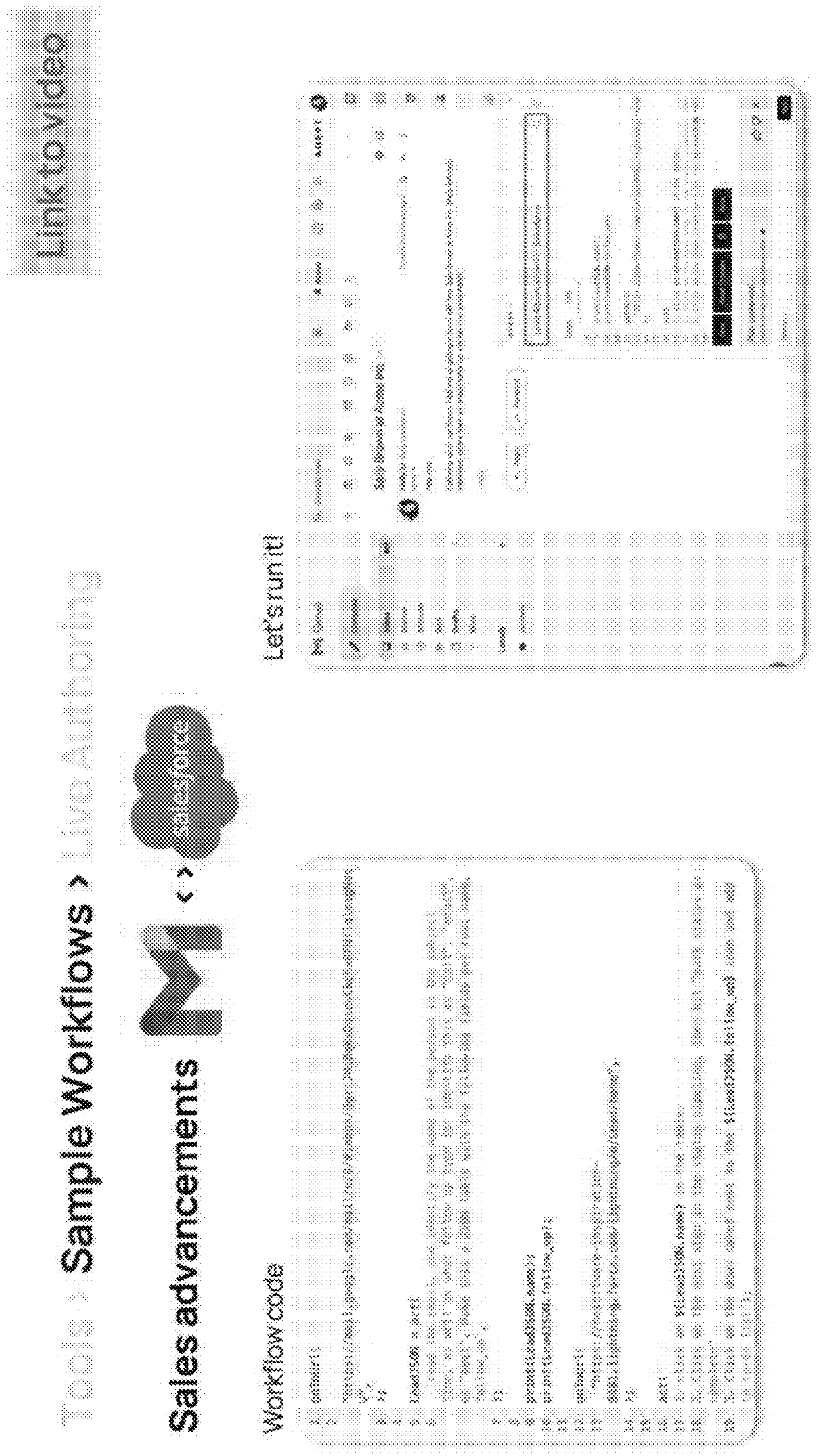
FIG. 131 is a pictorial illustration showing an example workflow corresponding to the disclosed systems and methods.

FIG. 131 is a pictorial illustration showing an example workflow corresponding to the disclosed systems and methods. The illustrated example shows an example sales advancements workflow.

Figure 147:
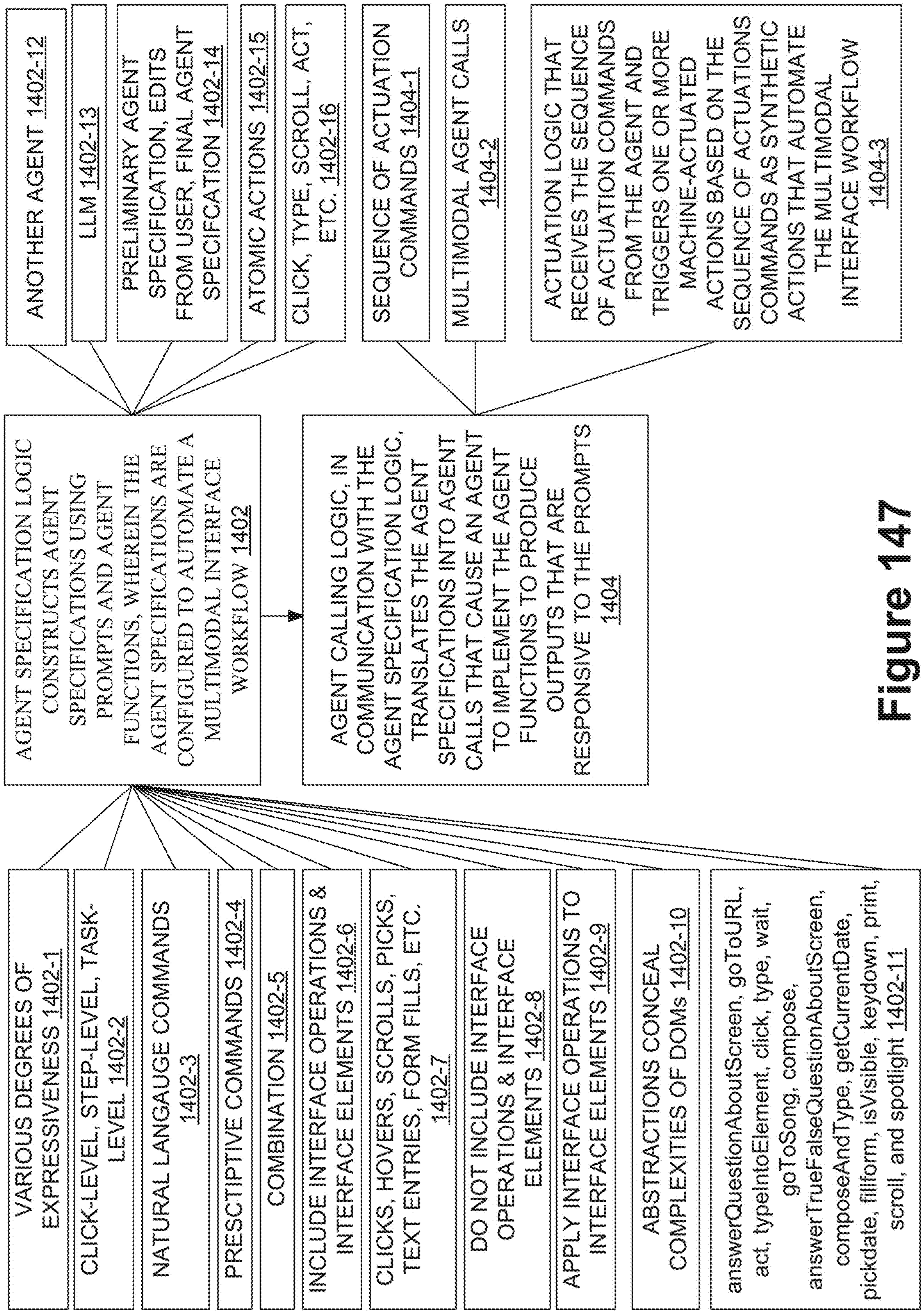

FIG. 147 shows a flow diagram illustrating one example method of operation of the systems disclosed herein. The method shown in FIG. 147 comprises a method for constructing prompts that cause an agent to automate multimodal workflows (e.g., interface workflows).

At block 1402, agent specification logic constructs agent specifications using prompts and agent functions, wherein the agent specifications are configured to automate a multimodal interface workflow.

As indicated by block 1402-1, in some examples, agent specifications are constructable using various degrees of expressiveness. As indicated by block 1402-2, in some examples, the various degrees of expressiveness range from click-level prompts to step-level prompts to task-level prompts. As indicated by block 1402-3, in some examples, agent specifications are constructed using natural language commands. As indicated by block 1402-4, in some examples, agent specifications are constructed using prescriptive commands. As indicated by block 1402-5, in some examples, agent specifications are constructed using a combination of the natural language commands and the prescriptive commands. As indicated by block 1402-6, in some examples, agent specifications include interface operations and interface elements. As indicated by block 1402-7, in some examples, the interface operations include, but are not limited to, clicks, hovers, scrolls, picks, text entries, and form fills. As indicated by block 1402-8, in some examples, agent specifications do not include the interface operations and the interface elements. As indicated by block 1402-9, in some examples, the agent functions apply the interface operations to the interface elements. As indicated by block 1402-10, in some examples, the agent specifications provide abstractions that conceal complexities of webpage document object models (DOMs). As indicated by block 1402-11, in some examples, the agent functions include answerQuestionAboutScreen, goToURL, act, typeIntoElement, click, type, wait, goToSong, compose, answerTrueFalseQuestionAboutScreen, composeAndType, getCurrentDate, pickdate, fillform, isVisible, keydown, print, scroll, and spotlight.

As indicated by block 1402-12, in some examples, the agent specification logic constructs the agent specifications using another agent. As indicated by block 1402-13, in some examples, the another agent is a large language model (LLM). As indicated by block 1402-14, in some examples, the agent specification logic receives a preliminary agent specification from the another agent and receives edits from a user to the preliminary agent specifications to generate final agent specifications. As indicated by block 1402-15, in some examples, the agent specification logic constructs the agent specifications using atomic actions. As indicated by block 1402-16, in some examples, the atomic actions include, but are not limited to, click, type, scroll, and act.

At block 1404, agent calling logic, in communication with the agent specification logic, translates the agent specifications into agent calls that cause an agent to implement the agent functions to produce outputs that are responsive to the prompts.

As indicated by block 1404-1, in some examples, the outputs are a sequence of actuation commands. As indicated by block 1404-2, in some examples, the agent calls are multimodal agent calls. As indicated by block 1404-3, in some examples, the system includes actuation logic that receives the sequence of actuation commands from the agent and triggers one or more machine-actuated actions based on the sequence of actuations commands as synthetic actions that automate the multimodal interface workflow.

Figure 148:
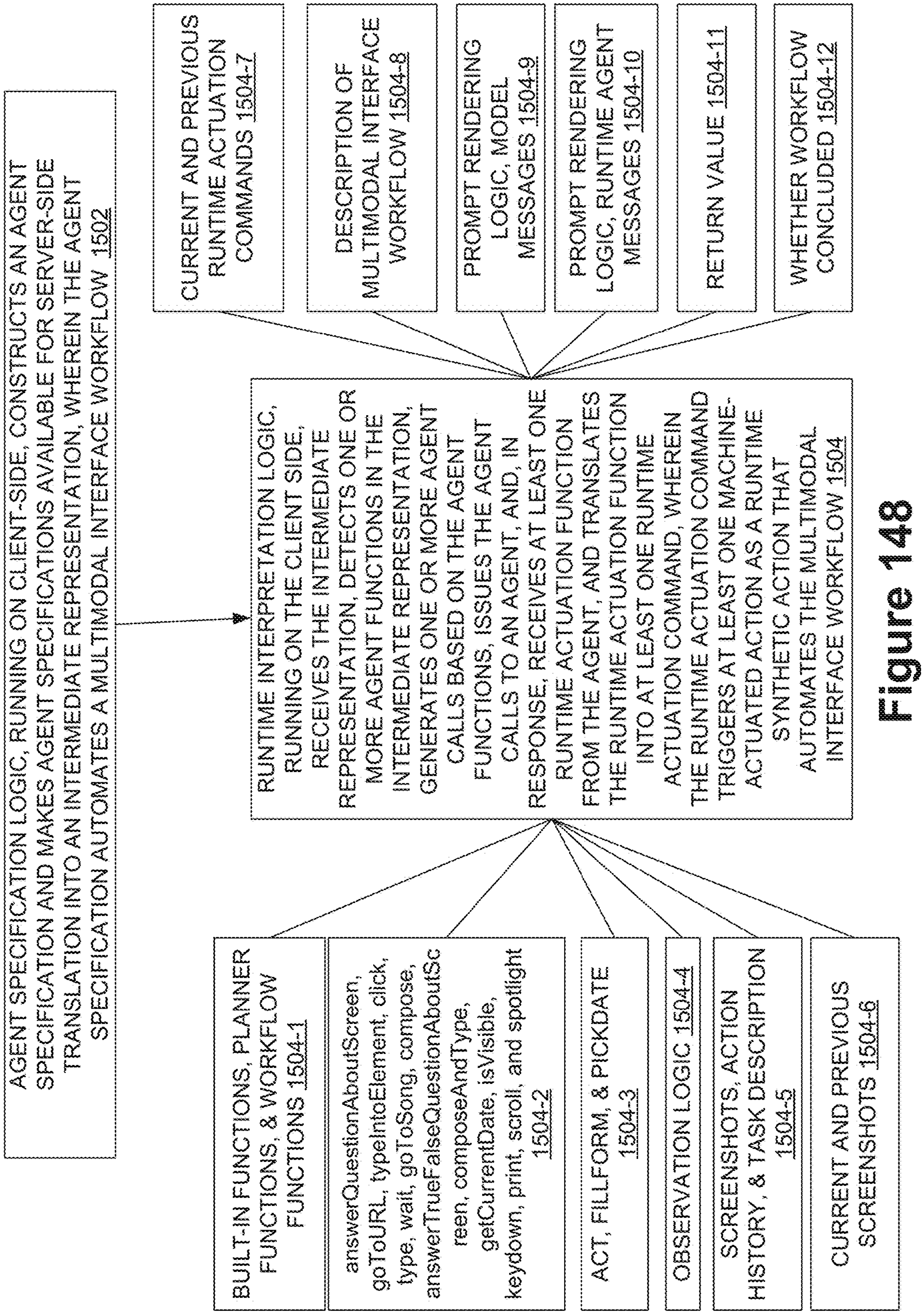

FIG. 148 shows a flow diagram illustrating one example method of operation of the systems disclosed herein. The method shown in FIG. 148 comprises a method for implementing (e.g., client-side implementing) of an interface automation language at runtime.

At block 1502, agent specification logic, running on client-side, constructs an agent specification and makes agent specifications available for server-side translation into an intermediate representation, wherein the agent specification automates a multimodal interface workflow.

At block 1504, runtime interpretation logic, running on the client side, receives the intermediate representation, detects one or more agent functions in the intermediate representation, generates one or more agent calls based on the agent functions, issues the agent calls to an agent, and, in response, receives at least one runtime actuation function from the agent, and translates the runtime actuation function into at least one runtime actuation command, wherein the runtime actuation command triggers at least one machine-actuated action as a runtime synthetic action that automates the multimodal interface workflow.

As indicated by block 1504-1, in some examples, the agent functions include built-in functions, planner functions, and workflow functions. As indicated by block 1504-2, in some examples, the built-in functions include answerQuestionAboutScreen, goToURL, typeIntoElement, click, type, wait, goToSong, compose, answerTrueFalseQuestionAboutScreen, composeAndType, getCurrentDate, isVisible, keydown, print, scroll, and spotlight. As indicated by block 1504-3, in some examples, the planner functions include act, fillform, and pickdate.

As indicated by block 1504-4, in some examples, the runtime interpretation logic invokes an observation logic in response to detecting the act planner function. As indicated by block 1504-5, in some examples, the observation logic sends one or more interface screenshots, an action history, and a task description to the agent. As indicated by block 1504-6, in some examples, the interface screenshots include a current interface screenshot and one or more previous interface screenshots. As indicated by block 1504-7, in some examples, the action history includes a current runtime actuation command and one or more previous runtime actuation commands. As indicated by block 1504-8, in some examples, the task description includes a description of the multimodal interface workflow.

As indicated by block 1504-9, in some examples, the system includes prompt rendering logic that provides a system prompt, the interface screenshots, the action history, and the task description as model messages to the agent. As indicated by block 1504-10, in some examples, the system includes prompt rendering logic that provides a system prompt, the interface screenshots, the action history, and the task description as runtime agent messages to the agent.

As indicated by block 1504-11, in some examples, runtime interpretation logic receives a return value from the agent in response to the agent calls. As indicated by block 1504-12, in some examples, the return value specifies whether the multimodal interface workflow has concluded.

FIG. 167 is a block diagram showing an example system 3300 corresponding to the disclosed systems and methods. The system 3300, in one example, can be used to perform the method described in FIG. 147. The system 3300 is operable to construct prompts that cause an agent to automate multimodal interface workflows. As shown, system 3300 includes agent specification logic 3302, agent calling logic 3308, and can include various other items and functionality 3399.

Agent specification logic 3302 is configured to construct agent specifications 3304 using prompts 3306 and agent functions 3305. The agent specifications 3304 are configured to automate a multimodal interface workflow.

Agent calling logic 3308 is in communication with agent specification logic 3302. Agent calling logic 3308 is configured to translate the agent specifications 3304 into agent calls 3312 that cause an agent 3314 to implement the agent functions 3305 to produce outputs 3316 that are responsive to the prompts 3306.

In some examples, the agent specifications 3304 are constructable using various degrees of expressiveness. In some examples, the agent specifications 3304 are constructed using natural language commands. In some examples, the agent specifications 3304 are constructed using prescriptive commands. In some examples, the agent specifications 3304 are constructed using a combination of the natural language commands and the prescriptive commands. In some examples, the various degrees of expressiveness range from click-level prompts to step-level prompts to task-level prompts. In some examples, the agent specifications 3304 include interface operations and interface elements. In some examples, the agent specifications 3304 do not include interface operations and interface elements. In some examples, the agent functions 3305 apply the interface operations to the interface elements. In some examples, the interface operations include clicks, hovers, scrolls, picks, text entries, and form fills.

In some examples, the outputs 3316 are a sequence of actuation commands 3318. In some examples, actuation logic 3320 is configured to receive the sequence of actuation commands 3318 from the agent 3314 and to trigger one or more machine actuated actions 3322 based on the sequence of actuation commands 3318 as synthetic actions that automate the multimodal interface workflow.

In some examples, the agent specifications 3304 are configured to provide abstractions that conceal complexities of webpage document object models (DOMs). In some examples, the agent functions 3305 include answerQuestionAboutScreen, goToURL, act, typeIntoElement, click, type, wait, goToSong, compose, answerTrueFalseQuestionAboutScreen, composeAndType, getCurrentDate, pickdate, fillform, isVisible, keydown, print, scroll, and spotlight.

In some examples, agent specification logic 3202 is configured to construct the agent specifications 3304 using another agent 3324. In some examples, the another agent 3324 is a large language model (LLM). In some examples, agent specification logic 3202 is configure to receive a preliminary agent specification 3326 from the another agent 3324, to receive edits 3352 from a user 3350 to the preliminary agent specification 3326 to generate, as an agent specification 3304, a final agent specification.

In some examples, agent specification logic 3202 is configured to construct the agent specifications 3304 using atomic actions. In some examples, the atomic actions include CLICK, TYPE, SCROLL, and ACT.

FIG. 168 is a block diagram showing an example system 3400 corresponding to the disclosed systems and methods. The system 3400, in one example, can be used to perform the method described in FIG. 148. The system 3400 is a system for client-side implementation of an interface automation language at runtime. As shown, system 3400 includes agent specification logic 3402, runtime interpretation logic 3408, and can include various other items and functionality 3499.

Agent specification logic 3402 is configured to run a client-side. Agent specification logic 3402 is configure to construct an agent specification 3404 and to make the agent specification 3404 available for server-side translation into an intermediate representation 3406. The agent specification 3404 is configure to automate a multimodal interface workflow.

Runtime interpretation logic 3408 is configure to run on the client-side. Runtime interpretation logic 3408 is configure to receive the intermediate representation 3406. Runtime interpretation logic 3408 is configured to detect one or more agent functions 3410 in the intermediate representation 3406. Runtime interpretation logic 3408 is configured to generate one or more agent calls 3412 based on the agent functions 3410. Runtime interpretation logic 3408 is configure to issue the agent calls 3412 to an agent 3414 and, in response, receive at least one runtime actuation function 3416 from the agent 3414. Runtime interpretation logic 3408 is configure to translate the at least one runtime action function 3416 into at least one runtime actuation command 3418. The at least one runtime actuation command 3418 triggers at least one machine-actuated action 3422 as a runtime synthetic action that automates the multimodal interface workflow.

In one example, the agent functions 3410 include built-in functions, planner functions, and workflow functions. In one example, the built-in functions include answerQuestionAboutScreen, goToURL, typeIntoElement, click, type, wait, goToSong, compose, answerTrueFalseQuestionAboutScreen, composeAndType, getCurrentDate, isVisible, keydown, print, scroll, and spotlight. In one example, the planner functions include act, fillform, and pickdate. In one example, the runtime interpretation logic 3408 is further configured to invoke an observation logic 3424 in response to detecting the act planner function. In one example, the observation logic 3424 is configure to send one or more interface screenshots, an action history, and a task description 3425 to the agent 3414. In one example, the interface screenshots include a current screenshot and one or more previous screenshots. In one example, the action history includes a current runtime actuation command and one or more previous runtime actuation commands. In one example, the task description includes a description of the multimodal interface workflow.

In one example, prompt rendering logic 3426 is configured to provide a system prompt 3428, the interface screenshots, the action history, and the task description 3425 as model messages to the agent 3414. In one example, prompt rendering logic 3426 is configured to provide a system prompt 3428, the interface screenshots, the action history, and the task description 3425 as runtime agent messages to the agent 3414.

In one example, the runtime interpretation logic 3408 is configure to receive a return value 3430 from the agent 3414 in response to the agent calls 3412. In one example, the return value 3430 specifies whether the multimodal interface workflow has concluded.

Image-Text Agentic Interface

Figure 132:
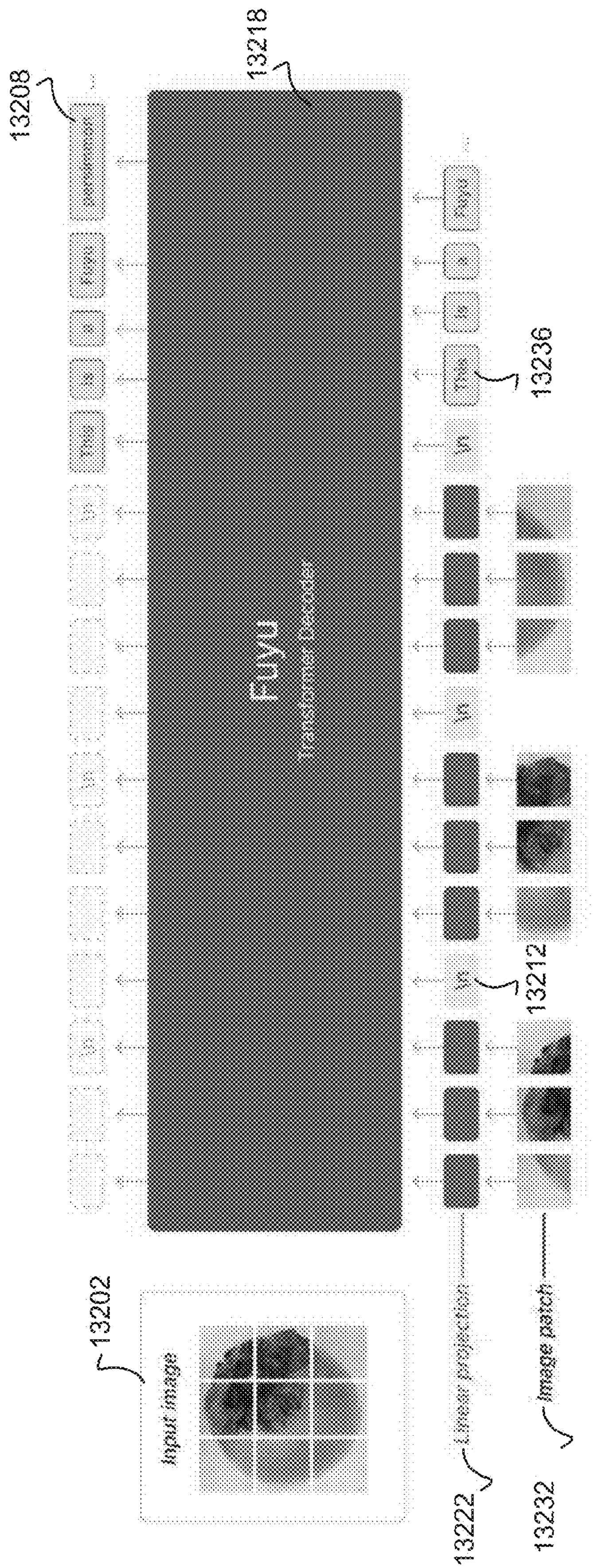
FIG. 132 discloses a system for image-text agentic interface automation.

FIG. 132 discloses a system for image-text agentic interface automation. A multimodal agent is configured to process arbitrary-length text sequences and arbitrary-resolution images. A memory stores an input image 13202 and an input text sequence. A patch extraction logic is configured to extract image patches 13232 from the input image on a line-by-line basis, and generate a plurality of lines of image patches for the input image. A newline insertion logic is configured to interleave a newline character 13212 between successive lines of image patches in the plurality of lines of image patches, wherein the newline character specifies an end of a line in the input image. A tokenization logic is configured to translate the input text sequence into a sequence of input text tokens, and to translate the successive lines of image patches interleaved with the newline character into a sequence of input image tokens. A linear projection logic is configured to linearly project 13222 a single token stream of the sequence of input text tokens and the sequence of input image tokens into a decoder-only Transformer logic 13218, wherein the linear projection of the single token stream bypasses any embedding lookup. The decoder-only Transformer logic configured to process the linearly projected, embedding lookup-bypassed single token stream 13236 to generate a sequence of output tokens 13208 that are responsive to the input image and the input text sequence.

FIG. 133 is a pictorial illustration showing reliability scores corresponding to the disclosed systems and methods across different multimodal benchmarks. The illustrated example shows reliability scores corresponding to a decoder-only transformer logic (or decoder) ("Fuyu").

FIG. 134 shows an example of model performance.

FIG. 135 shows another example of model performance.

Figure 136:
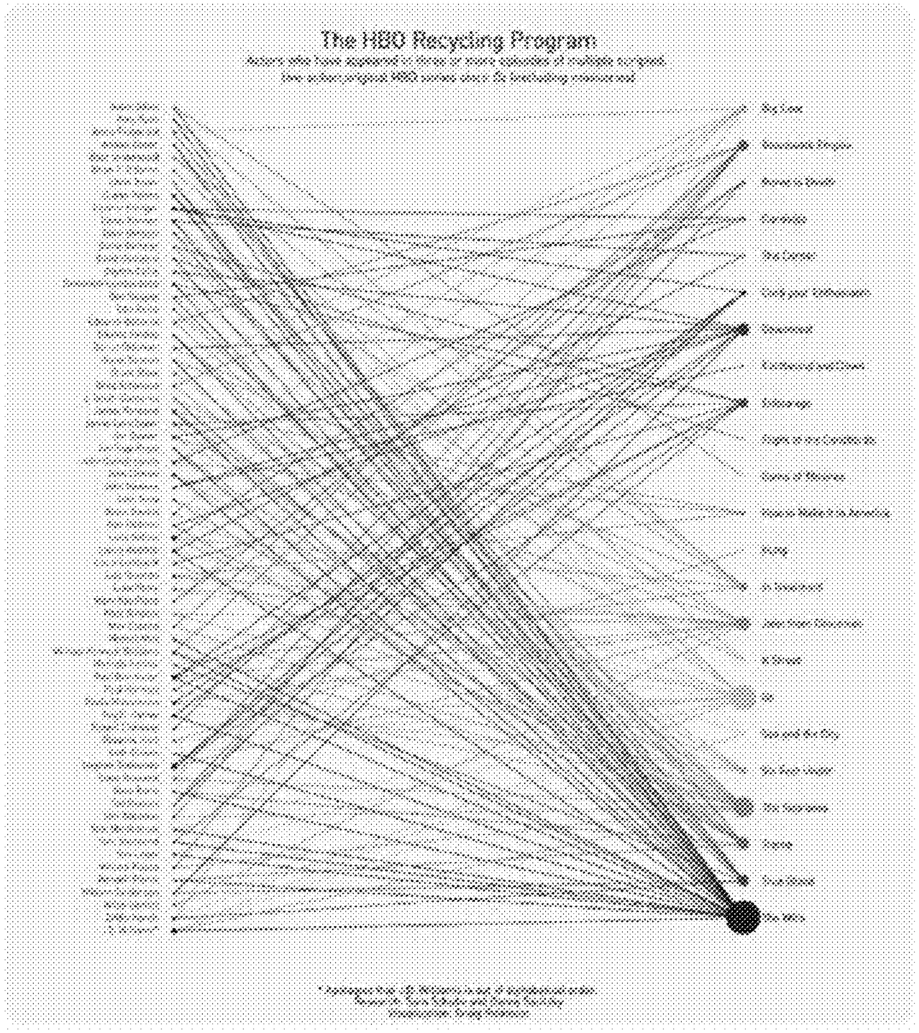
FIG. 136 is a pictorial illustration showing an of the disclosed systems and methods executing VQA.

FIG. 136 is a pictorial illustration showing an of the disclosed systems and methods executing VQA. The illustrated example the disclosed systems and methods executing VQA on a graph. A user asks "Aiden Gillen acted in how many series?" and the disclosed systems and methods answer "2".

FIG. 137 is a pictorial illustration showing examples of the disclosed systems and methods executing VQA. One example (left) shows the disclosed systems and methods executing VQA on a graph. A user asks "Find missing data of the sequence 24, _, 32, 33, 42?" and the disclosed systems and methods answer "29". One example (right) shows the disclosed systems and methods executing VQA on a graph. A user asks "What was the fair amount of paid vacation days in the UK?" and the disclosed systems and methods answer "28".

Figure 138:
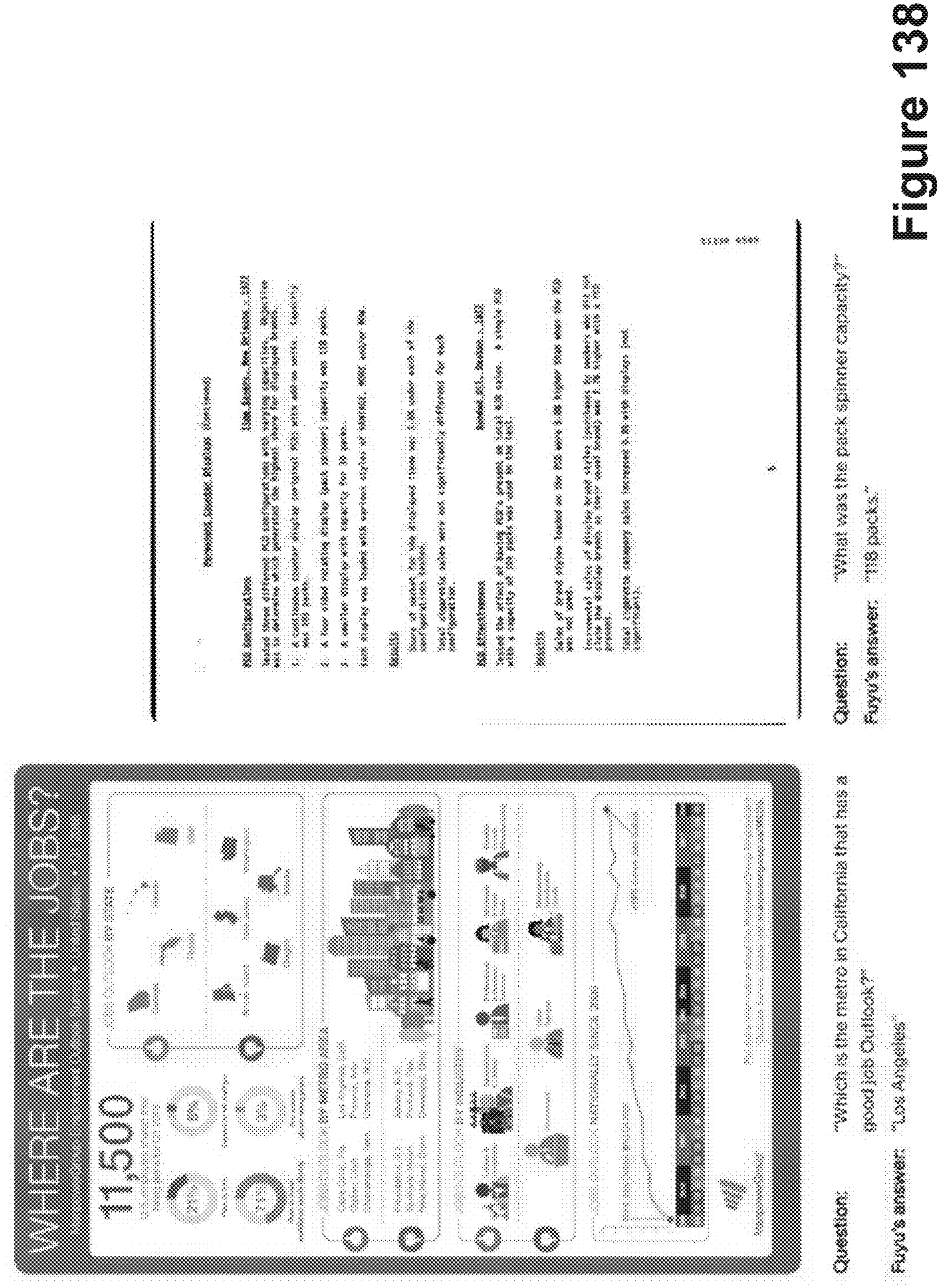
FIG. 138 is a pictorial illustration showing examples of the disclosed systems and methods executing VQA.

FIG. 138 is a pictorial illustration showing examples of the disclosed systems and methods executing VQA. One example (left) shows the disclosed systems and methods executing VQA on a document. A user asks "Which is the metro in California that has a good job Outlook?" and the disclosed systems and methods answer "Los Angeles". One example (right) shows the disclosed systems and methods executing VQA on a document. A user asks "What was the pack spinner capacity?" and the disclosed systems and methods answer "118 packs".

FIG. 139 is a pictorial illustration showing examples of the disclosed systems and methods executing VQA. One example (left) shows the disclosed systems and methods executing VQA on a document. A user asks "What letter does a keel-shaped cross-section look like?" and the disclosed systems and methods answer "The letter V". One example (right) shows the disclosed systems and methods executing VQA on a document. A user asks "If in the food web shown in the diagram, Douglas fir tree needles are absent, which organism would starve?" and the disclosed systems and methods answer "Red tree vole".

Figure 140:
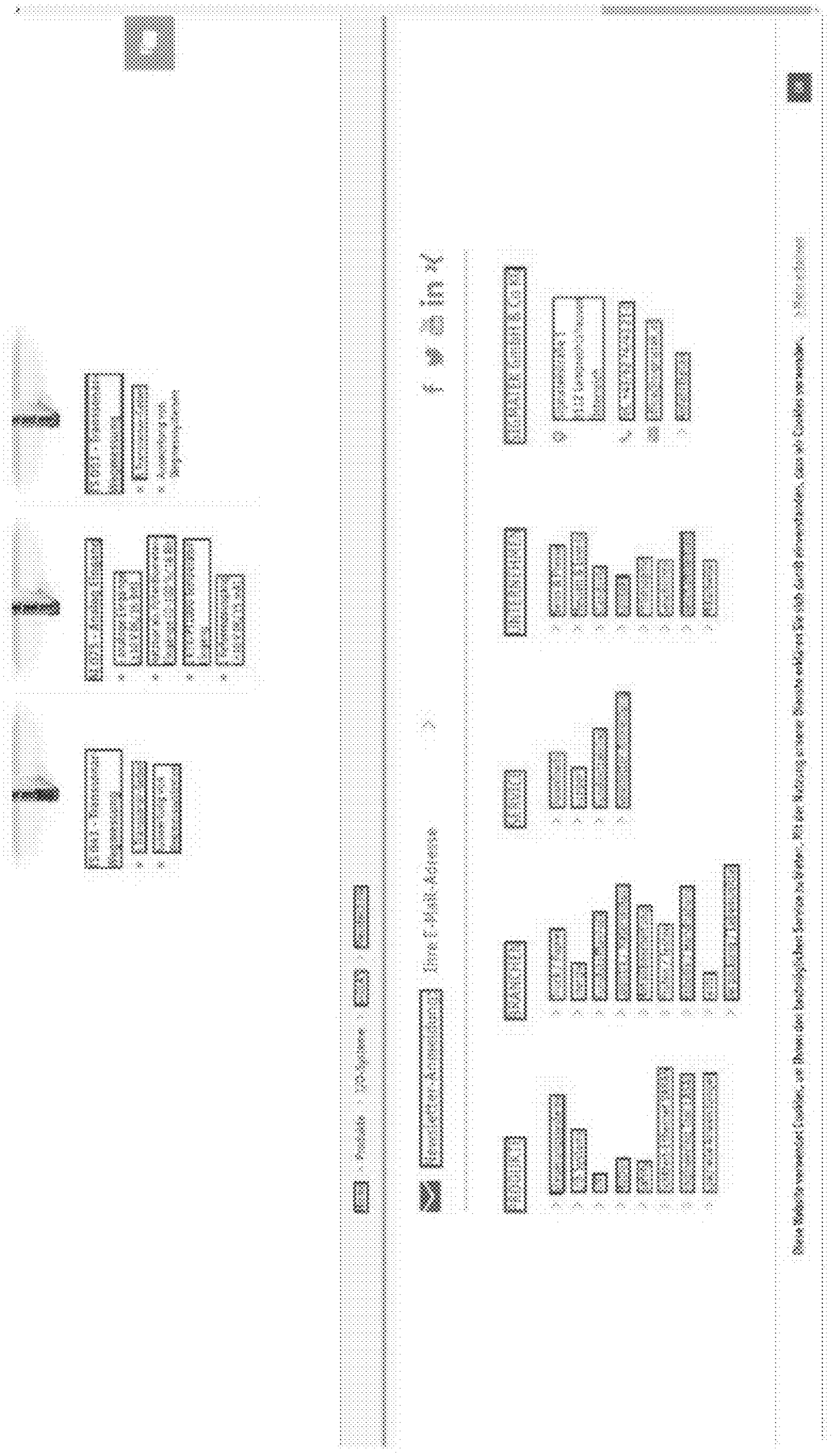
FIG. 140 discloses another implementation of the technology disclosed.

FIG. 140 shows another implementation of the technology disclosed.

Figure 141:
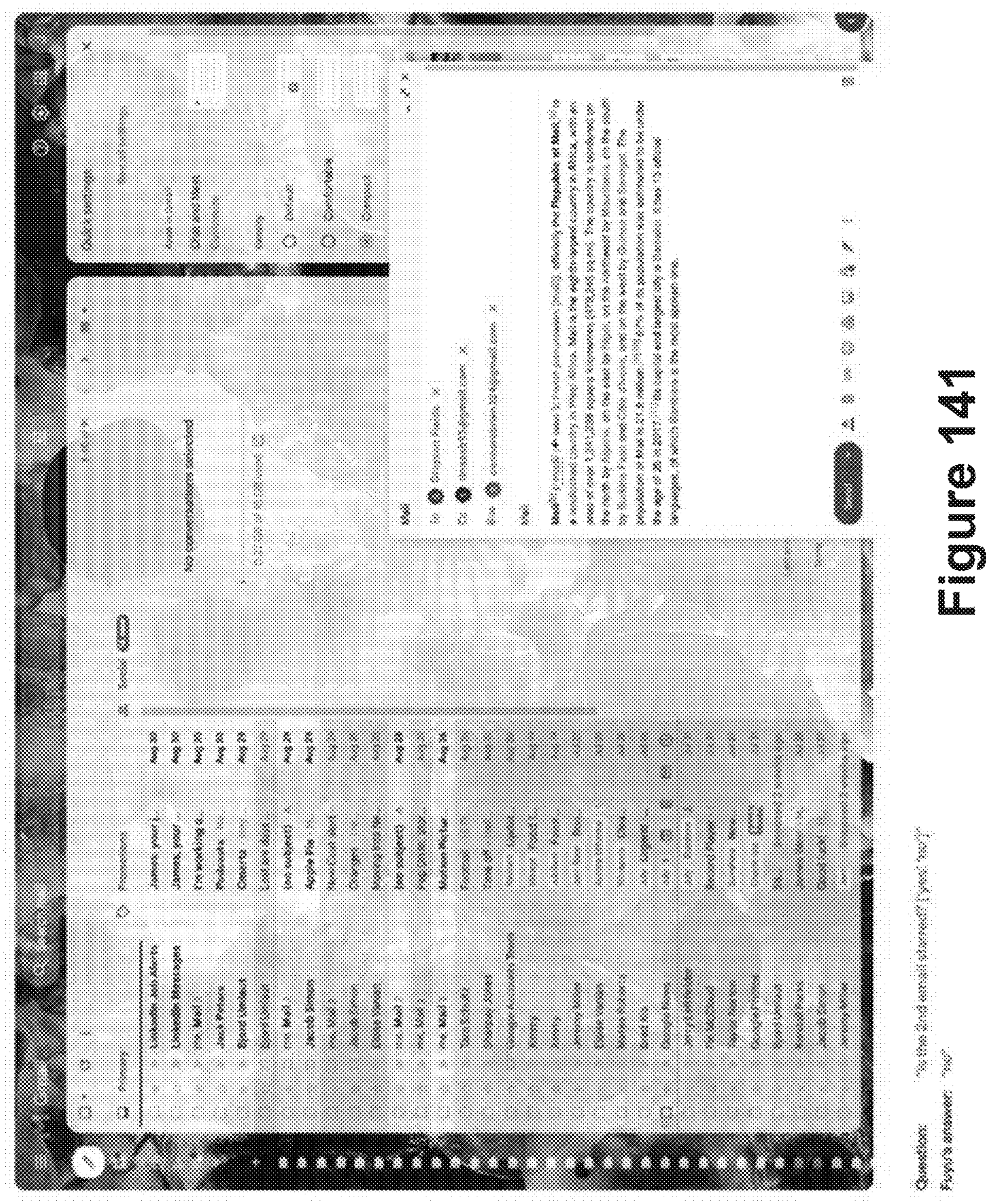
FIG. 141 is a pictorial illustration showing an example of the disclosed systems and methods executing VQA.

FIG. 141 is a pictorial illustration showing an example of the disclosed systems and methods executing VQA. The illustrated example shows the disclosed systems and methods executing VQA on a email interface (a native email application UI). A user asks "is the 2$^{nd}$ email starred?['yes', 'no']" and the disclosed systems and methods answer "no".

Figure 142:
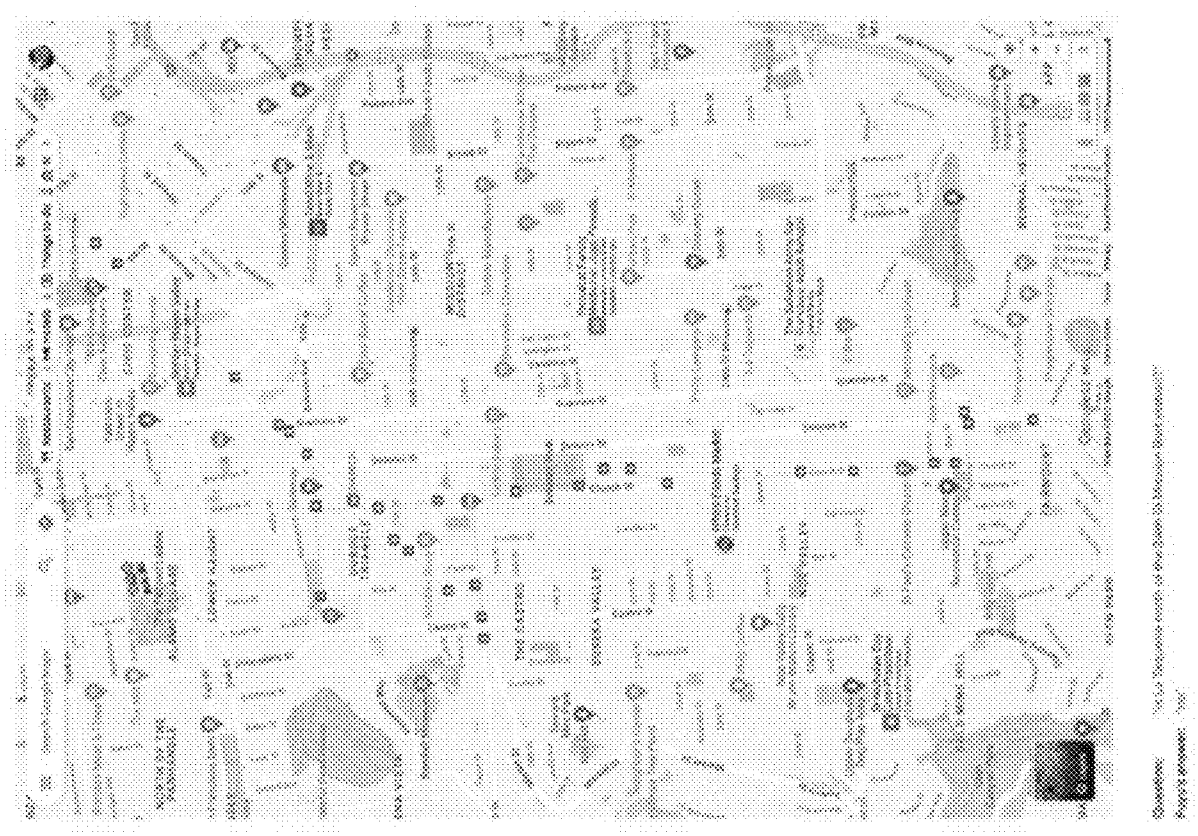
FIG. 142 is a pictorial illustration showing an example of the disclosed systems and methods executing VQA.

FIG. 142 is a pictorial illustration showing an example of the disclosed systems and methods executing VQA. The illustrated example shows the disclosed systems and methods executing VQA on a map image. A user asks "is La Taqueria north of 24$^{th}$ St Mission Bart station?" and the disclosed systems and methods answer "no".

Figure 150A:
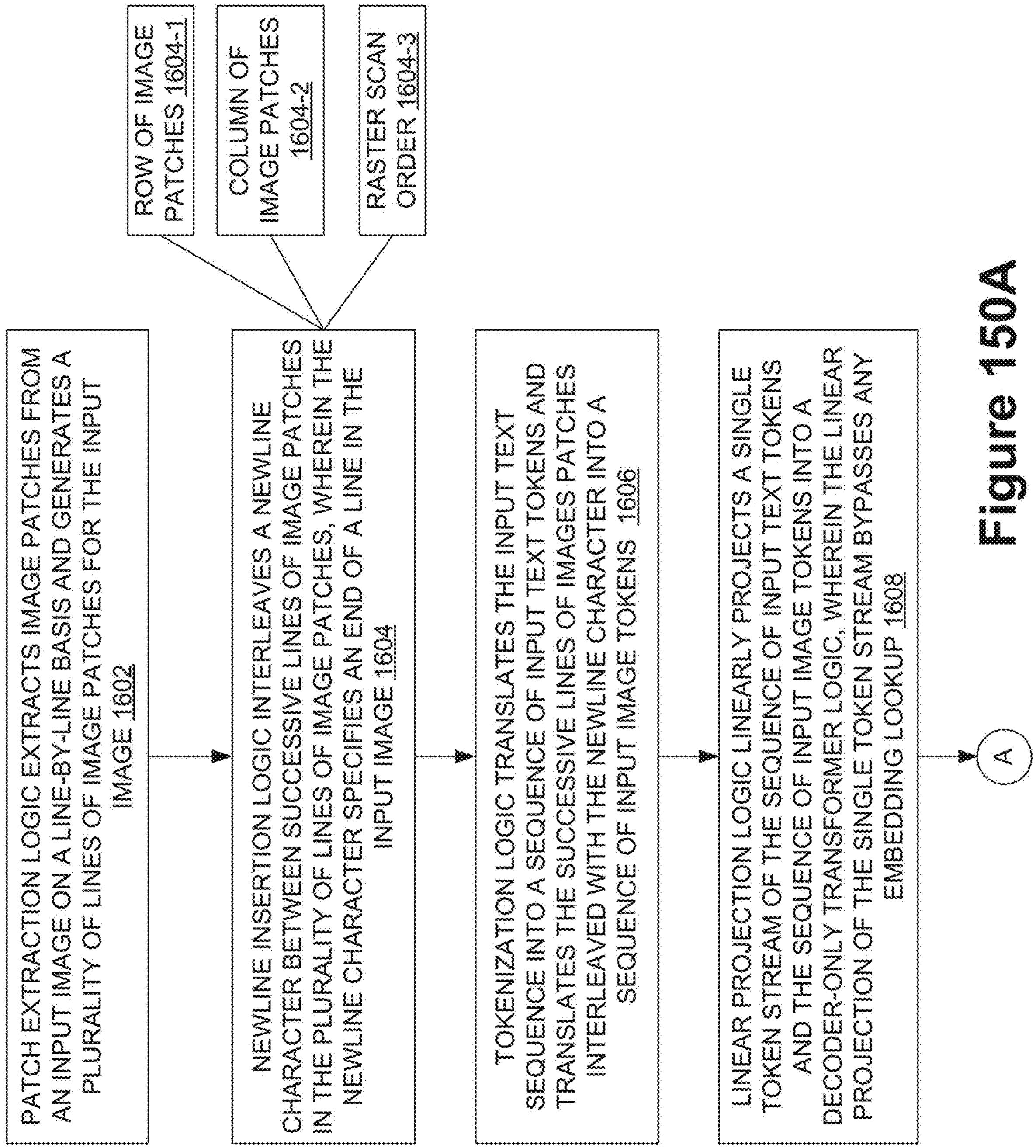
Figure 150B:
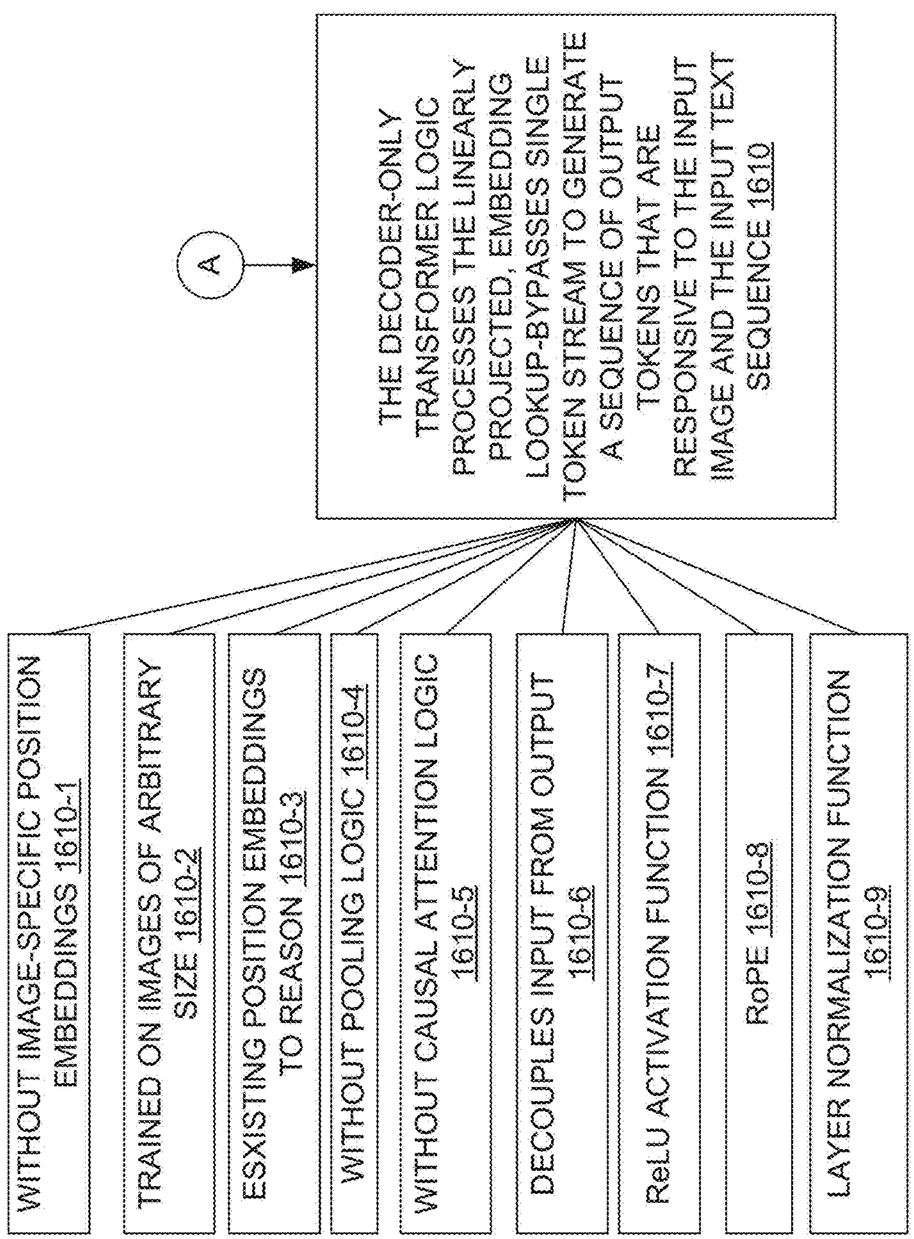

FIGS. 150A and 150B (herein referred to as FIG. 150) show a flow diagram illustrating one example method of operation of the systems disclosed herein. The method shown in FIG. 150 comprises a method for image-text agentic interface automation. It will be noted that the system can include a multimodal agent configured to process arbitrary-length text sequences and arbitrary-resolution images. The multimodal agent includes memory storing an input image and an input text sequence, patch extraction logic, newline insertion logic, tokenization logic, linear projection logic, and decoder-only transformer logic.

At block 1602, patch extraction logic extracts image patches from an input image on a line-by-line basis and generates a plurality of lines of image patches for the input image.

At block 1604, newline insertion logic interleaves a newline character between successive lines of image patches in the plurality of lines of image patches, wherein the newline character specifies an end of a line in the input image.

As indicated by block 1604-1, in some examples, the line in the input image is a row of image patches. As indicated by block 1604-2, in some examples, the line in the input image is a column of image patches. As indicated by block 1604-3, in some examples, the successive lines of image patches are arranged in a raster scan order.

At block 1606, tokenization logic translates the input text sequence into a sequence of input text tokens and translates the successive lines of images patches interleaved with the newline character into a sequence of input image tokens.

At block 1608, linear projection logic linearly projects a single token stream of the sequence of input text tokens and the sequence of input image tokens into a decoder-only transformer logic, wherein the linear projection of the single token stream bypasses any embedding lookup.

At block 1610, the decoder-only transformer logic processes the linearly projected, embedding lookup-bypasses single token stream to generate a sequence of output tokens that are responsive to the input image and the input text sequence.

As indicated by block 1610-1, in some examples, the decoder-only transformer logic is configured without any image-specific position embeddings. As indicated by block 1610-2, in some examples, the decoder-only transformer logic is trained on images of arbitrary size at training time, thereby obviating separate high and low-resolution training stages. As indicated by block 1610-3, in some examples, the decoder-only transformer logic uses existing position embeddings to reason about different image sizes. As indicated by block 1610-4, in some examples, the decoder-only transformer logic is configured without a pooling logic. As indicated by block 1610-5, in some examples, the decoder-only transformer logic is configured without a causal attention logic. As indicated by block 1610-6, in some examples, the decoder-only transformer logic decouples input embeddings from output embeddings. As indicated by block 1610-7, in some examples, the decoder-only transformer logic uses a squared rectified linear unit (ReLU) activation function. As indicated by block 1610-8, in some examples, the decoder-only transformer logic uses a rotary positional embedding (RoPE). As indicated by block 1610-9, in some examples, the decoder-only transformer logic adds a layer normalization (LayerNorm) function to Query (Q) and Key (K) embeddings before the Q and K embeddings enter attention calculations.

Figure 151:
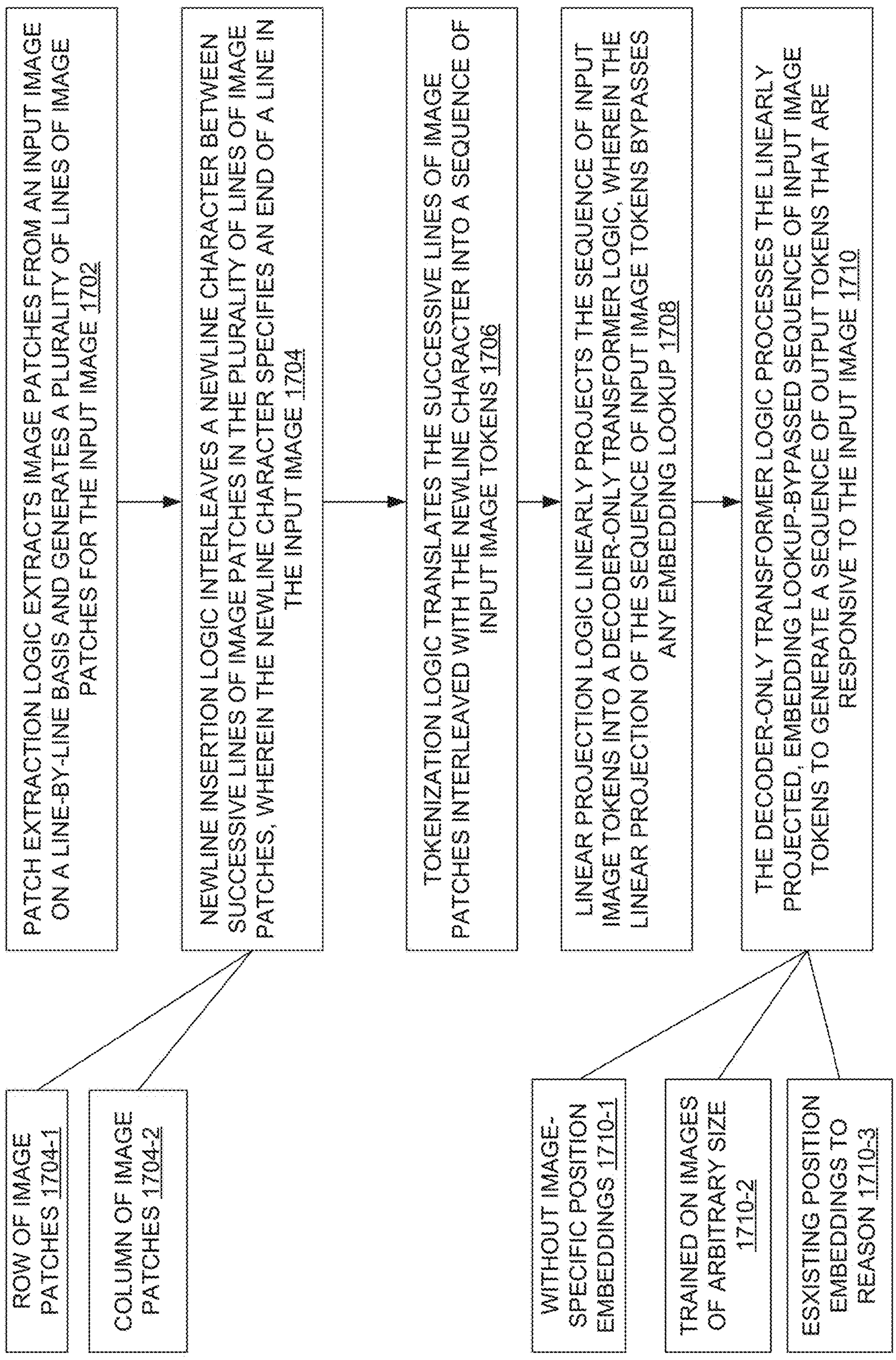

FIG. 151 shows a flow diagram illustrating one example method of operation of the systems disclosed herein. The method shown in FIG. 151 comprises a method for image-text agentic interface automation. It will be understood that the system can include a multimodal agent configured to process arbitrary-resolution images. The multimodal agent include memory storing an input image, patch extraction logic, newline insertion logic, tokenization logic, linear projection logic, and decoder-only transformer logic.

At block 1702, patch extraction logic extracts image patches from an input image on a line-by-line basis and generates a plurality of lines of image patches for the input image.

At block 1704, newline insertion logic interleaves a newline character between successive lines of image patches in the plurality of lines of image patches, wherein the newline character specifies an end of a line in the input image.

As indicated by block 1704-1, in some examples, the line in the input image is a row of image patches. As indicated by block 1704-2, in some examples, the line in the input image is a column of image patches.

At block 1706, tokenization logic translates the successive lines of image patches interleaved with the newline character into a sequence of input image tokens.

At block 1708, linear projection logic linearly projects the sequence of input image tokens into a decoder-only transformer logic, wherein the linear projection of the sequence of input image tokens bypasses any embedding lookup.

At block 1710, the decoder-only transformer logic processes the linearly projected, embedding lookup-bypassed sequence of input image tokens to generate a sequence of output tokens that are responsive to the input image.

As indicated by block 1710-1, in some examples, the decoder-only transformer logic is configured without any image-specific position embeddings. As indicated by block 1710-2, in some examples, the decoder-only transformer logic is trained on images of arbitrary size at training time, thereby obviating separate high and low-resolution training stages. As indicated by block 1710-3, in some examples, the decoder-only transformer logic uses existing position embeddings to reason about different image sizes.

Figure 152:
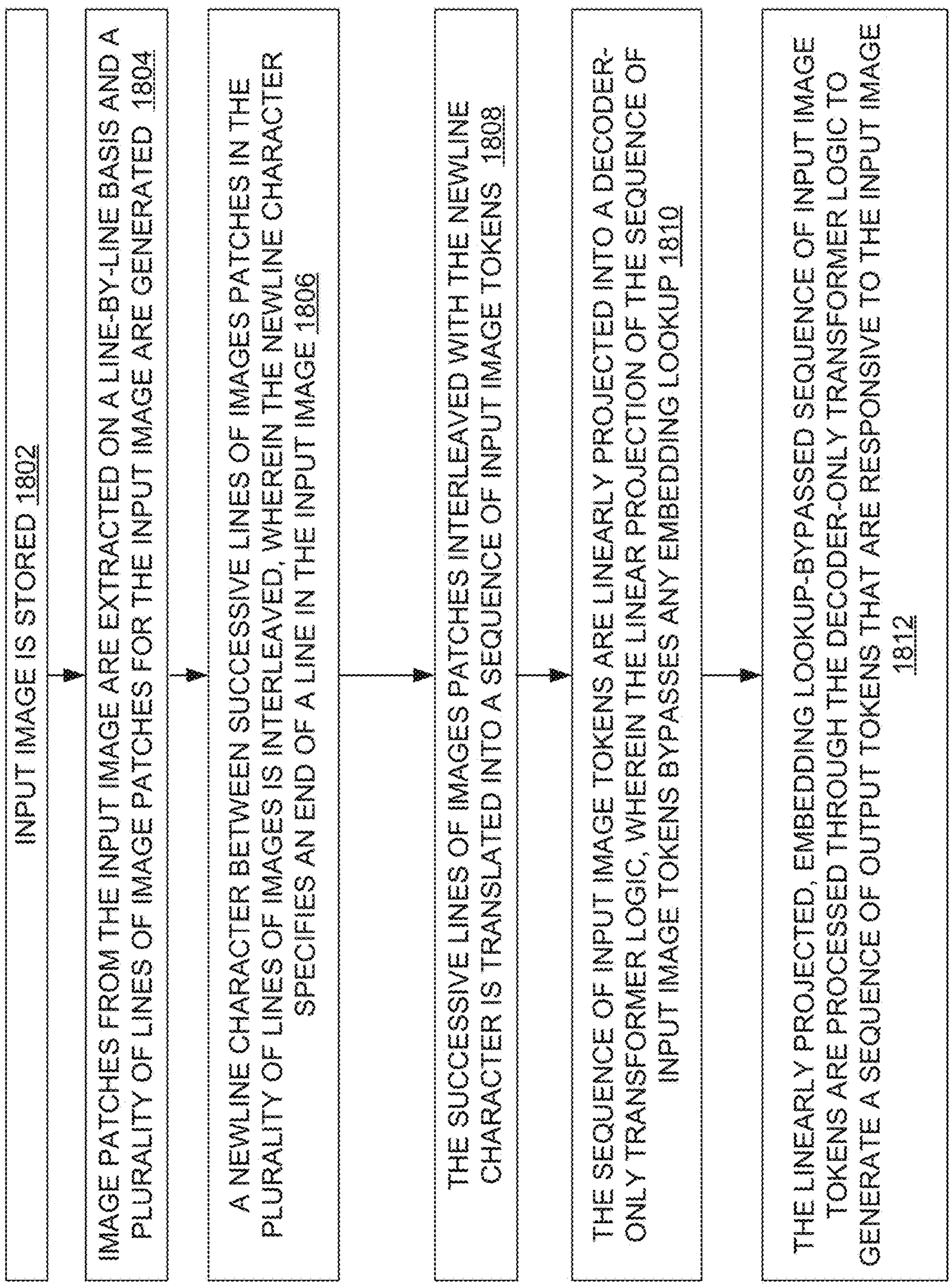

FIG. 152 shows a flow diagram illustrating one example method. The method shown in FIG. 152 comprises a method for image-text agentic interface automation.

At block 1802, an input image is stored.

At block 1804, image patches are extracted from the input image on a line-by-line basis and a plurality of lines of image patches for the input image are generated.

At block 1806, a newline character between successive lines of images patches in the plurality of lines of images is interleaved, wherein the newline character specifies an end of a line in the input image.

At block 1808, the successive lines of images patches interleaved with the newline character is translated into a sequence of input image tokens.

At block 1810, the sequence of input image tokens are linearly projected into a decoder-only transformer logic, wherein the linear projection of the sequence of input image tokens bypasses any embedding lookup.

At block 1812, the linearly projected, embedding lookup-bypassed sequence of input image tokens are processed through the decoder-only transformer logic to generate a sequence of output tokens that are responsive to the input image.

Figure 153A:
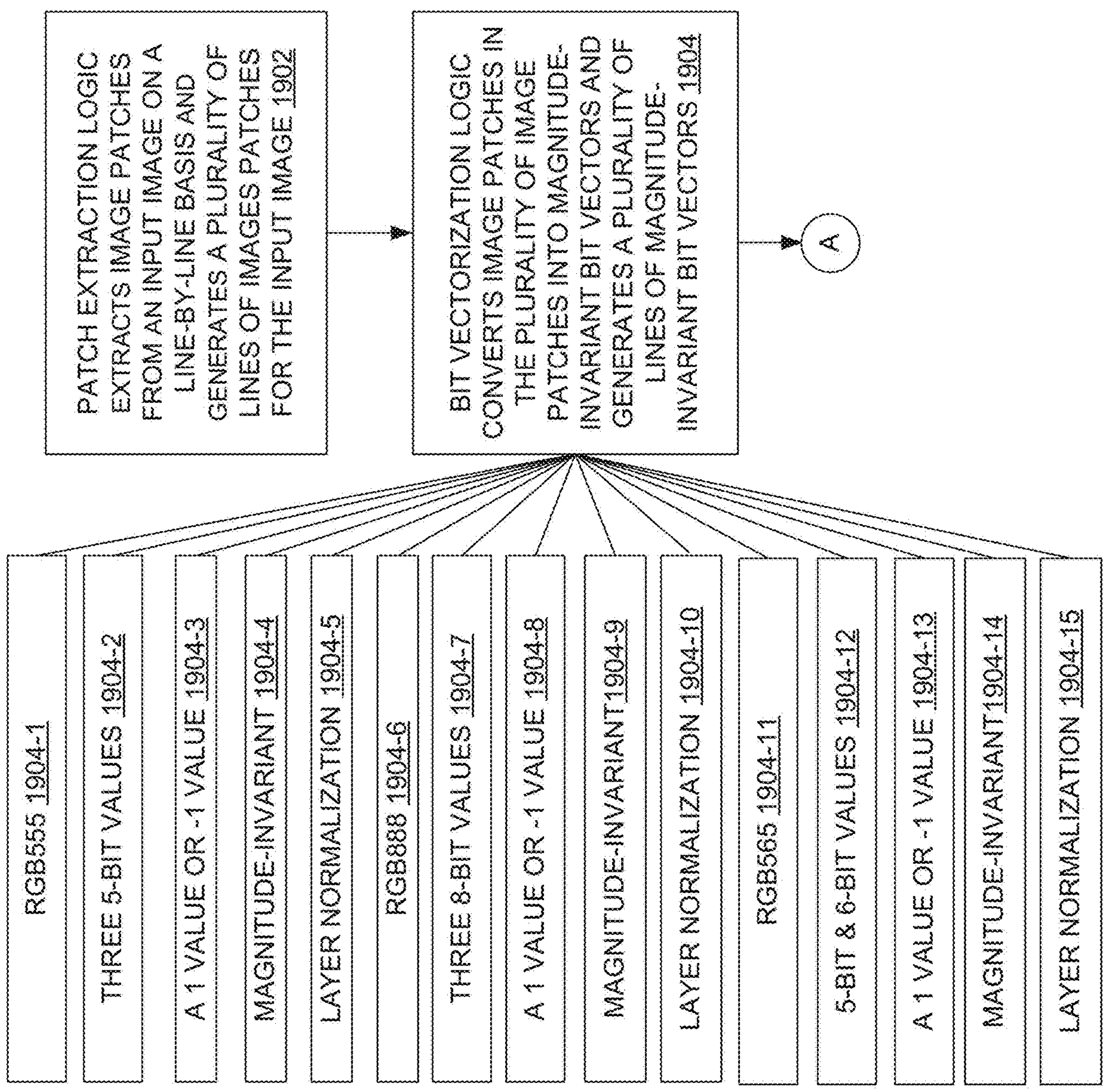
Figure 153B:
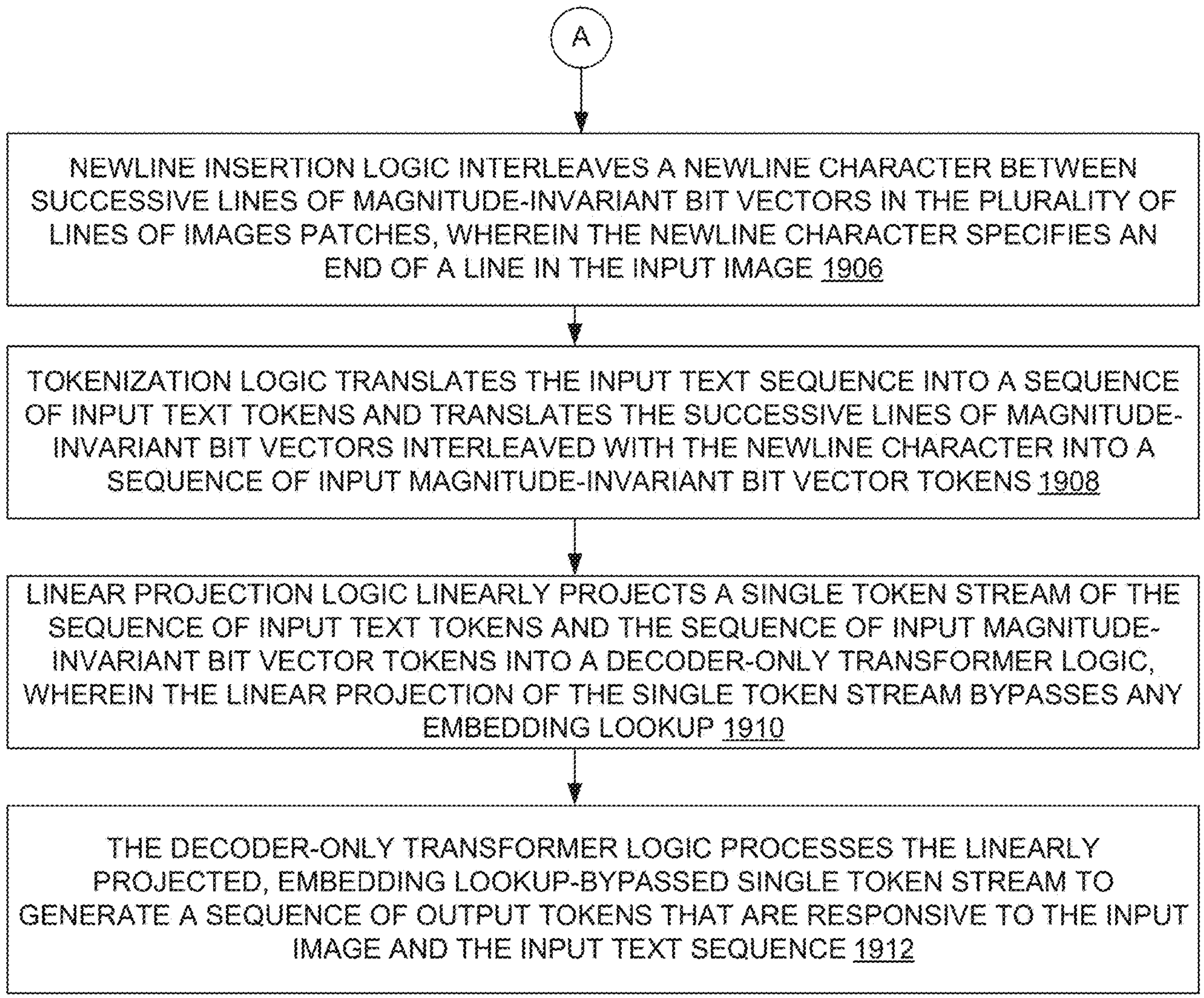

FIGS. 153A and 153B (collectively referred to as FIG. 153) shows a flow diagram illustrating one example method of operation of the systems disclosed herein. The method shown in FIG. 153 comprises a method for magnitude-invariant image-text agentic interface automation. It will be understood that the system can include a multimodal agent configured to process arbitrary-resolution images. The multimodal agent include memory storing an input image and an input text sequence, patch extraction logic, bit vectorization logic, newline insertion logic, tokenization logic, linear projection logic, and decoder-only transformer logic.

At block 1902, patch extraction logic extracts image patches from an input image on a line-by-line basis and generates a plurality of lines of images patches for the input image.

At block 1904, bit vectorization logic converts image patches in the plurality of image patches into magnitude-invariant bit vectors and generates a plurality of lines of magnitude-invariant bit vectors.

As indicated by block 1904-1, in some examples, the bit vectorization logic applies a RGB555 format compression to convert the image patches in the plurality of image patches into the magnitude-invariant bit vectors and to generate the plurality of lines of magnitude-invariant bit vectors. As indicated by block 1904-2, in some examples, the RGB555 format compression produces three 5-bit values, one for each of subpixel channels R (red), G (green), and B (blue). As indicated by block 1904-3, in some examples, the three 5-bit values take either a 1 value or a −1 value. As indicated by block 1904-4, in some examples, the three 5-bit values are magnitude-invariant to scale modification functions of the decoder-only transformer logic. As indicated by block 1904-5, in some examples, a layer normalization (LayerNorm) function is one of the scaling functions of the decoder-only transformer logic.

As indicated by block 1904-6, in some examples, the bit vectorization logic applies a RGB888 format compression to convert the image patches in the plurality of image patches into the magnitude-invariant bit vectors and to generate the plurality of lines of magnitude-invariant bit vectors. As indicated by block 1904-7, in some examples, the RGB888 format compression produces three 8-bit values, one for each of subpixel channels R (red), G (green), and B (blue). As indicated by block 1904-8, in some examples, the three 8-bit values take either a 1 value or a −1 value. As indicated by block 1904-9, in some examples, the three 8-bit values are magnitude-invariant to scale modification functions of the decoder-only transformer logic. As indicated by block 1904-10, in some examples, a layer normalization (LayerNorm) function is one of the scaling functions of the decoder-only transformer logic.

As indicated by block 1904-11, in some examples, the bit vectorization logic applies a RGB565 format compression to convert the image patches in the plurality of image patches into the magnitude-invariant bit vectors and to generate the plurality of lines of magnitude-invariant bit vectors. As indicated by block 1904-12, in some examples, the RGB565 format compression produces 5-bit values for R (red) and B (blue) subpixel channels and 6-bit values for G (green) subpixel channel. As indicated by block 1904-13, in some examples, the 5-bit and the 6-bit values take either a 1 value or a −1 value. As indicated by block 1904-14, in some examples, the 5-bit and the 6-bit values are magnitude-invariant to scale modification functions of the decoder-only transformer logic. As indicated by block 1904-15, in some examples, a layer normalization (LayerNorm) function is one of the scaling functions of the decoder-only transformer logic At block 1906, newline insertion logic interleaves a newline character between successive lines of magnitude-invariant bit vectors in the plurality of lines of images patches, wherein the newline character specifies an end of a line in the input image.

At block 1908, tokenization logic translates the input text sequence into a sequence of input text tokens and translates the successive lines of magnitude-invariant bit vectors interleaved with the newline character into a sequence of input magnitude-invariant bit vector tokens.

At block 1910, linear projection logic linearly projects a single token stream of the sequence of input text tokens and the sequence of input magnitude-invariant bit vector tokens into a decoder-only transformer logic, wherein the linear projection of the single token stream bypasses any embedding lookup.

At block 1912, the decoder-only transformer logic processes the linearly projected, embedding lookup-bypassed single token stream to generate a sequence of output tokens that are responsive to the input image and the input text sequence.

Figure 154:
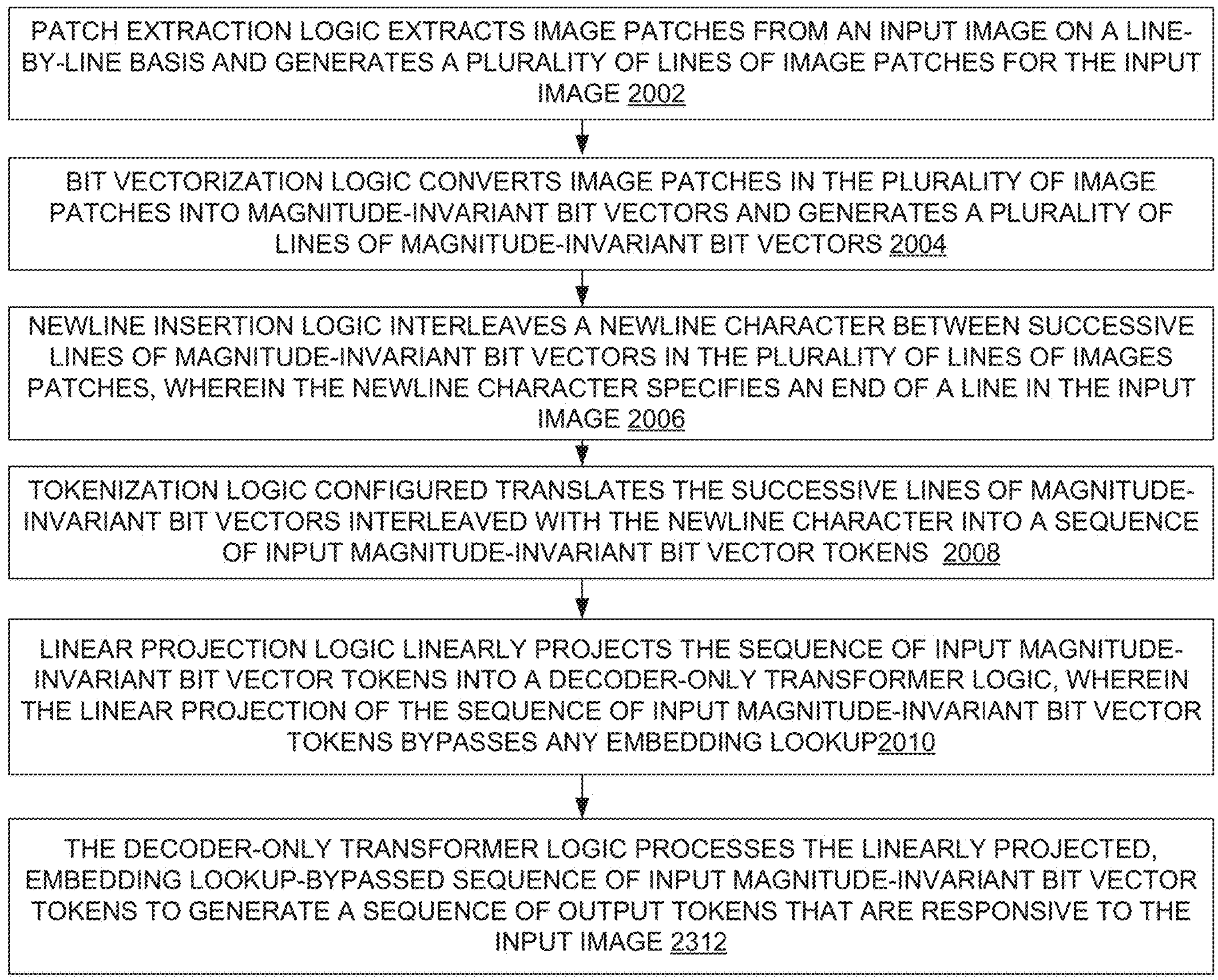

FIG. 154 shows a flow diagram illustrating one example method of operation of the systems disclosed herein. The method shown in FIG. 154 comprises a method for magnitude-invariant image-text agentic interface automation. It will be understood that the system can include a multimodal agent configured to process arbitrary-resolution images. The multimodal agent includes memory storing an input image, patch extraction logic, bit vectorization logic, newline insertion logic, tokenization logic, linear projection logic, and decoder-only transformer logic.

At block 2002, patch extraction logic extracts image patches from an input image on a line-by-line basis and generates a plurality of lines of image patches for the input image.

At block 2004, bit vectorization logic converts image patches in the plurality of image patches into magnitude-invariant bit vectors and generates a plurality of lines of magnitude-invariant bit vectors.

At block 2006, newline insertion logic interleaves a newline character between successive lines of magnitude-invariant bit vectors in the plurality of lines of images patches, wherein the newline character specifies an end of a line in the input image.

At block 2008, tokenization logic configured translates the successive lines of magnitude-invariant bit vectors interleaved with the newline character into a sequence of input magnitude-invariant bit vector tokens.

At block 2010, linear projection logic linearly projects the sequence of input magnitude-invariant bit vector tokens into a decoder-only transformer logic, wherein the linear projection of the sequence of input magnitude-invariant bit vector tokens bypasses any embedding lookup.

At block 2012, the decoder-only transformer logic processes the linearly projected, embedding lookup-bypassed sequence of input magnitude-invariant bit vector tokens to generate a sequence of output tokens that are responsive to the input image.

Figure 155:
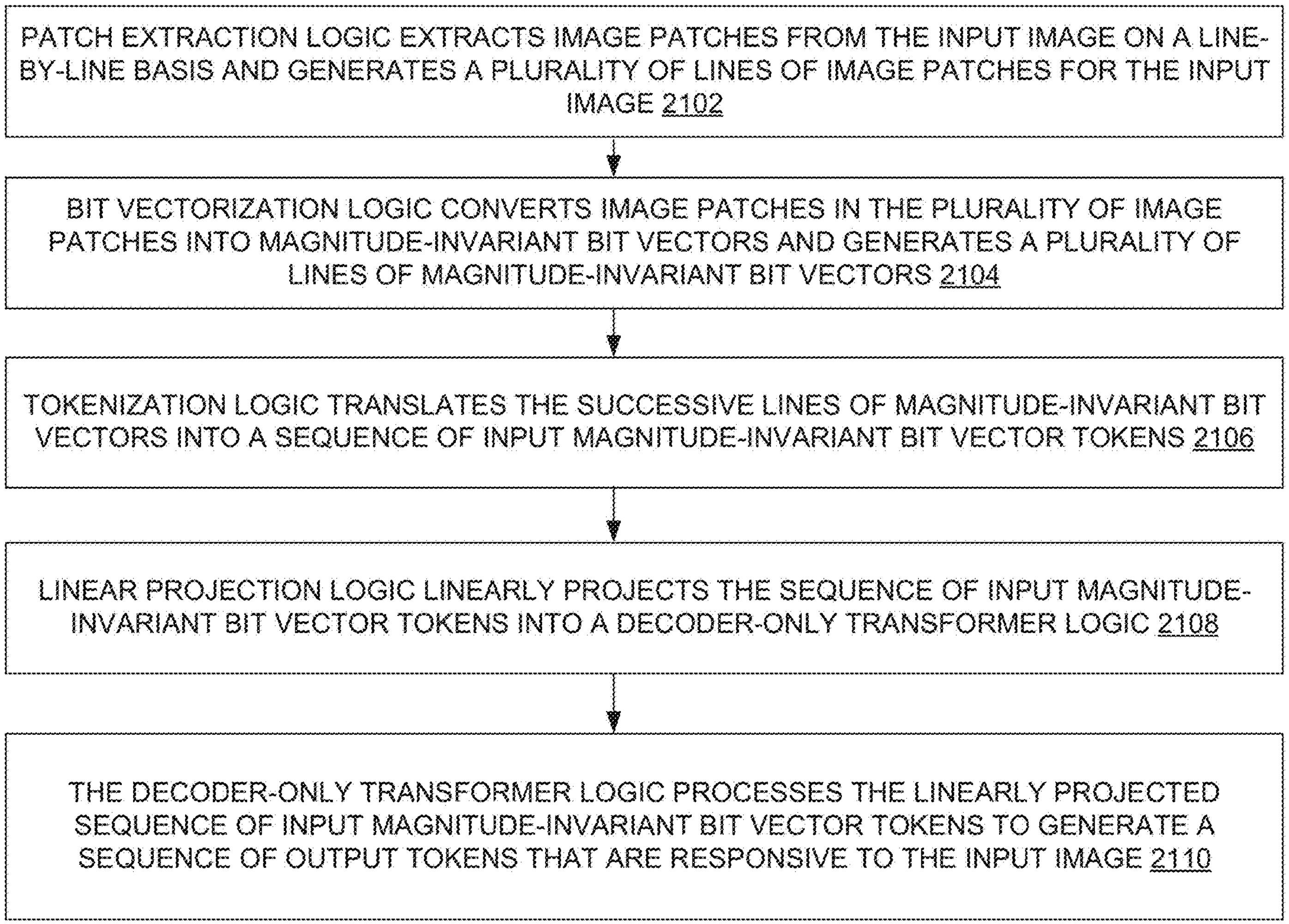

FIG. 155 shows a flow diagram illustrating one example method of operation of the systems disclosed herein. The method shown in FIG. 155 comprises a method for magnitude-invariant image-text agentic interface automation. It will be understood that the system can include a multimodal agent configured to process arbitrary-resolution images. The multimodal agent includes memory storing an input image, patch extraction logic, bit vectorization logic, newline insertion logic, tokenization logic, linear projection logic, and decoder-only transformer logic.

At block 2102, patch extraction logic extracts image patches from the input image on a line-by-line basis and generates a plurality of lines of image patches for the input image.

At block 2104, bit vectorization logic converts image patches in the plurality of image patches into magnitude-invariant bit vectors and generates a plurality of lines of magnitude-invariant bit vectors.

At block 2106, tokenization logic translates the successive lines of magnitude-invariant bit vectors into a sequence of input magnitude-invariant bit vector tokens.

At block 2108, linear projection logic linearly projects the sequence of input magnitude-invariant bit vector tokens into a decoder-only transformer logic.

At block 2110, the decoder-only transformer logic processes the linearly projected sequence of input magnitude-invariant bit vector tokens to generate a sequence of output tokens that are responsive to the input image.

Figure 156:
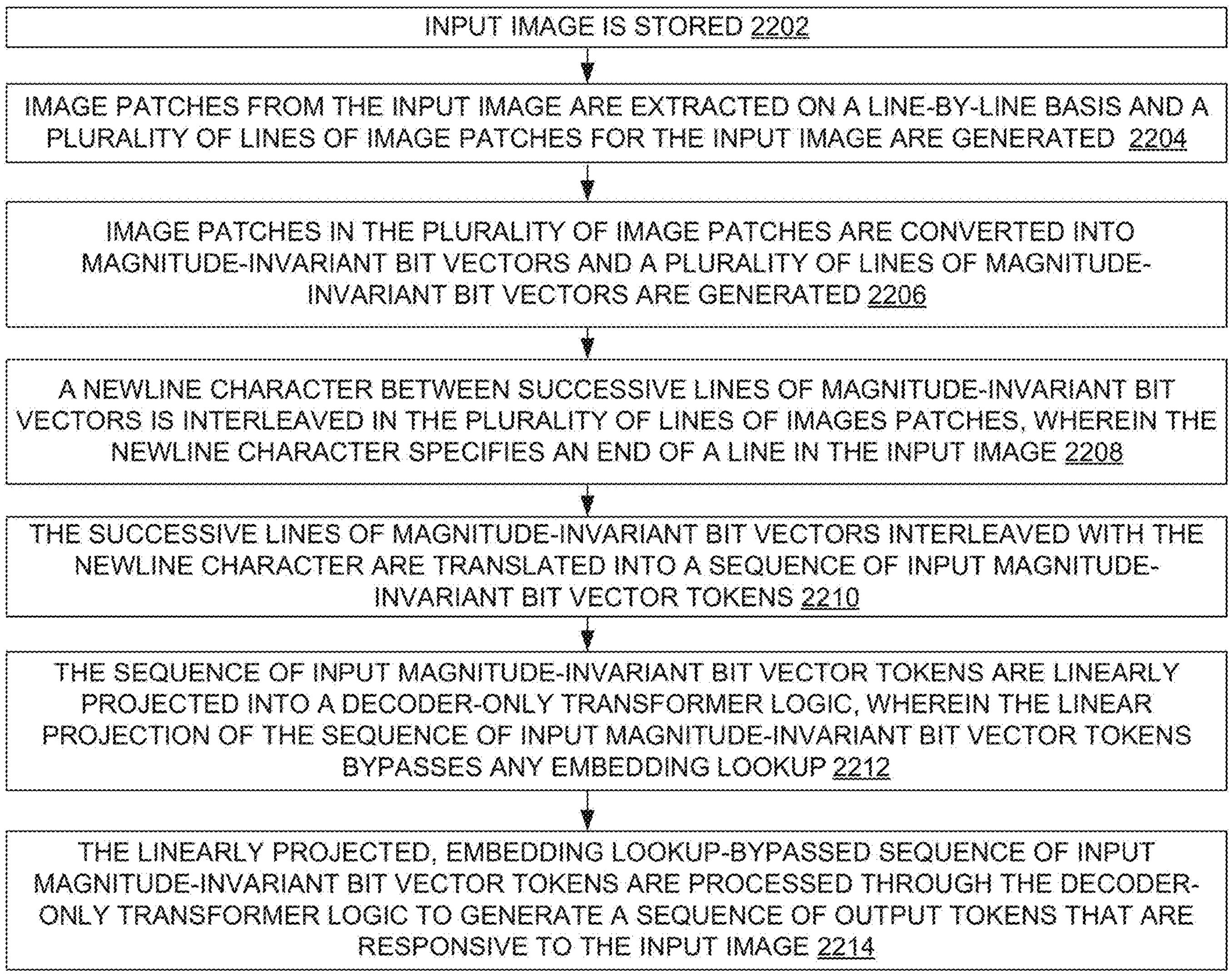

FIG. 156 shows a flow diagram illustrating one example method. The method shown in FIG. 156 comprises a method for magnitude-invariant image-text agentic interface automation.

At block 2202, an input image is stored.

At block 2204, image patches from the input image are extracted on a line-by-line basis and a plurality of lines of image patches for the input image are generated.

At block 2206, image patches in the plurality of image patches are converted into magnitude-invariant bit vectors and a plurality of lines of magnitude-invariant bit vectors are generated.

At block 2208, a newline character between successive lines of magnitude-invariant bit vectors is interleaved in the plurality of lines of images patches, wherein the newline character specifies an end of a line in the input image.

At block 2210, the successive lines of magnitude-invariant bit vectors interleaved with the newline character are translated into a sequence of input magnitude-invariant bit vector tokens.

At block 2212, the sequence of input magnitude-invariant bit vector tokens are linearly projected into a decoder-only transformer logic, wherein the linear projection of the sequence of input magnitude-invariant bit vector tokens bypasses any embedding lookup.

At block 2214, the linearly projected, embedding lookup-bypassed sequence of input magnitude-invariant bit vector tokens are processed through the decoder-only transformer logic to generate a sequence of output tokens that are responsive to the input image.

Figure 157:
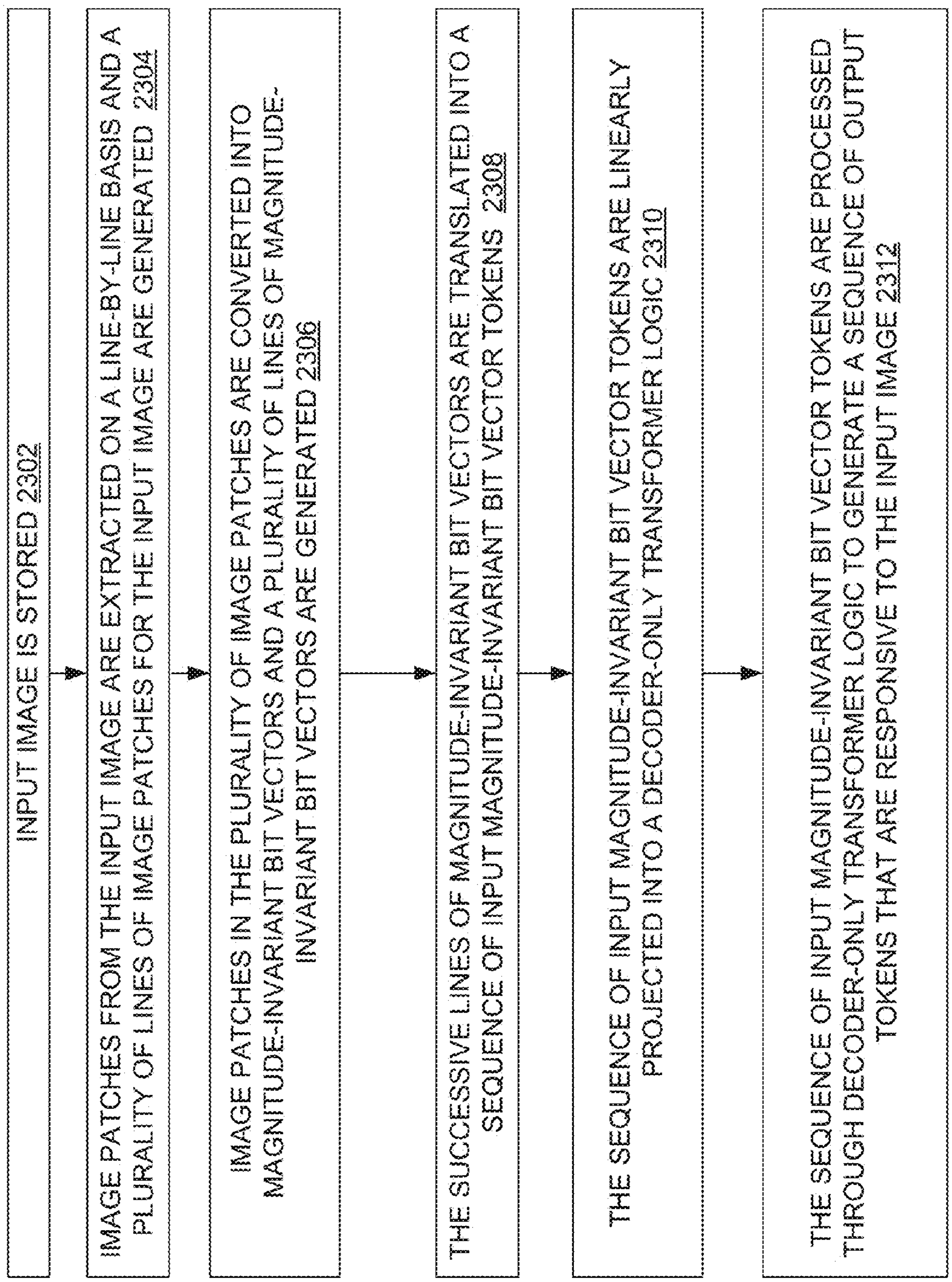

FIG. 157 shows a flow diagram illustrating one example method. The method shown in FIG. 157 comprises a method for magnitude-invariant image-text agentic interface automation.

At block 2302, an input image is stored.

At block 2304, image patches from the input image are extracted on a line-by-line basis and a plurality of lines of image patches for the input image are generated.

At block 2306, image patches in the plurality of image patches are converted into magnitude-invariant bit vectors and a plurality of lines of magnitude-invariant bit vectors are generated.

At block 2308, the successive lines of magnitude-invariant bit vectors are translated into a sequence of input magnitude-invariant bit vector tokens.

At block 2310, the sequence of input magnitude-invariant bit vector tokens are linearly projected into a decoder-only transformer logic.

At block 2312, the sequence of input magnitude-invariant bit vector tokens are processed through decoder-only transformer logic to generate a sequence of output tokens that are responsive to the input image.

FIG. 169 is a block diagram showing an example system 3500 corresponding to the disclosed systems and methods. The system 3500, in one example, can be used to perform the method described in FIG. 150. The system 3500 is a system for image-text agentic interface automation. As shown, system 3500 includes multimodal agent 3502, memory 3504, patch extraction logic 3506, newline insertion logic 3508, tokenization logic 3510, linear projection logic 3512, decoder-only transformer logic 3514, and can include various other items and functionality 3599.

Multimodal agent 3502 is configured to process arbitrary length text sequences and arbitrary-resolution images.

Memory 3504 stores an input image 3560 and an input text sequence 3561.

Patch extraction logic 3506 is configured to extract images patches from the input image 3560 on a line-by-line basis and generate a plurality of lines of images patches 3518 for the input image 3560.

Newline insertion logic 3508 is configured to interleave a newline character 3520 between successive lines of image patches in the plurality of lines of image patches 3518. The newline character 3520 specifies an end of a line in the input image 3560.

Tokenization logic 3510 is configure to translate the input text sequence 3561 into a sequence of input text tokens 3522 and to translate the successive lines of images patches interleave with the newline character 3520 into a sequence input image tokens 3524.

Linear projection logic 3512 is configured to linearly project a single token stream of the sequence of input text tokens 3522 and the sequence of input image tokens 3524 into a decoder-only transformer logic 3514. The linear projection of the single token stream bypasses any embedding lookup.

The decoder-only transformer logic 3514 is configured to process the linearly projected, embedding lookup-bypassed single token stream 3526 to generate a sequence of output tokens 3528 that are responsive to the input image 3560 and the input text sequence 3561.

In some examples, the line in the input image 3560 is a row of single image patches. In some examples, the line in the input image 3560 is a column of image patches. In some examples, the successive lines of image patches are arranged in a raster-scan order.

The decoder-only transformer logic 3514, in some examples, is configured without any image-specific position embeddings. The decoder-only transformer logic 3514, in some examples, is configured to be trained on images of arbitrary size at training time, thereby obviating separate high and low-resolution training stages. The decoder-only transformer logic 3514, in some examples, is configured to use existing position embeddings to reason about different image sizes. The decoder-only transformer logic 3514, in some examples, is configured without a pooling logic. The decoder-only transformer logic 3514, in some examples, is configured without a causal attention logic. The decoder-only transformer logic 3514, in some examples, is configured to decouple input embeddings from output embeddings. The decoder-only transformer logic 3514, in some examples, is configured to use a squared rectified linear unit (ReLU) activation function. The decoder-only transformer logic 3514, in some examples, is configured to use a rotary positional embedding (RoPE). The decoder-only transformer logic 3514, in some examples, is configured to add a layer normalization (LayerNorm) function to Query (Q) and Key (K) embeddings before the Q and K embeddings enter attention calculations.

FIG. 170 is a block diagram showing an example system 3600 corresponding to the disclosed systems and methods. The system 3600, in one example, can be used to perform the method described in FIG. 151. The system 3600 is a system for image-text agentic interface automation. As shown, system 3600 includes multimodal agent 3602, memory 3604, patch extraction logic 3606, newline insertion logic 3608, tokenization logic 3610, linear projection logic 3612, decoder-only transformer logic 3614, and can include various other items and functionality 3699.

Multimodal agent 3602 is configured to process arbitrary-resolution images.

Memory 3604 is configured to store an input image 3660.

Patch extraction logic 3606 is configured to extract image patches on a line-by-line basis and to generate a plurality of lines of image patches 3618 for the input image 3660.

Newline insertion logic 3608 is configured to interleave a newline character 3620 between successive lines of image patches in the plurality of lines of image patches 3618. The newline character 3620 specifies an end of a line in the input image 3660.

Tokenization logic 3610 is configured to translate the successive lines of image patches interleaved with the newline character 3620 into a sequence of input image tokens 3624.

Linear projection logic 3612 is configured to linearly project the sequence of input image tokens 3624 into a decoder-only transformer logic 3614. The linear projection of the sequence input image tokens bypasses any embedding lookup.

Decoder-only transformer logic 3614 is configured to process the linearly projected, embedding lookup-bypassed sequence of input image tokens 3626 to generate a sequence of output tokens 3628 that are responsive to the input image.

In one example, the line in the input image 3660 is a row of image patches. In one example, the line in the input image 3660 is a column of image patches.

The decoder-only transformer logic 3514, in some examples, is configured without any image-specific position embeddings. The decoder-only transformer logic 3614, in some examples, is configured to be trained on images of arbitrary size at training time, thereby obviating separate high and low-resolution training stages. The decoder-only transformer logic 3614, in some examples, is configured to use existing position embeddings to reason about different image sizes.

FIG. 171 is a block diagram showing an example system 3700 corresponding to the disclosed systems and methods. The system 3700, in one example, can be used to perform the method described in FIG. 153. The system 3700 is a system for magnitude-invariant image-text agentic interface automation. As shown, system 3700 includes multimodal agent 3702, memory 3704, patch extraction logic 3706, bit vectorization logic 3707, newline insertion logic 3708, tokenization logic 3710, linear projection logic 3712, decoder-only transformer logic 3714, and can include various other items and functionality 3799.

The multimodal agent 3702 is configured to process arbitrary-length text sequences and arbitrary-resolution images.

Memory 3704 is configured to store an input image 3760 and an input text sequence 3761.

Patch extraction logic 3706 is configured to extract image patches from the input image 3760 on a line-by-line basis and generate a plurality of lines of images patches 3718 for the input image 3760.

Bit vectorization logic 3707 is configured to convert image patches in the plurality of image patches into magnitude-invariant bit vectors 3722 and generate a plurality of lines of magnitude-invariant bit vectors 3724.

Newline insertion logic 3708 is configured to interleave a newline character 3720 between successive lines of magnitude-invariant bit vectors in the plurality of lines of images patches, wherein the newline character 3720 specifies an end of a line in the input image 3760.

Tokenization logic 3710 is configured to translate the input text sequence 3761 into a sequence of input text tokens 3726 and to translate the successive lines of magnitude-invariant bit vectors interleaved with the newline character into a sequence of input magnitude-invariant bit vector tokens 3728.

Linear projection logic 3712 is configured to linearly project a single token stream of the sequence of input text tokens 3726 and the sequence of input magnitude-invariant bit vector tokens 3728 into a decoder-only transformer logic 3714. The linear projection of the single token stream bypasses any embedding lookup.

Decoder-only transformer logic 3714 is configured to process the linearly projected, embedding lookup-bypassed single token stream 3730 to generate a sequence of output tokens 3732 that are responsive to the input image 3760 and the input text sequence 3761.

In some examples, bit vectorization logic 3707 is configured to apply a RGB555 format compression to convert the image patches in the plurality of image patches 3718 into the magnitude-invariant bit vectors 3722 and generate the plurality of lines of magnitude-invariant bit vectors 3724. In some examples, the RGB555 format compression produces three 5-bit values, one for each of subpixel channels R (red), G (green), and B (blue). In some examples, the three 5-bit values take either a 1 value or a −1 value. In some examples, the three 5-bit values are magnitude-invariant to scale modification functions of the decoder-only transformer logic 3714. In some examples, a layer normalization (LayerNorm) function is one of the scale modification functions of the decoder-only transformer logic.

In some examples, bit vectorization logic 3707 is configured to apply a RGB888 format compression to convert the image patches in the plurality of image patches 3718 into the magnitude-invariant bit vectors 3722 and to generate the plurality of lines of magnitude-invariant bit vectors 3724. In some examples, the RGB888 format compression produces three 8-bit values, one for each of subpixel channels R (red), G (green), and B (blue). In some examples, the three 8-bit values take either a 1 value or a −1 value. In some examples, the three 8-bit values are magnitude-invariant to scale modification functions of the decoder-only transformer logic 3714. In some examples, a layer normalization (LayerNorm) function is one of the scale modification functions of the decoder-only transformer logic 3714.

In some examples, bit vectorization logic 3707, is configured to apply a RGB565 format compression to convert the image patches in the plurality of image patches 3718 into the magnitude-invariant bit vectors 3722 and to generate the plurality of lines of magnitude-invariant bit vectors 3724. In some examples, the RGB565 format compression produces 5-bit values for R (red) and B (blue) subpixel channels and 6-bit values for G (green) subpixel channel. In some examples, the 5-bit and the 6-bit values take either a 1 value or a −1 value. In some examples, the 5-bit and the 6-bit values are magnitude-invariant to scale modification functions of the decoder-only transformer logic 3714. In some examples, a layer normalization (LayerNorm) function is one of the scale modification functions of the decoder-only transformer logic 3714.

FIG. 172 is a block diagram showing an example system 3800 corresponding to the disclosed systems and methods. The system 3800, in one example, can be used to perform the method described in FIG. 154. The system 3800 is a system for magnitude-invariant image-text agentic interface automation. As shown, system 3800 includes multimodal agent 3802, memory 3804, patch extraction logic 3806, bit vectorization logic 3807, newline insertion logic 3808, tokenization logic 3810, linear projection logic 3812, decoder-only transformer logic 3814, and can include various other items and functionality 3899.

Multimodal agent 3802 is configured to process arbitrary-resolution images.

Memory 3804 is configured to store an input image 3860.

Patch extraction logic 3806 is configured to extract image patches from the input image 3860 on a line-by-line basis and generate a plurality of lines of image patches 3818 for the input image 3860.

Bit vectorization logic 3807 is configured to convert image patches in the plurality of image patches 3818 into magnitude-invariant bit vectors 3822 and generate a plurality of lines of magnitude-invariant bit vectors 3824.

Newline insertion logic 3808 is configured to interleave a newline character 3820 between successive lines of magnitude-invariant bit vectors in the plurality of lines of images patches. The newline character 3820 specifies an end of a line in the input image 3860.

Tokenization logic 3810 is configured to translate the successive lines of magnitude-invariant bit vectors interleaved with the newline character into a sequence of input magnitude-invariant bit vector tokens 3828.

Linear projection logic 3812 is configured to linearly project the sequence of input magnitude-invariant bit vector tokens 3828 into a decoder-only transformer logic 3814. The linear projection of the sequence of input magnitude-invariant bit vector tokens bypasses any embedding lookup.

Decoder-only transformer logic 3814 is configured to process the linearly projected, embedding lookup-bypassed sequence of input magnitude-invariant bit vector tokens 3830 to generate a sequence of output tokens 3832 that are responsive to the input image 3860.

FIG. 173 is a block diagram showing an example system 3900 corresponding to the disclosed systems and methods. The system 3900, in one example, can be used to perform the method described in FIG. 155. The system 3900 is a system for magnitude-invariant image-text agentic interface automation. As shown, system 3900 includes multimodal agent 3902, memory 3904, patch extraction logic 3906, bit vectorization logic 3907, tokenization logic 3910, linear projection logic 3912, decoder-only transformer logic 3914, and can include various other items and functionality 3999.

Multimodal agent 3902 is configured to process arbitrary-resolution images.

Memory 3904 is configured to store an input image 3960.

Patch extraction logic 3906 is configured to extract image patches from the input image 3960 on a line-by-line basis and generate a plurality of lines of image patches 3918 for the input image 3960.

Bit vectorization logic 3907 is configured to convert image patches in the plurality of image patches 3918 into magnitude-invariant bit vectors 3922 and generate a plurality of lines of magnitude-invariant bit vectors 3924.

Tokenization logic 3910 is configured to translate successive lines of the magnitude-invariant bit vectors 3922 into a sequence of input magnitude-invariant bit vector tokens 3928.

Linear projection logic 3912 is configured to linearly project the sequence of input magnitude-invariant bit vector tokens 3928 into a decoder-only transformer logic 3914. Decoder-only transformer logic 3914 is configured to process the linearly projected sequence of input magnitude-invariant bit vector tokens 3930 to generate a sequence of output tokens 3932 that are responsive to the input image 3960.

Computer System

FIG. 174 shows an example computer system 1300 that can be used to implement the technology disclosed. Computer system 1300 includes at least one central processing unit (CPU) 1342 that communicates with a number of peripheral devices via bus subsystem 1326. These peripheral devices can include a storage subsystem 1302 including, for example, memory devices and a file storage subsystem 1326, user interface input devices 1328, user interface output devices 1346, and a network interface subsystem 1344. The input and output devices allow user interaction with computer system 1300. Network interface subsystem 1344 provides an interface to outside networks, including an interface to corresponding interface devices in other computer systems.

In one implementation, the disclosed AI system(s) are communicably linked to the storage subsystem 1302 and the user interface input devices 1328.

User interface input devices 1328 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1346 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1302 stores programming and data constructs that provide the functionality of some or all of the modules and methods described herein. These software modules are generally executed by processors 1348.

Processors 1348 can be graphics processing units (GPUs), field-programmable gate arrays (FPGAs), application-specific integrated circuits (ASICs), and/or coarse-grained reconfigurable architectures (CGRAs). Processors 1348 can be hosted by a deep learning cloud platform such as Google Cloud Platform™, Xilinx™, and Cirrascale™. Examples of processors 1348 include Google's Tensor Processing Unit (TPU)™, rackmount solutions like GX4 Rackmount Series™, GX13 Rackmount Series™, NVIDIA DGX-1™, Microsoft' Stratix V FPGA™ Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1312 used in the storage subsystem 1302 can include a number of memories including a main random access memory (RAM) 1322 for storage of instructions and data during program execution and a read only memory (ROM) 1324 in which fixed instructions are stored. A file storage subsystem 1326 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1326 in the storage subsystem 1302, or in other machines accessible by the processor.

Bus subsystem 1336 provides a mechanism for letting the various components and subsystems of computer system 1300 communicate with each other as intended. Although bus subsystem 1336 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1300 depicted in FIG. 174 is intended only as a specific example for purposes of illustrating the preferred implementations of the present technology disclosed. Many other configurations of computer system 1300 are possible having more or less components than the computer system depicted in FIG. 174.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

FIG. 174 is a schematic of an exemplary computing node. Computing node 1300 is only one example of a suitable computing node and is not intended to suggest any limitation as to the scope of use or functionality of embodiments described herein. Regardless, computing node 1300 is capable of being implemented and/or performing any of the functionality set forth hereinabove.

In computing node 1300 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 174, computer system/server in computing node 1300 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

1st Clause Set (Adept Recorder)

1. A system for generating training data to train agents to automate tasks otherwise done by users, comprising:
- an intermediary interposed between an interface and a user, and configured to:
  - intercept one or more user-actuated actions directed towards the interface by the user, wherein the user-actuated actions, if received by the interface, execute a task on the interface;
  - preserve a state of the interface prior to the execution of the task;
  - translate the user-actuated actions into one or more actuation commands, wherein the actuation commands are configured to trigger one or more machine-actuated actions that replicate the user-actuated actions on the interface to cause automation of the task; and
  - generate a training dataset to train an agent to automate the task, wherein the training dataset requires the agent to process, as input, the state of the interface prior to the execution of the task, and to generate, as output, the actuation commands.

2. The system of clause 1, further configured to comprise an actuator, wherein the actuator is configured to receive the actuation commands from the intermediary, and to perform the machine-actuated actions based on the actuation commands as synthetic actions that automate the task.

3. The system of clause 1, wherein the state of the interface prior to the execution of the task includes one or more snapshots of the interface.

4. The system of clause 1, wherein the state of the interface prior to the execution of the task includes metadata about the interface (e.g., variables, browser metadata).

5. The system of clause 1, wherein the state of the interface prior to the execution of the task includes one or more thoughts from the user that contextualize the state (e.g., the page is not loading).

6. The system of clause 1, wherein the state of the interface prior to the execution of the task includes one or more hints from the user that contextualize the task (e.g., the page is not loading).

7. The system of clause 1, wherein the state of the interface prior to the execution of the task includes a description of the task provided by the user.

8. The system of clause 1, wherein the task includes a plurality of sub-tasks that form an interface workflow.

9. The system of clause 8, wherein the intermediary is further configured to separately perform the interception, the preservation, the translation, and the generation for each sub-task in the plurality of sub-tasks.

10. The system of clause 8, wherein a current sub-task in the plurality of sub-tasks is a result of executing one or more preceding sub-tasks in the plurality of sub-tasks.

11. The system of clause 10, wherein the state of the interface prior to the execution of the current sub-task includes one or more snapshots of the interface corresponding to the current sub-task, one or more snapshots of the interface corresponding to the preceding sub-tasks, and one or more actuation commands corresponding to the preceding sub-tasks.

12. The system of clause 1, wherein the user-actuated actions include clicks, hovers, scrolls, picks, text entries, and form fills.

13. The system of clause 1, wherein the interface is part of an application.

14. The system of clause 13, wherein the application is a web application (e.g., a browser).

15. The system of clause 13, wherein the application is a native application (e.g., a desktop application).

16. The system of clause 1, wherein the actuation commands are editable by the user.

17. The system of clause 1, wherein the actuation commands are part of a sequence of actuation commands.

18. The system of clause 8, wherein the interface workflow is a multimodal interface workflow.

19. A computer-implemented method for generating training data to train agents to automate tasks otherwise done by users, the computer implemented method comprising:
- intercepting one or more user-actuated actions directed towards an interface by a user, wherein the user-actuated actions, if received by the interface, execute a task on the interface;
- preserving a state of the interface prior to the execution of the task;
- translating the user-actuated actions into one or more actuation commands, wherein the actuation commands are configured to trigger one or more machine-actuated actions that replicate the user-actuated actions on the interface to cause automation of the task; and
- generating a training dataset to train an agent to automate the task, wherein the training dataset requires the agent to process, as input, the state of the interface prior to the execution of the task, and to generate, as output, the actuation commands.

20. The computer-implemented method of clause 19, further comprising receiving, with an actuator, the actuation commands from the intermediary and performing, with the actuator, the machine-actuated actions based on the actuation commands as synthetic actions that automate the task.

21. The computer-implemented of clause 19, wherein the preserving the state of the interface prior to the execution of the task includes preserving one or more snapshots of the interface.

22. The computer-implemented of clause 19, wherein the preserving state of the interface prior to the execution of the task includes preserving metadata about the interface (e.g., variables, browser metadata).

23. The computer-implemented of clause 19, wherein preserving the state of the interface prior to the execution of the task includes preserving one or more thoughts from the user that contextualize the state (e.g., the page is not loading).

24. The computer-implemented of clause 19, wherein preserving the state of the interface prior to the execution of the task includes preserving one or more hints from the user that contextualize the task (e.g., the page is not loading).

25. The computer-implemented of clause 19, wherein the preserving state of the interface prior to the execution of the task includes preserving a description of the task provided by the user.

26. The computer-implemented of clause 19, wherein the task includes a plurality of sub-tasks that form an interface workflow.

27. The computer-implemented of clause 26, further comprising separately performing the intercepting, the preserving, the translating, and the generating for each sub-task in the plurality of sub-tasks.

28. The computer-implemented of clause 26, wherein a current sub-task in the plurality of sub-tasks is a result of executing one or more preceding sub-tasks in the plurality of sub-tasks.

29. The computer-implemented of clause 28, wherein the preserving state of the interface prior to the execution of the current sub-task includes preserving one or more snapshots of the interface corresponding to the current sub-task, preserving one or more snapshots of the interface corresponding to the preceding sub-tasks, and preserving one or more actuation commands corresponding to the preceding sub-tasks.

30. The computer-implemented of clause 19, wherein the user-actuated actions include clicks, hovers, scrolls, picks, text entries, and form fills.

31. The computer-implemented of clause 19, wherein the interface is part of an application.

32. The computer-implemented of clause 31, wherein the application is a web application (e.g., a browser).

33. The computer-implemented of clause 31, wherein the application is a native application (e.g., a desktop application).

34. The computer-implemented of clause 1, wherein the actuation commands are editable by the user.

35. The computer-implemented of clause 1, wherein the actuation commands are part of a sequence of actuation commands.

36. The computer-implemented of clause 26, wherein the interface workflow is a multimodal interface workflow.

2nd Clause Set (Adept Agent)

1. A system for interface automation, comprising:
  an agent configured to:
    process an input that specifies an interface workflow, wherein the interface workflow is otherwise implementable by one or more user-actuated actions directed towards an interface by a user; and
    generate an output that specifies a sequence of actuation commands, wherein the sequence of actuation commands triggers one or more machine-actuated actions that replicate the user-actuated actions on the interface and cause automation of the interface workflow.

2. The system of clause 1, wherein the input is a natural language description of the interface workflow.

3. The system of clause 1, wherein the input is a prescriptive command (e.g., a tuple) that translates the interface workflow into one or more functions and one or more parameters.

4. The system of clause 3, wherein the parameters are key-value pairs.

5. The system of clause 3, wherein the parameters include descriptions of the functions.

6. The system of clause 1, wherein the input includes a state of the interface prior to the execution of the interface workflow.

7. The system of clause 1, wherein the state of the interface prior to the execution of the interface workflow includes one or more snapshots of the interface.

8. The system of clause 1, wherein the state of the interface prior to the execution of the interface workflow includes metadata about the interface (e.g., variables, browser metadata).

9. The system of clause 1, wherein the state of the interface prior to the execution of the interface workflow includes one or more thoughts from the user that contextualize the state (e.g., the page is not loading).

10. The system of clause 1, wherein the state of the interface prior to the execution of the interface workflow includes one or more hints from the user that contextualize the interface workflow (e.g., the page is not loading).

11. The system of clause 1, wherein the state of the interface prior to the execution of the interface workflow includes a description of the interface workflow provided by the user.

12. The system of clause 1, wherein the interface workflow includes a plurality of sub-tasks.

13. The system of clause 12, wherein a current sub-task in the plurality of sub-tasks is a result of executing one or more preceding sub-tasks in the plurality of sub-tasks.

14. The system of clause 13, wherein the state of the interface prior to the execution of the current sub-task includes one or more snapshots of the interface corresponding to the current sub-task, one or more snapshots of the interface corresponding to the preceding sub-tasks, and one or more sequences of actuation commands corresponding to the preceding sub-tasks.

15. The system of clause 1, further configured to comprise an actuator, wherein the actuator is configured to receive the sequence of actuation commands from the agent, and to perform the machine-actuated actions based on the sequence of actuation commands as synthetic actions that automate the interface workflow.

16. The system of clause 1, wherein the user-actuated actions include clicks, hovers, scrolls, picks, text entries, and form fills.

17. The system of clause 1, wherein the interface is part of an application.

18. The system of clause 17, wherein the application is a web application (e.g., a browser).

19. The system of clause 17, wherein the application is a native application (e.g., a desktop application).

20. The system of clause 1, wherein the agent is further configured to use rejection sampling to output the sequence of actuation commands.

21. The system of clause 1, wherein the agent is further configured to be trained to perform a plurality of visual web tasks.

22. The system of clause 21, wherein the plurality of visual web tasks includes website-wise tasks, element-wise tasks, and action-wise tasks.

23. The system of clause 22, wherein the website-wise tasks include heading optical character recognition (OCR), captioning, and web question answering (WebQA).

24. The system of clause 22, wherein the element-wise tasks include element optical character recognition (OCR), element grounding/localization, and key-value pair identification.

25. The system of clause 22, wherein the action-wise tasks include action grounding and action prediction.

26. The system of clause 1, wherein the agent is further configured to locate elements on the interface based on processing a screenshot of the interface and a text description seeking coordinates of a particular element on the interface.

27. The system of clause 26, wherein the agent is further configured to answer questions about screenshots of websites and documents.

28. The system of clause 1, wherein the interface workflow is a multimodal interface workflow.

29. A system for interface automation, comprising:

an agent configured to automate a sequence of interface workflows, comprising:

the agent further configured to receive, for a first interface workflow in the sequence of interface workflows, a screenshot of a first interface and a first interface workflow definition, wherein the first interface has a first set of interface elements that when configured with a first configuration execute the first interface workflow;

the agent further configured to process the screenshot of the first interface and the first interface workflow definition, and, in response, generate a first sequence of actuation commands that automatically configures the first set of interface elements with the first configuration and causes execution of the first interface workflow;

the agent further configured to receive, for a second interface workflow in the sequence of interface workflows, a screenshot of a second interface, a second interface workflow definition, the screenshot of the first interface, and the first sequence of actuation commands, wherein the second interface has a second set of interface elements that when configured with a second configuration execute the second interface workflow; and the agent further configured to process the screenshot of the second interface, the second interface workflow definition, the screenshot of the first interface, and the first sequence of actuation commands, and, in response, generate a second sequence of actuation commands that automatically configures the second set of interface elements with the second configuration and causes execution of the second interface workflow.

30. The system of clause 29, further configured to comprise an actuator, wherein the actuator is configured to receive the first and second sequences of actuation commands from the agent, and to execute the first and second sequences of actuation commands as synthetic actions that automate the first and second interface workflows.

31. The system of clause 30, wherein the actuator is further configured to send the screenshots of the first and second interfaces to the agent.

32. The system of clause 29, wherein the first interface workflow definition is a natural language description of the first interface workflow, wherein the second interface workflow definition is a natural language description of the second interface workflow.

33. The system of clause 29, wherein the first interface workflow definition is a first tuple that translates the first interface workflow into a first set of functions and a first set of parameters, wherein the second interface workflow definition is a second tuple that translates the second interface workflow into a second set of functions and a second set of parameters.

34. The system of clause 33, wherein the first and second set of parameters are key-value pairs.

35. The system of clause 33, wherein the first and second set of parameters include descriptions of the first and second set of functions.

36. A system for automating long-horizon interface workflows, comprising:

interface automation logic configured to:

receive an agent specification that applies an agent function to a prompt to seek automation of a task on an interface;

capture a state of the interface;

generate agent calls based on the agent specification and the state, wherein the agent calls cause an agent to translate the agent function into a cascade of interface element-interface operation pairs that terminates when the task is automated on the interface, wherein a particular interface element-interface operation pair in the cascade of interface element-interface operation pairs applies a particular interface operation on a particular interface element of the interface; and actuates the cascade of interface element-interface operation pairs on the interface.

37. The system of clause 36, wherein interface operations in the cascade of interface element-interface operation pairs include a plurality of visual web tasks that the agent is trained to perform.

38. The system of clause 37, wherein the plurality of visual web tasks includes website-wise tasks, element-wise tasks, and action-wise tasks.

39. The system of clause 38, wherein the website-wise tasks include heading optical character recognition (OCR), captioning, and web question answering (WebQA).

40. The system of clause 38, wherein the element-wise tasks include element optical character recognition (OCR) and element grounding.

41. The system of clause 38, wherein the action-wise tasks include action grounding and action prediction.

42. The system of clause 36, wherein the agent is further configured to locate elements on the interface based on processing a screenshot of the interface and a text description seeking coordinates of a particular element on the interface.

43. The system of clause 42, wherein the agent is further configured to answer questions about screenshots of websites and documents.

44. The system of clause 36, wherein the state includes at least one screenshot of the interface, a description of the task, and a history of previous cascades of interface element-interface operation pairs.

45. The system of clause 36, wherein the agent is further configured to output the cascade of interface element-interface operation pairs as a sequence of actuation commands.

46. The system of clause 45, further configured to comprise actuation logic in communication with the interface automation logic, wherein the actuation logic is configured to receive the sequence of actuation commands from the agent, and to trigger one or more machine-actuated actions based on the sequence of actuation commands as synthetic actions that automate the task.

47. The system of clause 36, wherein the agent specification is constructable using various degrees of expressiveness.

48. The system of clause 47, wherein the agent specification is constructed using natural language commands.

49. The system of clause 48, wherein the agent specification is constructed using prescriptive commands.

50. The system of clause 49, wherein the agent specification is constructed using a combination of the natural language commands and the prescriptive commands.

51. The system of clause 36, wherein the agent calls are multimodal agent calls.

52. The system of clause 1, wherein the agent is further configured to operate in a virtual machine after user authentication into the virtual machine, and to take a plurality of actions in the virtual machine without access to user credentials used for the user authentication.

53. A computer-implemented method for interface automation, the computer-implemented method comprising:

processing, with an agent, an input that specifies an interface workflow, wherein the interface workflow is otherwise implementable by one or more user-actuated actions directed towards an interface by a user; and generating, with the agent, an output that specifies a sequence of actuation commands, wherein the sequence of actuation commands triggers one or more machine-actuated actions that replicate the user-actuated actions on the interface and cause automation of the interface workflow.

54. The s computer-implemented method of clause 53, wherein the input is a natural language description of the interface workflow.

55. The computer-implemented method of clause 53, wherein the input is a prescriptive command (e.g., a tuple) that translates the interface workflow into one or more functions and one or more parameters.

56. The computer-implemented method of clause 55, wherein the parameters are key-value pairs.

57. The computer-implemented method of clause 55, wherein the parameters include descriptions of the functions.

58. The computer-implemented method of clause 53, wherein the input includes a state of the interface prior to the execution of the interface workflow.

59. The computer-implemented method of clause 53, wherein the state of the interface prior to the execution of the interface workflow includes one or more snapshots of the interface.

60. The computer-implemented method of clause 53, wherein the state of the interface prior to the execution of the interface workflow includes metadata about the interface (e.g., variables, browser metadata).

61. The computer-implemented method of clause 53, wherein the state of the interface prior to the execution of the interface workflow includes one or more thoughts from the user that contextualize the state (e.g., the page is not loading).

62. The computer-implemented method of clause 53, wherein the state of the interface prior to the execution of the interface workflow includes one or more hints from the user that contextualize the interface workflow (e.g., the page is not loading).

63. The computer-implemented method of clause 53, wherein the state of the interface prior to the execution of the interface workflow includes a description of the interface workflow provided by the user.

64. The computer-implemented method of clause 53, wherein the interface workflow includes a plurality of sub-tasks.

65. The computer-implemented method of clause 64, wherein a current sub-task in the plurality of sub-tasks is a result of executing one or more preceding sub-tasks in the plurality of sub-tasks.

66. The computer-implemented method of clause 65, wherein the state of the interface prior to the execution of the current sub-task includes one or more snapshots of the interface corresponding to the current sub-task, one or more snapshots of the interface corresponding to the preceding sub-tasks, and one or more sequences of actuation commands corresponding to the preceding sub-tasks.

67. The computer-implemented method of clause 53, further comprising receiving, with an actuator, the sequence of actuation commands from the agent and performing, with the actuator, the machine-actuated actions based on the sequence of actuation commands as synthetic actions that automate the interface workflow.

68. The computer-implemented method of clause 53, wherein the user-actuated actions include clicks, hovers, scrolls, picks, text entries, and form fills.

69. The computer-implemented method of clause 53, wherein the interface is part of an application.

70. The computer-implemented method of clause 69, wherein the application is a web application (e.g., a browser).

71. The computer-implemented method of clause 69, wherein the application is a native application (e.g., a desktop application).

72. The computer-implemented method of clause 53, further comprising using, with the agent, rejection sampling to output the sequence of actuation commands.

73. The computer-implemented method of clause 53, further comprising training the agent to perform a plurality of visual web tasks.

74. The computer-implemented method of clause 73, wherein the plurality of visual web tasks includes website-wise tasks, element-wise tasks, and action-wise tasks.

75. The computer-implemented method of clause 74, wherein the website-wise tasks include heading optical character recognition (OCR), captioning, and web question answering (WebQA).

76. The computer-implemented method of clause 74, wherein the element-wise tasks include element optical character recognition (OCR), element grounding/localization, and key-value pair identification.

77. The computer-implemented method of clause 74, wherein the action-wise tasks include action grounding and action prediction.

78. The computer-implemented method of clause 53, further comprising locating, with the agent, elements on the interface based on processing a screenshot of the interface and a text description seeking coordinates of a particular element on the interface.

79. The computer-implemented method of clause 78, further comprising answering, with the agent, questions about screenshots of websites and documents.

80. The computer-implemented method of clause 53, wherein the interface workflow is a multimodal interface workflow.

81. A computer-implemented method for interface automation, the computer-implemented method comprising:

with an agent configured to automate a sequence of interface workflows:

receiving, for a first interface workflow in the sequence of interface workflows, a screenshot of a first interface and a first interface workflow definition, wherein the first interface has a first set of interface elements that when configured with a first configuration execute the first interface workflow;

processing the screenshot of the first interface and the first interface workflow definition, and, in response, generate a first sequence of actuation commands that automatically configures the first set of interface elements with the first configuration and causes execution of the first interface workflow;

receiving, for a second interface workflow in the sequence of interface workflows, a screenshot of a second interface, a second interface workflow definition, the screenshot of the first interface, and the first sequence of actuation commands, wherein the second interface has a second set of interface elements that when configured with a second configuration execute the second interface workflow; and processing the screenshot of the second interface, the second interface workflow definition, the screenshot of the first interface, and the first sequence of actuation commands, and, in response, generate a second sequence of actuation commands that automatically configures the second set of interface elements with the second configuration and causes execution of the second interface workflow.

82. The computer-implemented method of clause 81, further comprising receiving, with an actuator, the first and second sequences of actuation commands from the agent and executing, with the actuator, the first and second sequences of actuation commands as synthetic actions that automate the first and second interface workflows.

83. The computer-implemented method of clause 82, further comprising sending, with the actuator, the screenshots of the first and second interfaces to the agent.

84. The computer-implemented method of clause 81, wherein the first interface workflow definition is a natural language description of the first interface workflow, wherein the second interface workflow definition is a natural language description of the second interface workflow.

85. The computer-implemented method of clause 81, wherein the first interface workflow definition is a first tuple that translates the first interface workflow into a first set of functions and a first set of parameters, wherein the second interface workflow definition is a second tuple that translates the second interface workflow into a second set of functions and a second set of parameters.

86. The computer-implemented method of clause 85, wherein the first and second set of parameters are key-value pairs.

87. The computer-implemented method of clause 85, wherein the first and second set of parameters include descriptions of the first and second set of functions.

88. A computer-implemented method for automating long-horizon interface workflows, the computer-implemented method comprising:

with interface automation logic:

receiving an agent specification that applies an agent function to a prompt to seek automation of a task on an interface;

capturing a state of the interface;

generating agent calls based on the agent specification and the state, wherein the agent calls cause an agent to translate the agent function into a cascade of interface element-interface operation pairs that terminates when the task is automated on the interface, wherein a particular interface element-interface operation pair in the cascade of interface element-interface operation pairs applies a particular interface operation on a particular interface element of the interface; and actuating the cascade of interface element-interface operation pairs on the interface.

89. The computer-implemented method of clause 88, wherein interface operations in the cascade of interface element-interface operation pairs include a plurality of visual web tasks that the agent is trained to perform.

90. The computer-implemented method of clause 89, wherein the plurality of visual web tasks includes website-wise tasks, element-wise tasks, and action-wise tasks.

91. The computer-implemented method of clause 90, wherein the website-wise tasks include heading optical character recognition (OCR), captioning, and web question answering (WebQA).

92. The computer-implemented method of clause 90, wherein the element-wise tasks include element optical character recognition (OCR) and element grounding.

93. The computer-implemented method of clause 90, wherein the action-wise tasks include action grounding and action prediction.

94. The computer-implemented method of clause 88, further comprising locating, with the agent, elements on the interface based on processing a screenshot of the interface and a text description seeking coordinates of a particular element on the interface.

95. The computer-implemented method of clause 94, further comprising answering, with the agent, questions about screenshots of websites and documents.

96. The computer-implemented method of clause 88, wherein the state includes at least one screenshot of the interface, a description of the task, and a history of previous cascades of interface element-interface operation pairs.

97. The computer-implemented method of clause 88, further comprising outputting, with the agent, the cascade of interface element-interface operation pairs as a sequence of actuation commands.

98. The computer-implemented method of clause 98, further comprising receiving, with actuation logic in communication with the interface automation logic, the sequence of actuation commands from the agent and triggering, with the actuation logic, one or more machine-actuated actions based on the sequence of actuation commands as synthetic actions that automate the task.

99. The computer-implemented method of clause 88, wherein the agent specification is constructable using various degrees of expressiveness.

100. The computer-implemented method of clause 99, wherein the agent specification is constructed using natural language commands.

101. The computer-implemented method of clause 100, wherein the agent specification is constructed using prescriptive commands.

102. The computer-implemented method of clause 101, wherein the agent specification is constructed using a combination of the natural language commands and the prescriptive commands.

103. The computer-implemented method of clause 88, wherein the agent calls are multimodal agent calls.

104. The computer-implemented method of clause 88, further comprising operating, with the agent, in a virtual machine after user authentication into the virtual machine and taking, with the agent, a plurality of actions in the virtual machine without access to user credentials used for the user authentication.

3rd Clause Set (Adept Workflow Language (AWL))

1. A system for constructing prompts that cause an agent to automate multimodal interface workflows, comprising:

agent specification logic configured to construct agent specifications using prompts and agent functions, wherein the agent specifications are configured to automate a multimodal interface workflow; and agent calling logic, in communication with the agent specification logic, and configured to translate the agent specifications into agent calls that cause an agent to implement the agent functions to produce outputs that are responsive to the prompts.

2. The system of clause 1, wherein the agent specifications are constructable using various degrees of expressiveness.

3. The system of clause 2, wherein the agent specifications are constructed using natural language commands.

4. The system of clause 3, wherein the agent specifications are constructed using prescriptive commands.

5. The system of clause 4, wherein the agent specifications are constructed using a combination of the natural language commands and the prescriptive commands.

6. The system of clause 2, wherein the various degrees of expressiveness range from click-level prompts to step-level prompts to task-level prompts.

7. The system of clause 2, wherein the agent specifications include interface operations and interface elements.

8. The system of clause 7, wherein the agent specifications do not include the interface operations and the interface elements.

9. The system of clause 8, wherein the agent functions apply the interface operations to the interface elements.

10. The system of clause 1, wherein the outputs are a sequence of actuation commands.

11. The system of clause 10, wherein the agent calls are multimodal agent calls.

12. The system of clause 11, further configured to comprise actuation logic, wherein the actuation logic is configured to receive the sequence of actuation commands from the agent, and to trigger one or more machine-actuated actions based on the sequence of actuation commands as synthetic actions that automate the multimodal interface workflow.

13. The system of clause 1, wherein the agent specifications are configured to provide abstractions that conceal complexities of webpage document object models (DOMs).

14. The system of clause 1, wherein the agent functions include answerQuestionAboutScreen, goToURL, act, typeIntoElement, click, type, wait, goToSong, compose, answerTrueFalseQuestionAboutScreen, composeAndType, getCurrentDate, pickdate, fillform, isVisible, keydown, print, scroll, and spotlight.

15. The system of clause 1, wherein the interface operations include clicks, hovers, scrolls, picks, text entries, and form fills.

16. The system of clause 1, wherein the agent specification logic is further configured to construct the agent specifications using another agent.

17. The system of clause 16, wherein the another agent is a large language model (LLM).

18. The system of clause 16, wherein the agent specification logic is further configured to receive a preliminary agent specification from the another agent, and to receive edits from a user to the preliminary agent specification to generate a final agent specification.

19. The system of clause 16, wherein the agent specification logic is further configured to construct the agent specifications using atomic actions.

20. The system of clause 19, wherein the atomic actions include CLICK, TYPE, SCROLL, and ACT.

21. A method for constructing prompts that cause an agent to automate multimodal interface workflows, the method comprising:

constructing, using prompts and agent functions, agent specifications configured to automate a multimodal interface workflow; and translating the agent specifications into agent calls that cause an agent to implement the agent functions to produce outputs that are responsive to the prompts.

22. The method of clause 21, wherein constructing the agent specifications comprises constructing the agent specifications using various degrees of expressiveness.

23. The method of clause 22, wherein constructing the agent specifications comprises constructing the agent specifications using natural language commands.

24. The method of clause 23, wherein constructing the agent specifications comprises constructing the agent specifications using prescriptive commands.

25. The method of clause 24, wherein constructing the agent specifications comprises constructing the agent specifications using a combination of the natural language commands and the prescriptive commands.

26. The method of clause 21, wherein constructing the agent specifications comprises constructing the agent specifications using various degrees of expressiveness ranging from click-level prompts to step-level prompts to task-level prompts.

27. The method of clause 22, wherein constructing the agent specifications comprises constructing the agent specifications the agent specifications to include interface operations and interface elements.

28. The method of clause 22, wherein constructing the agent specifications comprises constructing the agent specifications to not include the interface operations and the interface elements.

29. The method of clause 28 and further comprising applying, with the agent functions, the interface operations to the interface elements.

30. The method of clause 21, wherein translating the agent specifications into agent calls that cause an agent to implement the agent functions to produce outputs that are responsive to the prompts comprises translating the agent specifications into agent calls that cause an agent to implement the agent functions to produce the outputs as a sequence of actuation commands that a responsive to the prompts.

31. The method of clause 30, wherein translating the agent specifications into agent calls comprises translating the agent specifications into, as the agent calls, multimodal agent calls.

32. The method of clause 31 and further comprising:

receiving the sequence of actuation commands from the agent and triggering one or more machine-actuated actions based on the sequence of actuation commands as synthetic actions that automate the multimodal interface workflow.

33. The method of clause 21 and further comprising providing, with the agent specifications, abstractions that conceal complexities of webpage document object models (DOMs).

34. The method of clause 21, wherein the agent functions include answerQuestionAboutScreen, goToURL, act, typeIntoElement, click, type, wait, goToSong, compose, answerTrueFalseQuestionAboutScreen, composeAndType, getCurrentDate, pickdate, fillform, isVisible, keydown, print, scroll, and spotlight.

35. The method of clause 21, wherein the interface operations include clicks, hovers, scrolls, picks, text entries, and form fills.

36. The method of clause 21, wherein constructing the agent specifications comprises constructing the agent specifications using another agent.

37. The method of clause 36, wherein the another agent is a large language model (LLM).

38. The method of clause 36, wherein constructing the agent specifications using another agent comprises:
   receiving a preliminary agent specification from the another agent;
   receiving edits from a user to the preliminary agent specification; and
   generating a final agent specification.

39. The method of clause 36, wherein constructing the agent specifications using another agent comprises constructing the agent specifications using atomic actions.

40. The method of clause 39, wherein the atomic actions include CLICK, TYPE, SCROLL, and ACT.

4th Clause Set (Adept Workflow Language (AWL) Runtime Architecture)

1. A system for client-side implementation of an interface automation language at runtime, comprising:
   agent specification logic, running on client-side, and configured to construct an agent specification, and to make the agent specification available for server-side translation into an intermediate representation, wherein the agent specification is configured to automate a multimodal interface workflow; and
   runtime interpretation logic, running on the client-side, and configured to:
      receive the intermediate representation;
      detect one or more agent functions in the intermediate representation;
      generate one or more agent calls based on the agent functions;
      issue the agent calls to an agent, and, in response, receive at least one runtime actuation function from the agent; and
      translate the runtime actuation function into at least one runtime actuation command, wherein the runtime actuation command triggers at least one machine-actuated action as a runtime synthetic action that automates the multimodal interface workflow.

2. The system of clause 1, wherein the agent functions include built-in functions, planner functions, and workflow functions.

3. The system of clause 2, wherein the built-in functions include answerQuestionAboutScreen, goToURL, typeIntoElement, click, type, wait, goToSong, compose, answerTrueFalseQuestionAboutScreen, composeAndType, getCurrentDate, isVisible, keydown, print, scroll, and spotlight.

4. The system of clause 2, wherein the planner functions include act, fillform, and pickdate.

5. The system of clause 4, wherein the runtime interpretation logic is further configured to invoke an observation logic in response to detecting the act planner function.

6. The system of clause 5, wherein the observation logic is configured to send one or more interface screenshots, an action history, and a task description to the agent.

7. The system of clause 6, wherein the interface screenshots include a current interface screenshot and one or more previous interface screenshots.

8. The system of clause 6, wherein the action history includes a current runtime actuation command and one or more previous runtime actuation commands.

9. The system of clause 6, wherein the task description includes a description of the multimodal interface workflow.

10. The system of clause 1, further comprising a prompt rendering logic that is configured to provide a system prompt, the interface screenshots, the action history, and the task description as model messages to the agent.

11. The system of clause 1, further comprising a prompt rendering logic that is configured to provide a system prompt, the interface screenshots, the action history, and the task description as runtime agent messages to the agent.

12. The system of clause 1, wherein the runtime interpretation logic is further configured to receive a return value from the agent in response to the agent calls.

13. The system of clause 12, wherein the return value specifies whether the multimodal interface workflow has concluded.

14. A computer-implemented method for client-side implementation of an interface automation language at runtime, the computer-implemented method comprising:
   constructing, on the client-side, an agent specification, making the agent specification available for server-side translation into an intermediate representation, wherein the agent specification is configured to automate a multimodal interface workflow;
   receiving, on the client-side, the intermediate representation;
   detecting, on the client-side, one or more agent functions in the intermediate representation;
   generating, on the client-side, one or more agent calls based on the agent functions;
   issuing, on the client-side, the agent calls to an agent on the server-side, and, in response, receiving, on the client-side, at least one runtime actuation function from the agent; and
   translating, on the client-side, the runtime actuation function into at least one runtime actuation command, wherein the runtime actuation command triggers at least one machine-actuated action as a runtime synthetic action that automates the multimodal interface workflow.

15. The computer-implemented method of clause 14, wherein the agent functions include built-in functions, planner functions, and workflow functions.

16. The computer-implemented method of clause 15, wherein the built-in functions include answerQuestionAboutScreen, goToURL, typeIntoElement, click, type, wait, goToSong, compose, answerTrueFalseQuestionAboutScreen, composeAndType, getCurrentDate, isVisible, keydown, print, scroll, and spotlight.

17. The computer-implemented method of clause 15, wherein the planner functions include act, fillform, and pickdate.

18. The computer-implemented method of clause 17, further comprising invoking an observation logic in response to detecting the act planner function.

19. The computer-implemented method of clause 18, sending, with the observation logic, one or more interface screenshots, an action history, and a task description to the agent.

20. The computer-implemented method of clause 19, wherein the interface screenshots include a current interface screenshot and one or more previous interface screenshots.

21. The computer-implemented method of clause 19, wherein the action history includes a current runtime actuation command and one or more previous runtime actuation commands.

22. The computer-implemented method of clause 19, wherein the task description includes a description of the multimodal interface workflow.

23. The computer-implemented method of clause 14, further comprising providing, with prompt rendering logic, a system prompt, the interface screenshots, the action history, and the task description as model messages to the agent.

24. The computer-implemented method of clause 14, further comprising providing, with prompt rendering logic, a system prompt, the interface screenshots, the action history, and the task description as runtime agent messages to the agent.

25. The computer-implemented method of clause 14, further comprising receiving, on the client-side, a return value from the agent in response to the agent calls.

26. The computer-implemented method of clause 25, wherein the return value specifies whether the multimodal interface workflow has concluded.

5th Clause Set (Training Data)

1. A system for automating software usage, comprising:
   an agent configured to automate software usage, wherein the agent is trained on:
      a first training dataset including documents containing text interleaved with images;
      a second training dataset including text embedded in images;
      a third training dataset including recorded videos of software usage;
      a fourth training dataset including portable document format (PDF) documents;
      a fifth training dataset including recorded videos of software tool usage trajectories, wherein;
      a sixth training dataset including images of open-domain web pages;
      a seventh training dataset including images of specific-domain web pages; and/or
      an eighth training dataset including images of agentic trajectories of the agent performing interface automation task workflows.

2. The system of clause 1, wherein images in the recorded videos of software tool usage trajectories are interleaved with text descriptions of tasks executed in the recorded videos through the software tool usage trajectories.

3. The system of clause 2, wherein the images in the recorded videos of software tool usage trajectories are further interleaved with text descriptions of actions executed on the images and image annotations resulting from execution of the actions.

4. The system of clause 3, wherein the actions include clicking, scrolling, and typing.

5. The system of clause 1, wherein the images of open-domain web pages are automatically crawled.

6. The system of clause 5, wherein the open-domain web pages are multimodal web pages.

7. The system of clause 5, wherein the open-domain web pages are part of software tools.

8. The system of clause 5, wherein the images of open-domain web pages are interleaved with text descriptions of synthetic tasks and image annotations resulting from execution of the synthetic tasks.

9. The system of clause 8, wherein the synthetic tasks include website-wise tasks, element-wise tasks, and action-wise tasks.

10. The system of clause 9, wherein the website-wise tasks include heading optical character recognition (OCR), captioning, and web question answering (WebQA).

11. The system of clause 9, wherein the element-wise tasks include element optical character recognition (OCR), element grounding/localization, and key-value pair identification.

12. The system of clause 9, wherein the action-wise tasks include action grounding and action prediction.

13. The system of clause 8, wherein the images of open-domain web pages are further interleaved with unified resource locators (URLs) of the open-domain web pages.

14. The system of clause 1, wherein the specific-domain web pages are multimodal web pages.

15. The system of clause 14, wherein the specific-domain web pages are part of software tools.

16. The system of clause 15, wherein the images of specific-domain web pages are curated at complex states of the software tools.

17. The system of clause 14, wherein the images of specific-domain web pages are interleaved with text descriptions of synthetic tasks and image annotations resulting from execution of the synthetic tasks.

18. The system of clause 17, wherein the synthetic tasks include website-wise tasks, element-wise tasks, and action-wise tasks.

19. The system of clause 18, wherein the website-wise tasks include heading optical character recognition (OCR), captioning, and web question answering (WebQA).

20. The system of clause 18, wherein the element-wise tasks include element optical character recognition (OCR), element grounding/localization, and key-value pair identification.

21. The system of clause 18, wherein the action-wise tasks include action grounding and action prediction.

22. The system of clause 17, wherein the images of specific-domain web pages are further interleaved with unified resource locators (URLs) of the specific-domain web pages.

23. The system of clause 1, wherein the images of agentic trajectories of the agent performing interface automation task workflows are interleaved with agent instructions, agent actions, agent thoughts, interface document object models (DOMs), and interface unified resource locators (URLs).

24. The system of clause 23, wherein the images of agentic trajectories of the agent performing interface automation task workflows are organized as respective training examples that correspond to respective steps in the interface automation task workflows.

25. The system of clause 23, wherein the agent actions include current and previous actions.

26. The system of clause 23, wherein the images of agentic trajectories of the agent performing interface automation task workflows include current and previous interface screenshots.

27. The system of clause 23, wherein the images of agentic trajectories of the agent performing interface automation task workflows are selected based on approval from a human oracle on how well the agent performed the interface automation task workflows.

28. The system of clause 1, further configured to use some of the first, second, third, fourth, fifth, sixth, seventh, and eights training datasets for pre-training the agent, for post-training the agent, for finisher training the agent, for combined fine-tuning of the agent, and for agentic-fine tuning of the agent.

29. A system for automating software usage, comprising:
   an agent configured to interface automation task workflows comprising a sequence of steps,
      wherein the agent is trained on a sequence of training datasets,
      wherein respective training datasets in the sequence of training datasets correspond to respective steps in the sequence of steps, and wherein a particular training dataset in the sequence of training dataset corresponding to a particular step in the sequence of steps includes a multitude of interface images of the particular step being performed over multitude of iterations.

30. A system for automating software usage, comprising:
an agent configured to interface automation task workflows, wherein the agent is trained on high-fidelity training datasets comprising:
interface images labelled with data identifying interface elements; and
interface images labelled with data identifying interface operations applied on the interface elements.

31. The system of clause 30, wherein the data identifying the interface elements includes text description of the interface elements.

32. The system of clause 30, wherein the data identifying the interface elements includes contextual description of the interface elements.

33. The system of clause 30, wherein the data identifying the interface elements includes inter-element relationship description of the interface elements.

34. The system of clause 30, further configured to comprise labelling logic configured to receive inputs that labels the interface images with the data identifying interface elements and the data identifying interface operations applied on the interface elements.

35. A system for effectively collecting on-policy feedback for ongoing agent fine-tuning, comprising:
prompt processing logic configured to receive a prompt from an annotator for a run of a task, and to cause an agent to process the prompt and to generate an output in response to processing the prompt;
output evaluation logic configured to make the output available to the annotator for review, and to receive approval or disapproval from the annotator on the output;
training data construction logic configured to store the output as training data for future training of the agent in response to determining that the annotator has approved the output, that the run is concluded, and that the task is solved;
run continuation logic configured to cause the agent to generate a subsequent output in response to determining that the annotator has approved the output and that the run is not concluded; and
output revision logic configured to cause the agent to generate a revised output in response to determining that the annotator has disapproved the output and receiving corrective instructions from the annotator, and to make the revised output available to the annotator for review, and to receive approval or disapproval from the annotator on the revised output.

36. A computer-implemented method for automating software usage, the computer-implemented method comprising:
training an agent configured to automate software usage on:
a first training dataset including documents containing text interleaved with images;
a second training dataset including text embedded in images;
a third training dataset including recorded videos of software usage;
a fourth training dataset including portable document format (PDF) documents;
a fifth training dataset including recorded videos of software tool usage trajectories, wherein;
a sixth training dataset including images of open-domain web pages;
a seventh training dataset including images of specific-domain web pages; and/or
an eighth training dataset including images of agentic trajectories of the agent performing interface automation task workflows.

37. The computer-implemented method of clause 36, wherein images in the recorded videos of software tool usage trajectories are interleaved with text descriptions of tasks executed in the recorded videos through the software tool usage trajectories.

38. The computer-implemented method of clause 37, wherein the images in the recorded videos of software tool usage trajectories are further interleaved with text descriptions of actions executed on the images and image annotations resulting from execution of the actions.

39. The computer-implemented method of clause 38, wherein the actions include clicking, scrolling, and typing.

40. The computer-implemented method of clause 36, wherein the images of open-domain web pages are automatically crawled.

41. The computer-implemented method of clause 40, wherein the open-domain web pages are multimodal web pages.

42. The computer-implemented method of clause 40, wherein the open-domain web pages are part of software tools.

43. The computer-implemented method of clause 40, wherein the images of open-domain web pages are interleaved with text descriptions of synthetic tasks and image annotations resulting from execution of the synthetic tasks.

44. The computer-implemented method of clause 43, wherein the synthetic tasks include website-wise tasks, element-wise tasks, and action-wise tasks.

45. The computer-implemented method of clause 44, wherein the website-wise tasks include heading optical character recognition (OCR), captioning, and web question answering (WebQA).

46. The computer-implemented method of clause 44, wherein the element-wise tasks include element optical character recognition (OCR), element grounding/localization, and key-value pair identification.

47. The computer-implemented method of clause 44, wherein the action-wise tasks include action grounding and action prediction.

48. The computer-implemented method of clause 43, wherein the images of open-domain web pages are further interleaved with unified resource locators (URLs) of the open-domain web pages.

49. The computer-implemented method of clause 36, wherein the specific-domain web pages are multimodal web pages.

50. The computer-implemented method of clause 49, wherein the specific-domain web pages are part of software tools.

51. The computer-implemented method of clause 50, wherein the images of specific-domain web pages are curated at complex states of the software tools.

52. The computer-implemented method of clause 49, wherein the images of specific-domain web pages are interleaved with text descriptions of synthetic tasks and image annotations resulting from execution of the synthetic tasks.

53. The computer-implemented method of clause 52, wherein the synthetic tasks include website-wise tasks, element-wise tasks, and action-wise tasks.

54. The computer-implemented method of clause 53, wherein the website-wise tasks include heading optical character recognition (OCR), captioning, and web question answering (WebQA).

55. The computer-implemented method of clause 53, wherein the element-wise tasks include element optical character recognition (OCR), element grounding/localization, and key-value pair identification.

56. The computer-implemented method of clause 53, wherein the action-wise tasks include action grounding and action prediction.

57. The computer-implemented method of clause 52, wherein the images of specific-domain web pages are further interleaved with unified resource locators (URLs) of the specific-domain web pages.

58. The computer-implemented method of clause 36, wherein the images of agentic trajectories of the agent performing interface automation task workflows are interleaved with agent instructions, agent actions, agent thoughts, interface document object models (DOMs), and interface unified resource locators (URLs).

59. The computer-implemented method of clause 58, wherein the images of agentic trajectories of the agent performing interface automation task workflows are organized as respective training examples that correspond to respective steps in the interface automation task workflows.

60. The computer-implemented method of clause 58, wherein the agent actions include current and previous actions.

61. The computer-implemented method of clause 58, wherein the images of agentic trajectories of the agent performing interface automation task workflows include current and previous interface screenshots.

62. The computer-implemented method of clause 58, wherein the images of agentic trajectories of the agent performing interface automation task workflows are selected based on approval from a human oracle on how well the agent performed the interface automation task workflows.

63. The computer-implemented method of clause 36, further comprising using some of the first, second, third, fourth, fifth, sixth, seventh, and eights training datasets for pre-training the agent, for post-training the agent, for finisher training the agent, for combined fine-tuning of the agent, and for agentic-fine tuning of the agent.

64. A computer-implemented method for automating software usage, the computer-implemented method comprising:

training, an agent configured to interface automation task workflows comprising a sequence of steps, on a sequence of training datasets, wherein respective training datasets in the sequence of training datasets correspond to respective steps in the sequence of steps, and wherein a particular training dataset in the sequence of training dataset corresponding to a particular step in the sequence of steps includes a multitude of interface images of the particular step being performed over multitude of iterations.

65. A computer-implemented method for automating software usage, the computer-implemented method comprising:

training, an agent configured to interface automation task workflows, on high-fidelity training datasets comprising:

interface images labelled with data identifying interface elements; and interface images labelled with data identifying interface operations applied on the interface elements.

66. The computer-implemented method of clause 65, wherein the data identifying the interface elements includes text description of the interface elements.

67. The computer-implemented method of clause 65, wherein the data identifying the interface elements includes contextual description of the interface elements.

68. The computer-implemented method of clause 65, wherein the data identifying the interface elements includes inter-element relationship description of the interface elements.

69. The computer-implemented method of clause 65, further comprising receiving, with labelling logic, inputs that labels the interface images with the data identifying interface elements and the data identifying interface operations applied on the interface elements.

70. A computer-implemented method for effectively collecting on-policy feedback for ongoing agent fine-tuning, the computer-implemented method comprising:

with prompt processing logic, receiving a prompt from an annotator for a run of a task and causing an agent to process the prompt and to generate an output in response to processing the prompt;

with output evaluation logic, making the output available to the annotator for review and receiving approval or disapproval from the annotator on the output;

with training data construction logic, storing the output as training data for future training of the agent in response to determining that the annotator has approved the output, that the run is concluded, and that the task is solved;

with run continuation logic, causing the agent to generate a subsequent output in response to determining that the annotator has approved the output and that the run is not concluded; and with revision logic, causing the agent to generate a revised output in response to determining that the annotator has disapproved the output and receiving corrective instructions from the annotator, making the revised output available to the annotator for review, and receiving approval or disapproval from the annotator on the revised output.

6$^{th}$ Clause Set (Overall Architecture)

1. A system for providing artificial intelligence agents that automate software usage, comprising: training servers configured to train agents during training;

production servers configured to execute the trained agents during inference;

a plurality of training datasets; and data flow logic configured to:

during the training, provide the agents and the plurality of training datasets to the training servers to cause the training servers to train the agents on the plurality of training datasets and thereby produce the trained agents;

configure the production servers with the trained agents for use during the inference;

during the inference, provide prompts issued by clients to the production servers to cause the production servers to translate the prompts into agent calls to the trained agents that in turn cause the trained agents to generate outputs that are responsive to the prompts; and make the outputs available to the clients.

2. The system of clause 1, wherein the data flow logic is further configured to use some training datasets in the plurality of training datasets for pre-training the agents, for post-training the agents, for finisher training the agents, for combined fine-tuning of the agents, and for agentic-fine tuning of the agents.

3. The system of clause 1, wherein the data flow logic is further configured to cause the training servers to periodically retrain the trained agents.

4. The system of clause 3, wherein the data flow logic is further configured to periodically reconfigure the production servers with the retrained agents.

5. The system of clause 1, wherein the agent calls are multimodal interface automation agent calls.

6. The system of clause 5, wherein the data flow logic is further configured to periodically configure the clients with agent workflow logics that construct, based on the prompts, agent specifications that are configured to issue the multimodal interface automation agent calls to the trained agents.

7. The system of clause 1, wherein the plurality of training datasets includes:

- a first training dataset including documents containing text interleaved with images;
- a second training dataset including text embedded in images;
- a third training dataset including recorded videos of software usage;
- a fourth training dataset including portable document format (PDF) documents;
- a fifth training dataset including recorded videos of software tool usage trajectories, wherein;
- a sixth training dataset including images of open-domain web pages;
- a seventh training dataset including images of specific-domain web pages; and/or
- an eighth training dataset including images of agentic trajectories of the agent performing interface automation task workflows.

8. The system of clause 7, wherein images in the recorded videos of software tool usage trajectories are interleaved with text descriptions of tasks executed in the recorded videos through the software tool usage trajectories.

9. The system of clause 8, wherein the images in the recorded videos of software tool usage trajectories are further interleaved with text descriptions of actions executed on the images and image annotations resulting from execution of the actions.

10. The system of clause 9, wherein the actions include clicking, scrolling, and typing.

11. The system of clause 7, wherein the images of open-domain web pages are automatically crawled.

12. The system of clause 11, wherein the open-domain web pages are multimodal web pages.

13. The system of clause 11, wherein the open-domain web pages are part of software tools.

14. The system of clause 11, wherein the images of open-domain web pages are interleaved with text descriptions of synthetic tasks and image annotations resulting from execution of the synthetic tasks.

15. The system of clause 14, wherein the synthetic tasks include website-wise tasks, element-wise tasks, and action-wise tasks.

16. The system of clause 15, wherein the website-wise tasks include heading optical character recognition (OCR), captioning, and web question answering (WebQA).

17. The system of clause 15, wherein the element-wise tasks include element optical character recognition (OCR), element grounding/localization, and key-value pair identification.

18. The system of clause 15, wherein the action-wise tasks include action grounding and action prediction.

19. The system of clause 8, wherein the images of open-domain web pages are further interleaved with unified resource locators (URLs) of the open-domain web pages.

20. The system of clause 7, wherein the specific-domain web pages are multimodal web pages.

21. The system of clause 20, wherein the specific-domain web pages are part of software tools.

22. The system of clause 21, wherein the images of specific-domain web pages are curated at complex states of the software tools.

23. The system of clause 20, wherein the images of specific-domain web pages are interleaved with text descriptions of synthetic tasks and image annotations resulting from execution of the synthetic tasks.

24. The system of clause 23, wherein the synthetic tasks include website-wise tasks, element-wise tasks, and action-wise tasks.

25. The system of clause 24, wherein the website-wise tasks include heading optical character recognition (OCR), captioning, and web question answering (WebQA).

26. The system of clause 24, wherein the element-wise tasks include element optical character recognition (OCR), element grounding/localization, and key-value pair identification.

27. The system of clause 24, wherein the action-wise tasks include action grounding and action prediction.

28. The system of clause 23, wherein the images of specific-domain web pages are further interleaved with unified resource locators (URLs) of the specific-domain web pages.

29. The system of clause 7, wherein the images of agentic trajectories of the agent performing interface automation task workflows are interleaved with agent instructions, agent actions, agent thoughts, interface document object models (DOMs), and interface unified resource locators (URLs).

30. The system of clause 23, wherein the images of agentic trajectories of the agent performing interface automation task workflows are organized as respective training examples that correspond to respective steps in the interface automation task workflows.

31. The system of clause 30, wherein the agent actions include current and previous actions.

32. The system of clause 30, wherein the images of agentic trajectories of the agent performing interface automation task workflows include current and previous interface screenshots.

33. The system of clause 30, wherein the images of agentic trajectories of the agent performing interface automation task workflows are selected based on approval from a human oracle on how well the agent performed the interface automation task workflows.

34. A computer-implemented method for providing artificial intelligence agents that automate software usage, the computer-implemented method comprising:

- training, with training servers, agents;
- executing, with production servers, the trained agents during inference;
- providing, during the training, the agents and a plurality of training datasets to the training servers to cause the training servers to train the agents on the plurality of training datasets and thereby produce the trained agents;
- configuring the production servers with the trained agents for use during the inference;
- providing, during the inference, prompts issued by clients to the production servers to cause the production servers to translate the prompts into agent calls to the trained agents that in turn cause the trained agents to generate outputs that are responsive to the prompts; and making the outputs available to the clients.

35. The computer-implemented method of clause 34, further comprising using some training datasets in the plurality of training datasets for pre-training the agents, for post-training the agents, for finisher training the agents, for combined fine-tuning of the agents, and for agentic-fine tuning of the agents.

36. The computer-implemented method of clause 34, further comprising causing the training servers to periodically retrain the trained agents.

37. The computer-implemented method of clause 36, further comprising periodically reconfiguring the production servers with the retrained agents.

38. The computer-implemented method of clause 34, wherein the agent calls are multimodal interface automation agent calls.

39. The computer-implemented method of clause 38, further comprising periodically configuring the clients with agent workflow logics that construct, based on the prompts, agent specifications that are configured to issue the multimodal interface automation agent calls to the trained agents.

40. The computer-implemented method of clause 34, wherein the plurality of training datasets includes:

a first training dataset including documents containing text interleaved with images;

a second training dataset including text embedded in images;

a third training dataset including recorded videos of software usage;

a fourth training dataset including portable document format (PDF) documents;

a fifth training dataset including recorded videos of software tool usage trajectories, wherein;

a sixth training dataset including images of open-domain web pages;

a seventh training dataset including images of specific-domain web pages; and/or an eighth training dataset including images of agentic trajectories of the agent performing interface automation task workflows.

41. The computer-implemented method of clause 40, wherein images in the recorded videos of software tool usage trajectories are interleaved with text descriptions of tasks executed in the recorded videos through the software tool usage trajectories.

42. The computer-implemented method of clause 41, wherein the images in the recorded videos of software tool usage trajectories are further interleaved with text descriptions of actions executed on the images and image annotations resulting from execution of the actions.

43. The computer-implemented method of clause 42, wherein the actions include clicking, scrolling, and typing.

44. The computer-implemented method of clause 40, wherein the images of open-domain web pages are automatically crawled.

45. The computer-implemented method of clause 44, wherein the open-domain web pages are multimodal web pages.

46. The computer-implemented method of clause 44, wherein the open-domain web pages are part of software tools.

47. The computer-implemented method of clause 44, wherein the images of open-domain web pages are interleaved with text descriptions of synthetic tasks and image annotations resulting from execution of the synthetic tasks.

48. The computer-implemented method of clause 47, wherein the synthetic tasks include website-wise tasks, element-wise tasks, and action-wise tasks.

49. The computer-implemented method of clause 48, wherein the website-wise tasks include heading optical character recognition (OCR), captioning, and web question answering (WebQA).

50. The computer-implemented method of clause 48, wherein the element-wise tasks include element optical character recognition (OCR), element grounding/localization, and key-value pair identification.

51. The computer-implemented method of clause 48, wherein the action-wise tasks include action grounding and action prediction.

52. The computer-implemented method of clause 41, wherein the images of open-domain web pages are further interleaved with unified resource locators (URLs) of the open-domain web pages.

53. The computer-implemented method of clause 40, wherein the specific-domain web pages are multimodal web pages.

54. The computer-implemented method of clause 53, wherein the specific-domain web pages are part of software tools.

55. The computer-implemented method of clause 54, wherein the images of specific-domain web pages are curated at complex states of the software tools.

56. The computer-implemented method of clause 53, wherein the images of specific-domain web pages are interleaved with text descriptions of synthetic tasks and image annotations resulting from execution of the synthetic tasks.

57. The computer-implemented method of clause 56, wherein the synthetic tasks include website-wise tasks, element-wise tasks, and action-wise tasks.

58. The computer-implemented method of clause 57, wherein the website-wise tasks include heading optical character recognition (OCR), captioning, and web question answering (WebQA).

59. The computer-implemented method of clause 57, wherein the element-wise tasks include element optical character recognition (OCR), element grounding/localization, and key-value pair identification.

60. The computer-implemented method of clause 57, wherein the action-wise tasks include action grounding and action prediction.

61. The computer-implemented method of clause 56, wherein the images of specific-domain web pages are further interleaved with unified resource locators (URLs) of the specific-domain web pages.

62. The computer-implemented method of clause 40, wherein the images of agentic trajectories of the agent performing interface automation task workflows are interleaved with agent instructions, agent actions, agent thoughts, interface document object models (DOMs), and interface unified resource locators (URLs).

63. The computer-implemented method of clause 40, wherein the images of agentic trajectories of the agent performing interface automation task workflows are organized as respective training examples that correspond to respective steps in the interface automation task workflows.

64. The computer-implemented method of clause 63, wherein the agent actions include current and previous actions.

65. The computer-implemented method of clause 63, wherein the images of agentic trajectories of the agent performing interface automation task workflows include current and previous interface screenshots.

66. The computer-implemented method of clause 63, wherein the images of agentic trajectories of the agent performing interface automation task workflows are selected based on approval from a human oracle on how well the agent performed the interface automation task workflows.

7th Clause Set (Agentic Interface Automation)

1. A system for image-text agentic interface automation, comprising:
   - a multimodal agent configured to process arbitrary-length text sequences and arbitrary-resolution images:
     - memory storing an input image and an input text sequence;
     - patch extraction logic configured to extract image patches from the input image on a line-by-line basis, and generate a plurality of lines of image patches for the input image;
     - newline insertion logic configured to interleave a newline character between successive lines of image patches in the plurality of lines of image patches, wherein the newline character specifies an end of a line in the input image;
     - tokenization logic configured to translate the input text sequence into a sequence of input text tokens, and to translate the successive lines of image patches interleaved with the newline character into a sequence of input image tokens;
     - linear projection logic configured to linearly project a single token stream of the sequence of input text tokens and the sequence of input image tokens into a decoder-only transformer logic, wherein the linear projection of the single token stream bypasses any embedding lookup; and
     - the decoder-only transformer logic configured to process the linearly projected, embedding lookup-bypassed single token stream to generate a sequence of output tokens that are responsive to the input image and the input text sequence.

2. The system of clause 1, wherein the line in the input image is a row of image patches.

3. The system of clause 1, wherein the line in the input image is a column of image patches.

4. The system of clause 1, wherein the successive lines of image patches are arranged in a raster-scan order.

5. The system of clause 1, wherein the decoder-only Transformer logic is further configured without any image-specific position embeddings.

6. The system of clause 5, wherein the decoder-only Transformer logic is further configured to be trained on images of arbitrary size at training time, thereby obviating separate high and low-resolution training stages.

7. The system of clause 6, wherein the decoder-only Transformer logic is further configured to use existing position embeddings to reason about different image sizes.

8. The system of clause 1, wherein the decoder-only Transformer logic is further configured without a pooling logic.

9. The system of clause 1, wherein the decoder-only Transformer logic is further configured without a causal attention logic.

10. The system of clause 1, wherein the decoder-only Transformer logic is further configured to decouple input embeddings from output embeddings.

11. The system of clause 1, wherein the decoder-only Transformer logic is further configured to use a squared rectified linear unit (ReLU) activation function.

12. The system of clause 1, wherein the decoder-only Transformer logic is further configured to use a rotary positional embedding (RoPE).

13. The system of clause 1, wherein the decoder-only Transformer logic is further configured to add a layer normalization (LayerNorm) function to Query (Q) and Key (K) embeddings before the Q and K embeddings enter attention calculations.

14. A system for image-text agentic interface automation, comprising:
   - a multimodal agent configured to process arbitrary-resolution images:
     - memory storing an input image;
     - patch extraction logic configured to extract image patches from the input image on a line-by-line basis, and generate a plurality of lines of image patches for the input image;
     - newline insertion logic configured to interleave a newline character between successive lines of image patches in the plurality of lines of image patches, wherein the newline character specifies an end of a line in the input image;
     - tokenization logic configured to translate the successive lines of image patches interleaved with the newline character into a sequence of input image tokens;
     - linear projection logic configured to linearly project the sequence of input image tokens into a decoder-only transformer logic, wherein the linear projection of the sequence of input image tokens bypasses any embedding lookup; and
     - the decoder-only transformer logic configured to process the linearly projected, embedding lookup-bypassed sequence of input image tokens to generate a sequence of output tokens that are responsive to the input image.

15. The system of clause 14, wherein the line in the input image is a row of image patches.

16. The system of clause 14, wherein the line in the input image is a column of image patches.

17. The system of clause 14, wherein the decoder-only Transformer logic is further configured without any image-specific position embeddings.

18. The system of clause 17, wherein the decoder-only Transformer logic is further configured to be trained on images of arbitrary size at training time, thereby obviating separate high and low-resolution training stages.

19. The system of clause 18, wherein the decoder-only Transformer logic is further configured to use existing position embeddings to reason about different image sizes.

20. A computer-implemented method for image-text agentic interface automation, including:
   - storing an input image;
   - extracting image patches from the input image on a line-by-line basis, and generating a plurality of lines of image patches for the input image;
   - interleaving a newline character between successive lines of image patches in the plurality of lines of image patches, wherein the newline character specifies an end of a line in the input image;
   - translating the successive lines of image patches interleaved with the newline character into a sequence of input image tokens;
   - linearly projecting the sequence of input image tokens into a decoder-only Transformer logic, wherein the linear projection of the sequence of input image tokens bypasses any embedding lookup; and processing the linearly projected, embedding lookup-bypassed sequence of input image tokens through the decoder-only Transformer logic to generate a sequence of output tokens that are responsive to the input image.

8th Clause Set (Magnitude-Invariant Image-Text Agentic Interface Automation)

1. A system for magnitude-invariant image-text agentic interface automation, comprising:

a multimodal agent configured to process arbitrary-length text sequences and arbitrary-resolution images:

memory storing an input image and an input text sequence;

patch extraction logic configured to extract image patches from the input image on a line-by-line basis, and generate a plurality of lines of images patches for the input image;

bit vectorization logic configured to convert image patches in the plurality of image patches into magnitude-invariant bit vectors, and generate a plurality of lines of magnitude-invariant bit vectors;

newline insertion logic configured to interleave a newline character between successive lines of magnitude-invariant bit vectors in the plurality of lines of images patches, wherein the newline character specifies an end of a line in the input image;

tokenization logic configured to translate the input text sequence into a sequence of input text tokens, and to translate the successive lines of magnitude-invariant bit vectors interleaved with the newline character into a sequence of input magnitude-invariant bit vector tokens;

linear projection logic configured to linearly project a single token stream of the sequence of input text tokens and the sequence of input magnitude-invariant bit vector tokens into a decoder-only Transformer logic, wherein the linear projection of the single token stream bypasses any embedding lookup; and the decoder-only Transformer logic configured to process the linearly projected, embedding lookup-bypassed single token stream to generate a sequence of output tokens that are responsive to the input image and the input text sequence.

2. The system of clause 1, wherein the bit vectorization logic is further configured to apply a RGB555 format compression to convert the image patches in the plurality of image patches into the magnitude-invariant bit vectors, and generate the plurality of lines of magnitude-invariant bit vectors.

3. The system of clause 2, wherein the RGB555 format compression produces three 5-bit values, one for each of subpixel channels R (red), G (green), and B (blue).

4. The system of clause 3, wherein the three 5-bit values take either a 1 value or a −1 value.

5. The system of clause 4, wherein the three 5-bit values are magnitude-invariant to scale modification functions of the decoder-only Transformer logic.

6. The system of clause 5, wherein a layer normalization (LayerNorm) function is one of the scaling functions of the decoder-only Transformer logic.

7. The system of clause 1, wherein the bit vectorization logic is further configured to apply a RGB888 format compression to convert the image patches in the plurality of image patches into the magnitude-invariant bit vectors, and generate the plurality of lines of magnitude-invariant bit vectors.

8. The system of clause 7, wherein the RGB888 format compression produces three 8-bit values, one for each of subpixel channels R (red), G (green), and B (blue).

9. The system of clause 8, wherein the three 8-bit values take either a 1 value or a −1 value.

10. The system of clause 9, wherein the three 8-bit values are magnitude-invariant to scale modification functions of the decoder-only Transformer logic.

11. The system of clause 10, wherein a layer normalization (LayerNorm) function is one of the scaling functions of the decoder-only Transformer logic.

12. The system of clause 1, wherein the bit vectorization logic is further configured to apply a RGB565 format compression to convert the image patches in the plurality of image patches into the magnitude-invariant bit vectors, and generate the plurality of lines of magnitude-invariant bit vectors.

13. The system of clause 12, wherein the RGB565 format compression produces 5-bit values for R (red) and B (blue) subpixel channels and 6-bit values for G (green) subpixel channel.

14. The system of clause 13, wherein the 5-bit and the 6-bit values take either a 1 value or a −1 value.

15. The system of clause 14, wherein the 5-bit and the 6-bit values are magnitude-invariant to scale modification functions of the decoder-only Transformer logic.

16. The system of clause 15, wherein a layer normalization (LayerNorm) function is one of the scaling functions of the decoder-only Transformer logic.

17. A system for magnitude-invariant image-text agentic interface automation, comprising:

a multimodal agent configured to process arbitrary-resolution images:

memory storing an input image;

patch extraction logic configured to extract image patches from the input image on a line-by-line basis, and generate a plurality of lines of image patches for the input image;

bit vectorization logic configured to convert image patches in the plurality of image patches into magnitude-invariant bit vectors, and generate a plurality of lines of magnitude-invariant bit vectors;

newline insertion logic configured to interleave a newline character between successive lines of magnitude-invariant bit vectors in the plurality of lines of images patches, wherein the newline character specifies an end of a line in the input image;

tokenization logic configured to translate the successive lines of magnitude-invariant bit vectors interleaved with the newline character into a sequence of input magnitude-invariant bit vector tokens;

linear projection logic configured to linearly project the sequence of input magnitude-invariant bit vector tokens into a decoder-only Transformer logic, wherein the linear projection of the sequence of input magnitude-invariant bit vector tokens bypasses any embedding lookup; and the decoder-only Transformer logic configured to process the linearly projected, embedding lookup-bypassed sequence of input magnitude-invariant bit vector tokens to generate a sequence of output tokens that are responsive to the input image.

18. A system for magnitude-invariant image-text agentic interface automation, comprising:
a multimodal agent configured to process arbitrary-resolution images:
memory storing an input image;
patch extraction logic configured to extract image patches from the input image on a line-by-line basis, and generate a plurality of lines of image patches for the input image;
bit vectorization logic configured to convert image patches in the plurality of image patches into magnitude-invariant bit vectors, and generate a plurality of lines of magnitude-invariant bit vectors;
tokenization logic configured to translate the successive lines of magnitude-invariant bit vectors into a sequence of input magnitude-invariant bit vector tokens;
linear projection logic configured to linearly project the sequence of input magnitude-invariant bit vector tokens into a decoder-only Transformer logic; and
the decoder-only Transformer logic configured to process the linearly projected sequence of input magnitude-invariant bit vector tokens to generate a sequence of output tokens that are responsive to the input image.

19. A computer-implemented method for magnitude-invariant image-text agentic interface automation, including:
storing an input image;
extracting image patches from the input image on a line-by-line basis, and generating a plurality of lines of image patches for the input image;
converting image patches in the plurality of image patches into magnitude-invariant bit vectors, and generating a plurality of lines of magnitude-invariant bit vectors;
interleaving a newline character between successive lines of magnitude-invariant bit vectors in the plurality of lines of images patches, wherein the newline character specifies an end of a line in the input image;
translating the successive lines of magnitude-invariant bit vectors interleaved with the newline character into a sequence of input magnitude-invariant bit vector tokens;
linearly projecting the sequence of input magnitude-invariant bit vector tokens into a decoder-only Transformer logic, wherein the linear projection of the sequence of input magnitude-invariant bit vector tokens bypasses any embedding lookup; and processing the linearly projected, embedding lookup-bypassed sequence of input magnitude-invariant bit vector tokens through the decoder-only Transformer logic to generate a sequence of output tokens that are responsive to the input image.

20. A computer-implemented method for magnitude-invariant image-text agentic interface automation, including:
storing an input image;
extracting image patches from the input image on a line-by-line basis, and generating a plurality of lines of image patches for the input image;
converting image patches in the plurality of image patches into magnitude-invariant bit vectors, and generating a plurality of lines of magnitude-invariant bit vectors;
translating the successive lines of magnitude-invariant bit vectors into a sequence of input magnitude-invariant bit vector tokens;
linearly projecting the sequence of input magnitude-invariant bit vector tokens into a decoder-only Transformer logic; and
processing the linearly projected sequence of input magnitude-invariant bit vector tokens through the decoder-only Transformer logic to generate a sequence of output tokens that are responsive to the input image.

What is claimed is:

1. A system for image-text agentic interface automation, comprising:
a multimodal agent configured to process arbitrary-length text sequences and arbitrary-resolution images:
memory storing an input image and an input text sequence;
patch extraction logic configured to extract image patches from the input image on a line-by-line basis, and generate a plurality of lines of image patches for the input image;
newline insertion logic configured to interleave a newline character between successive lines of image patches in the plurality of lines of image patches, wherein the newline character specifies an end of a line in the input image;
tokenization logic configured to translate the input text sequence into a sequence of input text tokens, and to translate the successive lines of image patches interleaved with the newline character into a sequence of input image tokens;
linear projection logic configured to linearly project a single token stream of the sequence of input text tokens and the sequence of input image tokens into a decoder-only Transformer logic, wherein the linear projection of the single token stream bypasses any embedding lookup; and
the decoder-only Transformer logic configured to process the linearly projected, embedding lookup-bypassed single token stream to generate a sequence of output tokens that are responsive to the input image and the input text sequence.

2. The system of claim 1, wherein the line in the input image is a row of image patches.

3. The system of claim 1, wherein the line in the input image is a column of image patches.

4. The system of claim 1, wherein the successive lines of image patches are arranged in a raster-scan order.

5. The system of claim 1, wherein the decoder-only Transformer logic is further configured without any image-specific position embeddings.

6. The system of claim 5, wherein the decoder-only Transformer logic is further configured to be trained on images of arbitrary size at training time, thereby obviating separate high and low-resolution training stages.

7. The system of claim 1, wherein the decoder-only Transformer logic is further configured without a pooling logic.

8. The system of claim 1, wherein the decoder-only Transformer logic is further configured without a causal attention logic.

9. The system of claim 1, wherein the decoder-only Transformer logic is further configured to decouple input embeddings from output embeddings.

10. The system of claim 1, wherein the decoder-only Transformer logic is further configured to use a squared rectified linear unit (ReLU) activation function.

11. The system of claim 1, wherein the decoder-only Transformer logic is further configured to use a rotary positional embedding (RoPE).

12. The system of claim 1, wherein the decoder-only Transformer logic is further configured to add a layer normalization (LayerNorm) function to Query (Q) and Key (K) embeddings before the Q and K embeddings enter attention calculations.

13. A system for image-text agentic interface automation, comprising:

a multimodal agent configured to process arbitrary-resolution images:

memory storing an input image;

patch extraction logic configured to extract image patches from the input image on a line-by-line basis, and generate a plurality of lines of image patches for the input image;

newline insertion logic configured to interleave a newline character between successive lines of image patches in the plurality of lines of image patches, wherein the newline character specifies an end of a line in the input image;

tokenization logic configured to translate the successive lines of image patches interleaved with the newline character into a sequence of input image tokens;

linear projection logic configured to linearly project the sequence of input image tokens into a decoder-only Transformer logic, wherein the linear projection of the sequence of input image tokens bypasses any embedding lookup; and the decoder-only Transformer logic configured to process the linearly projected, embedding lookup-bypassed sequence of input image tokens to generate a sequence of output tokens that are responsive to the input image.

14. The system of claim 13, wherein the line in the input image is a row of image patches.

15. The system of claim 13, wherein the line in the input image is a column of image patches.

16. The system of claim 13, wherein the decoder-only Transformer logic is further configured without any image-specific position embeddings.

17. The system of claim 16, wherein the decoder-only Transformer logic is further configured to be trained on images of arbitrary size at training time, thereby obviating separate high and low-resolution training stages.

18. A computer-implemented method for image-text agentic interface automation, including:

storing an input image;

extracting image patches from the input image on a line-by-line basis, and generating a plurality of lines of image patches for the input image;

interleaving a newline character between successive lines of image patches in the plurality of lines of image patches, wherein the newline character specifies an end of a line in the input image;

translating the successive lines of image patches interleaved with the newline character into a sequence of input image tokens;

linearly projecting the sequence of input image tokens into a decoder-only Transformer logic, wherein the linear projection of the sequence of input image tokens bypasses any embedding lookup; and processing the linearly projected, embedding lookup-bypassed sequence of input image tokens through the decoder-only Transformer logic to generate a sequence of output tokens that are responsive to the input image.

* * * * *